United States Patent
Van Os et al.

(10) Patent No.: US 12,105,942 B2
(45) Date of Patent: Oct. 1, 2024

(54) INPUT DEVICE AND USER INTERFACE INTERACTIONS

(71) Applicant: Apple Inc., Cupertino, CA (US)

(72) Inventors: Marcel Van Os, San Francisco, CA (US); William M. Bachman, San Jose, CA (US); Elbert D. Chen, Cupertino, CA (US); Jeffrey L Robbin, Los Altos, CA (US); Joe Howard, San Jose, CA (US); Joshua McGlinn, Mooresville, NC (US); Jonathan Lochhead, Scotts Valley, CA (US); Benjamin W. Keighran, Palo Alto, CA (US); Jennifer L. C. Folse, San Francisco, CA (US); Lynne Kress, Seattle, WA (US); Julian Missig, Burlingame, CA (US); Imran Chaudhri, San Francisco, CA (US); Alessandro Sabatelli, San Francisco, CA (US); Nicholas Zambetti, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/060,902

(22) Filed: Dec. 1, 2022

(65) Prior Publication Data

US 2023/0096458 A1     Mar. 30, 2023

Related U.S. Application Data

(63) Continuation of application No. 16/945,724, filed on Jul. 31, 2020, now Pat. No. 11,520,467, which is a
(Continued)

(51) Int. Cl.
G06F 3/04842    (2022.01)
G06F 3/01       (2006.01)
(Continued)

(52) U.S. Cl.
CPC .......... *G06F 3/04842* (2013.01); *G06F 3/016* (2013.01); *G06F 3/04817* (2013.01);
(Continued)

(58) Field of Classification Search
CPC .. G06F 3/04842; G06F 3/016; G06F 3/04817; G06F 3/0482; G06F 3/0485;
(Continued)

(56) References Cited

U.S. PATENT DOCUMENTS 2,718,550 A    9/1955   Hoyt et al.
4,672,677 A    6/1987   Yamakawa
(Continued)

FOREIGN PATENT DOCUMENTS

AU    2009255409 B2    7/2012
AU    2016100476 A4    5/2016
(Continued)

OTHER PUBLICATIONS

Applicant Initiated Interview Summary received for U.S. Appl. No. 17/210,352, mailed on Feb. 28, 2022, 4 pages.
(Continued)

*Primary Examiner* — Kenneth B Lee, Jr.
(74) *Attorney, Agent, or Firm* — Kubota & Basol LLP

(57) ABSTRACT

In some embodiments, a device displays functionality information in response to receiving an indication of a first input for which a contact meets functionality display criteria. In some embodiments, a device generates a user interface that includes a navigation bar including images from different positions in a respective content item, and a representation of an adjacent content item. In some embodiments, a device moves a selection-indicator in a user interface by a predefined amount in response to receiving an indication of a first input that meets unitary movement criteria. In some embodiments, a device interprets movement of a contact of
(Continued)

an input based at least in part on a grip of a user. In some embodiments, a device displays a plurality of character selection options when a text entry field is not tolerant of character ambiguity and a first input corresponds to a plurality of candidate characters.

45 Claims, 62 Drawing Sheets

Related U.S. Application Data continuation of application No. 16/392,467, filed on Apr. 23, 2019, now Pat. No. 10,732,807, which is a continuation of application No. 15/990,327, filed on May 25, 2018, now Pat. No. 10,303,348, which is a continuation of application No. 15/695,880, filed on Sep. 5, 2017, now Pat. No. 10,019,142, which is a continuation of application No. 14/749,288, filed on Jun. 24, 2015, now Pat. No. 9,792,018.

(60) Provisional application No. 62/016,593, filed on Jun. 24, 2014.

(51) Int. Cl.
*G06F 3/04817* (2022.01)
*G06F 3/0482* (2013.01)
*G06F 3/0485* (2022.01)
*G06F 3/04883* (2022.01)
*G06F 3/04886* (2022.01)
*H04N 21/422* (2011.01)

(52) U.S. Cl.
CPC .......... *G06F 3/0482* (2013.01); *G06F 3/0485* (2013.01); *G06F 3/04883* (2013.01); *G06F 3/04886* (2013.01); *G06F 2203/014* (2013.01); *G06F 2203/0383* (2013.01); *G06F 2203/04105* (2013.01); *G06F 2203/04803* (2013.01); *G08C 2201/30* (2013.01); *H04N 21/42224* (2013.01)

(58) Field of Classification Search
CPC ............. G06F 3/04883; G06F 3/04886; G06F 2203/014; G06F 2203/0383; G06F 2203/04105; G06F 2203/04803; H04N 21/42224

See application file for complete search history.

(56) References Cited

U.S. PATENT DOCUMENTS

| | | | |
|---|---|---|---|
| 5,029,223 | A | 7/1991 | Fujisaki |
| 5,483,261 | A | 1/1996 | Yasutake |
| 5,488,204 | A | 1/1996 | Mead et al. |
| 5,585,866 | A | 12/1996 | Miller et al. |
| 5,596,373 | A | 1/1997 | White et al. |
| 5,621,456 | A | 4/1997 | Florin et al. |
| 5,818,439 | A | 10/1998 | Nagasaka et al. |
| 5,825,352 | A | 10/1998 | Bisset et al. |
| 5,835,079 | A | 11/1998 | Shieh |
| 5,880,411 | A | 3/1999 | Gillespie et al. |
| 5,886,690 | A | 3/1999 | Pond et al. |
| 5,926,230 | A | 7/1999 | Niijima et al. |
| 6,021,320 | A | 2/2000 | Bickford et al. |
| 6,028,600 | A | 2/2000 | Rosin et al. |
| 6,049,333 | A | 4/2000 | Lajoie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,405,371 | B1 | 6/2002 | Oosterhout et al. |
| 6,487,722 | B1 | 11/2002 | Okura et al. |
| 6,570,557 | B1 | 5/2003 | Westerman et al. |
| 6,628,304 | B2 | 9/2003 | Mitchell et al. |
| 6,677,932 | B1 | 1/2004 | Westerman |
| 6,690,387 | B2 | 2/2004 | Zimmerman et al. |
| 6,745,391 | B1 | 6/2004 | Macrae et al. |
| 6,909,837 | B1 | 6/2005 | Unger |
| 6,928,433 | B2 | 8/2005 | Goodman et al. |
| 7,015,894 | B2 | 3/2006 | Morohoshi |
| 7,039,879 | B2 | 5/2006 | Bergsten et al. |
| 7,103,906 | B1 | 9/2006 | Katz et al. |
| 7,134,089 | B2 | 11/2006 | Celik et al. |
| 7,184,064 | B2 | 2/2007 | Zimmerman et al. |
| 7,213,255 | B2 | 5/2007 | Markel et al. |
| 7,293,275 | B1 | 11/2007 | Krieger et al. |
| 7,324,953 | B1 | 1/2008 | Murphy |
| 7,330,192 | B2 | 2/2008 | Brunner et al. |
| 7,596,761 | B2 | 9/2009 | Lemay et al. |
| 7,614,008 | B2 | 11/2009 | Ording |
| 7,631,278 | B2 | 12/2009 | Miksovsky et al. |
| 7,633,076 | B2 | 12/2009 | Huppi et al. |
| 7,636,897 | B2 | 12/2009 | Koralski et al. |
| 7,649,526 | B2 | 1/2010 | Ording et al. |
| 7,650,569 | B1 | 1/2010 | Allen et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,694,231 | B2 | 4/2010 | Kocienda et al. |
| 7,712,051 | B2 | 5/2010 | Chadzelek et al. |
| 7,783,892 | B2 | 8/2010 | Russell et al. |
| 7,810,043 | B2 | 10/2010 | Ostojic et al. |
| 7,814,023 | B1 | 10/2010 | Rao et al. |
| 7,827,483 | B2 | 11/2010 | Unbedacht et al. |
| 7,836,475 | B2 | 11/2010 | Angiolillo et al. |
| 7,844,914 | B2 | 11/2010 | Andre et al. |
| 7,849,487 | B1 | 12/2010 | Vosseller |
| 7,856,605 | B2 | 12/2010 | Ording et al. |
| 7,917,477 | B2 | 3/2011 | Hutson et al. |
| 7,956,846 | B2 | 6/2011 | Ording et al. |
| 7,957,762 | B2 | 6/2011 | Herz et al. |
| 7,970,379 | B2 | 6/2011 | White et al. |
| 8,006,002 | B2 | 8/2011 | Kalayjian et al. |
| 8,026,805 | B1 | 9/2011 | Rowe |
| 8,082,523 | B2 | 12/2011 | Forstall et al. |
| 8,094,132 | B1 | 1/2012 | Frischling et al. |
| 8,115,731 | B2 | 2/2012 | Varanda |
| 8,145,617 | B1 | 3/2012 | Verstak et al. |
| 8,170,931 | B2 | 5/2012 | Ross et al. |
| 8,205,240 | B2 | 6/2012 | Ansari et al. |
| 8,239,784 | B2 | 8/2012 | Hotelling et al. |
| 8,279,180 | B2 | 10/2012 | Hotelling et al. |
| 8,291,452 | B1 | 10/2012 | Yong et al. |
| 8,299,889 | B2 | 10/2012 | Kumar et al. |
| 8,301,484 | B1 | 10/2012 | Kumar |
| 8,312,484 | B1 | 11/2012 | Mccarty et al. |
| 8,312,486 | B1 | 11/2012 | Briggs et al. |
| 8,325,160 | B2 | 12/2012 | St. Pierre et al. |
| 8,346,798 | B2 | 1/2013 | Spiegelman et al. |
| 8,370,874 | B1 | 2/2013 | Chang et al. |
| 8,381,135 | B2 | 2/2013 | Hotelling et al. |
| 8,386,588 | B1 | 2/2013 | Cooley |
| 8,407,737 | B1 | 3/2013 | Ellis |
| 8,416,217 | B1 | 4/2013 | Eriksson et al. |
| 8,418,202 | B2 | 4/2013 | Ahmad-taylor |
| 8,424,048 | B1 | 4/2013 | Lyren et al. |
| 8,479,122 | B2 | 7/2013 | Hotelling et al. |
| 8,495,499 | B1 | 7/2013 | Denise |
| 8,516,063 | B2 | 8/2013 | Fletcher |
| 8,516,525 | B1 | 8/2013 | Jerding et al. |
| 8,560,398 | B1 | 10/2013 | Few et al. |
| 8,584,165 | B1 | 11/2013 | Kane et al. |
| 8,607,163 | B2 | 12/2013 | Plummer |
| 8,607,268 | B2 | 12/2013 | Migos |
| 8,613,015 | B2 | 12/2013 | Gordon et al. |
| 8,613,023 | B2 | 12/2013 | Narahara et al. |
| 8,625,974 | B1 | 1/2014 | Pinson |
| 8,674,958 | B1 | 3/2014 | Kravets et al. |
| 8,683,362 | B2 | 3/2014 | Shiplacoff et al. |
| 8,683,517 | B2 | 3/2014 | Carpenter et al. |
| 8,730,190 | B2 | 5/2014 | Moloney |
| 8,742,885 | B2 | 6/2014 | Brodersen et al. |
| 8,754,862 | B2 | 6/2014 | Zaliva |

(56) References Cited

U.S. PATENT DOCUMENTS

| | | |
|---|---|---|
| 8,762,852 B2 | 6/2014 | Davis et al. |
| 8,769,408 B2 | 7/2014 | Madden et al. |
| 8,782,706 B2 | 7/2014 | Ellis |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,129,656 B2 | 9/2015 | Prather et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,215,273 B2 | 12/2015 | Jonnala et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |
| 9,319,727 B2 | 4/2016 | Phipps et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,509,798 B1 | 11/2016 | Thomas et al. |
| 9,514,476 B2 | 12/2016 | Kay et al. |
| 9,532,111 B1 | 12/2016 | Christie et al. |
| 9,538,310 B2 | 1/2017 | Fjeldsoe-nielsen et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,600,159 B2 | 3/2017 | Lawson et al. |
| 9,602,566 B1 | 3/2017 | Lewis et al. |
| 9,639,241 B2 | 5/2017 | Penha et al. |
| 9,652,118 B2 | 5/2017 | Hill et al. |
| 9,652,448 B2 | 5/2017 | Pasquero et al. |
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |
| 9,913,142 B2 | 3/2018 | Folse et al. |
| 9,933,937 B2 | 4/2018 | Lemay et al. |
| 9,973,800 B2 | 5/2018 | Yellin et al. |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-sang et al. |
| 10,209,866 B2 | 2/2019 | Johnston et al. |
| 10,237,599 B1 | 3/2019 | Gravino et al. |
| 10,275,148 B2 | 4/2019 | Matas et al. |
| 10,282,088 B2 | 5/2019 | Kim et al. |
| 10,303,422 B1 | 5/2019 | Woo et al. |
| 10,373,479 B2 | 8/2019 | Banfi |
| 10,405,015 B2 | 9/2019 | Kite et al. |
| 10,521,188 B1 | 12/2019 | Christie et al. |
| 10,551,995 B1 | 2/2020 | Ho et al. |
| 10,552,470 B2 | 2/2020 | Todd et al. |
| 10,564,823 B1 | 2/2020 | Dennis et al. |
| 10,601,808 B1 | 3/2020 | Nijim et al. |
| 10,606,539 B2 | 3/2020 | Bernstein et al. |
| 10,631,042 B2 | 4/2020 | Zerr et al. |
| 10,650,052 B2 | 5/2020 | Van Os et al. |
| 10,795,490 B2 | 10/2020 | Chaudhri et al. |
| 10,827,007 B2 | 11/2020 | Kode et al. |
| 11,062,358 B1 | 7/2021 | Lewis et al. |
| 11,461,397 B2 | 10/2022 | Van Os et al. |
| 2002/0015024 A1 | 2/2002 | Westerman et al. |
| 2002/0026637 A1 | 2/2002 | Markel et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0100063 A1 | 7/2002 | Herigstad et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2002/0178446 A1 | 11/2002 | Sie et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0013483 A1 | 1/2003 | Ausems et al. |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0149628 A1 | 8/2003 | Abbosh et al. |
| 2003/0158950 A1 | 8/2003 | Sako |
| 2003/0167471 A1 | 9/2003 | Roth et al. |
| 2003/0177075 A1 | 9/2003 | Burke |
| 2003/0177498 A1 | 9/2003 | Ellis et al. |
| 2003/0192060 A1 | 10/2003 | Levy |
| 2003/0221191 A1 | 11/2003 | Khusheim |
| 2003/0228130 A1 | 12/2003 | Tanikawa et al. |
| 2003/0234804 A1 | 12/2003 | Parker et al. |
| 2004/0019497 A1 | 1/2004 | Volk et al. |
| 2004/0046801 A1* | 3/2004 | Lin .................. G11B 27/28 |
| | | 715/810 |
| 2004/0070573 A1 | 4/2004 | Graham |
| 2004/0088328 A1 | 5/2004 | Cook et al. |
| 2004/0090463 A1 | 5/2004 | Celik et al. |
| 2004/0093262 A1 | 5/2004 | Weston et al. |
| 2004/0133909 A1 | 7/2004 | Ma |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254883 A1 | 12/2004 | Kondrk et al. |
| 2004/0254958 A1 | 12/2004 | Volk |
| 2004/0267715 A1 | 12/2004 | Polson et al. |
| 2005/0012599 A1 | 1/2005 | Dematteo |
| 2005/0071761 A1 | 3/2005 | Kontio |
| 2005/0071785 A1 | 3/2005 | Chadzelek et al. |
| 2005/0076363 A1 | 4/2005 | Dukes et al. |
| 2005/0091254 A1 | 4/2005 | Stabb et al. |
| 2005/0091597 A1 | 4/2005 | Ackley |
| 2005/0134625 A1 | 6/2005 | Kubota |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1 | 10/2005 | Ichikawa |
| 2005/0235316 A1 | 10/2005 | Ahmad-Taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0029374 A1 | 2/2006 | Park |
| 2006/0031872 A1 | 2/2006 | Hsiao et al. |
| 2006/0033724 A1 | 2/2006 | Chaudhri et al. |
| 2006/0053449 A1 | 3/2006 | Gutta |

(56) References Cited

U.S. PATENT DOCUMENTS

| | | | |
|---|---|---|---|
| 2006/0069998 A1* | 3/2006 | Artman | G06F 16/907 707/E17.143 |
| 2006/0071905 A1 | 4/2006 | Varanda | |
| 2006/0080352 A1 | 4/2006 | Boubez et al. | |
| 2006/0097991 A1 | 5/2006 | Hotelling et al. | |
| 2006/0107304 A1 | 5/2006 | Cleron et al. | |
| 2006/0112346 A1 | 5/2006 | Miksovsky et al. | |
| 2006/0112352 A1 | 5/2006 | Tseng et al. | |
| 2006/0117267 A1 | 6/2006 | Koralski et al. | |
| 2006/0120624 A1* | 6/2006 | Jojic | G06F 16/739 382/284 |
| 2006/0195479 A1 | 8/2006 | Spiegelman et al. | |
| 2006/0195512 A1 | 8/2006 | Rogers et al. | |
| 2006/0197753 A1 | 9/2006 | Hotelling | |
| 2006/0224987 A1 | 10/2006 | Caffarelli | |
| 2006/0236847 A1 | 10/2006 | Withop | |
| 2006/0248113 A1 | 11/2006 | Leffert et al. | |
| 2006/0265637 A1 | 11/2006 | Marriott et al. | |
| 2006/0271968 A1 | 11/2006 | Zellner | |
| 2006/0282856 A1 | 12/2006 | Errico et al. | |
| 2006/0288848 A1 | 12/2006 | Gould et al. | |
| 2006/0294545 A1 | 12/2006 | Morris et al. | |
| 2007/0005569 A1 | 1/2007 | Hurst-hiller et al. | |
| 2007/0009229 A1 | 1/2007 | Liu | |
| 2007/0011702 A1 | 1/2007 | Vaysman | |
| 2007/0024594 A1 | 2/2007 | Sakata et al. | |
| 2007/0028267 A1 | 2/2007 | Ostojic et al. | |
| 2007/0038957 A1 | 2/2007 | White | |
| 2007/0073596 A1 | 3/2007 | Alexander et al. | |
| 2007/0092204 A1 | 4/2007 | Wagner et al. | |
| 2007/0150802 A1 | 6/2007 | Wan et al. | |
| 2007/0150918 A1 | 6/2007 | Carpenter et al. | |
| 2007/0154163 A1 | 7/2007 | Cordray | |
| 2007/0157220 A1 | 7/2007 | Cordray et al. | |
| 2007/0157249 A1 | 7/2007 | Cordray et al. | |
| 2007/0168413 A1* | 7/2007 | Barletta | G06F 16/9577 707/E17.121 |
| 2007/0186254 A1 | 8/2007 | Tsutsui et al. | |
| 2007/0199035 A1 | 8/2007 | Schwartz et al. | |
| 2007/0204057 A1 | 8/2007 | Shaver et al. | |
| 2007/0229465 A1 | 10/2007 | Sakai et al. | |
| 2007/0233880 A1 | 10/2007 | Nieh et al. | |
| 2007/0244902 A1 | 10/2007 | Seide et al. | |
| 2007/0248317 A1 | 10/2007 | Bahn | |
| 2008/0046928 A1 | 2/2008 | Poling et al. | |
| 2008/0059884 A1 | 3/2008 | Ellis et al. | |
| 2008/0065989 A1 | 3/2008 | Conroy et al. | |
| 2008/0066010 A1 | 3/2008 | Brodersen et al. | |
| 2008/0077562 A1 | 3/2008 | Schleppe | |
| 2008/0092168 A1 | 4/2008 | Logan et al. | |
| 2008/0092173 A1 | 4/2008 | Shannon et al. | |
| 2008/0111822 A1 | 5/2008 | Horowitz et al. | |
| 2008/0120668 A1 | 5/2008 | Yau | |
| 2008/0127281 A1 | 5/2008 | Van et al. | |
| 2008/0155475 A1 | 6/2008 | Duhig | |
| 2008/0189740 A1 | 8/2008 | Carpenter et al. | |
| 2008/0189742 A1 | 8/2008 | Ellis et al. | |
| 2008/0208844 A1 | 8/2008 | Jenkins | |
| 2008/0216020 A1 | 9/2008 | Plummer | |
| 2008/0222677 A1 | 9/2008 | Woo et al. | |
| 2008/0235331 A1 | 9/2008 | Melamed et al. | |
| 2008/0235588 A1 | 9/2008 | Gonze et al. | |
| 2008/0243817 A1 | 10/2008 | Chan et al. | |
| 2008/0250312 A1 | 10/2008 | Curtis | |
| 2008/0260252 A1 | 10/2008 | Borgaonkar et al. | |
| 2008/0270886 A1 | 10/2008 | Gossweiler et al. | |
| 2008/0276279 A1 | 11/2008 | Gossweiler et al. | |
| 2008/0301260 A1 | 12/2008 | Goldeen et al. | |
| 2008/0301579 A1 | 12/2008 | Jonasson et al. | |
| 2008/0301734 A1 | 12/2008 | Goldeen et al. | |
| 2008/0307343 A1 | 12/2008 | Robert et al. | |
| 2008/0307458 A1 | 12/2008 | Kim et al. | |
| 2008/0307459 A1 | 12/2008 | Migos | |
| 2008/0320391 A1 | 12/2008 | Lemay et al. | |
| 2008/0320532 A1 | 12/2008 | Lee | |
| 2009/0055385 A1 | 2/2009 | Jeon et al. | |
| 2009/0063521 A1 | 3/2009 | Bull et al. | |
| 2009/0063975 A1 | 3/2009 | Rottler et al. | |
| 2009/0089837 A1 | 4/2009 | Momosaki | |
| 2009/0094662 A1 | 4/2009 | Chang et al. | |
| 2009/0119754 A1 | 5/2009 | Schubert | |
| 2009/0158325 A1 | 6/2009 | Johnson | |
| 2009/0158326 A1 | 6/2009 | Hunt et al. | |
| 2009/0161868 A1 | 6/2009 | Chaudhry | |
| 2009/0164944 A1* | 6/2009 | Webster | G06F 3/0489 715/838 |
| 2009/0165054 A1 | 6/2009 | Rudolph | |
| 2009/0174679 A1 | 7/2009 | Westerman | |
| 2009/0177301 A1 | 7/2009 | Hayes | |
| 2009/0177989 A1 | 7/2009 | Ma et al. | |
| 2009/0178083 A1 | 7/2009 | Carr et al. | |
| 2009/0228491 A1 | 9/2009 | Malik | |
| 2009/0228807 A1 | 9/2009 | Lemay | |
| 2009/0239587 A1 | 9/2009 | Negron et al. | |
| 2009/0256807 A1 | 10/2009 | Nurmi | |
| 2009/0259957 A1 | 10/2009 | Slocum et al. | |
| 2009/0278916 A1 | 11/2009 | Ito | |
| 2009/0282444 A1 | 11/2009 | Laksono et al. | |
| 2009/0288079 A1 | 11/2009 | Zuber et al. | |
| 2009/0313100 A1 | 12/2009 | Ingleshwar | |
| 2009/0322962 A1 | 12/2009 | Weeks | |
| 2009/0327952 A1 | 12/2009 | Karas et al. | |
| 2010/0009629 A1 | 1/2010 | Jung et al. | |
| 2010/0017713 A1* | 1/2010 | Igarashi | H04N 21/4532 715/716 |
| 2010/0031162 A1 | 2/2010 | Wiser et al. | |
| 2010/0053220 A1 | 3/2010 | Ozawa et al. | |
| 2010/0053432 A1 | 3/2010 | Cheng et al. | |
| 2010/0057696 A1 | 3/2010 | Miyazawa et al. | |
| 2010/0064313 A1 | 3/2010 | Beyabani | |
| 2010/0080163 A1 | 4/2010 | Krishnamoorthi et al. | |
| 2010/0083181 A1 | 4/2010 | Matsushima et al. | |
| 2010/0095240 A1 | 4/2010 | Shiplacoff et al. | |
| 2010/0100899 A1 | 4/2010 | Bradbury et al. | |
| 2010/0104269 A1 | 4/2010 | Prestenback et al. | |
| 2010/0115592 A1 | 5/2010 | Belz et al. | |
| 2010/0121714 A1 | 5/2010 | Bryant et al. | |
| 2010/0146442 A1 | 6/2010 | Nagasaka et al. | |
| 2010/0153881 A1 | 6/2010 | Dinn | |
| 2010/0153999 A1 | 6/2010 | Yates | |
| 2010/0159898 A1 | 6/2010 | Krzyzanowski et al. | |
| 2010/0162172 A1 | 6/2010 | Aroner | |
| 2010/0194998 A1 | 8/2010 | Lee et al. | |
| 2010/0198822 A1 | 8/2010 | Glennon et al. | |
| 2010/0205628 A1 | 8/2010 | Davis et al. | |
| 2010/0211636 A1 | 8/2010 | Starkenburg et al. | |
| 2010/0211884 A1 | 8/2010 | Kashyap et al. | |
| 2010/0223646 A1 | 9/2010 | Goldeen et al. | |
| 2010/0229194 A1 | 9/2010 | Blanchard et al. | |
| 2010/0235744 A1 | 9/2010 | Schultz et al. | |
| 2010/0251304 A1 | 9/2010 | Donoghue et al. | |
| 2010/0257005 A1 | 10/2010 | Phenner et al. | |
| 2010/0269145 A1 | 10/2010 | Ingrassia et al. | |
| 2010/0275143 A1 | 10/2010 | Fu et al. | |
| 2010/0277337 A1 | 11/2010 | Brodersen et al. | |
| 2010/0293190 A1 | 11/2010 | Kaiser et al. | |
| 2010/0293586 A1 | 11/2010 | Simoes et al. | |
| 2010/0299606 A1 | 11/2010 | Morita | |
| 2010/0312824 A1 | 12/2010 | Smith et al. | |
| 2010/0325660 A1 | 12/2010 | Holden | |
| 2010/0333142 A1 | 12/2010 | Busse et al. | |
| 2010/0333143 A1 | 12/2010 | Civanlar et al. | |
| 2011/0004831 A1 | 1/2011 | Steinberg et al. | |
| 2011/0033168 A1 | 2/2011 | Iyer | |
| 2011/0047513 A1 | 2/2011 | Onogi et al. | |
| 2011/0052146 A1 | 3/2011 | Murthy et al. | |
| 2011/0054649 A1 | 3/2011 | Sarkis et al. | |
| 2011/0055762 A1 | 3/2011 | Jung et al. | |
| 2011/0055870 A1 | 3/2011 | Yum et al. | |
| 2011/0071977 A1 | 3/2011 | Nakajima et al. | |
| 2011/0078739 A1 | 3/2011 | Grad | |
| 2011/0080935 A1 | 4/2011 | Kim et al. | |
| 2011/0087992 A1 | 4/2011 | Wang et al. | |
| 2011/0090402 A1 | 4/2011 | Huntington et al. | |

(56) References Cited

U.S. PATENT DOCUMENTS

| | | |
|---|---|---|
| 2011/0093415 A1 | 4/2011 | Rhee et al. |
| 2011/0099519 A1 | 4/2011 | Ma et al. |
| 2011/0119715 A1 | 5/2011 | Chang et al. |
| 2011/0131607 A1 | 6/2011 | Thomas et al. |
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0162022 A1 | 6/2011 | Xia |
| 2011/0163971 A1 | 7/2011 | Wagner et al. |
| 2011/0167339 A1 | 7/2011 | Lemay |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0197153 A1 | 8/2011 | King et al. |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0307631 A1 | 12/2011 | Park et al. |
| 2011/0312278 A1 | 12/2011 | Matsushita et al. |
| 2011/0321072 A1 | 12/2011 | Patterson et al. |
| 2012/0019674 A1 | 1/2012 | Ohnishi et al. |
| 2012/0023450 A1 | 1/2012 | Noto et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054679 A1 | 3/2012 | Ma et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0093481 A1 | 4/2012 | Mcdowell et al. |
| 2012/0096011 A1 | 4/2012 | Kay et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler |
| 2012/0114303 A1 | 5/2012 | Chung et al. |
| 2012/0117584 A1 | 5/2012 | Gordon |
| 2012/0124615 A1 | 5/2012 | Lee |
| 2012/0131615 A1 | 5/2012 | Kobayashi et al. |
| 2012/0139938 A1 | 6/2012 | Khedouri et al. |
| 2012/0141095 A1 | 6/2012 | Schwesinger et al. |
| 2012/0144003 A1 | 6/2012 | Rosenbaum et al. |
| 2012/0158524 A1 | 6/2012 | Hintz et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0215684 A1 | 8/2012 | Kidron |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0236173 A1 | 9/2012 | Telek et al. |
| 2012/0242704 A1 | 9/2012 | Bamford et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0080968 A1 | 3/2013 | Hanson et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0173034 A1 | 7/2013 | Reimann et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1 | 8/2013 | Kawai et al. |
| 2013/0205312 A1 | 8/2013 | Huang |
| 2013/0212531 A1 | 8/2013 | Yoshida |
| 2013/0227482 A1 | 8/2013 | Thorsander et al. |
| 2013/0247105 A1 | 9/2013 | Jovanovski et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283168 A1 | 10/2013 | Brown et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332960 A1 | 12/2013 | Young et al. |
| 2013/0339877 A1 | 12/2013 | Skeen et al. |
| 2013/0340006 A1 | 12/2013 | Kwan |
| 2013/0346564 A1 | 12/2013 | Warrick et al. |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0020017 A1 | 1/2014 | Stern et al. |
| 2014/0024341 A1 | 1/2014 | Johan |

(56) References Cited

U.S. PATENT DOCUMENTS

| | | |
|---|---|---|
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0068654 A1 | 3/2014 | Marlow et al. |
| 2014/0071068 A1 | 3/2014 | Shih et al. |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0082660 A1 | 3/2014 | Zhang et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0101706 A1 | 4/2014 | Kardatzke |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |
| 2014/0130097 A1 | 5/2014 | Londero |
| 2014/0136946 A1 | 5/2014 | Matas |
| 2014/0137029 A1 | 5/2014 | Stephenson et al. |
| 2014/0137030 A1 | 5/2014 | Matas |
| 2014/0143260 A1 | 5/2014 | Simonson et al. |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0157329 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0172622 A1 | 6/2014 | Baronshin |
| 2014/0172953 A1 | 6/2014 | Blanksteen |
| 2014/0173660 A1 | 6/2014 | Correa et al. |
| 2014/0184471 A1 | 7/2014 | Martynov et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0196069 A1 | 7/2014 | Ahmed et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0280728 A1 | 9/2014 | Szerlip Joyce et al. |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0288686 A1 | 9/2014 | Sant et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0317653 A1 | 10/2014 | Mlodzinski |
| 2014/0325357 A1 | 10/2014 | Sant et al. |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344247 A1 | 11/2014 | Procopio et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0365479 A1 | 12/2014 | Lyons et al. |
| 2014/0365481 A1 | 12/2014 | Novosel et al. |
| 2014/0365604 A1 | 12/2014 | Lewis et al. |
| 2014/0365919 A1 | 12/2014 | Shaw et al. |
| 2014/0366040 A1 | 12/2014 | Parker et al. |
| 2014/0366047 A1 | 12/2014 | Thomas et al. |
| 2015/0020127 A1 | 1/2015 | Doshi et al. |
| 2015/0022481 A1 | 1/2015 | Andersson et al. |
| 2015/0039685 A1 | 2/2015 | Lewis et al. |
| 2015/0046866 A1 | 2/2015 | Shimadate |
| 2015/0062069 A1 | 3/2015 | Shin et al. |
| 2015/0067582 A1 | 3/2015 | Donnelly et al. |
| 2015/0067724 A1 | 3/2015 | Johnson et al. |
| 2015/0074522 A1 | 3/2015 | Harned et al. |
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0095460 A1 | 4/2015 | Berger et al. |
| 2015/0095845 A1 | 4/2015 | Chun et al. |
| 2015/0113429 A1 | 4/2015 | Edwards et al. |
| 2015/0121408 A1 | 4/2015 | Jacoby et al. |
| 2015/0134653 A1 | 5/2015 | Bayer et al. |
| 2015/0150049 A1 | 5/2015 | White |
| 2015/0150066 A1 | 5/2015 | Park et al. |
| 2015/0153571 A1 | 6/2015 | Ballard et al. |
| 2015/0161251 A1 | 6/2015 | Ramanarayanan et al. |
| 2015/0169705 A1 | 6/2015 | Korbecki et al. |
| 2015/0169975 A1 | 6/2015 | Kienzle et al. |
| 2015/0186002 A1 | 7/2015 | Suzuki et al. |
| 2015/0189347 A1 | 7/2015 | Oztaskent et al. |
| 2015/0193192 A1 | 7/2015 | Kidron |
| 2015/0195624 A1 | 7/2015 | Gossweiler, III |
| 2015/0205591 A1 | 7/2015 | Jitkoff et al. |
| 2015/0237389 A1 | 8/2015 | Grouf et al. |
| 2015/0277720 A1 | 10/2015 | Thorson et al. |
| 2015/0296072 A1 | 10/2015 | Zhou et al. |
| 2015/0301729 A1 | 10/2015 | Wang et al. |
| 2015/0309670 A1 | 10/2015 | Wheeler et al. |
| 2015/0312603 A1 | 10/2015 | Singh et al. |
| 2015/0317343 A1 | 11/2015 | Cselle et al. |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0373107 A1 | 12/2015 | Chan et al. |
| 2015/0382047 A1 | 12/2015 | Van Os et al. |
| 2015/0382066 A1 | 12/2015 | Heeter et al. |
| 2016/0004425 A1 | 1/2016 | Yoon et al. |
| 2016/0004772 A1 | 1/2016 | Kim et al. |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0021412 A1 | 1/2016 | Zito, Jr. |
| 2016/0035119 A1 | 2/2016 | Lee et al. |
| 2016/0036897 A1 | 2/2016 | Kim et al. |
| 2016/0041702 A1 | 2/2016 | Wang |
| 2016/0043962 A1 | 2/2016 | Kim et al. |
| 2016/0066004 A1 | 3/2016 | Lieu et al. |
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0092559 A1 | 3/2016 | Lind et al. |
| 2016/0096113 A1 | 4/2016 | Decoufle |
| 2016/0099991 A1 | 4/2016 | Lonkar et al. |

(56) References Cited

U.S. PATENT DOCUMENTS

| | | |
|---|---|---|
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0133230 A1 | 5/2016 | Daniels et al. |
| 2016/0142783 A1 | 5/2016 | Bagga et al. |
| 2016/0146935 A1 | 5/2016 | Lee et al. |
| 2016/0165307 A1 | 6/2016 | Lavender et al. |
| 2016/0188902 A1 | 6/2016 | Jin |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0334935 A1 | 11/2016 | Jeon |
| 2016/0345070 A1 | 11/2016 | Beeson et al. |
| 2016/0357305 A1 | 12/2016 | Wells et al. |
| 2016/0357352 A1 | 12/2016 | Matas et al. |
| 2016/0357355 A1 | 12/2016 | Carrigan et al. |
| 2016/0357366 A1 | 12/2016 | Migos et al. |
| 2016/0370982 A1 | 12/2016 | Penha et al. |
| 2017/0003879 A1 | 1/2017 | Tamai et al. |
| 2017/0010846 A1 | 1/2017 | Bernstein et al. |
| 2017/0010847 A1 | 1/2017 | Bernstein et al. |
| 2017/0013295 A1 | 1/2017 | Wertheimer et al. |
| 2017/0024587 A1 | 1/2017 | Nonogaki et al. |
| 2017/0046039 A1 | 2/2017 | Karunamuni et al. |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0094360 A1 | 3/2017 | Keighran et al. |
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0140748 A1 | 5/2017 | Roberts et al. |
| 2017/0188116 A1 | 6/2017 | Major et al. |
| 2017/0192642 A1 | 7/2017 | Fishman et al. |
| 2017/0195736 A1 | 7/2017 | Chai et al. |
| 2017/0201618 A1 | 7/2017 | Schmidt |
| 2017/0201850 A1 | 7/2017 | Raleigh et al. |
| 2017/0214975 A1 | 7/2017 | Schmidt et al. |
| 2017/0220228 A1 | 8/2017 | Sang et al. |
| 2017/0242913 A1 | 8/2017 | Tijssen et al. |
| 2017/0243471 A1 | 8/2017 | Banfi |
| 2017/0245017 A1 | 8/2017 | Chaudhri et al. |
| 2017/0251257 A1 | 8/2017 | Obrien |
| 2017/0300151 A1 | 10/2017 | Lue-sang et al. |
| 2017/0339443 A1 | 11/2017 | Lue-sang et al. |
| 2017/0344553 A1 | 11/2017 | Evnine et al. |
| 2017/0345040 A1 | 11/2017 | Pirnack et al. |
| 2017/0353603 A1 | 12/2017 | Grunewald et al. |
| 2017/0357387 A1 | 12/2017 | Clarke |
| 2017/0359722 A1 | 12/2017 | Folse et al. |
| 2017/0364246 A1 | 12/2017 | Van Os et al. |
| 2018/0011580 A1 | 1/2018 | Lebowitz et al. |
| 2018/0041814 A1 | 2/2018 | Christie et al. |
| 2018/0053094 A1 | 2/2018 | Patel et al. |
| 2018/0059872 A1 | 3/2018 | Iida |
| 2018/0063591 A1 | 3/2018 | Newman et al. |
| 2018/0070121 A1 | 3/2018 | Zimmerman et al. |
| 2018/0070138 A1 | 3/2018 | Chai et al. |
| 2018/0107353 A1 | 4/2018 | Lee |
| 2018/0113579 A1 | 4/2018 | Johnston et al. |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0157368 A1 | 6/2018 | Park et al. |
| 2018/0189076 A1 | 7/2018 | Liston et al. |
| 2018/0253900 A1 | 9/2018 | Finding et al. |
| 2018/0260070 A1 | 9/2018 | Mun et al. |
| 2018/0275855 A1 | 9/2018 | Van Os et al. |
| 2018/0293210 A1 | 10/2018 | Xue et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0349509 A1 | 12/2018 | Abou Mahmoud et al. |
| 2018/0367834 A1 | 12/2018 | Carpenter et al. |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0052744 A1 | 2/2019 | Jung et al. |
| 2019/0058921 A1 | 2/2019 | Christie et al. |
| 2019/0064998 A1 | 2/2019 | Chowdhury et al. |
| 2019/0066672 A1 | 2/2019 | Wood et al. |
| 2019/0073104 A1 | 3/2019 | Wang |
| 2019/0073680 A1 | 3/2019 | Knox |
| 2019/0129588 A1 | 5/2019 | Johnston et al. |
| 2019/0138163 A1 | 5/2019 | Howland et al. |
| 2019/0141399 A1 | 5/2019 | Auxer et al. |
| 2019/0246060 A1 | 8/2019 | Tanabe et al. |
| 2019/0258373 A1 | 8/2019 | Davydov et al. |
| 2019/0272853 A1 | 9/2019 | Moore |
| 2019/0324614 A1 | 10/2019 | Brillon et al. |
| 2019/0324640 A1 | 10/2019 | Park et al. |
| 2019/0342616 A1 | 11/2019 | Domm et al. |
| 2019/0354264 A1 | 11/2019 | Van Os et al. |
| 2019/0373320 A1 | 12/2019 | Balsamo |
| 2020/0034792 A1 | 1/2020 | Rogers et al. |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0104021 A1 | 4/2020 | Bylenok et al. |
| 2020/0133631 A1 | 4/2020 | Christie et al. |
| 2020/0137175 A1 | 4/2020 | Ganci et al. |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0363934 A1 | 11/2020 | Van Os et al. |
| 2020/0374595 A1 | 11/2020 | Yang et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0168424 A1 | 6/2021 | Sharma |
| 2021/0181901 A1 | 6/2021 | Johnston et al. |
| 2021/0195277 A1 | 6/2021 | Thurlow et al. |
| 2021/0223925 A1 | 7/2021 | Bylenok et al. |
| 2021/0286454 A1 | 9/2021 | Beaumier et al. |
| 2021/0306711 A1 | 9/2021 | Ellingford et al. |
| 2021/0337280 A1 | 10/2021 | Diaz Delgado et al. |
| 2021/0345004 A1 | 11/2021 | Christie et al. |
| 2021/0365134 A1 | 11/2021 | Beaumier et al. |
| 2021/0397306 A1 | 12/2021 | Rajam et al. |
| 2021/0406995 A1 | 12/2021 | Peters et al. |
| 2022/0132215 A1 | 4/2022 | Venugopal et al. |
| 2022/0179526 A1 | 6/2022 | Schöberl |
| 2022/0244824 A1 | 8/2022 | Cielak |
| 2022/0321940 A1 | 10/2022 | Christie et al. |
| 2022/0329891 A1 | 10/2022 | Christie et al. |
| 2022/0337914 A1 | 10/2022 | Christie et al. |
| 2022/0360858 A1 | 11/2022 | Christie et al. |
| 2022/0413796 A1 | 12/2022 | Christie et al. |
| 2023/0022781 A1 | 1/2023 | Lindholm et al. |
| 2023/0033604 A1 | 2/2023 | Diaz Delgado et al. |
| 2023/0127228 A1 | 4/2023 | Clarke |
| 2023/0132595 A1 | 5/2023 | Van Os et al. |
| 2023/0300415 A1 | 9/2023 | Balsamo |
| 2023/0328327 A1 | 10/2023 | Cielak et al. |
| 2024/0037144 A1 | 2/2024 | Chen |
| 2024/0089550 A1 | 3/2024 | Ellingford et al. |

(56) References Cited

U.S. PATENT DOCUMENTS

| | | | |
|---|---|---|---|
| 2024/0089553 | A1 | 3/2024 | Payne |
| 2024/0126401 | A1 | 4/2024 | Rajam et al. |

FOREIGN PATENT DOCUMENTS

| | | | |
|---|---|---|---|
| AU | 2017101431 | A4 | 11/2017 |
| AU | 2018100810 | A4 | 7/2018 |
| CN | 1295419 | A | 5/2001 |
| CN | 1391765 | A | 1/2003 |
| CN | 1985277 | A | 6/2007 |
| CN | 1985327 | A | 6/2007 |
| CN | 101160932 | A | 4/2008 |
| CN | 101228570 | A | 7/2008 |
| CN | 101317149 | A | 12/2008 |
| CN | 101370104 | A | 2/2009 |
| CN | 101405679 | A | 4/2009 |
| CN | 101436110 | A | 5/2009 |
| CN | 101465993 | A | 6/2009 |
| CN | 101529437 | A | 9/2009 |
| CN | 101641662 | A | 2/2010 |
| CN | 101699505 | A | 4/2010 |
| CN | 101706704 | A | 5/2010 |
| CN | 101719125 | A | 6/2010 |
| CN | 101860447 | A | 10/2010 |
| CN | 102098537 | A | 6/2011 |
| CN | 102103460 | A | 6/2011 |
| CN | 102187338 | A | 9/2011 |
| CN | 102265586 | A | 11/2011 |
| CN | 102325144 | A | 1/2012 |
| CN | 102819715 | A | 12/2012 |
| CN | 102859484 | A | 1/2013 |
| CN | 102880404 | A | 1/2013 |
| CN | 102890615 | A | 1/2013 |
| CN | 102939515 | A | 2/2013 |
| CN | 102955653 | A | 3/2013 |
| CN | 102981695 | A | 3/2013 |
| CN | 103037265 | A | 4/2013 |
| CN | 103177738 | A | 6/2013 |
| CN | 103399967 | A | 11/2013 |
| CN | 103516933 | A | 1/2014 |
| CN | 103546816 | A | 1/2014 |
| CN | 103562848 | A | 2/2014 |
| CN | 103562947 | A | 2/2014 |
| CN | 103620531 | A | 3/2014 |
| CN | 103620541 | A | 3/2014 |
| CN | 103620639 | A | 3/2014 |
| CN | 103686418 | A | 3/2014 |
| CN | 103985045 | A | 8/2014 |
| CN | 103999017 | A | 8/2014 |
| CN | 104508618 | A | 4/2015 |
| CN | 104822098 | A | 8/2015 |
| CN | 105190590 | A | 12/2015 |
| CN | 105247526 | A | 1/2016 |
| CN | 105264479 | A | 1/2016 |
| CN | 105303372 | A | 2/2016 |
| CN | 105308634 | A | 2/2016 |
| CN | 105308923 | A | 2/2016 |
| CN | 105336350 | A | 2/2016 |
| CN | 105657554 | A | 6/2016 |
| CN | 105812849 | A | 7/2016 |
| CN | 105828098 | A | 8/2016 |
| CN | 105955520 | A | 9/2016 |
| CN | 105955607 | A | 9/2016 |
| CN | 105989085 | A | 10/2016 |
| CN | 105992068 | A | 10/2016 |
| CN | 106101982 | A | 11/2016 |
| CN | 107710131 | A | 2/2018 |
| CN | 108292190 | A | 7/2018 |
| CN | 109313491 | A | 2/2019 |
| CN | 109313651 | A | 2/2019 |
| DE | 202016003233 | U1 | 8/2016 |
| EP | 0608708 | A2 | 8/1994 |
| EP | 0624853 | A2 | 11/1994 |
| EP | 2386984 | A2 | 11/2011 |
| EP | 2453667 | A1 | 5/2012 |
| EP | 2535844 | A2 | 12/2012 |
| EP | 2574089 | A1 | 3/2013 |
| EP | 2605203 | A1 | 6/2013 |
| EP | 2642402 | A2 | 9/2013 |
| EP | 2672703 | A1 | 12/2013 |
| EP | 2679017 | A2 | 1/2014 |
| EP | 2704032 | A2 | 3/2014 |
| EP | 2725531 | A1 | 4/2014 |
| EP | 2879398 | A1 | 6/2015 |
| JP | 2000-112977 | A | 4/2000 |
| JP | 2000-163031 | A | 6/2000 |
| JP | 2001-197445 | A | 7/2001 |
| JP | 2002-027381 | A | 1/2002 |
| JP | 2002-342033 | A | 11/2002 |
| JP | 2003-099452 | A | 4/2003 |
| JP | 2003-534737 | A | 11/2003 |
| JP | 2004-62237 | A | 2/2004 |
| JP | 2006-031219 | A | 2/2006 |
| JP | 2007-124465 | A | 5/2007 |
| JP | 2007-512640 | A | 5/2007 |
| JP | 2007-140910 | A | 6/2007 |
| JP | 2007-294068 | A | 11/2007 |
| JP | 2008-71112 | A | 3/2008 |
| JP | 2008-135911 | A | 6/2008 |
| JP | 2009-60328 | A | 3/2009 |
| JP | 2009-206957 | A | 9/2009 |
| JP | 2009-260947 | A | 11/2009 |
| JP | 2010-28437 | A | 2/2010 |
| JP | 2010-056595 | A | 3/2010 |
| JP | 2010-509684 | A | 3/2010 |
| JP | 2010-114733 | A | 5/2010 |
| JP | 2011-512701 | A | 4/2011 |
| JP | 2011-123750 | A | 6/2011 |
| JP | 2011-154455 | A | 8/2011 |
| JP | 2011-182146 | A | 9/2011 |
| JP | 2011-205562 | A | 10/2011 |
| JP | 2011-257930 | A | 12/2011 |
| JP | 2012-95123 | A | 5/2012 |
| JP | 2012-123685 | A | 6/2012 |
| JP | 2012-208622 | A | 10/2012 |
| JP | 2013-008369 | A | 1/2013 |
| JP | 2013-12021 | A | 1/2013 |
| JP | 2013-223150 | A | 10/2013 |
| JP | 2013-235523 | A | 11/2013 |
| JP | 2014-081740 | A | 5/2014 |
| JP | 2014-102660 | A | 6/2014 |
| JP | 2015-050655 | A | 3/2015 |
| JP | 2015-70404 | A | 4/2015 |
| KR | 10-2001-0005939 | A | 1/2001 |
| KR | 10-2001-0035356 | A | 5/2001 |
| KR | 10-2002-0010151 | A | 2/2002 |
| KR | 10-2007-0114329 | A | 12/2007 |
| KR | 10-2009-0106104 | A | 10/2009 |
| KR | 10-2010-0039194 | A | 4/2010 |
| KR | 10-2011-0036408 | A | 4/2011 |
| KR | 10-2011-0061811 | A | 6/2011 |
| KR | 10-2012-0076682 | A | 7/2012 |
| KR | 10-2012-0124445 | A | 11/2012 |
| KR | 10-2013-0014712 | A | 2/2013 |
| KR | 10-2013-0058034 | A | 6/2013 |
| KR | 10-2013-0137969 | A | 12/2013 |
| KR | 10-2014-0041939 | A | 4/2014 |
| KR | 10-2019-0033658 | A | 3/2019 |
| KR | 10-2022-0041231 | A | 3/2022 |
| TW | 200622893 | A | 7/2006 |
| TW | 200719204 | A | 5/2007 |
| TW | 201337717 | A | 9/2013 |
| TW | 201349049 | A | 12/2013 |
| TW | 201351261 | A | 12/2013 |
| WO | 1994/009438 | A2 | 4/1994 |
| WO | 1999/040728 | A1 | 8/1999 |
| WO | 2004/063862 | A2 | 7/2004 |
| WO | 2004/102285 | A2 | 11/2004 |
| WO | 2005/050652 | A1 | 6/2005 |
| WO | 2005/109345 | A1 | 11/2005 |
| WO | 2007/078623 | A2 | 7/2007 |
| WO | 2008/005135 | A1 | 1/2008 |
| WO | 2008/060486 | A2 | 5/2008 |
| WO | 2009/016607 | A2 | 2/2009 |

(56) References Cited

FOREIGN PATENT DOCUMENTS

| | | | |
|---|---|---|---|
| WO | 2009/039786 | A1 | 4/2009 |
| WO | 2009/148781 | A1 | 12/2009 |
| WO | 2010/022570 | A1 | 3/2010 |
| WO | 2010/025168 | A1 | 3/2010 |
| WO | 2010/118690 | A1 | 10/2010 |
| WO | 2011/095693 | A1 | 8/2011 |
| WO | 2011/158475 | A1 | 12/2011 |
| WO | 2012/012446 | A2 | 1/2012 |
| WO | 2012/061760 | A2 | 5/2012 |
| WO | 2012/088665 | A1 | 7/2012 |
| WO | 2013/000741 | A1 | 1/2013 |
| WO | 2013/149128 | A2 | 10/2013 |
| WO | 2013/169849 | A2 | 11/2013 |
| WO | 2013/169877 | A2 | 11/2013 |
| WO | 2013/187370 | A1 | 12/2013 |
| WO | 2013/149128 | A3 | 2/2014 |
| WO | 2014/105276 | A1 | 7/2014 |
| WO | 2014/144908 | A1 | 9/2014 |
| WO | 2014/177929 | A2 | 11/2014 |
| WO | 2014/200730 | A1 | 12/2014 |
| WO | 2015/200227 | A1 | 12/2015 |
| WO | 2015/200228 | A1 | 12/2015 |
| WO | 2015/200537 | A2 | 12/2015 |
| WO | 2016/030437 | A1 | 3/2016 |
| WO | 2016/048308 | A1 | 3/2016 |
| WO | 2016/048310 | A1 | 3/2016 |
| WO | 2016/111065 | A1 | 7/2016 |
| WO | 2017/008079 | A1 | 1/2017 |
| WO | 2017/124116 | A1 | 7/2017 |
| WO | 2017/200923 | A1 | 11/2017 |
| WO | 2017/218104 | A1 | 12/2017 |
| WO | 2018/081157 | A1 | 5/2018 |

OTHER PUBLICATIONS

Corrected Notice of Allowability received for U.S. Appl. No. 16/108,519, mailed on Dec. 22, 2021, 3 pages.
Corrected Notice of Allowance received for U.S. Appl. No. 14/749,288, mailed on Sep. 21, 2017, 5 pages.
Corrected Notice of Allowance received for U.S. Appl. No. 15/695,880, mailed on Jun. 11, 2018, 6 pages.
Corrected Notice of Allowance received for U.S. Appl. No. 15/876,715, mailed on Apr. 11, 2022, 4 Pages.
Corrected Notice of Allowance received for U.S. Appl. No. 15/876,715, mailed on Apr. 19, 2022, 4 Pages.
Corrected Notice of Allowance received for U.S. Appl. No. 15/876,715, mailed on Oct. 20, 2021, 2 pages.
Corrected Notice of Allowance received for U.S. Appl. No. 16/036,810, mailed on Nov. 19, 2018, 6 pages.
Corrected Notice of Allowance received for U.S. Appl. No. 16/142,635, mailed on Mar. 10, 2022, 2 Pages.
Corrected Notice of Allowance received for U.S. Appl. No. 16/233,990, mailed on Mar. 8, 2022, 4 pages.
Corrected Notice of Allowance received for U.S. Appl. No. 16/827,931, mailed on Dec. 6, 2021, 4 pages.
Corrected Notice of Allowance received for U.S. Appl. No. 16/945,724, mailed on Aug. 31, 2022, 2 pages.
Corrected Notice of Allowance received for U.S. Appl. No. 17/000,112, mailed on Jun. 17, 2022, 2 pages.
Corrected Notice of Allowance received for U.S. Appl. No. 17/065,387, mailed on Mar. 30, 2022, 2 Pages.
Cover Flow—Wikipedia, Available online at: <https://en.wikipedia.org/w/index.php?t%20itle=Cover%20Flow&oldid=879285208>, Jan. 20, 2019, 3 pages.
Examiner Initiated Interview Summary received for U.S. Appl. No. 15/390,377, mailed on Oct. 30, 2017, 2 pages.
Examiner's Answer to Appeal Brief received for U.S. Appl. No. 15/876,715, mailed on Aug. 18, 2020, 16 pages.
Extended European Search Report received for European Patent Application No. 20190698.9, mailed on Oct. 30, 2020, 6 pages.
Extended European Search Report received for European Patent Application No. 20199219.5, mailed on Apr. 22, 2021, 8 pages.
Final Office Action received for U.S. Appl. No. 14/746,662, mailed on Apr. 24, 2017, 8 pages.
Final Office Action received for U.S. Appl. No. 14/746,662, mailed on Jun. 27, 2017, 9 pages.
Final Office Action received for U.S. Appl. No. 15/390,377, mailed on Nov. 9, 2017, 18 pages.
Final Office Action received for U.S. Appl. No. 15/719,404, mailed on Mar. 30, 2021, 19 pages.
Final Office Action received for U.S. Appl. No. 16/108,519, mailed on Nov. 25, 2020, 12 pages.
Final Office Action received for U.S. Appl. No. 16/142,635, mailed on Feb. 3, 2021, 23 pages.
Final Office Action received for U.S. Appl. No. 16/175,565, mailed on May 27, 2022, 33 pages.
Final Office Action received for U.S. Appl. No. 16/175,565, mailed on Nov. 12, 2020, 40 pages.
Final Office Action received for U.S. Appl. No. 16/233,990, mailed on Jan. 11, 2021, 17 pages.
Final Office Action received for U.S. Appl. No. 16/584,790, mailed on Jun. 14, 2022, 37 pages.
Final Office Action received for U.S. Appl. No. 16/584,790, mailed on Jun. 15, 2021, 30 pages.
Final Office Action received for U.S. Appl. No. 16/682,443, mailed on Mar. 9, 2021, 9 pages.
Final Office Action received for U.S. Appl. No. 16/697,090, mailed on Feb. 23, 2022, 25 pages.
Final Office Action received for U.S. Appl. No. 16/697,090, mailed on Jan. 27, 2021, 18 pages.
Final Office Action received for U.S. Appl. No. 16/827,910, mailed on Feb. 28, 2022, 17 pages.
Final Office Action received for U.S. Appl. No. 16/827,918, mailed on Jul. 8, 2021, 31 pages.
Final Office Action received for U.S. Appl. No. 16/827,926, mailed on Mar. 17, 2021, 44 pages.
Final Office Action received for U.S. Appl. No. 16/865,172, mailed on Feb. 12, 2021, 29 pages.
Final Office Action received for U.S. Appl. No. 16/872,274, mailed on Dec. 23, 2021, 20 pages.
Final Office Action received for U.S. Appl. No. 16/888,453, mailed on Apr. 8, 2022, 39 pages.
Final Office Action received for U.S. Appl. No. 16/888,478, mailed on Nov. 15, 2021, 27 pages.
Final Office Action received for U.S. Appl. No. 17/133,550, mailed on Feb. 11, 2022, 18 pages.
Final Office Action received for U.S. Appl. No. 17/210,352, mailed on Jun. 3, 2022, 21 pages.
Final Office Action received for U.S. Appl. No. 17/353,527, mailed on May 11, 2022, 17 Pages.
International Search Report received for PCT Patent Application No. PCT/US2015/037030, mailed on Dec. 10, 2015, 7 pages.
International Search Report received for PCT Patent Application No. PCT/US2015/037520, mailed on Mar. 7, 2016, 6 pages.
International Search Report received for PCT Patent Application No. PCT/US2019/034921, mailed on Nov. 19, 2019, 5 pages.
International Search Report received for PCT Patent Application No. PCT/US2020/024452, mailed on Aug. 6, 2020, 6 pages.
International Search Report received for PCT Patent Application No. PCT/US2020/024485, mailed on Aug. 3, 2020, 6 pages.
International Search Report received for PCT Patent Application No. PCT/US2020/024486, mailed on Aug. 11, 2020, 6 pages.
International Search Report received for PCT Patent Application No. PCT/US2020/024492, mailed on Aug. 10, 2020, 6 pages.
International Search Report received for PCT Patent Application No. PCT/US2020/035423, mailed on Oct. 13, 2020, 4 pages.
Invitation to Pay Additional Fees received for PCT Patent Application No. PCT/US2019/034921, mailed on Sep. 24, 2019, 12 pages.
Invitation to Pay Additional Fees received for PCT Patent Application No. PCT/US2020/024452, mailed on Jun. 15, 2020, 13 pages.

(56) References Cited

OTHER PUBLICATIONS

Invitation to Pay Additional Fees received for PCT Patent Application No. PCT/US2020/024485, mailed on Jun. 8, 2020, 11 pages.
Invitation to Pay Additional Fees received for PCT Patent Application No. PCT/US2020/024486, mailed on Jun. 3, 2020, 11 pages.
Invitation to Pay Additional Fees received for PCT Patent Application No. PCT/US2020/024492, mailed on Jun. 8, 2020, 10 pages.
Non-Final Office Action received for U.S. Appl. No. 14/262,435, mailed on Feb. 22, 2016, 22 pages.
Office Action received for U.S. Appl. No. 14/746,620, mailed on Jan. 11, 2017, 16 pages.
Office Action received for U.S. Appl. No. 14/746,662, mailed on Aug. 9, 2016, 8 pages.
Office Action received for U.S. Appl. No. 14/749,288, mailed on Oct. 12, 2016, 11 pages.
Office Action received for U.S. Appl. No. 15/167,801, mailed on Dec. 11, 2020, 18 pages.
Non-Final Office Action received for U.S. Appl. No. 15/167,801, mailed on May 18, 2022, 17 Pages.
Non-Final Office Action received for U.S. Appl. No. 15/167,801, mailed on Sep. 3, 2021, 17 pages.
Non-Final Office Action received for U.S. Appl. No. 15/390,377, mailed on Apr. 5, 2017, 17 pages.
Non-Final Office Action received for U.S. Appl. No. 15/719,404, mailed on Nov. 26, 2021, 19 pages.
Non-Final Office Action received for U.S. Appl. No. 15/719,404, mailed on Oct. 16, 2020, 18 pages.
Non-Final Office Action received for U.S. Appl. No. 15/990,327, mailed on Jul. 31, 2018, 8 pages.
Non-Final Office Action received for U.S. Appl. No. 16/108,519, mailed on Apr. 5, 2021, 13 pages.
Non-Final Office Action received for U.S. Appl. No. 16/126,962, mailed on Aug. 25, 2020, 22 pages.
Non-Final Office Action received for U.S. Appl. No. 16/136,005, mailed on Sep. 9, 2020, 10 pages.
Non-Final Office Action received for U.S. Appl. No. 16/142,635, mailed on Jun. 11, 2021, 23 pages.
Non-Final Office Action received for U.S. Appl. No. 16/175,565, mailed on Sep. 20, 2021, 33 pages.
Non-Final Office Action received for U.S. Appl. No. 16/233,990, mailed on Jul. 9, 2021, 18 pages.
Non-Final Office Action received for U.S. Appl. No. 16/392,467, mailed on Sep. 27, 2019, 5 pages.
Non-Final Office Action received for U.S. Appl. No. 16/584,790, mailed on Dec. 23, 2020, 30 pages.
Non-Final Office Action received for U.S. Appl. No. 16/584,790, mailed on Feb. 1, 2022, 33 pages.
Non-Final Office Action received for U.S. Appl. No. 16/682,443, mailed on Sep. 23, 2020, 10 pages.
Non-Final Office Action received for U.S. Appl. No. 16/697,090, mailed on Aug. 3, 2021, 16 pages.
Non-Final Office Action received for U.S. Appl. No. 16/827,910, mailed on Jun. 17, 2021, 16 pages.
Non-Final Office Action received for U.S. Appl. No. 16/827,918, mailed on Dec. 10, 2020, 28 pages.
Non-Final Office Action received for U.S. Appl. No. 16/827,926, mailed on Apr. 25, 2022, 27 pages.
Non-Final Office Action received for U.S. Appl. No. 16/827,926, mailed on Oct. 29, 2020, 45 pages.
Non-Final Office Action received for U.S. Appl. No. 16/827,931, mailed on Mar. 3, 2021, 24 pages.
Non-Final Office Action received for U.S. Appl. No. 16/865,172 mailed on Jun. 29, 2021, 29 pages.
Non-Final Office Action received for U.S. Appl. No. 16/865,172, mailed on Aug. 20, 2020, 19 pages.
Non-Final Office Action received for U.S. Appl. No. 16/872,274, mailed on Jul. 9, 2021, 19 pages.
Non-Final Office Action received for U.S. Appl. No. 16/888,453, mailed on Jun. 4, 2021, 37 pages.
Non-Final Office Action received for U.S. Appl. No. 16/888,478, mailed on Feb. 8, 2021, 24 pages.
Non-Final Office Action received for U.S. Appl. No. 16/888,478, mailed on May 2, 2022, 29 pages.
Non-Final Office Action received for U.S. Appl. No. 16/945,724, mailed on Jul. 19, 2021, 8 pages.
Non-Final Office Action received for U.S. Appl. No. 17/000,112, mailed on Dec. 7, 2021, 15 pages.
Non-Final Office Action received for U.S. Appl. No. 17/065,387, mailed on Jan. 28, 2021, 28 pages.
Non-Final Office Action received for U.S. Appl. No. 17/065,387, mailed on Jun. 1, 2021, 25 pages.
Non-Final Office Action received for U.S. Appl. No. 17/133,550, mailed on Jun. 8, 2021, 23 pages.
Non-Final Office Action received for U.S. Appl. No. 17/210,352, mailed on Oct. 18, 2021, 18 pages.
Non-Final Office Action received for U.S. Appl. No. 17/353,527, mailed on Oct. 5, 2021, 14 pages.
Non-Final Office Action received for U.S. Appl. No. 17/379,785, mailed on Mar. 30, 2022, 18 Pages.
Non-Final Office Action received for U.S. Appl. No. 16/175,565, mailed on Mar. 4, 2020, 36 pages.
Notice of Allowance received for U.S. Appl. No. 14/262,435, mailed on Aug. 16, 2016, 6 pages.
Notice of Allowance received for U.S. Appl. No. 14/746,620, mailed on Sep. 25, 2017, 8 pages.
Notice of Allowance received for U.S. Appl. No. 14/746,662, mailed on Sep. 25, 2017, 7 pages.
Notice of Allowance received for U.S. Appl. No. 14/749,288, mailed on May 25, 2017, 8 pages.
Notice of Allowance received for U.S. Appl. No. 15/390,377, mailed on Jul. 2, 2018, 9 pages.
Notice of Allowance received for U.S. Appl. No. 15/695,880, mailed on Feb. 28, 2018, 10 pages.
Notice of Allowance received for U.S. Appl. No. 15/695,880, mailed on Oct. 18, 2017, 9 pages.
Notice of Allowance received for U.S. Appl. No. 15/833,618, mailed on Mar. 14, 2018, 9 pages.
Notice of Allowance received for U.S. Appl. No. 15/876,715, mailed on Apr. 4, 2022, 7 pages.
Notice of Allowance received for U.S. Appl. No. 15/876,715, mailed on Oct. 14, 2021, 7 pages.
Notice of Allowance received for U.S. Appl. No. 15/990,327, mailed on Jan. 11, 2019, 7 pages.
Notice of Allowance received for U.S. Appl. No. 16/036,810, mailed on Oct. 31, 2018, 9 pages.
Notice of Allowance received for U.S. Appl. No. 16/108,519, mailed on Sep. 21, 2021, 8 pages.
Notice of Allowance received for U.S. Appl. No. 16/136,005, mailed on Feb. 24, 2021, 8 pages.
Notice of Allowance received for U.S. Appl. No. 16/136,005, mailed on Jun. 9, 2021, 7 pages.
Notice of Allowance received for U.S. Appl. No. 16/142,635, mailed on Nov. 10, 2021, 8 pages.
Notice of Allowance received for U.S. Appl. No. 16/233,990, mailed on Feb. 22, 2022, 8 pages.
Notice of Allowance received for U.S. Appl. No. 16/233,990, mailed on May 26, 2022, 5 pages.
Notice of Allowance received for U.S. Appl. No. 16/392,467, mailed on Mar. 23, 2020, 9 pages.
Notice of Allowance received for U.S. Appl. No. 16/682,443, mailed on Aug. 20, 2021, 7 pages.
Notice of Allowance received for U.S. Appl. No. 16/682,443, mailed on Nov. 17, 2021, 8 pages.
Notice of Allowance received for U.S. Appl. No. 16/726,179, mailed on Jun. 17, 2021, 9 pages.
Notice of Allowance received for U.S. Appl. No. 16/726,179, mailed on Sep. 30, 2021, 8 pages.
Notice of Allowance received for U.S. Appl. No. 16/827,918, mailed on Feb. 7, 2022, 9 pages.
Notice of Allowance received for U.S. Appl. No. 16/827,918, mailed on Jun. 8, 2022, 9 Pages.

(56) References Cited

OTHER PUBLICATIONS

Notice of Allowance received for U.S. Appl. No. 16/827,926, mailed on Nov. 1, 2021, 35 pages.
Notice of Allowance received for U.S. Appl. No. 16/827,931, mailed on Apr. 19, 2022, 7 Pages.
Notice of Allowance received for U.S. Appl. No. 16/827,931, mailed on Jan. 5, 2022, 7 pages.
Notice of Allowance received for U.S. Appl. No. 16/827,931, mailed on Sep. 15, 2021, 11 pages.
Notice of Allowance received for U.S. Appl. No. 16/827,942, mailed on Apr. 28, 2021, 5 pages.
Notice of Allowance received for U.S. Appl. No. 16/827,942, mailed on Jan. 22, 2021, 5 pages.
Notice of Allowance received for U.S. Appl. No. 16/827,942, mailed on Oct. 5, 2020, 10 pages.
Notice of Allowance received for U.S. Appl. No. 16/865,172, mailed on Apr. 13, 2022, 8 pages.
Notice of Allowance received for U.S. Appl. No. 16/865,172, mailed on Dec. 16, 2021, 10 pages.
Notice of Allowance received for U.S. Appl. No. 16/872,274, mailed on Apr. 19, 2022, 10 Pages.
Notice of Allowance received for U.S. Appl. No. 16/945,724, mailed on Apr. 4, 2022, 8 Pages.
Notice of Allowance received for U.S. Appl. No. 16/945,724, mailed on Dec. 20, 2021, 7 pages.
Notice of Allowance received for U.S. Appl. No. 16/945,724, mailed on Jul. 20, 2022, 8 Pages.
Notice of Allowance received for U.S. Appl. No. 17/000,112, mailed on Jun. 3, 2022, 14 pages.
Notice of Allowance received for U.S. Appl. No. 17/065,387, mailed on Dec. 1, 2021, 10 pages.
Office Action received for European Patent Application No. 15736119.7, mailed on Jun. 25, 2019, 6 pages.
Patent Board Decision received for U.S. Appl. No. 15/876,715, mailed on Aug. 3, 2021, 8 pages.
Search Report received for Chinese Patent Application No. 201580028382.1, mailed on Oct. 12, 2018, 5 pages (2 pages of English Translation & 3 pages of Official copy).
Search Report received for Chinese Patent Application No. 201680050096.X, mailed on Jan. 10, 2022, 4 pages (2 pages of English Translation and 2 pages of Official Copy).
Search Report received for Chinese Patent Application No. 201780033590.X, mailed on Mar. 24, 2021, 4 pages (2 page of English Translation and 2 pages of Official Copy).
Search Report received for Chinese Patent Application No. 201910469185.3, mailed on Feb. 23, 2021, 6 pages (3 page of English Translation and 3 page of Official Copy).
Search Report received for Chinese Patent Application No. 201910587972.8, mailed on Jan. 4, 2022, 4 pages (2 pages of English Translation and 2 pages of Official Copy).
Search Report received for Danish Patent Application No. PA201770200, Completed on Jul. 12, 2017, 4 pages.
Search Report received for Taiwanese Patent Application No. 104120369, mailed on Aug. 8, 2016, 2 Pages (1 page of official copy & 1 page of English translation).
Supplemental Notice of Allowability received for U.S. Appl. No. 16/827,942, mailed on Nov. 4, 2020, 3 pages.
Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, Jan. 6, 2014, 5 pages.
Cheredar Tom, "Verizon's Viewdini Lets You Watch Netflix, Comcast, & Hulu Videos from a Single App", Available online at: <venturebeat.com>, May 22, 2012, 6 pages.
Fingas Roger, "Walmart's Vudu to get Native Apple TV", AppleInsider, 2017, pp. 1-4.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Kaijser Martijn, "Mimic Skin for Kodi 15.x: Installation and Showcase", Time 2:23-2:28, Available online at: <https://www.youtube.com/watch?v=RGfpbUWVkgQ&t=143s>, Aug. 3, 2015, 1 page.
Lee et al., "A Multi-Touch Three Dimensional Touch-Sensitive Tablet", CHI'85 Proceedings, Apr. 1985, pp. 21-25.
Li Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Corrected Notice of Allowance received for U.S. Appl. No. 16/888,453, mailed on Jul. 26, 2023, 5 pages.
Corrected Notice of Allowance received for U.S. Appl. No. 16/888,478, mailed on Oct. 31, 2023, 6 pages.
Corrected Notice of Allowance received for U.S. Appl. No. 17/210,352, mailed on Sep. 20, 2023, 5 pages.
Corrected Notice of Allowance received for U.S. Appl. No. 17/367,227, mailed on Jul. 27, 2023, 2 pages.
Examiner's Answer to Appeal Brief received for U.S. Appl. No. 16/697,090, mailed on Oct. 26, 2023, 10 pages.
Final Office Action received for U.S. Appl. No. 15/167,801, mailed on Sep. 19, 2023, 19 pages.
Final Office Action received for U.S. Appl. No. 17/379,785, mailed on Aug. 23, 2023, 13 pages.
Final Office Action received for U.S. Appl. No. 17/937,410, mailed on Aug. 3, 2023, 15 pages.
Final Office Action received for U.S. Appl. No. 17/937,704, mailed on Aug. 31, 2023, 18 pages.
Non-Final Office Action received for U.S. Appl. No. 17/656,610, mailed on Jul. 26, 2023, 10 pages.
Non-Final Office Action received for U.S. Appl. No. 17/657,913, mailed on Jul. 21, 2023, 16 pages.
Non-Final Office Action received for U.S. Appl. No. 18/146,336, mailed on Aug. 3, 2023, 23 pages.
Notice of Allowance received for U.S. Appl. No. 16/827,910, mailed on Aug. 3, 2023, 21 pages.
Notice of Allowance received for U.S. Appl. No. 16/827,926, mailed on Sep. 13, 2023, 9 pages.
Notice of Allowance received for U.S. Appl. No. 16/888,478, mailed on Aug. 2, 2023, 9 pages.
Notice of Allowance received for U.S. Appl. No. 17/353,527, mailed on Jul. 21, 2023, 7 pages.
Notice of Allowance received for U.S. Appl. No. 17/353,527, mailed on Oct. 4, 2023, 7 pages.
Notice of Allowance received for U.S. Appl. No. 17/586,625, mailed on Oct. 26, 2023, 7 pages.
Notice of Allowance received for U.S. Appl. No. 17/651,731, mailed on Oct. 3, 2023, 5 pages.
Search Report received for Chinese Patent Application No. 201811143102.3, mailed on Nov. 2, 2023, 5 pages (3 pages of English Translation and 2 Pages of Official Copy).
Search Report received for Chinese Patent Application No. 202010011436.6 mailed on Aug. 30, 2023, 4 pages (2 pages of English Translation and 2 pages of Official Copy).
Search Report received for Chinese Patent Application No. 202010662994.9, mailed on Sep. 28, 2023, 3 pages (1 page of English Translation and 2 pages of Official Copy).

(56) References Cited

OTHER PUBLICATIONS

Search Report received for Chinese Patent Application No. 202110201931.8, mailed on Oct. 16, 2023, 3 pages (1 page of English Translation and 2 pages of Official Copy).
Search Report received for Chinese Patent Application No. 202210799020.4, mailed on Jul. 27, 2023, 5 pages (1 page of English Translation and 4 pages of Official Copy).
Cai, Chongshan, "Analysis of Copyright Infringement Problems of Video Aggregation App", China Copyright, vol. 02, [retrieved on Oct. 6, 2023], Available online at: <http://www.cqvip.com/qk/81889a/2015002/907166815048495348504850485048.html>, Apr. 15, 2015, 2 pages (1 page English Translation and 1 page Official Copy).
Chen et al., "What a Juke! A Collaborative Music Sharing System", IEEE, 2012, 6 pages.
Cunningham et al., "An Ethnographic Study of Music Information Seeking: Implications for the Design of a Music Digital Library", IEEE, 2003, 13 pages.
Advisory Action received for U.S. Appl. No. 14/208,963, mailed on Feb. 17, 2017, 3 pages.
Advisory Action received for U.S. Appl. No. 15/167,801, mailed on Feb. 16, 2018, 4 pages.
Applicant Initiated Interview Summary received for U.S. Appl. No. 15/167,801, mailed on Apr. 23, 2018, 3 pages.
Applicant Initiated Interview Summary received for U.S. Appl. No. 15/167,801, mailed on Jul. 29, 2019, 3 pages.
Corrected Notice of Allowance received for U.S. Appl. No. 14/242,575, mailed on Dec. 15, 2016, 7 pages.
Corrected Notice of Allowance received for U.S. Appl. No. 14/242,575, mailed on Nov. 16, 2016, 7 pages.
Corrected Notice of Allowance received for U.S. Appl. No. 14/255,664, mailed on Aug. 29, 2017, 4 pages.
Corrected Notice of Allowance received for U.S. Appl. No. 14/267,671, mailed on Nov. 29, 2018, 3 pages.
Corrected Notice of Allowance received for U.S. Appl. No. 15/276,633, mailed on Sep. 10, 2019, 7 pages.
Corrected Notice of Allowance received for U.S. Appl. No. 15/714,904, mailed on Sep. 7, 2018, 5 pages.
Corrected Notice of Allowance received for U.S. Appl. No. 16/010,280, mailed on Aug. 6, 2019, 2 pages.
Corrected Notice of Allowance received for U.S. Appl. No. 16/233,990, mailed on Oct. 20, 2022, 2 pages.
Corrected Notice of Allowance received for U.S. Appl. No. 16/872,274, mailed on Aug. 12, 2022, 5 pages.
Decision on Appeal received for U.S. Appl. No. 14/208,963, mailed on Dec. 22, 2021, 12 pages.
Decision on Appeal received for U.S. Appl. No. 15/943,316, mailed on Jan. 11, 2022, 19 pages.
Examiner's Answer to Appeal Brief received for U.S. Patent Application No. 14/208,963, mailed on Jun. 24, 2021, 20 pages.
Examiner's Answer to Appeal Brief received for U.S. Appl. No. 15/943,316, mailed on Jun. 16, 2021, 9 pages.
Extended European Search Report received for European Patent Application No. 17813728.7, mailed on Feb. 11, 2019, 8 pages.
Extended European Search Report received for European Patent Application No. 22167405.4, mailed on Jul. 4, 2022, 11 pages.
Final Office Action received for U.S. Appl. No. 14/208,963, mailed on Aug. 13, 2015, 16 pages.
Final Office Action received for U.S. Appl. No. 14/208,963, mailed on Aug. 18, 2016, 17 pages.
Final Office Action received for U.S. Appl. No. 14/255,664, mailed on Oct. 17, 2016, 16 pages.
Final Office Action received for U.S. Appl. No. 14/267,671, mailed on May 23, 2018, 17 pages.
Final Office Action received for U.S. Appl. No. 14/267,671, mailed on Oct. 26, 2016, 21 pages.
Final Office Action received for U.S. Appl. No. 14/271,179, mailed on Dec. 15, 2016, 10 pages.
Final Office Action received for U.S. Appl. No. 14/271,179, mailed on Jun. 20, 2019, 15 pages.
Final Office Action received for U.S. Appl. No. 14/271,179, mailed on Jun. 21, 2018, 14 pages.
Final Office Action received for U.S. Appl. No. 14/746,095, mailed on Jul. 16, 2018, 33 pages.
Final Office Action received for U.S. Appl. No. 15/167,801, mailed on Apr. 5, 2019, 18 pages.
Final Office Action received for U.S. Appl. No. 15/167,801, mailed on May 28, 2020, 17 pages.
Final Office Action received for U.S. Appl. No. 15/167,801, mailed on Nov. 29, 2017, 12 pages.
Final Office Action received for U.S. Appl. No. 15/235,000, mailed on Dec. 19, 2018, 33 pages.
Final Office Action received for U.S. Appl. No. 15/235,000, mailed on Mar. 13, 2018, 31 pages.
Final Office Action received for U.S. Appl. No. 15/272,393, mailed on Mar. 25, 2019, 54 pages.
Final Office Action received for U.S. Appl. No. 15/272,397, mailed on Mar. 7, 2017, 23 pages.
Final Office Action received for U.S. Appl. No. 15/276,633, mailed on Jul. 26, 2017, 15 pages.
Final Office Action received for U.S. Appl. No. 15/276,633, mailed on Oct. 29, 2018, 12 pages.
Final Office Action received for U.S. Appl. No. 15/507,229, mailed on Jul. 15, 2020, 20 pages.
Final Office Action received for U.S. Appl. No. 15/507,229, mailed on Sep. 18, 2019, 15 pages.
Final Office Action received for U.S. Appl. No. 15/719,404, mailed on Aug. 8, 2019, 19 pages.
Final Office Action received for U.S. Appl. No. 15/876,715, mailed on Nov. 5, 2018, 15 pages.
Final Office Action received for U.S. Appl. No. 15/943,316, mailed on Apr. 27, 2020, 19 pages.
Final Office Action received for U.S. Appl. No. 15/943,316, mailed on Mar. 6, 2019, 8 pages.
Final Office Action received for U.S. Appl. No. 16/108,519, mailed on Dec. 12, 2019, 10 pages.
Final Office Action received for U.S. Appl. No. 16/126,962, mailed on Apr. 8, 2020, 20 pages.
Final Office Action received for U.S. Appl. No. 16/136,005, mailed on Mar. 9, 2020, 9 pages.
Final Office Action received for U.S. Appl. No. 16/144,077, mailed on Jul. 12, 2019, 22 pages.
Final Office Action received for U.S. Appl. No. 16/222,619, mailed on Jul. 27, 2020, 11 pages.
Final Office Action received for U.S. Appl. No. 16/584,790, mailed on May 27, 2020, 27 pages.
Final Office Action received for U.S. Appl. No. 16/697,090, mailed on Dec. 14, 2022, 28 pages.
Final Office Action received for U.S. Appl. No. 16/827,910, mailed on Mar. 15, 2023, 18 pages.
Final Office Action received for U.S. Appl. No. 16/827,926, mailed on Apr. 18, 2023, 32 pages.
Final Office Action received for U.S. Appl. No. 16/888,478, mailed on Feb. 13, 2023, 27 pages.
Final Office Action received for U.S. Appl. No. 17/133,550, mailed on Feb. 15, 2023, 22 pages.
Final Office Action received for U.S. Appl. No. 17/379,785, mailed on Oct. 28, 2022, 14 pages.
Final Office Action received for U.S. Appl. No. 17/586,625, mailed on May 4, 2023, 15 pages.
Final Office Action received for U.S. Appl. No. 17/660,622, mailed on May 24, 2023, 20 pages.
International Search Report received for PCT Patent Application No. PCT/US2014/057272, mailed on May 28, 2015, 4 pages.
International Search Report received for PCT Patent Application No. PCT/US2014/057280, mailed on May 27, 2015, 4 pages.
International Search Report received for PCT Patent Application No. PCT/US2015/037027, mailed on Sep. 28, 2015, 3 pages.
International Search Report received for PCT Patent Application No. PCT/US2017/029448, mailed on Jul. 13, 2017, 3 pages.
International Search Report received for PCT Patent Application No. PCT/US2017/031764, mailed on Aug. 7, 2017, 2 pages.

(56) References Cited

OTHER PUBLICATIONS

International Search Report received for PCT Patent Application No. PCT/US2017/058132, mailed on Mar. 27, 2018, 6 pages.
Non-Final Office Action received for U.S. Appl. No. 14/208,099, mailed on Jun. 25, 2015, 12 pages.
Non-Final Office Action received for U.S. Appl. No. 14/208,963 mailed on Nov. 3, 2014, 17 pages.
Non-Final Office Action received for U.S. Appl. No. 14/208,963, mailed on Apr. 21, 2017, 19 pages.
Non-Final Office Action received for U.S. Appl. No. 14/208,963, mailed on Jan. 29, 2016, 17 pages.
Non-Final Office Action received for U.S. Appl. No. 14/208,963, mailed on Jun. 30, 2020, 20 pages.
Non-Final Office Action received for U.S. Appl. No. 14/242,575, mailed on Mar. 21, 2016, 12 pages.
Non-Final Office Action received for U.S. Appl. No. 14/255,664, mailed on Apr. 1, 2016, 15 pages.
Non-Final Office Action received for U.S. Appl. No. 14/267,671, mailed on Apr. 1, 2016, 16 pages.
Non-Final Office Action received for U.S. Appl. No. 14/267,671, mailed on Dec. 1, 2017, 18 pages.
Non-Final Office Action received for U.S. Appl. No. 14/267,671, mailed on May 26, 2017, 18 pages.
Non-Final Office Action received for U.S. Appl. No. 14/271,179, mailed on May 29, 2015, 25 pages.
Non-Final Office Action received for U.S. Appl. No. 14/271,179, mailed on Oct. 5, 2018, 15 pages.
Non-Final Office Action received for U.S. Appl. No. 14/271,179, mailed on Sep. 21, 2017, 12 pages.
Non-Final Office Action received for U.S. Appl. No. 14/746,095, mailed on Dec. 1, 2017, 34 pages.
Non-Final Office Action received for U.S. Appl. No. 14/746,095, mailed on Jul. 25, 2019, 33 pages.
Non-Final Office Action received for U.S. Appl. No. 15/167,801 mailed on Mar. 24, 2017, 12 pages.
Non-Final Office Action received for U.S. Appl. No. 15/167,801, mailed on Aug. 30, 2018, 15 pages.
Non-Final Office Action received for U.S. Appl. No. 15/167,801, mailed on Feb. 8, 2023, 23 pages.
Non-Final Office Action received for U.S. Appl. No. 15/167,801, mailed on Sep. 26, 2019, 18 pages.
Non-Final Office Action received for U.S. Appl. No. 15/224,370, mailed on Oct. 3, 2017, 14 pages.
Non-Final Office Action received for U.S. Appl. No. 15/235,000, mailed on Jul. 14, 2017, 31 pages.
Non-Final Office Action received for U.S. Appl. No. 15/235,000, mailed on Jul. 25, 2018, 31 pages.
Non-Final Office Action received for U.S. Appl. No. 15/235,000, mailed on Jun. 26, 2019, 31 pages.
Non-Final Office Action received for U.S. Appl. No. 15/272,393, mailed on Oct. 2, 2018, 52 pages.
Non-Final Office Action received for U.S. Appl. No. 15/272,397, mailed on Nov. 22, 2016, 20 pages.
Non-Final Office Action received for U.S. Appl. No. 15/276,633, mailed on Feb. 23, 2018, 12 pages.
Non-Final Office Action received for U.S. Appl. No. 15/276,633, mailed on Mar. 5, 2019, 16 pages.
Non-Final Office Action received for U.S. Appl. No. 15/276,633, mailed on Nov. 17, 2016, 12 pages.
Non-Final Office Action received for U.S. Appl. No. 15/414,493, mailed on Oct. 6, 2017, 15 pages.
Non-Final Office Action received for U.S. Appl. No. 15/507,229, mailed on Feb. 27, 2020, 16 pages.
Non-Final Office Action received for U.S. Appl. No. 15/507,229, mailed on Jun. 3, 2019, 14 pages.
Non-Final Office Action received for U.S. Appl. No. 15/674,992, mailed on May 11, 2018, 8 pages.
Non-Final Office Action received for U.S. Appl. No. 15/719,404, mailed on Dec. 14, 2018, 14 pages.
Non-Final Office Action received for U.S. Appl. No. 15/719,404, mailed on May 10, 2023, 14 pages.
Non-Final Office Action received for U.S. Appl. No. 15/798,092, mailed on Dec. 20, 2017, 20 pages.
Non-Final Office Action received for U.S. Appl. No. 15/876,715, mailed on Jun. 4, 2018, 12 pages.
Non-Final Office Action received for U.S. Appl. No. 15/876,715, mailed on Sep. 10, 2019, 13 pages.
Non-Final Office Action received for U.S. Appl. No. 15/943,316, mailed on Aug. 20, 2019, 11 pages.
Non-Final Office Action received for U.S. Appl. No. 15/943,316, mailed on Jul. 23, 2018, 9 pages.
Non-Final Office Action received for U.S. Appl. No. 16/010,280, mailed on Mar. 7, 2019, 5 pages.
Non-Final Office Action received for U.S. Appl. No. 16/108,519, mailed on Aug. 2, 2019, 10 pages.
Non-Final Office Action received for U.S. Appl. No. 16/108,519, mailed on May 8, 2020, 11 pages.
Non-Final Office Action received for U.S. Appl. No. 16/126,962, mailed on Sep. 3, 2019, 16 pages.
Non-Final Office Action received for U.S. Appl. No. 16/136,005, mailed on Sep. 18, 2019, 9 pages.
Non-Final Office Action received for U.S. Appl. No. 16/142,635, mailed on Jun. 8, 2020, 19 pages.
Non-Final Office Action received for U.S. Appl. No. 16/144,077, mailed on Feb. 19, 2019, 24 pages.
Non-Final Office Action received for U.S. Appl. No. 16/144,077, mailed on Nov. 27, 2019, 40 pages.
Non-Final Office Action received for U.S. Appl. No. 16/175,565, mailed on Feb. 17, 2023, 33 pages.
Non-Final Office Action received for U.S. Appl. No. 16/222,619, mailed on Mar. 19, 2020, 16 pages.
Non-Final Office Action received for U.S. Appl. No. 16/233,990, mailed on Jun. 18, 2020, 17 pages.
Non-Final Office Action received for U.S. Appl. No. 16/584,790, mailed on Dec. 26, 2019, 24 pages.
Non-Final Office Action received for U.S. Appl. No. 16/697,090, mailed on Jul. 6, 2020, 14 pages.
Non-Final Office Action received for U.S. Appl. No. 16/697,090, mailed on Jul. 7, 2022, 25 pages.
Non-Final Office Action received for U.S. Appl. No. 16/827,910, mailed on Sep. 14, 2022, 18 pages.
Non-Final Office Action received for U.S. Appl. No. 17/133,550, mailed on Sep. 9, 2022, 23 pages.
Non-Final Office Action received for U.S. Appl. No. 17/353,527, mailed on Dec. 8, 2022, 17 pages.
Non-Final Office Action received for U.S. Appl. No. 17/379,785, mailed on Mar. 9, 2023, 14 pages.
Non-Final Office Action received for U.S. Appl. No. 17/457,901, mailed on Apr. 28, 2022, 24 pages.
Non-Final Office Action received for U.S. Appl. No. 17/586,625, mailed on Sep. 1, 2022, 13 pages.
Non-Final Office Action received for U.S. Appl. No. 17/651,731, mailed on Apr. 25, 2023, 9 pages.
Non-Final Office Action received for U.S. Appl. No. 17/656,610, mailed on Feb. 6, 2023, 10 pages.
Non-Final Office Action received for U.S. Appl. No. 17/660,622, mailed on Dec. 20, 2022, 17 pages.
Non-Final Office Action received for U.S. Appl. No. 17/937,410, mailed on Mar. 2, 2023, 15 pages.
Non-Final Office Action received for U.S. Appl. No. 17/937,704, mailed on Mar. 30, 2023, 18 pages.
Notice of Allowability received for U.S. Appl. No. 17/457,901, mailed on Mar. 8, 2023, 9 pages.
Notice of Allowance received for U.S. Appl. No. 14/208,099, mailed on Feb. 3, 2016, 10 pages.
Notice of Allowance received for U.S. Appl. No. 14/242,575, mailed on Oct. 27, 2016, 11 pages.
Notice of Allowance received for U.S. Appl. No. 14/255,664, mailed on May 5, 2017, 7 pages.
Notice of Allowance received for U.S. Appl. No. 14/267,671, mailed on Sep. 19, 2018, 8 pages.

(56) References Cited

OTHER PUBLICATIONS

Notice of Allowance received for U.S. Appl. No. 14/746,095, mailed on Dec. 31, 2019, 8 pages.
Notice of Allowance received for U.S. Appl. No. 15/272,393, mailed on Jan. 15, 2020, 7 pages.
Notice of Allowance received for U.S. Appl. No. 15/272,393, mailed on Sep. 18, 2019, 10 pages.
Notice of Allowance received for U.S. Appl. No. 15/272,397, mailed on Oct. 18, 2017, 8 pages.
Notice of Allowance received for U.S. Appl. No. 15/276,633, mailed on Aug. 26, 2019, 8 pages.
Notice of Allowance received for U.S. Appl. No. 15/414,493, mailed on Mar. 14, 2018, 7 pages.
Notice of Allowance received for U.S. Appl. No. 15/674,992, mailed on Oct. 1, 2018, 7 pages.
Notice of Allowance received for U.S. Appl. No. 15/714,904, mailed on May 22, 2018, 8 pages.
Notice of Allowance received for U.S. Appl. No. 15/719,404, mailed on Jul. 13, 2022, 8 pages.
Notice of Allowance received for U.S. Appl. No. 15/719,404, mailed on Nov. 9, 2022, 7 pages.
Notice of Allowance received for U.S. Appl. No. 15/798,092, mailed on Jun. 7, 2018, 9 pages.
Notice of Allowance received for U.S. Appl. No. 15/798,092, mailed on Oct. 9, 2018, 5 pages.
Notice of Allowance received for U.S. Appl. No. 15/876,715, mailed on Aug. 3, 2022, 7 pages.
Notice of Allowance received for U.S. Appl. No. 16/010,280, mailed on Jul. 29, 2019, 7 pages.
Notice of Allowance received for U.S. Appl. No. 16/144,077, mailed on May 8, 2020, 15 pages.
Notice of Allowance received for U.S. Appl. No. 16/222,619, mailed on Nov. 20, 2020, 9 pages.
Notice of Allowance received for U.S. Appl. No. 16/233,990, mailed on Jan. 31, 2023, 5 pages.
Notice of Allowance received for U.S. Appl. No. 16/233,990, mailed on Oct. 5, 2022, 5 pages.
Notice of Allowance received for U.S. Appl. No. 16/584,790, mailed on Feb. 3, 2023, 9 pages.
Notice of Allowance received for U.S. Appl. No. 16/865,172, mailed on Aug. 25, 2022, 8 pages.
Notice of Allowance received for U.S. Appl. No. 16/888,453, mailed on Jun. 21, 2023, 7 pages.
Notice of Allowance received for U.S. Appl. No. 16/888,453, mailed on Mar. 1, 2023, 8 pages.
Notice of Allowance received for U.S. Appl. No. 17/000,112, mailed on Oct. 18, 2022, 10 pages.
Notice of Allowance received for U.S. Appl. No. 17/210,352, mailed on Dec. 5, 2022, 9 pages.
Notice of Allowance received for U.S. Appl. No. 17/210,352, mailed on Mar. 16, 2023, 7 pages.
Notice of Allowance received for U.S. Appl. No. 17/367,227, mailed on Mar. 23, 2023, 12 pages.
Notice of Allowance received for U.S. Appl. No. 17/457,901, mailed on Nov. 16, 2022, 9 pages.
Notice of Allowance received for U.S. Appl. No. 17/654,578, mailed on Feb. 15, 2023, 8 pages.
Notice of Allowance received for U.S. Appl. No. 17/654,578, mailed on Jun. 13, 2023, 7 pages.
Notice of Allowance received for U.S. Appl. No. 17/654,578, mailed on Oct. 25, 2022, 8 pages.
Restriction Requirement received for U.S. Appl. No. 14/208,099, mailed on Feb. 24, 2015, 5 pages.
Search Report received for Chinese Patent Application No. 201780066823.6, mailed on Nov. 1, 2022, 4 pages (2 pages of English Translation and 2 pages of Official Copy).
Search Report received for Chinese Patent Application No. 201811143102.3, mailed on Nov. 22, 2022, 5 pages (2 pages of English Translation and 3 pages of Official Copy).
Search Report received for Chinese Patent Application No. 201911313480.6, mailed on Jan. 20, 2023, 4 pages (2 pages of English Translation and 2 pages of Official Copy).
Search Report received for Chinese Patent Application No. 201911313496.7, mailed on Jan. 20, 2023, 4 pages (2 pages of English Translation and 2 pages of Official Copy).
Search Report received for Chinese Patent Application No. 201911313497.1, mailed on Apr. 11, 2023, 5 pages (2 pages of English Translation and 3 pages of Official Copy).
Search Report received for Chinese Patent Application No. 201911313497.1, mailed on Dec. 14, 2022, 3 pages (1 page of English Translation and 2 pages of Official Copy).
Search Report received for Chinese Patent Application No. 202010011436.6, mailed on Dec. 15, 2022, 9 pages (4 pages of English Translation and 5 pages of Official Copy).
Search Report received for Chinese Patent Application No. 202010662190.9, mailed on Apr. 28, 2023, 5 pages (2 pages of English Translation and 3 pages of Official Copy).
Search Report received for Chinese Patent Application No. 202010662206.6, mailed on Apr. 28, 2023, 5 pages (2 pages of English Translation and 3 pages of Official Copy).
Search Report received for Chinese Patent Application No. 202010662994.9, mailed on Apr. 28, 2023, 5 pages (2 pages of English Translation and 3 pages of Official Copy).
Search Report received for Danish Patent Application No. PA 201670581, mailed on Apr. 4, 2017, 2 pages.
Search Report received for Danish Patent Application No. PA 201670581, mailed on Feb. 5, 2018, 1 page.
Search Report received for Danish Patent Application No. PA 201670581, mailed on Nov. 3, 2016, 1 page.
Search Report received for Danish Patent Application No. PA 201670582, mailed on Feb. 9, 2017, 1 page.
Search Report received for Danish Patent Application No. PA 201870354, mailed on Sep. 26, 2018, 4 pages.
Search Report received for Danish Patent Application No. PA201670582, mailed on Mar. 6, 2018, 2 pages.
Search Report received for Danish Patent Application No. PA201670582, mailed on Oct. 28, 2016, 4 pages.
Search Report received for European Patent Application No. 20718506.7, mailed on Mar. 21, 2023, 2 pages.
Search Report received for Taiwanese Patent Application No. 104120385, mailed on Nov. 25, 2016, 2 pages (1 page of official copy & 1 page of English translation).
Supplemental Notice of Allowability received for U.S. Appl. No. 16/222,619, mailed on Mar. 8, 2021, 3 pages.
Supplemental Notice of Allowance received for U.S. Appl. No. 15/798,092, mailed on Jan. 9, 2019, 2 pages.
Akhtar Iyaz, "Movies Anywhere: Everything You Need To Know", Available online at: <https://www.cnet.com/how-to/movies-anywhere-ultraviolet-movies-locker-streaming-redeem-faq/>, [Retrieved May 4, 2020], 2017, 8 pages.
Alvarez Edgar, "Sling TV Redesign Makes It Easy To Find Your Favorite Content", Engadget, Available online at: <https://www.engadget.com/2016/01/05/sling-tv-major-redesign/>, [Retrieved Aug. 5, 2019], May 1, 2016, pp. 1-12.
Anonymous, "Video Progress Bar—YouTube Help", Available online at: <https://web.archive.org/web/20190317001501/https://support.google.com/youtube/answer/7174115?hl=en>, [retrieved on Mar. 22, 2023], Mar. 17, 2019, 2 pages.
Apple, "The control is all yours", Available online at: <https://www.apple.com.cn/privacy/control/>, [Retrieved Dec. 29, 2022], Nov. 30, 2022, 12 pages. See attached Communication 37 CFR § 1.98(a)(3).
Beer et al., "The Odds Of Running A Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communications, 2013, 4 pages. See attached Communication 37 CFR § 1.98(a)(3).
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.

(56) References Cited

OTHER PUBLICATIONS

Budhraja et al., "Probability Based Playlist Generation Based on Music Similarity and User Customization", National Conference On Computing And Communication Systems, 2012, 5 pages.

Cheng, Luo, "The Designing of Dynamic Play-List Based on Flash Streaming Media Technology", Computer and Telecommunication, 2008, 3 pages. See attached Communication 37 CFR § 1.98(a)(3).

Drews et al., "Virtual Jukebox—Reviving a Classic", Proceedings of the 35th Hawaii International Conference on System Sciences, 2022, 7 pages.

episodecalendar.com, "Keep track of your favorite TV shows!—TV Episode Calendar", Available Online At: <https://web.archive.org/web/20140517060612/https://episodecalendar.com/>, [Retrieved Oct. 18, 2017], May 17, 2014, 6 pages.

Jin et al., "Pricing Sponsored Content in Wireless Networks with Multiple Content Providers", The Fourth IEEE Workshop on Smart Data Pricing 2015, 2015, pp. 668-673.

Kimbler Kristofer, "App Store Strategies for Service Providers", 2010 4th International Conference on Intelligence in Next Generation Networks, Nov. 18, 2010, 5 pages.

Liu, Chang, "Functions and Design of Multi-Screen Playing System in TV Variety Studio", Modern TV Technology, 2013, 5 pages. See attached Communication 37 CFR § 1.98(a)(3).

Meng et al., "Role Authorization Based Web Service Access Control Model", Journal of Lanzhou University (Natural Science Edition), vol. 42, No. 2, 2007, pp. 84-88. See attached Communication 37 CFR § 1.98(a)(3).

Ng Gary, "New Netflix User Interface Coming This Month, First Redesign in Four Years", iPhone in Canada, Available online at: <https://www.iphoneincanada.ca/news/new-netflix-user-interface/>, [Retrieved Jul. 7, 2020], Jun. 1, 2015, 3 pages.

Panzarino Matthew, "Apple Announces Voice Activated Siri Assistant Feature For iOS 5, Integrates Wolfram Alpha And Wikipedia", Available online at: <www.thenextweb.com>, Oct. 4, 2011, pp. 1-6.

Pierce David, "Got Hulu and Netflix? You Need an App to Search It All", Wired, Available online at: <https://www.wired.com/2016/03/got-hulu-netflix-need-app-search/>, [Retrieved Mar. 10, 2016], Mar. 10, 2016, pp. 1-4.

Tinari George, "What's New in the Netflix Redesign and How to Use It", Retrieved from the Internet: <https://web.archive.org/web/20161110092133/https://www.guidingtech.com/48443/netflix-redesign-overview/>, [retrieved on Mar. 22, 2023], Nov. 10, 2016, 9 pages.

Wang et al., "Authorization Management Mechanism of Web Application System", Network and Information Technology, vol. 25, No. 11, 2006, 3 pages. See attached Communication 37 CFR § 1.98(a)(3).

Zhang et al., "Music Playlist Prediction Via Detecting Song Moods", IEEE China Summit and International Conference on Signal and Information Processing, 2013, pp. 174-178.

Applicant Initiated Interview Summary received for U.S. Appl. No. 17/656,610, mailed on Apr. 10, 2024, 2 pages.

Corrected Notice of Allowability received for U.S. Appl. No. 15/719,404, mailed on Mar. 22, 2024, 2 pages.

Corrected Notice of Allowability received for U.S. Appl. No. 17/586,625, mailed on Feb. 20, 2024, 2 pages.

Examiner's Answer to Appeal Brief received for U.S. Appl. No. 16/175,565, mailed on Dec. 15, 2023, 27 pages.

Final Office Action received for U.S. Appl. No. 17/656,610, mailed on Jan. 16, 2024, 12 pages.

Final Office Action received for U.S. Appl. No. 18/146,336, mailed on Feb. 23, 2024, 23 pages.

Non-Final Office Action received for U.S. Appl. No. 17/133,550, mailed on Dec. 18, 2023, 25 pages.

Non-Final Office Action received for U.S. Appl. No. 17/379,785, mailed on Feb. 15, 2024, 14 pages.

Non-Final Office Action received for U.S. Appl. No. 17/656,610, mailed on Apr. 30, 2024, 12 pages.

Non-Final Office Action received for U.S. Appl. No. 17/657,913, mailed on Jan. 11, 2024, 20 pages.

Non-Final Office Action received for U.S. Appl. No. 17/937,410, mailed on Feb. 29, 2024, 16 pages.

Non-Final Office Action received for U.S. Appl. No. 17/937,704, mailed on Feb. 1, 2024, 21 pages.

Notice of Allowance received for U.S. Appl. No. 15/719,404, mailed on Dec. 8, 2023, 10 pages.

Notice of Allowance received for U.S. Appl. No. 16/827,910, mailed on Dec. 13, 2023, 19 pages.

Notice of Allowance received for U.S. Appl. No. 16/827,926, mailed on Feb. 2, 2024, 8 pages.

Notice of Allowance received for U.S. Appl. No. 17/651,731, mailed on Jan. 25, 2024, 5 pages.

Notice of Allowance received for U.S. Appl. No. 17/660,622, mailed on Jan. 24, 2024, 11 pages.

Notice of Allowance received for U.S. Appl. No. 17/937,704, mailed on Apr. 25, 2024, 12 pages.

Search Report received for Chinese Patent Application No. 202111293833.8, mailed on Dec. 9, 2023, 4 pages (2 pages of English Translation and 2 pages of Official Copy).

Search Report received for Chinese Patent Application No. 202111635535.2, mailed on Dec. 21, 2023, 5 pages (2 pages of English Translation and 3 pages of Official Copy).

Kim et al., "Towards Optimal Navigation Through Video Content on Interactive TV", Interacting with Computers, vol. 18, No. 4 (2006): (Year: 2006), Mar. 3, 2006, pp. 723-746.

Matejka et al., "Swifter: Improved Online Video Scrubbing", Proceedings of the SIGCHI Conference on Human Factors in Computing Systems, Apr. 27-May 2, 2013, 10 pages.

Schmidt, Alexander, "Graphical User Interface for Video on Demand Navigation from an IPTV Set Top Box", Jun. 16, 2009, 52 pages.

\* cited by examiner

INPUT DEVICE AND USER INTERFACE INTERACTIONS

CROSS REFERENCE TO RELATED APPLICATIONS

This application is a continuation of U.S. patent application Ser. No. 16/945,724, (now U.S. Publication No. 2020/0363934), filed Jul. 31, 2020, which is a continuation of U.S. patent application Ser. No. 16/392,467 (now U.S. Pat. No. 10,732,807 issued on Aug. 4, 2020), filed Apr. 23, 2019, which is a continuation of U.S. patent application Ser. No. 15/990,327 (now U.S. Pat. No. 10,303,348 issued on May 28, 2019), filed May 25, 2018, which is a continuation of U.S. patent application Ser. No. 15/695,880 (now U.S. Pat. No. 10,019,142 issued on Jul. 10, 2018), filed Sep. 5, 2017, which is a continuation of U.S. patent application Ser. No. 14/749,288 (now U.S. Pat. No. 9,792,018 issued on Oct. 17, 2017), filed on Jun. 24, 2015, which claims the benefit of U.S. Provisional Application No. 62/016,593, filed Jun. 24, 2014, the entire disclosures of which are incorporated herein by reference for all purposes.

FIELD OF THE DISCLOSURE

This relates generally to electronic devices with which interaction is accomplished using touch-sensitive surfaces.

BACKGROUND OF THE DISCLOSURE

User interaction with devices such as computers and other electronic computing devices has increased significantly in recent years. These devices can be devices such as computers, tablet computers, televisions, multimedia devices, and the like, and these devices can present user interfaces to users to facilitate the above interaction.

Interaction with the above devices can be performed using various input devices, such as touch screen displays, touch-sensitive surfaces, remote controls, mice and other input devices. Touch-sensitive surfaces and touch screen displays, in particular, have become increasingly popular input devices. Providing for robust user interface-input device interaction enhances the user's experience with the device and decreases user interaction time, which is particularly important where input devices are battery-operated.

SUMMARY OF THE DISCLOSURE

The embodiments described in this disclosure are directed to one or more devices that optionally display functionality information, display a content navigation bar, provide for predefined movement in a user interface in response to specified inputs, determine a user's grip of a device, and display a character recognition user interface, and one or more actions that the devices optionally perform that are related to the above. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
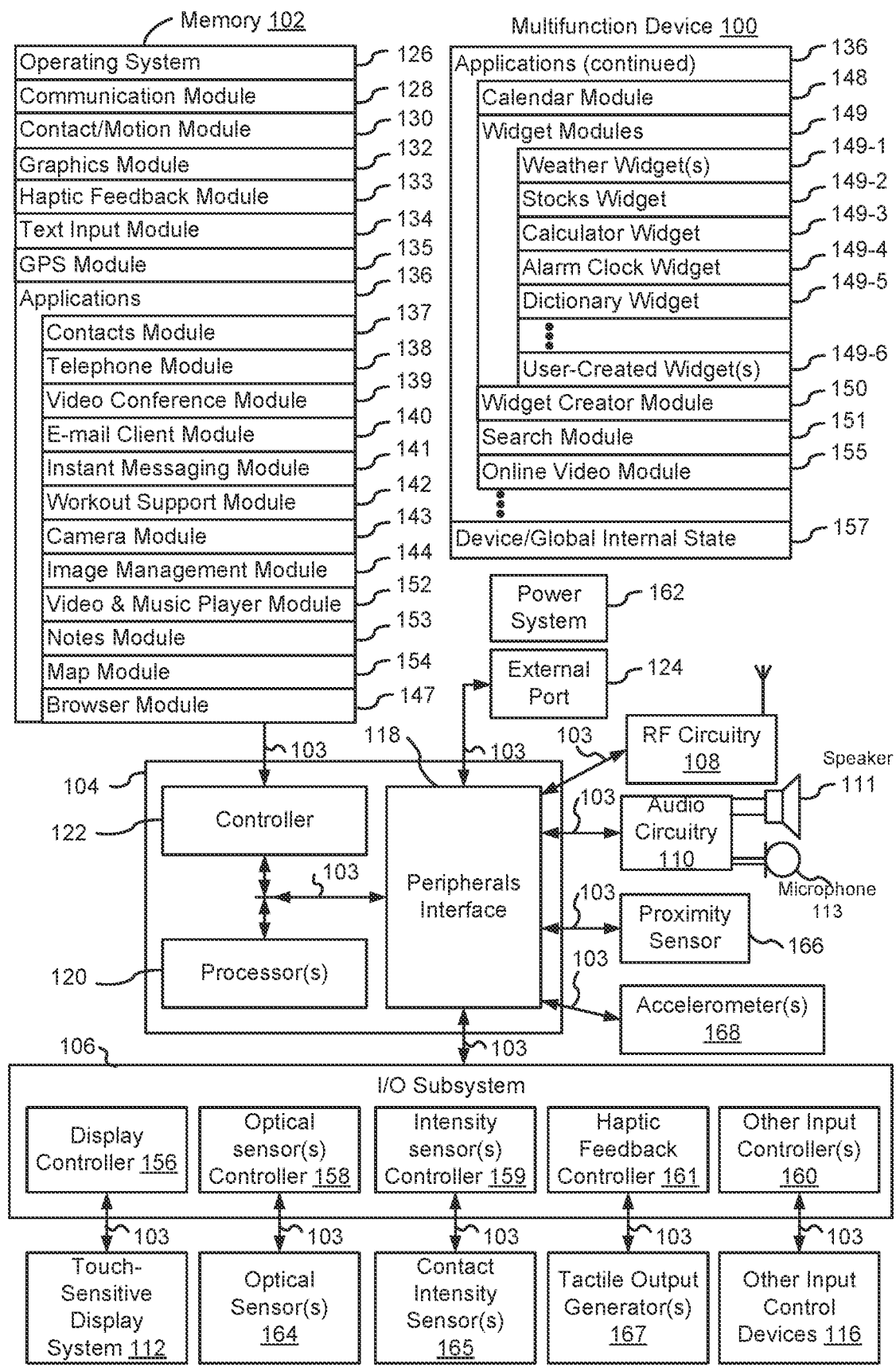
FIG. 1A is a block diagram illustrating a multifunction device with a touch-sensitive display in accordance with some embodiments.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
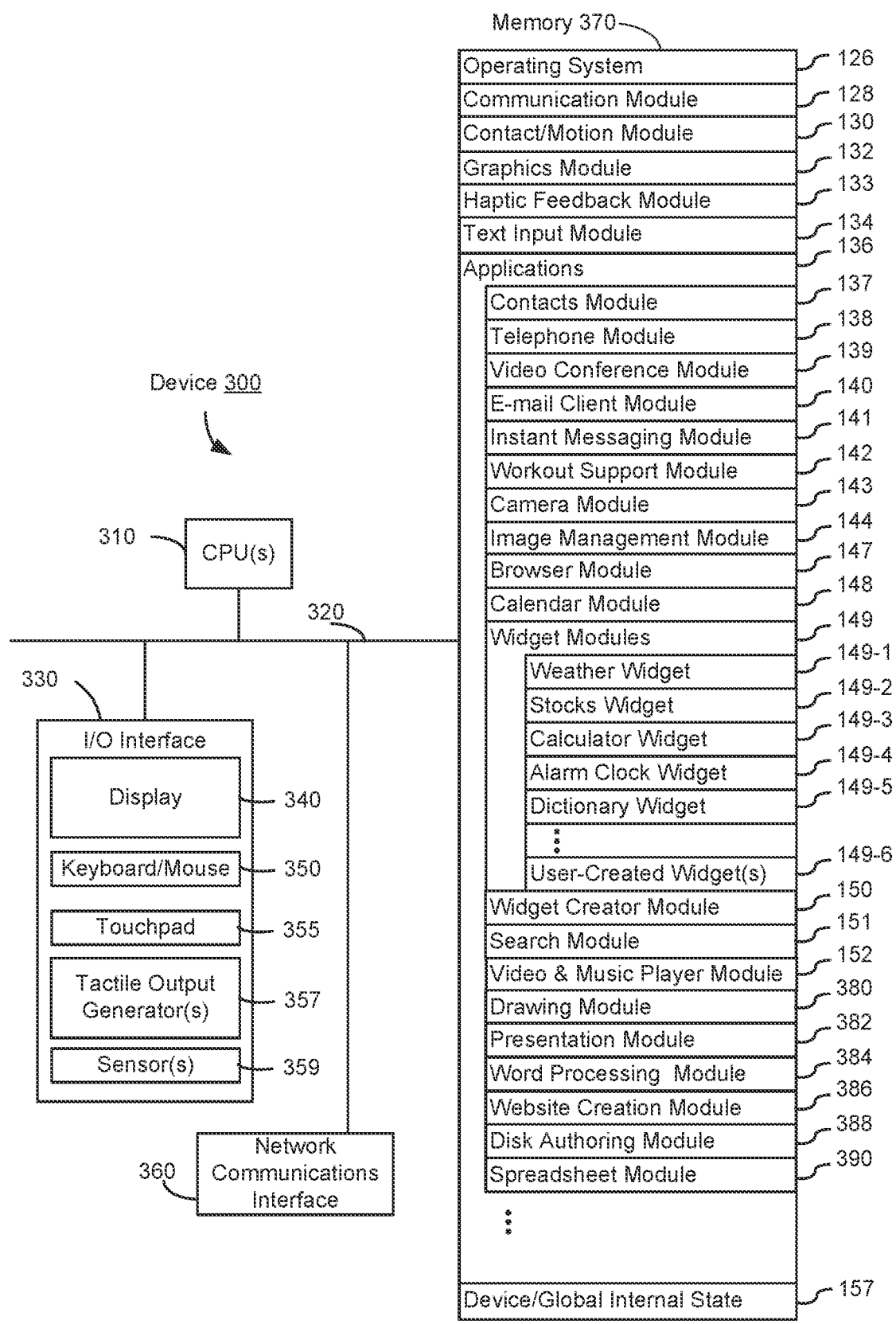
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns and intensities. Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154;
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad (whether included in device 100 or on a separate device, such as an input device). By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In some embodiments, a "menu button" is implemented using a touchpad. In some other embodiments, the menu button is a physical push button or other physical input control device instead of a touchpad.

Figure 1B:
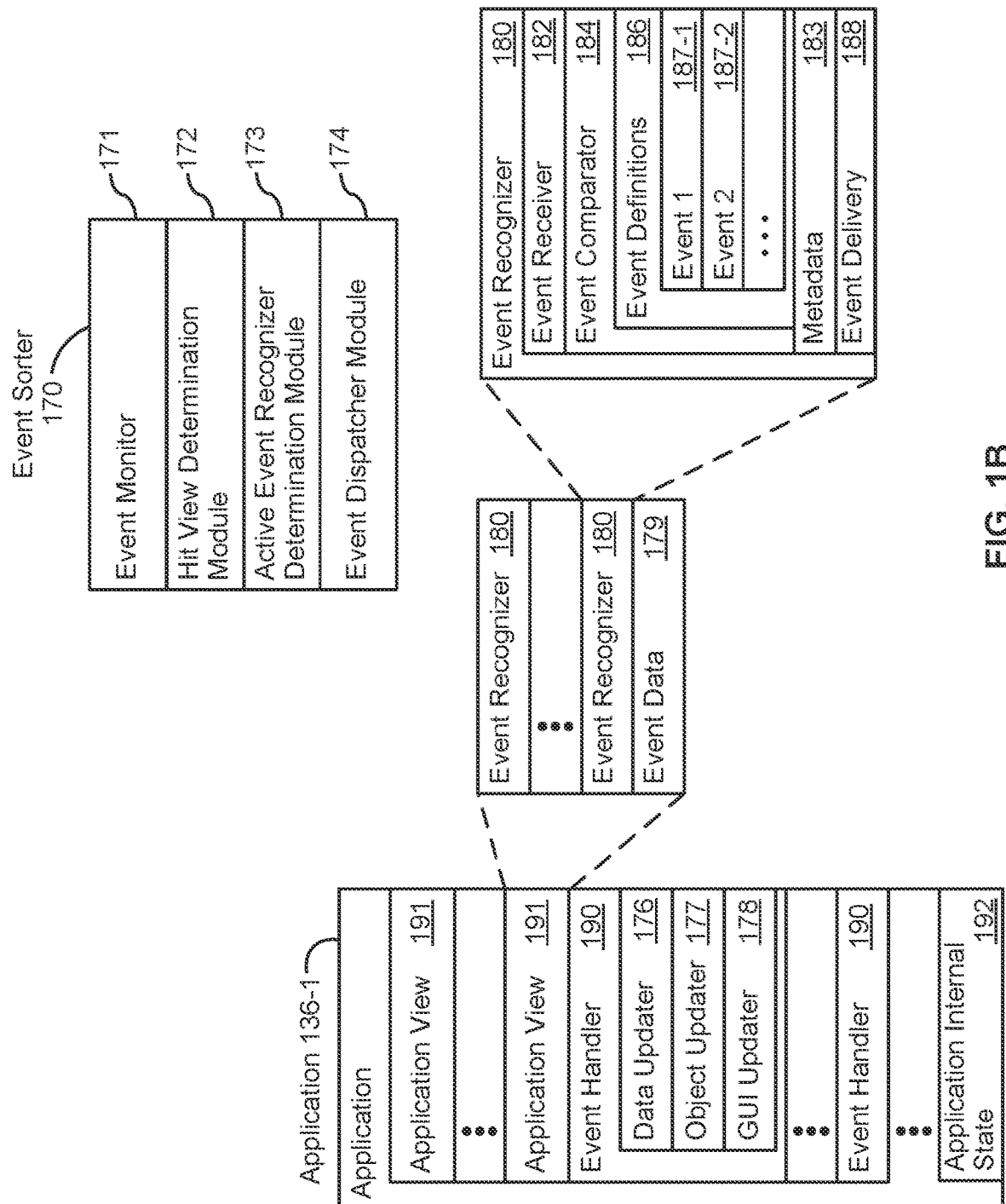
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays and/or touchpads also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
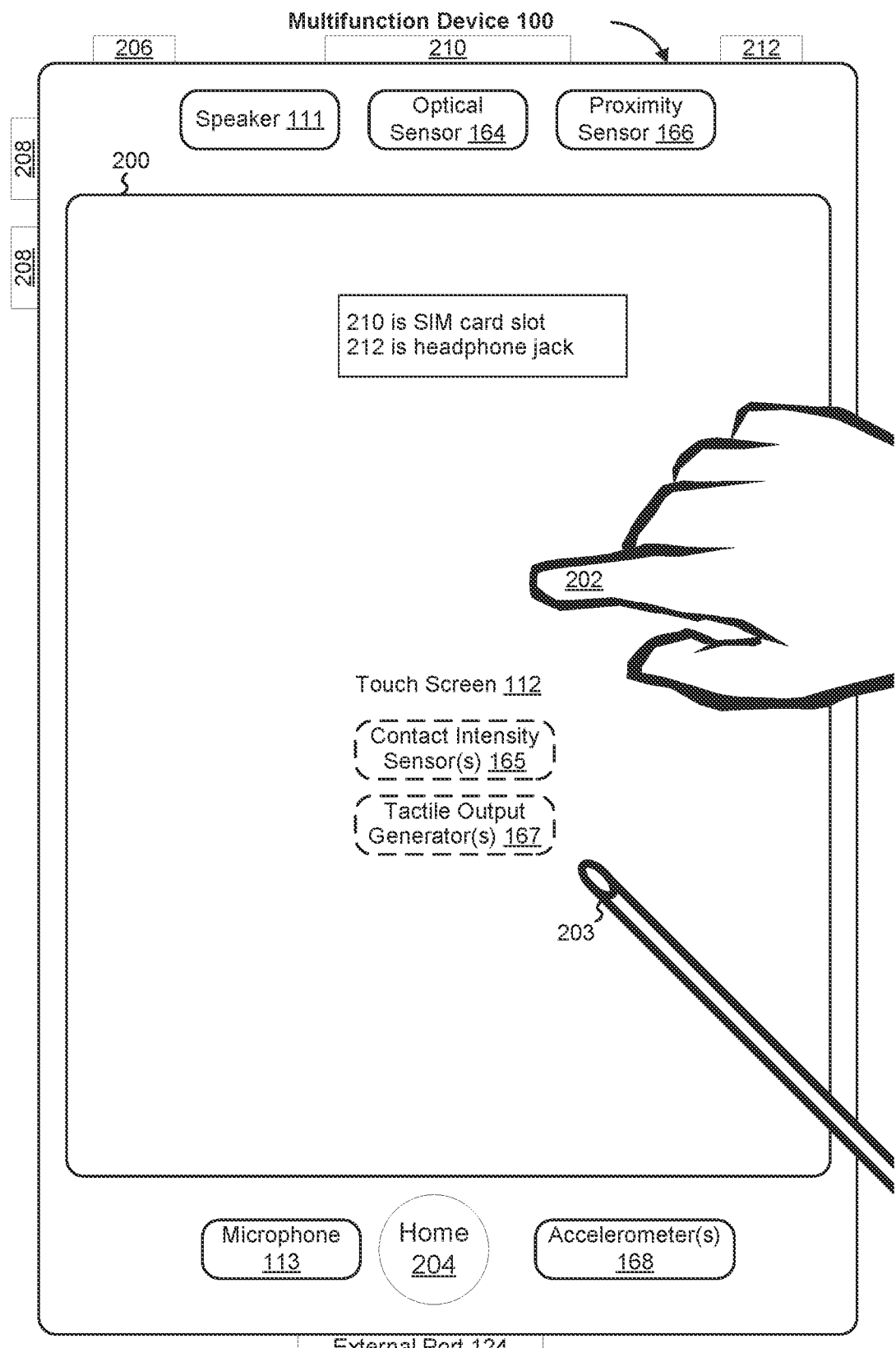
FIG. 2 illustrates a multifunction device having a touch screen in accordance with some embodiments.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
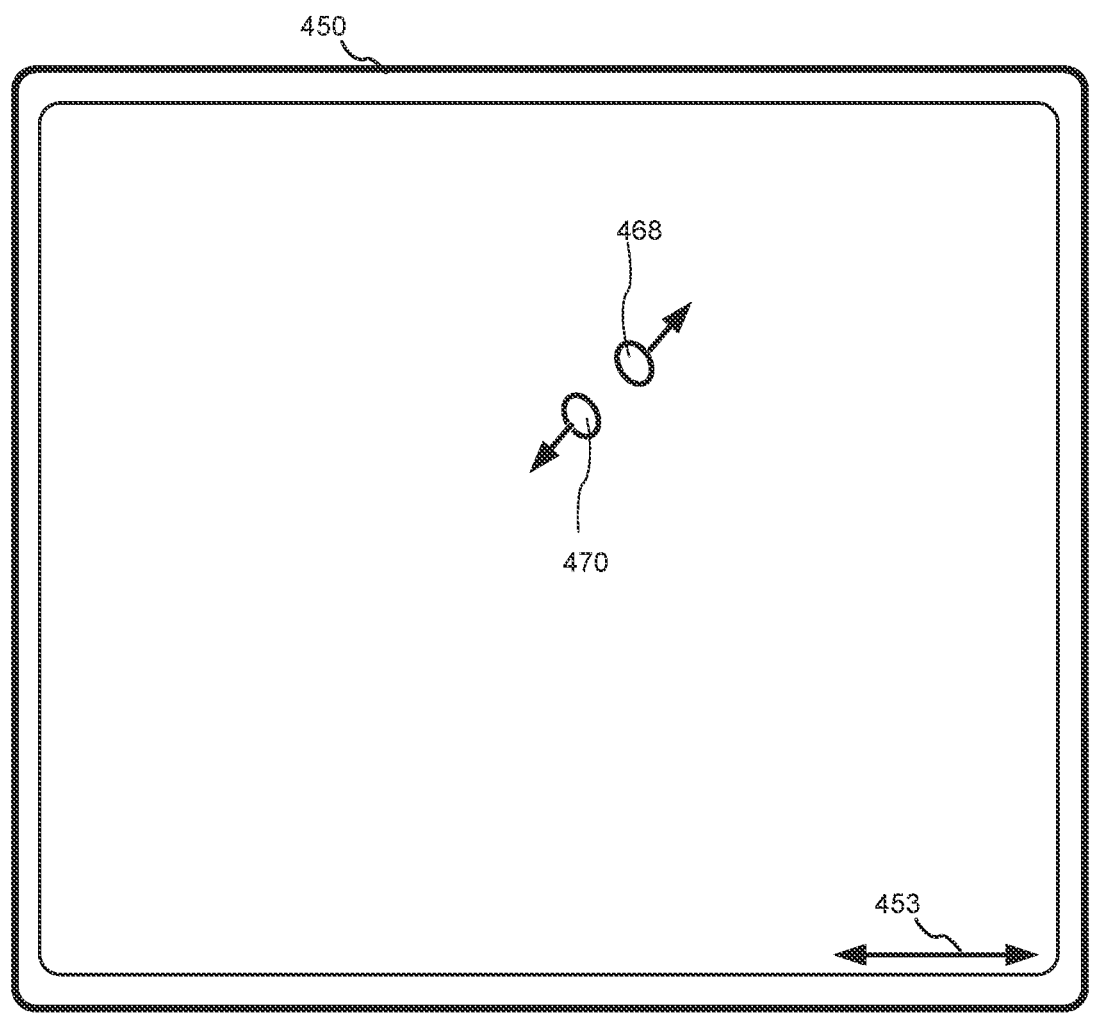
FIG. 4 illustrates an exemplary user interface for a multifunction device with a touch-sensitive surface that is separate from the display in accordance with some embodiments.
Figure 4:
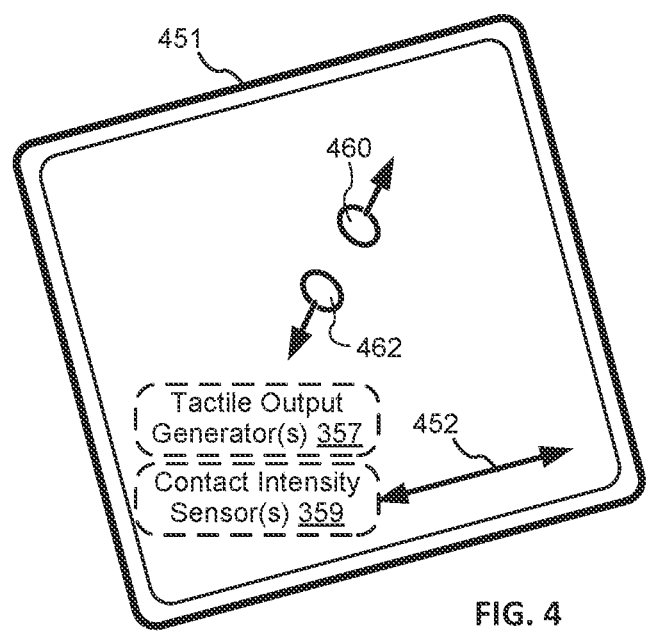

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5:
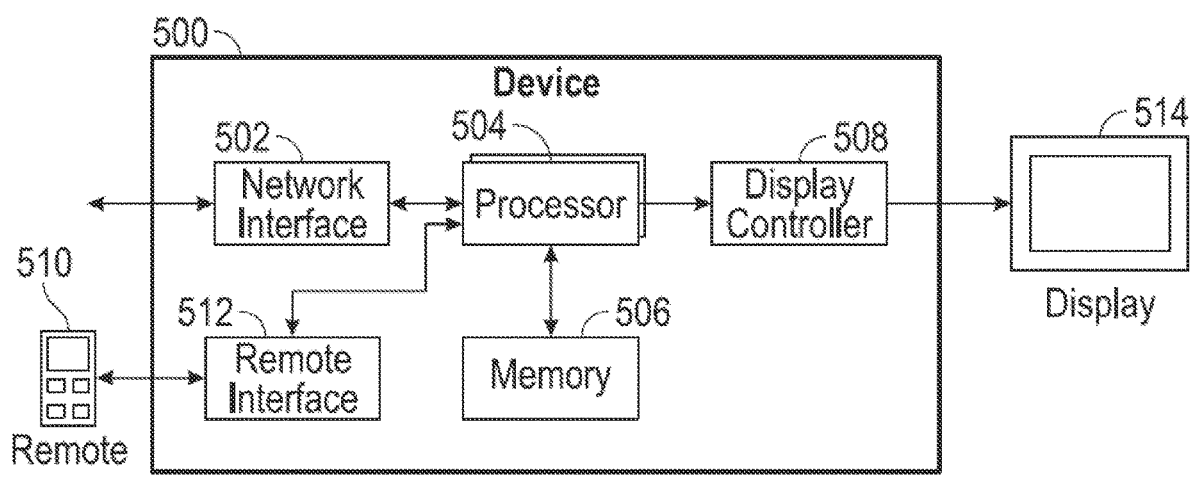
FIG. 5 illustrates a block diagram of an exemplary architecture for the device according to some embodiments of the disclosure.

FIG. 5 illustrates a block diagram of an exemplary architecture for the device 500 according to some embodiments of the disclosure. In the embodiment of FIG. 5, media content is optionally received by device 500 via network interface 502, which is optionally a wireless or wired connection. The one or more processors 504 optionally execute any number of programs stored in memory 506 or storage, which optionally includes instructions to perform one or more of the methods and/or processes described in this disclosure.

In some embodiments, display controller 508 causes the various user interfaces of the disclosure to be displayed on display 500. Further, input to device 500 is optionally provided by remote 510 via remote interface 512, which is optionally a wireless or a wired connection. It is understood that the embodiment of FIG. 5 is not meant to limit the features of the device of the disclosure, and that other components to facilitate other features described in the disclosure are optionally included in the architecture of FIG. 5 as well. In some embodiments, device 500 optionally corresponds to one or more of multifunction device 100 in FIGS. 1A and 2, and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 510 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and display 514 optionally corresponds to one or more of touch-sensitive display system 112 in FIGS. 1A and 2, display 340 in FIG. 3, and display 450 in FIG. 4.

User Interfaces and Associated Processes

Display of Functionality Information

In circumstances where a user interacts with an electronic device using an input device, such as a touch-sensitive surface, it can be beneficial to the user's experience for the electronic device to provide the user with information about functionalities ("functionality information") that may be accessible from the input device. This can be particularly true in circumstances in which the input device itself contains no visible information about such functionalities—for example, a touch-sensitive surface having a blank, uniform surface. The embodiments described below provide ways to present such functionality information. Enhancing interactions with a device reduces the amount of time needed by a user to perform operations, and thus reduces the power usage of the device and increases battery life for battery-powered devices.

It is understood that people use devices. When a person uses a device, that person is optionally referred to as a user of the device. Thus, in this disclosure, references to a "person" or "people" are optionally interchangeable with references to a "user" or "users", and references to a "user" or "users" are optionally interchangeable with references to a "person" or "people".

FIGS. 6A-6G illustrate exemplary ways in which functionality information is presented in a user interface in accordance with some embodiments of the disclosure. The embodiments in these figures are used to illustrate the processes described below, including the processes described with reference to FIGS. 7A-7G.

Figure 6A:
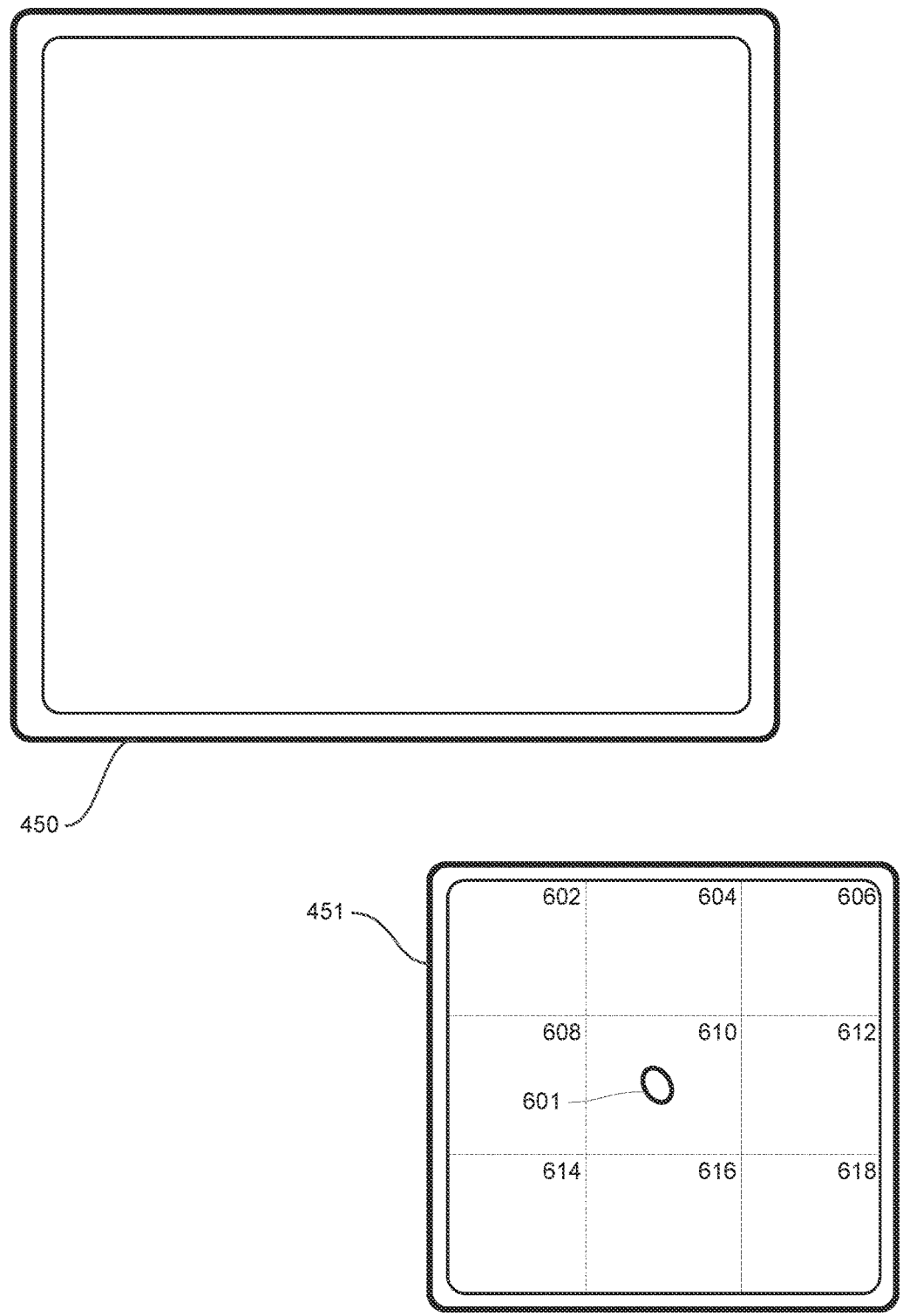
FIGS. 6A-6G illustrate exemplary ways in which functionality information is presented in a user interface in accordance with some embodiments of the disclosure.

FIG. 6A illustrates exemplary display 450 and touch-sensitive surface 451. Display 450 (e.g., a television or other display device) and touch-sensitive surface 451 are optionally integrated with and/or otherwise in communication with a device such as device 500 as described above with reference to FIG. 5—for example, a set top box or other user interface generating device that is in communication with a remote control and a display device. Display 450 optionally displays one or more user interfaces that include various content. Touch-sensitive surface 451 optionally includes a plurality of predefined regions 602, 604, 606, 608, 610, 612, 614, 616, and 618. In some embodiments, one or more of predefined regions 602, 604, 606, 608, 610, 612, 614, 616, and 618 are selectable to perform a functionality associated with the respective predefined region (e.g., one or more of the regions are selectable to perform a functionality, including reverse skipping, forward skipping, rewinding, fast-forwarding, scrubbing and displaying information associated with a content item in a user interface displayed on display 450). Further exemplary functionalities are described below. In particular, in some embodiments, tapping in one of the predefined regions performs the functionality associated with the predefined region; in some embodiments, clicking in the predefined region performs the functionality associated with the predefined region; in some embodiments, one or more other inputs detected in the predefined region perform the functionality associated with the predefined region. For example, in some embodiments, clicking in region 612 (e.g., detecting the clicking of a button while detecting a contact, such as contact 601 or a different contact, on region 612, or detecting an increase in the intensity of a contact, such as contact 601 or a different contact, detected in region 612 above a predetermined intensity threshold) performs a fast-forward operation for content displayed on display 450 while detecting a contact on region 612. The surface of touch-sensitive surface 451 is optionally visibly uniform, and optionally does not provide a visual indication of the existence of predefined regions 602, 604, 606, 608, 610, 612, 614, 616, and 618, and/or their associated functionalities. Thus, it can be beneficial to display such information on display 450.

In some embodiments, receiving an indication of contact 601 detected on touch-sensitive surface 451, and determining whether the contact has been detected for longer than a first time period (e.g., determining whether a resting finger has been detected on the touch-sensitive surface of the remote for at least a threshold amount of time such as 0.1, 0.2, 0.5, or 1 seconds), initiates a process by which functionality information is optionally determined and/or displayed on display 450. In some embodiments, contact 601 need not be detected for longer than the first time period, but rather tapping on touch-sensitive surface initiates the process by which functionality information is optionally determined and/or displayed on display 450. As shown in FIG. 6A, in some embodiments, contact 601 has been detected in predefined region 610, though it is understood that a contact detected anywhere on touch-sensitive surface 451 optionally initiates the determination and/or display of functionality information. In some embodiments, functionality information is determined and/or displayed not in response to detection of an input for displaying the functionality information, but rather in response to a determination that one or more functions are accessible from the touch-sensitive surface based on a state of a user interface on display 450—for example, selection of a user interface element (e.g., an application or a channel) in the user interface optionally results in the display of functionality information relating to the selected user interface element (e.g., functionality information for deleting the application or the channel from an application or channel bar). The discussion that follows focuses on embodiments in which functionality information is displayed in response to detection of an input for displaying the functionality information, though it is understood that the scope of the disclosure is not so limited, as described above.

In accordance with a determination that contact 601 meets functionality display criteria (e.g., one or more criterion) that include a criterion that is met when the contact has been detected for longer than the first time period, in some embodiments, functionality information is determined for display in a user interface for display on display 450, the functionality information including information about a first functionality of the plurality of functionalities associated with predefined regions 602, 604, 606, 608, 610, 612, 614, 616, and 618. This determination involves, for example, determining a respective functionality for which functionality information is to be displayed, and then selecting pre-generated functionality information that corresponds to the respective functionality or generating the functionality information that is to be displayed on display 450 (e.g., resting a finger anywhere on touch-sensitive surface 451 optionally brings up information about one or more functionalities accessible from the touch-sensitive surface). In some embodiments, the functionality information includes one or more icons that are displayed in a user interface on display 450 that indicate functions of corresponding regions of the touch-sensitive surface. In some embodiments, the information about the first functionality comprises a visual cue for performing the first functionality (e.g., a visual display about the functionality to be performed, how to perform the functionality from the remote, etc.).

In accordance with a determination that contact 601 does not meet the functionality display criteria (e.g., because the contact has not been detected for longer than the first time period or because the contact has not been substantially stationary for longer than the first time period), the electronic device optionally forgoes determination of the functionality information including the information about the first functionality of the plurality of associated functionalities (e.g., icons or information indicating the functionalities of the different regions of touch-sensitive surface 451 are not displayed if the contact ends before the first time period has been reached).

In some embodiments, the functionality display criteria include a criterion that is met when the contact has moved less than a first movement threshold during the first time period (e.g., in order to display the functionality information, in some embodiments, the contact must be a substantially stationary contact).

Figure 6B:
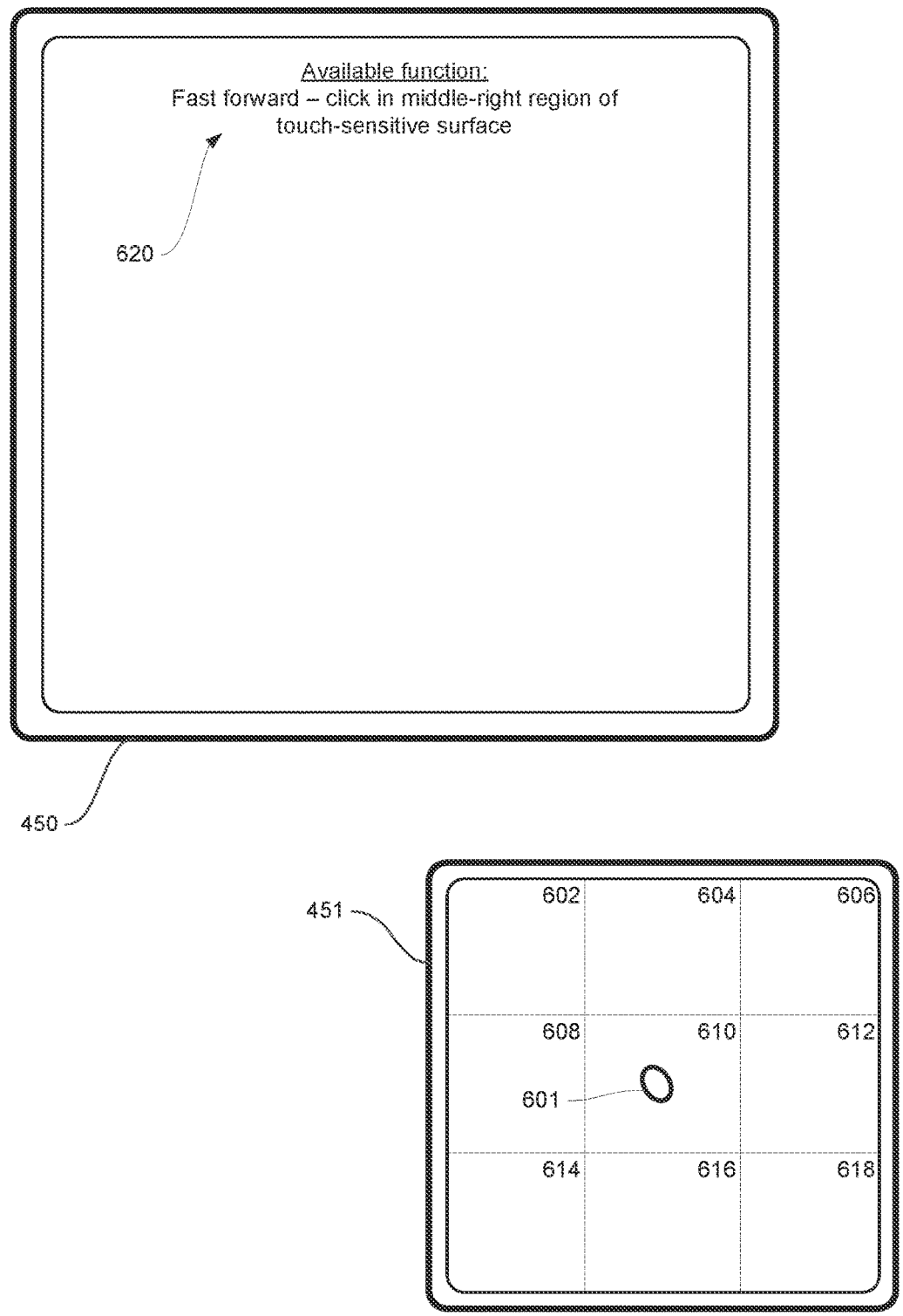

FIG. 6B illustrates exemplary functionality information displayed in a user interface on display 450 in accordance with a determination that contact 601 meets the functionality display criteria. Functionality information 620 optionally includes information about a functionality that is accessible from touch sensitive surface 451 (e.g., fast forward), and/or information about how to access the functionality (e.g., clicking in predefined region 612). In some embodiments, the functionality information comprises an overlay displayed over a moving image or a still image in the user interface displayed by display 450.

Figure 6C:
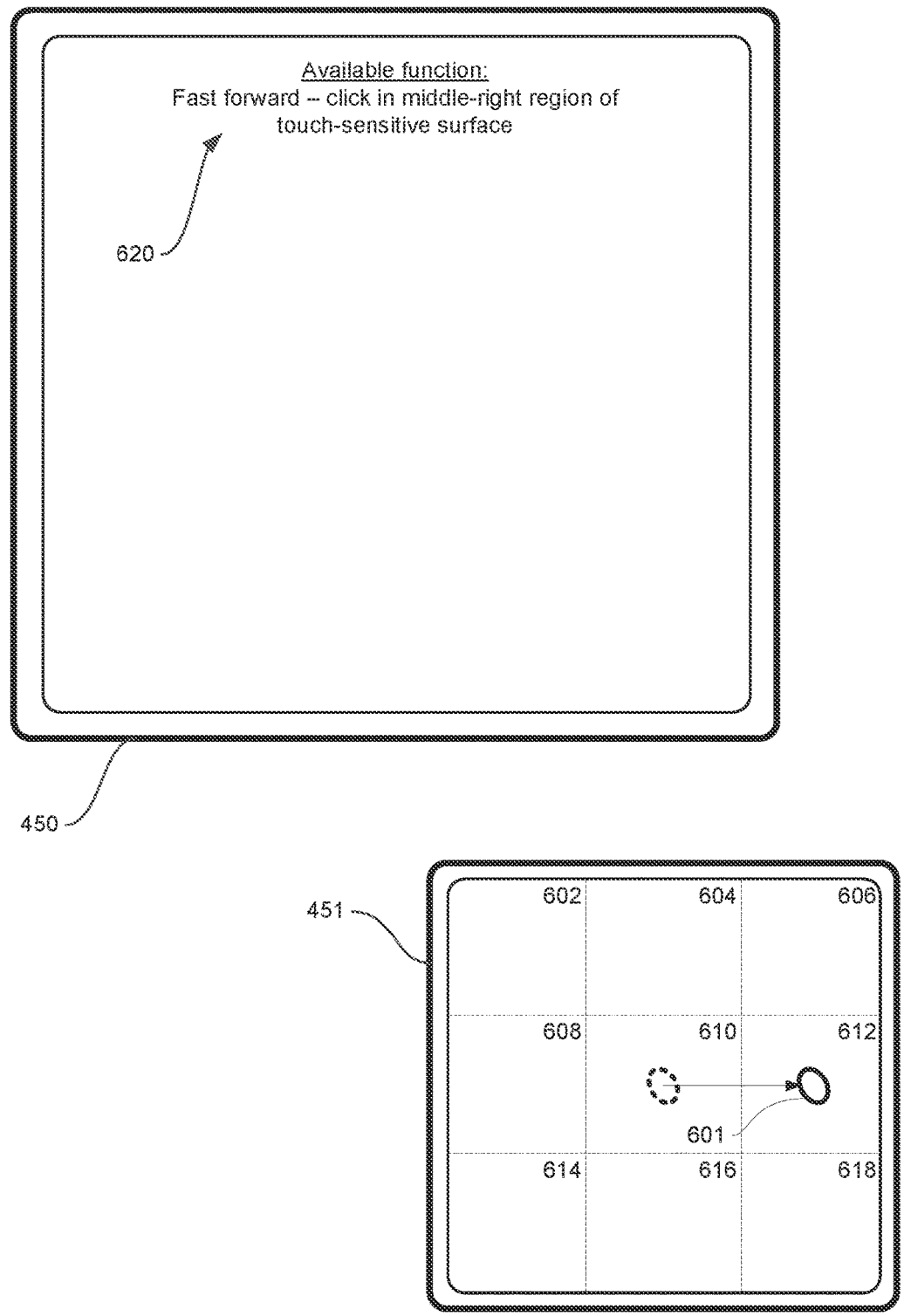

FIG. 6C illustrates exemplary selection of a functionality accessible from touch-sensitive surface 451. As described above, selection of a functionality is optionally accomplished when an indication of an input ("second input") detected on the predefined region associated with the functionality is received. As shown in FIG. 6C, in some embodiments, selection of the fast forward functionality is accomplished by detecting a click in predefined region 612, as shown. In response to receiving the indication of the second input, the electronic device optionally performs the functionality associated with the predefined region on which the second input was detected.

In some embodiments, detecting the second input (e.g., the click) comprises detecting the second input concurrently with the contact (e.g., contact 601) on touch-sensitive surface 451 (e.g., a click in predefined region 612 is optionally detected in response to contact 601 moving to predefined region 612 and providing a click input, without contact lifting off touch-sensitive surface). In some embodiments, detecting the second input comprises detecting a second contact (e.g., one or more of a tap, a click and a resting touch) on predefined region 612 of touch-sensitive surface 451. In some embodiments, detecting the second input comprises detecting an increase in an intensity of the contact above a first predetermined intensity threshold (e.g., a mechanical click or force detection).

In some embodiments, detection of contacts having different intensities results in the device performing different functionalities. In some embodiments, the electronic device optionally receives an indication of a third input detected on the first predefined region (e.g., predefined region 612) of touch-sensitive surface 451 that is associated with the first functionality (e.g., fast forward), wherein detecting the third input comprises detecting a second increase in the intensity of the contact (e.g., contact 601) above a second predetermined intensity threshold (e.g., multi-level click), the second predetermined intensity threshold being greater than the first predetermined intensity threshold. In response to receiving the indication of the third input, the electronic device optionally forgoes performance of the first functionality (e.g., fast forward) associated with the first predefined region (e.g., predefined region 612) on the touch-sensitive surface, and performs a second functionality associated with the first predefined region (e.g., predefined region 612) of the touch-sensitive surface, the second functionality being different than the first functionality (e.g., a double-level click optionally performs a different functionality than a single-level click).

In some embodiments, prior to performing the second functionality, the electronic device replaces the functionality information in the user interface (e.g., functionality information 620) with second functionality information (e.g., updated functionality information about the second functionality), the second functionality information including second information about the second functionality associated with the first predefined region of the touch-sensitive surface.

In some embodiments, detecting a click-and-hold-type input performs a different functionality than a click-type input. In some embodiments, detecting the second input further comprises detecting the contact (e.g., contact 601) on the touch-sensitive surface of the device for longer than a second time period after detecting the increase in the intensity of the contact above the first predetermined intensity threshold (e.g., clicking and holding for at least a threshold amount of time such as 0.1, 0.2, 0.5, or 1 seconds). In response to receiving the indication of the second input, the electronic device optionally forgoes performance of the first functionality associated with the first predefined region on the touch-sensitive surface, and performs a second functionality associated with the first predefined region of the touch-sensitive surface, the second functionality being different than the first functionality (e.g., click-and-hold initiates different functionality than only click). Similar to above, in some embodiments, prior to performing the second functionality, the electronic device replaces the functionality information in the user interface with second functionality information, the second functionality information including second information about the second functionality associated with the first predefined region of the touch-sensitive surface.

In some embodiments, the functionalities accessible from predefined regions 602, 604, 606, 608, 610, 612, 614, 616, and 618 of touch-sensitive surface 451 are based on a current context of the user interface (e.g., what kind of content is displayed in the user interface) displayed on display 450. In some embodiments, a first predefined region (e.g., predefined region 612) of the plurality of predefined regions on the touch-sensitive surface of the device is associated with a first set of functionalities, the first set of functionalities including the first functionality (e.g., the middle-right region of touch-sensitive surface is optionally associated with fast-forwarding and skipping an advertisement). Determining the functionality information for display in response to receiving the indication of the first input optionally comprises determining a current context of the user interface (e.g., what kind of content is displayed in the user interface), and selecting the first functionality from the first set of functionalities based on the current context of the user interface.

In some embodiments, selecting the first functionality from the first set of functionalities based on the current context of the user interface includes, in accordance with a determination that the current context is a first context (e.g., an advertisement displayed in the user interface, a collection of music displayed in the user interface, an application displayed in the user interface, a collection of photos displayed in the user interface), the first functionality corresponds to a first operation (e.g., skipping the advertisement, navigating to a page of the collection of music, switching to another application, navigating to a page of the collection of photos), and in accordance with a determination that the current context is a second context, different from the first context (e.g., a movie displayed in the user interface, a television channel displayed in the user interface, a content information page displayed in the user interface), the first functionality corresponds to a second operation, different from the first operation (e.g., fast-forwarding the movie, changing the channel, viewing more content information).

It should be noted that in some embodiments, the functionalities described herein are optionally accessed without first displaying the functionality information that is described—in some embodiments, the displaying of the functionality information simply provides information as to what functionalities are optionally accessible from touch-sensitive surface 451.

Figure 6D:
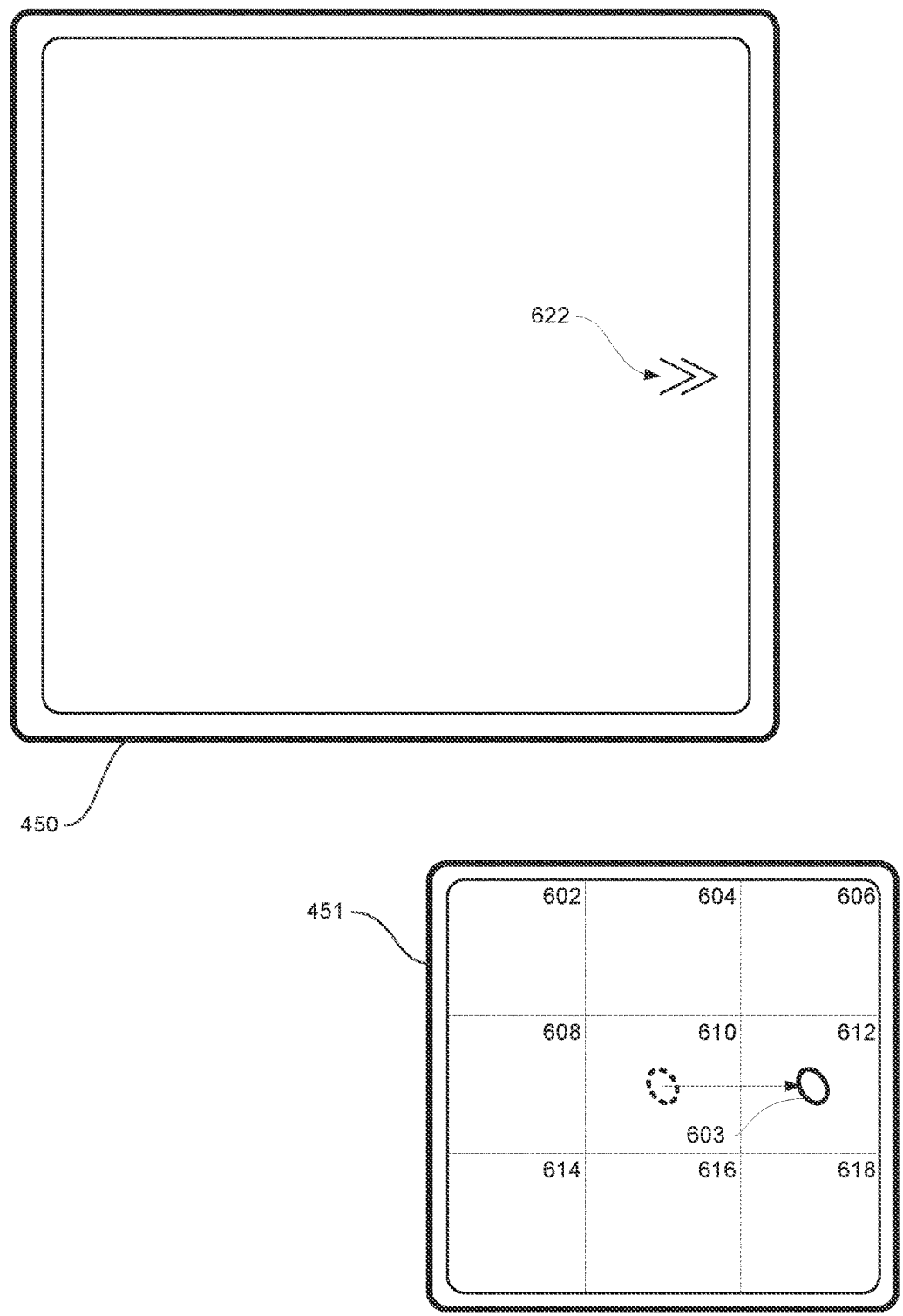

FIG. 6D illustrates exemplary functionality information displayed in a user interface on display 450. In some embodiments, functionality information 622 comprises an icon or other graphic that provides information as to the relevant functionality—as shown in FIG. 6D, in some embodiments, the icon indicates the functionality is a fast forward functionality. In some embodiments, the icon (e.g., functionality information 622) is displayed at a first location in the user interface (e.g., middle-right of the user interface), the first location corresponding to a first predefined region (e.g., predefined region 612) on the touch-sensitive surface associated with the first functionality (e.g., a first region on the touch-sensitive surface that, when selected, will cause the first functionality to be performed. For example, the middle-right region of touch-sensitive surface, e.g., predefined region 612). Thus, in some embodiments, the location of the functionality icon in the user interface maps to the location of the functionality access on touch-sensitive surface 451 of the remote. Selection of the functionality is optionally accomplished as described above. In some embodiments, functionality information 622 optionally provides some visual indication (e.g., glowing, flashing, etc.) that contact 603 is detected in a region of touch-sensitive surface 451 that corresponds to the functionality information (e.g., predefined region 612). This visual indication optionally provides feedback to a user that further selection of predefined region 612 (e.g., by clicking in predefined region 612) will perform the functionality associated with predefined region 612 and functionality information 622.

Figure 6E:
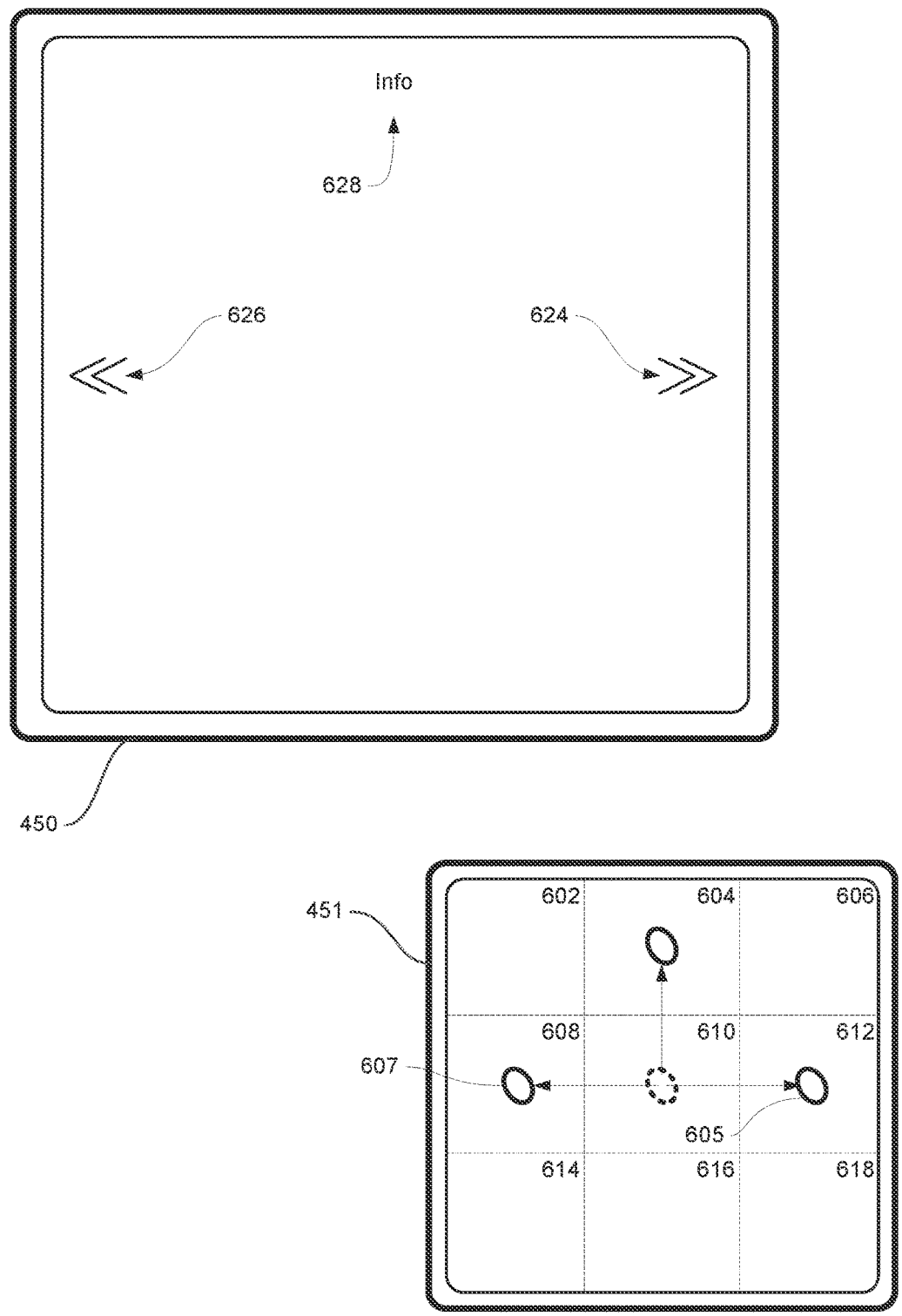

FIG. 6E illustrates exemplary functionality information for two functionalities displayed in a user interface on display 450. In some embodiments, the functionality information displayed on display 450 includes information about two or more functionalities accessible from touch-sensitive surface 451 (e.g., functionality information 626, 624, and 628, indicating the accessibility of the rewind functionality from predefined region 608, the fast forward functionality from predefined region 612, and the information functionality from predefined region 604, respectively). Further, as before, each piece of functionality information is optionally displayed at a location in the user interface that corresponds to the associated predefined region on touch-sensitive surface 451. The relative positioning of functionality information 626 with respect to functionality information 624 in the user interface optionally corresponds to the relative positioning of predefined region 608 with respect to predefined region 612. Selection of the respective functionalities is optionally accomplished as described above and as illustrated in FIG. 6E.

Figure 6F:
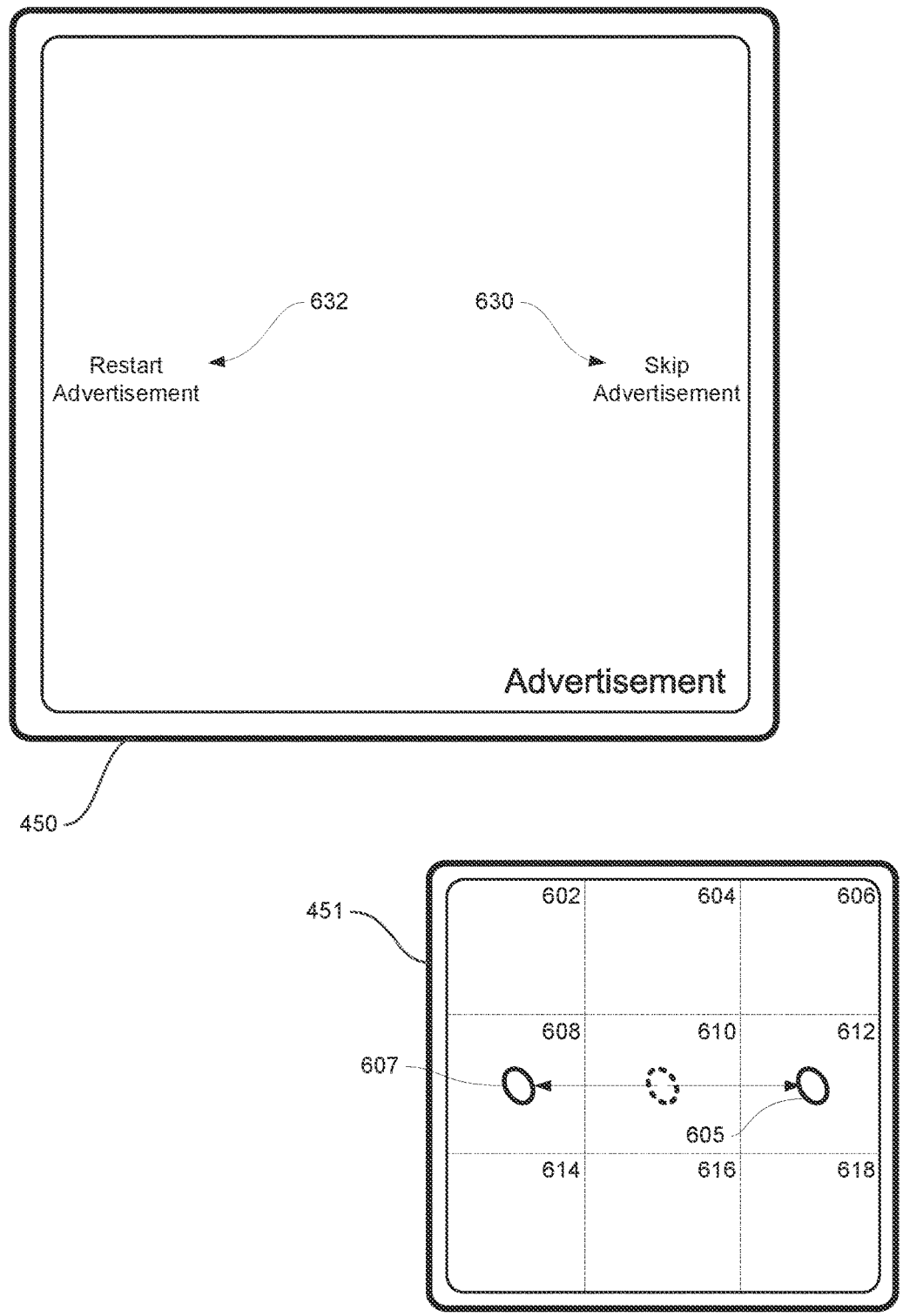
Figure 6G:
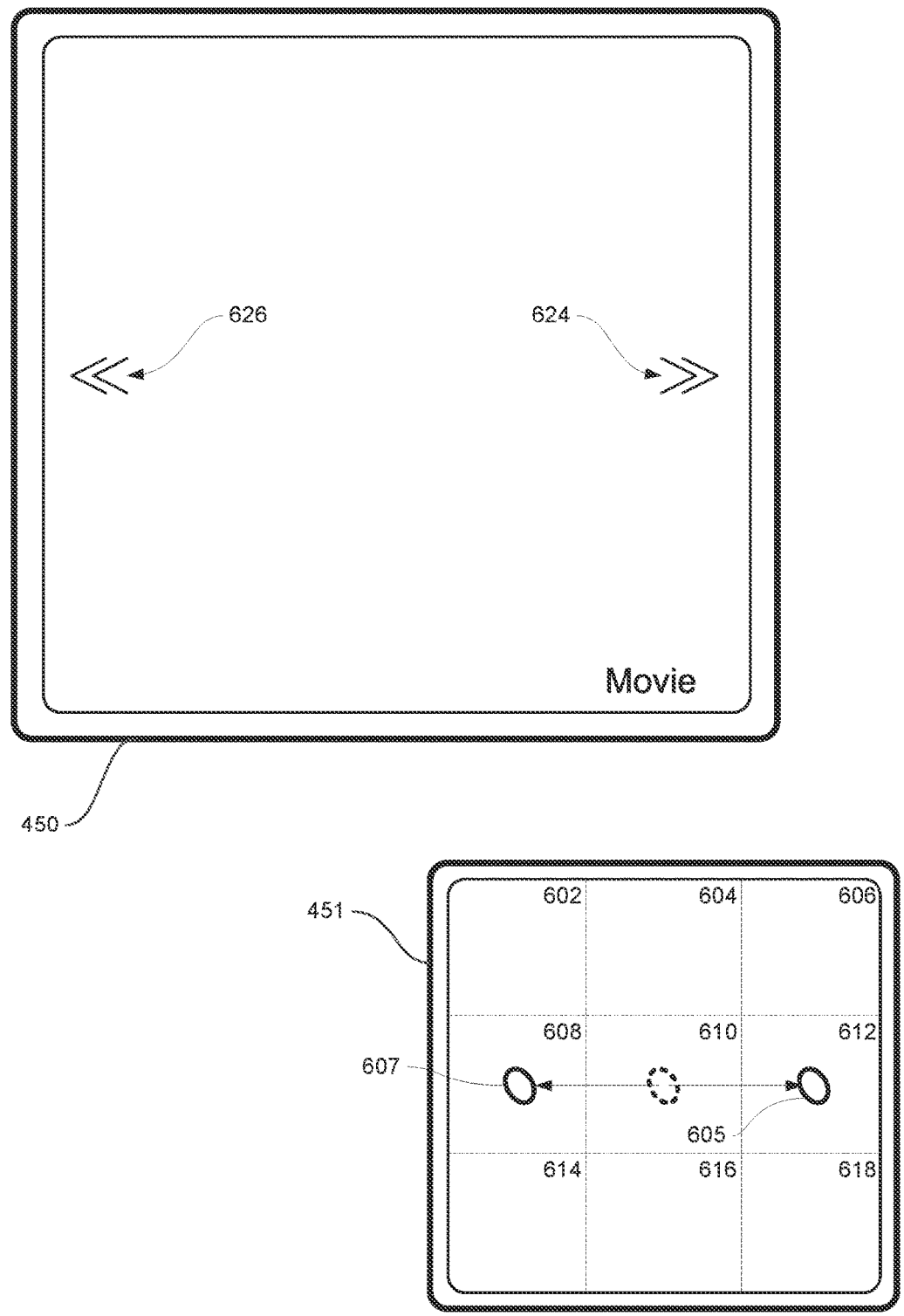
Figure 7A:
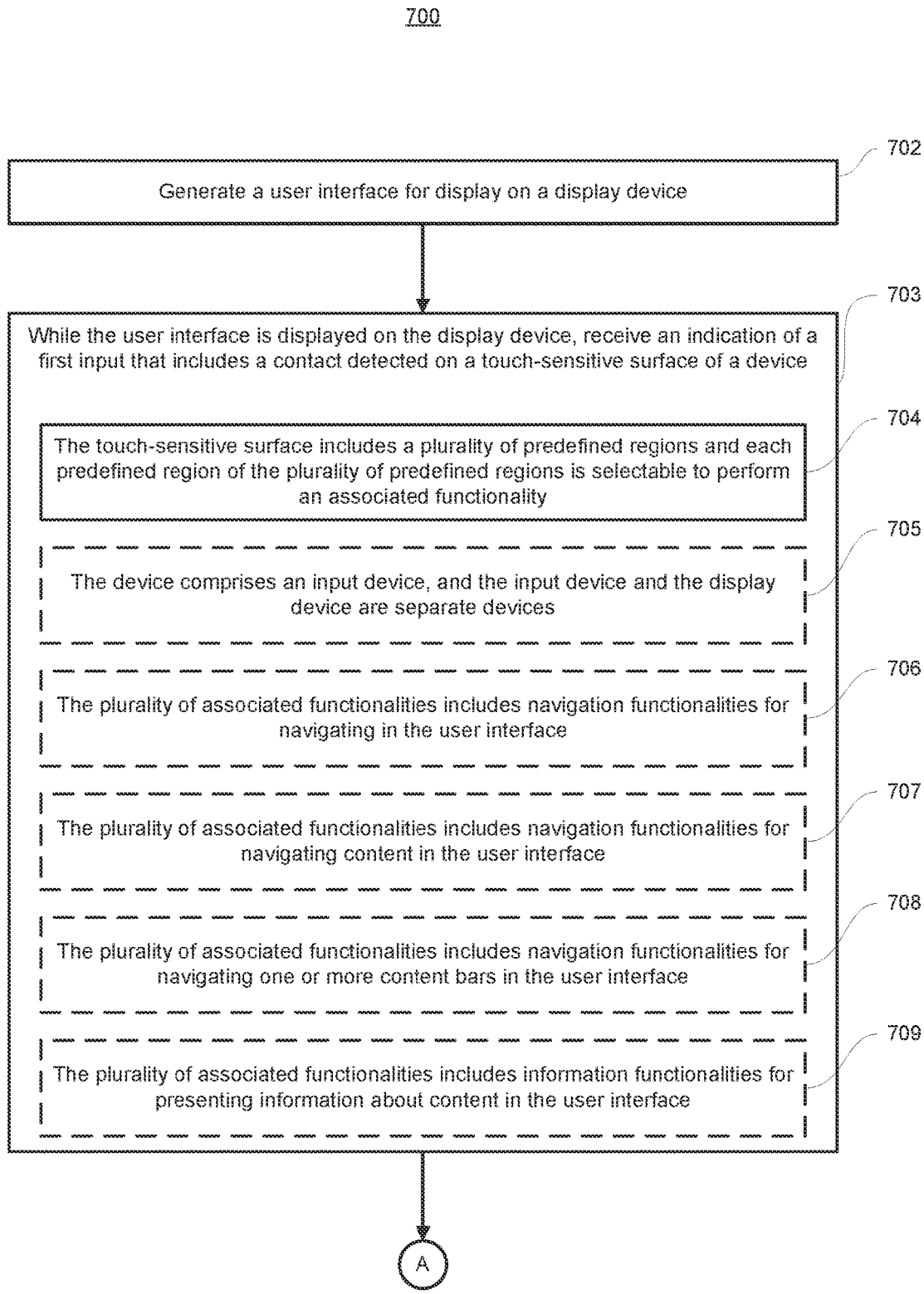
FIGS. 7A-7G are flow diagrams illustrating a method of displaying functionality information in accordance with some embodiments.
Figure 7B:
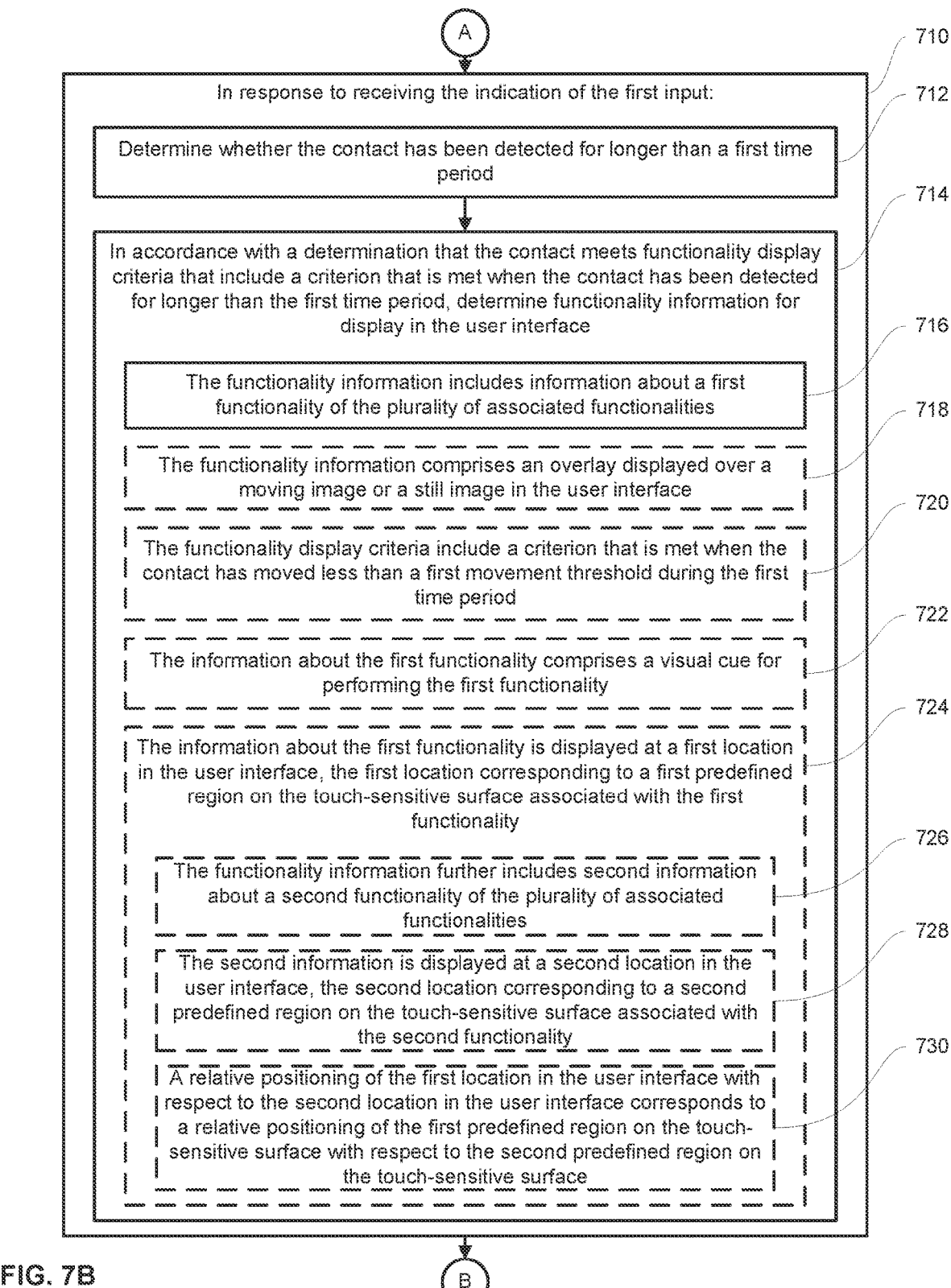
Figure 7C:
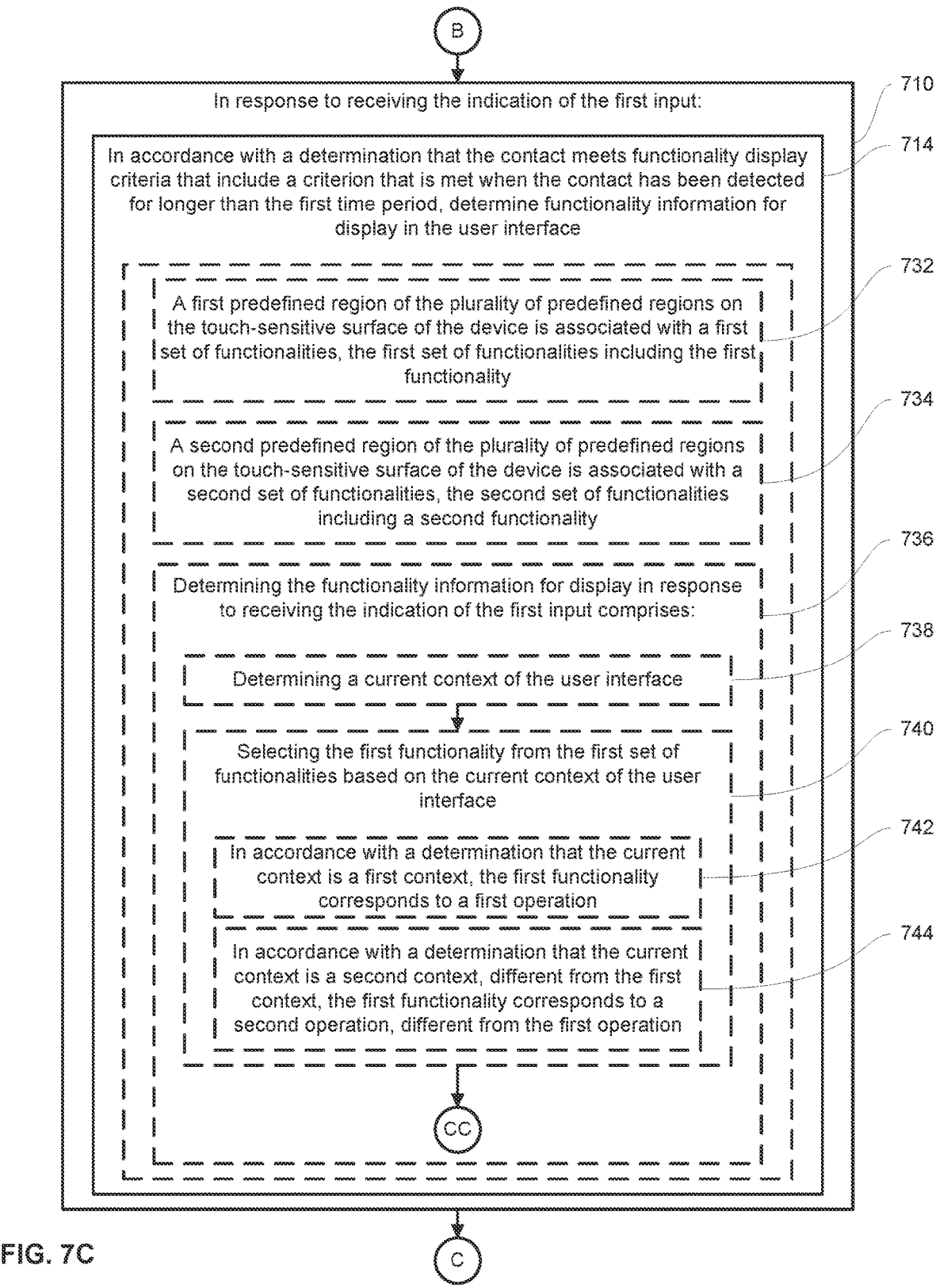
Figure 7D:
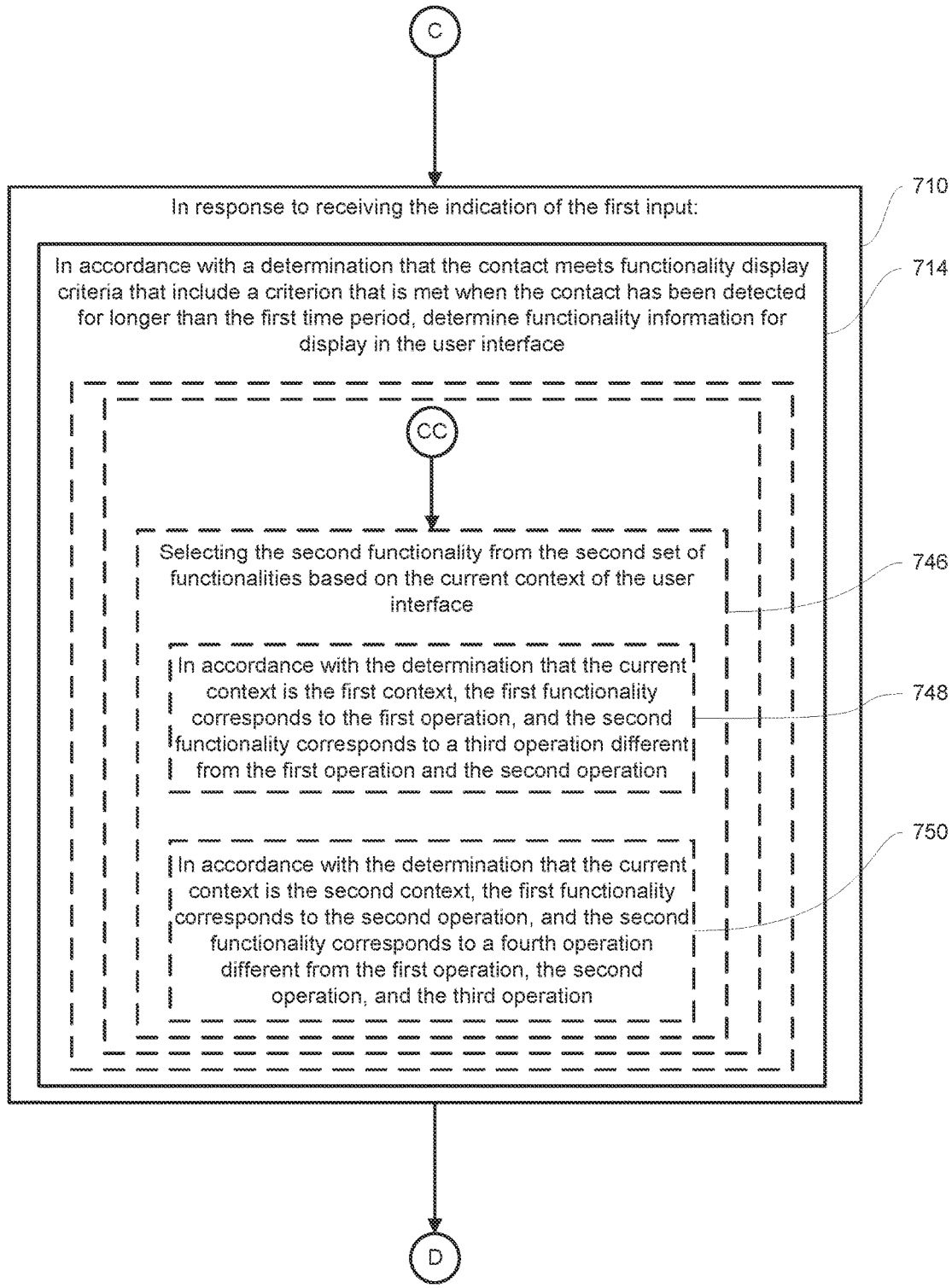
Figure 7E:
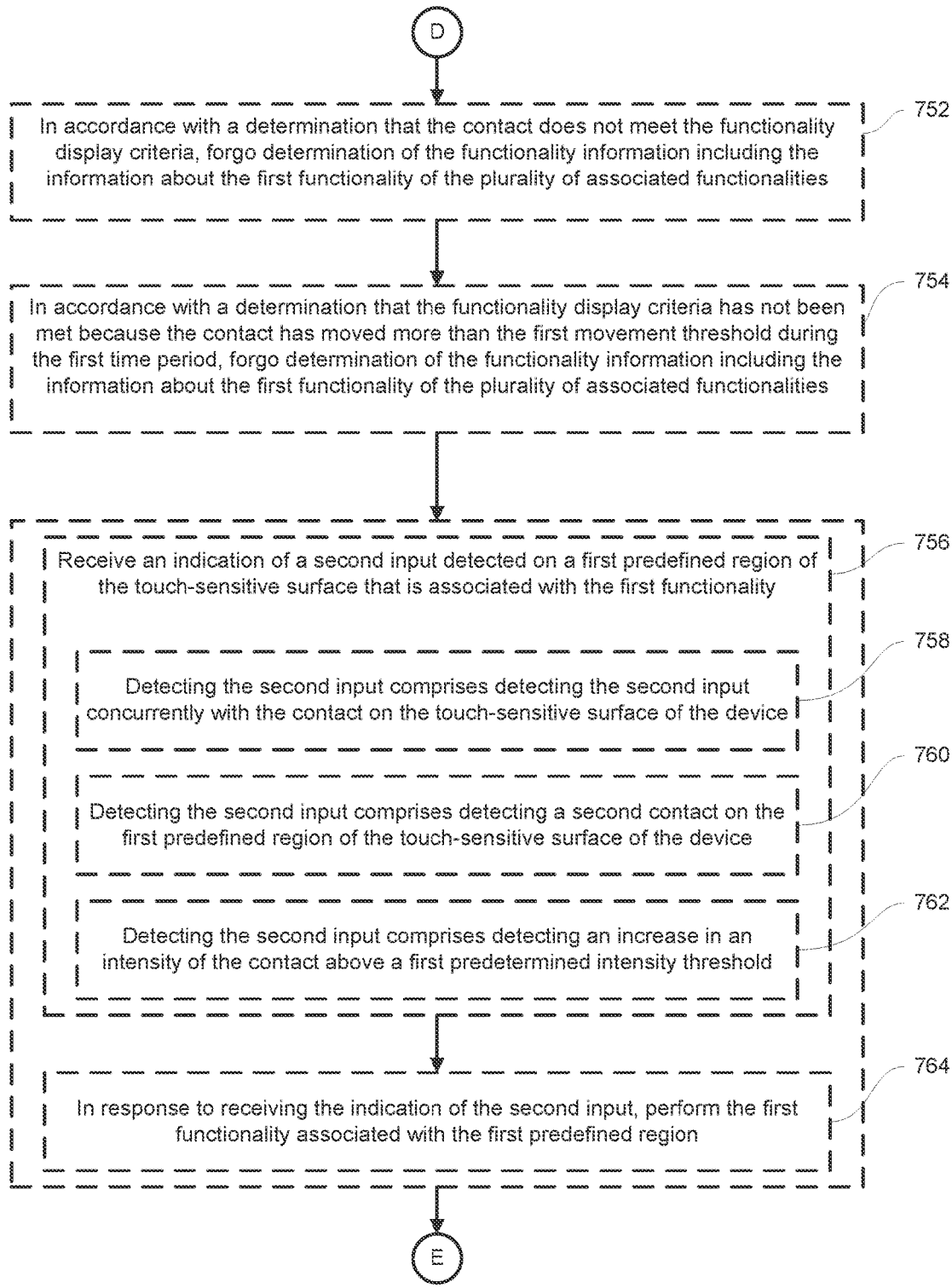
Figure 7F:
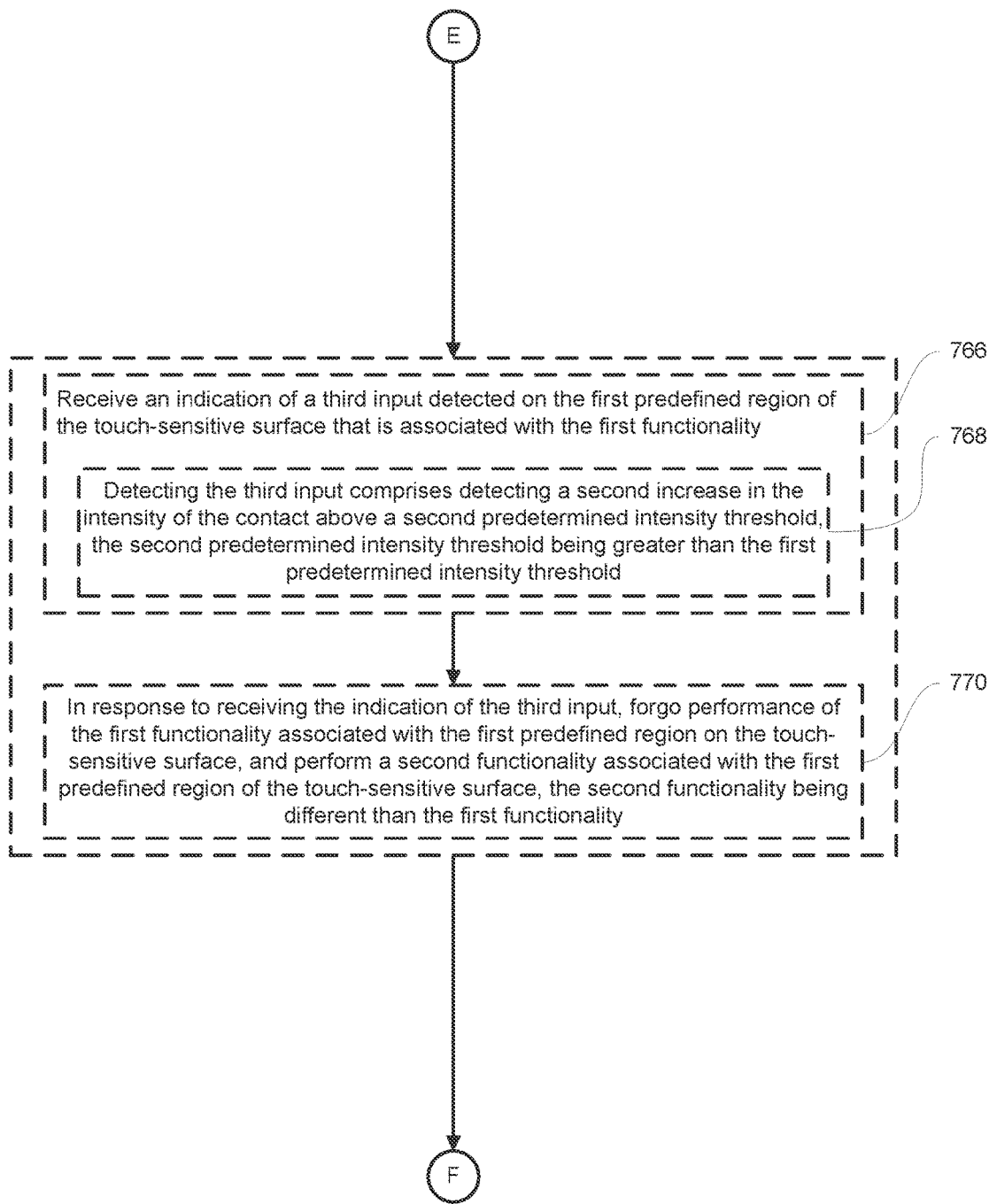
Figure 7G:
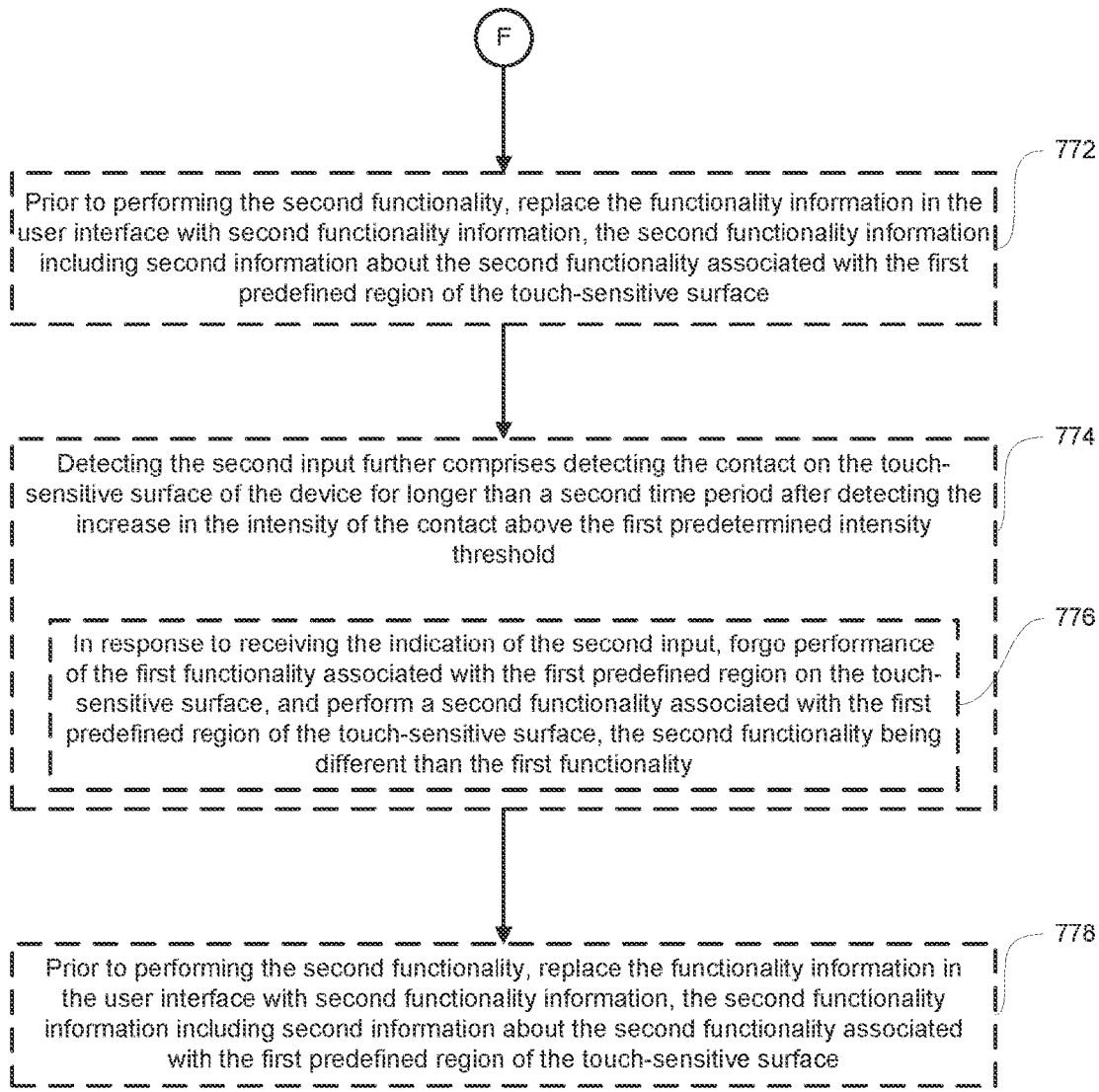

In some embodiments, as above, the functionalities accessible from the predefined regions are based on context, as illustrated in FIGS. 6F-6G. In some embodiments, a second predefined region (e.g., region 608) of the plurality of predefined regions on the touch-sensitive surface of the device is associated with a second set of functionalities, the second set of functionalities including a second functionality (e.g., the left-middle region of the touch-sensitive surface is associated with a first functionality, and the right-middle region of the touch-sensitive surface is associated with a second functionality). Determining the functionality information for display in response to receiving the indication of the first input (e.g., a resting finger) further comprises selecting the second functionality from the second set of functionalities based on the current context of the user interface (e.g., what kind of content is displayed in the user interface). In accordance with the determination that the current context is the first context (e.g., an advertisement displayed in the user interface, illustrated in FIG. 6F), the first functionality (e.g., functionality 630 in FIG. 6F) corresponds to the first operation (e.g., skipping the advertisement), and the second functionality (e.g., functionality 632 in FIG. 6F) corresponds to a third operation (e.g., restarting the advertisement) different from the first operation and the second operation (e.g., the left-middle region of the touch-sensitive surface restarts the advertisement, and the right-middle region of the touch-sensitive surface skips the advertisement). In accordance with the determination that the current context is the second context (e.g., a movie displayed in the user interface, illustrated in FIG. 6G), the first functionality (e.g., functionality 624 in FIG. 6G) corresponds to the second operation (e.g., fast-forwarding the movie), and the second functionality (e.g., functionality 626 in FIG. 6G) corresponds to a fourth operation (e.g., rewinding the movie) different from the first operation, the second operation, and the third operation (e.g., the left-middle region of the touch-sensitive surface rewinds the movie, and the right-middle region of the touch-sensitive surface fast-forwards the movie).

As described above, any number of functionalities are optionally accessible from the touch-sensitive surface of the disclosure. In some embodiments, the plurality of associated functionalities accessible form the touch-sensitive surface includes navigation functionalities for navigating in the user interface (e.g., moving a selection-indicator up, down, left, and right by tapping on the top, bottom, left, and right sides, respectively, of the touch-sensitive surface of the device; selecting an object in the user interface by clicking on the touch-sensitive surface of the device; presenting a contextual navigation menu by clicking and holding the touch-sensitive surface of the device).

In some embodiments, the plurality of associated functionalities accessible form the touch-sensitive surface includes navigation functionalities for navigating content in the user interface (e.g., moving left/right or previous/next through images by tapping and/or clicking on the left and right sides, respectively, of the touch-sensitive surface of the device; moving to the previous/next image by swiping to the right and left, respectively, on the touch-sensitive surface of the device; skipping backward/forward through content (e.g., video) by clicking in the upper left and upper right regions, respectively, of the touch-sensitive surface of the device; jumping backward/forward through content (e.g., video) by clicking and holding in the upper left and upper right regions, respectively, of the touch-sensitive surface of the device; rewinding/fast forwarding through content (e.g., video) by clicking on the left and right sides, respectively, of the touch-sensitive surface of the device; rewinding/fast forwarding through content (e.g., music) by clicking and holding on the left and right sides, respectively, of the touch-sensitive surface of the device; changing to a previous/next track in content (e.g., music) by clicking on the left and right sides, respectively, of the touch-sensitive surface of the device; changing to a previous/next channel by swiping in, towards the center, from the left and right edges, respectively, of the touch-sensitive surface of the device; skipping to the last channel by swiping in, towards the center, from the left edge of the touch-sensitive surface of the device; presenting one or more overlay applications by swiping in, towards the center, from the right or top edges of the touch-sensitive surface of the device; presenting a content guide (e.g., electronic program guide) by clicking in an upper left region of the touch-sensitive surface of the device; presenting content in a full screen mode by clicking in an upper right region of the touch-sensitive surface of the device; presenting a filmstrip (e.g., scrubber bar) of images from content (e.g., video) by clicking on the touch-sensitive surface of the device; presenting, in a filmstrip (e.g., scrubber bar), images corresponding to chapters/keyframes in content (e.g., video) by swiping up and down, respectively, on the touch-sensitive surface of the device; playing content from a current position in a filmstrip (e.g., scrubber bar) by clicking on the touch-sensitive surface of the device; presenting a photostrip of images from a collection of images by clicking on the touch-sensitive surface of the device; presenting history of content (e.g., music) played and/or upcoming content (e.g., music) to be played by clicking on the touch-sensitive surface of the device).

In some embodiments, the plurality of associated functionalities accessible form the touch-sensitive surface includes navigation functionalities for navigating one or more content bars (e.g., app or channel bar) in the user interface (e.g., moving to the next/previous content bar by tapping on the top and bottom sides, respectively, of the touch-sensitive surface of the device; moving to the left/right in a current content bar by tapping on the left and right sides, respectively, of the touch-sensitive surface of the device; moving to the next/previous content bar by swiping down and up, respectively, on the touch-sensitive surface of the device; selecting an object (e.g., an app or channel) in the current content bar by clicking on the touch-sensitive surface of the device).

In some embodiments, the plurality of associated functionalities accessible form the touch-sensitive surface includes information functionalities for presenting information about content in the user interface (e.g., presenting information about content by clicking on the top side of the touch-sensitive surface of the device; presenting information about content by swiping in, towards the center, from the left edge of the touch-sensitive surface of the device).

The following table lists some functionalities, various combinations of one or more of which are optionally accessible from the touch-sensitive surface (TSS) of the disclosure:

| | | Location on TSS | |
| --- | --- | --- | --- |
| Input | Anywhere | Top/Bottom/Left/Right | Top-Left/Top-Right |
| Tap | Display functionality information | Navigate UI in accordance with location of tap | |
| Click | Select | Top: Display information about content Right/Left: Navigate content (e.g., FF, Rewind, Skip, etc.) in accordance with location of click | Alternative content navigation in accordance with location of click |
| Click-and-Hold | Display contextual menu | Right/Left: Alternative content navigation in accordance with location of click-and-hold | Alternative content navigation in accordance with location of click-and-hold |
| Swipe | Browse through images/content bar in accordance | Left-to-center: Skip to previous/last channel, or display |

-continued

| | Location on TSS | |
|---|---|---|
| Input | Anywhere | Top/Bottom/Left/Right Top-Left/Top-Right |
| | with direction of swipe | information about content Right-to-center: Skip to next channel, or display overlay applications Top-to-center: Display overlay applications |

FIGS. 7A-7G are flow diagrams illustrating a method 700 of displaying functionality information in accordance with some embodiments. The method 700 is optionally performed at an electronic device such as device 500 as described above with reference to FIG. 5, including a set top box or other user interface generating device that is in communication with a remote control and a display device. Some operations in method 700 are, optionally, combined and/or the order of some operations is, optionally, changed.

As described below, the method 700 provides ways in which a device optionally provides functionality information to a user. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 500 in FIG. 5) with one or more processors and memory generates (702) a user interface for display on a display device (e.g., a television or other display device, such as display 450 in FIG. 6A).

In some embodiments, while the user interface is displayed on the display device, the device receives (703) an indication of a first input that includes a contact (e.g., a finger contact or stylus contact) detected on a touch-sensitive surface of a device (e.g., a touch-sensitive surface of a remote control or a portable multifunction device with a touchscreen display, such as contact 601 detected on touch-sensitive surface 451 in FIG. 6A). In some embodiments, the touch-sensitive surface includes a plurality of predefined regions (e.g., regions 602, 604, 606, 608, 610, 612, 614, 616, and 618 on touch-sensitive surface 451 in FIG. 6A) and each predefined region of the plurality of predefined regions is selectable to perform an associated functionality (704) (e.g., each region is selectable to perform a functionality, including reverse skipping, forward skipping, rewinding, fast-forwarding, scrubbing and displaying information associated with a content item). In some embodiments, the touch-sensitive surface includes fewer than nine predefined regions; for example, in some embodiments, the touch-sensitive surface includes four predefined regions (top-right, bottom-right, bottom-left, and top-left) that are optionally larger than the nine predefined regions, and in some embodiments, the touch-sensitive surface includes five predefined regions (top-right, bottom-right, bottom-left, top-left and center) that are optionally larger than the nine predefined regions, but optionally smaller than the four predefined regions. In some embodiments, the number of predefined regions on the touch-sensitive surface is based on the number of functionalities that need to be accessible from the touch-sensitive surface (e.g., when more functionalities need to be accessible from the touch-sensitive surface, the touch-sensitive surface optionally includes more predefined regions). In some embodiments, the device comprises an input device, and the input device and the display device are separate devices (705) (e.g., display 450 and touch-sensitive surface 451 in FIG. 6A are included in separate devices).

In some embodiments, the plurality of associated functionalities includes navigation functionalities for navigating in the user interface (706). In some embodiments, the plurality of associated functionalities includes navigation functionalities for navigating content in the user interface (707). In some embodiments, the plurality of associated functionalities includes navigation functionalities for navigating one or more content bars in the user interface (708). In some embodiments, the plurality of associated functionalities includes information functionalities for presenting information about content in the user interface (709).

In some embodiments, in response to receiving the indication of the first input (710) (e.g., contact 601 in FIG. 6A), the device determines (712) whether the contact has been detected for longer than a first time period (e.g., determines whether a resting finger has been detected on the touch-sensitive surface of the remote for at least a threshold amount of time such as 0.1, 0.2, 0.5, or 1 seconds—for example, whether contact 601 in FIG. 6A has been detected for longer than the threshold amount of time). In some embodiments, in accordance with a determination that the contact meets functionality display criteria (e.g., one or more criterion) that include a criterion that is met when the contact has been detected for longer than the first time period, the device determines (714) functionality information (e.g., determines a respective functionality for which functionality information is to be displayed, and then selects pre-generated functionality information that corresponds to the respective functionality, or generates the functionality information that is to be displayed on the display) for display in the user interface (e.g., functionality information 620 in FIG. 6A, functionality information 622 in FIG. 6D, and functionality information 624 and 626 in FIG. 6E). In some embodiments, the functionality information includes information about a first functionality of the plurality of associated functionalities (716) (e.g., resting a finger anywhere on the touch-sensitive surface brings up information about one or more functionalities accessible from the touch-sensitive surface). For example, the functionality information optionally includes one or more icons (e.g., icons 624 and 626 in FIG. 6E) that are displayed in the user interface that indicate functions accessible from corresponding regions of the touch-sensitive surface. In some embodiments, the functionality information comprises an overlay displayed over a moving image or a still image in the user interface (718) (e.g., functionality information 622 in FIG. 6D is optionally overlaid on a moving or still image displayed on display 450). In some embodiments, the functionality display criteria include a criterion that is met when the contact has moved less than a first movement threshold during the first time period (720) (e.g., in order to display the functionality information, the contact (e.g., contact 601 in FIG. 6A) optionally must be a substantially stationary contact). In some embodiments, the information about the first functionality comprises a visual cue for performing the first functionality (722) (e.g., a visual display about the functionality to be performed, how to perform the functionality from the remote, etc., such as functionality information 620 in FIG. 6C and functionality information 624 and 626 in FIG. 6E).

In some embodiments, the information about the first functionality is displayed at a first location in the user interface, the first location corresponding to a first predefined region on the touch-sensitive surface associated with the first functionality (724) (e.g., a first predefined region on the touch-sensitive surface that, when activated, will cause the first functionality to be performed). Thus, in some embodiments, the location of the functionality icon on the user interface maps to the location of functionality access on the touch-sensitive surface of the remote. For example, the location of functionality information 622 on display 450 optionally corresponds to the location of region 612 on touch-sensitive surface 451 in FIG. 6D. In some embodiments, the functionality information further includes second information about a second functionality of the plurality of associated functionalities (726). In some embodiments, the second information is displayed at a second location in the user interface, the second location corresponding to a second predefined region on the touch-sensitive surface associated with the second functionality (728) (e.g., a second region on the touch-sensitive surface that, when activated, will cause the second functionality to be performed). In some embodiments, a relative positioning of the first location in the user interface with respect to the second location in the user interface corresponds to a relative positioning of the first predefined region on the touch-sensitive surface with respect to the second predefined region on the touch-sensitive surface (730), as illustrated in FIG. 6E with functionality information 624 and 626 and corresponding regions 612 and 608, respectively.

In some embodiments, a first predefined region of the plurality of predefined regions on the touch-sensitive surface of the device is associated with a first set of functionalities, the first set of functionalities including the first functionality (732) (e.g., the right region of the touch-sensitive surface (e.g., region 612 in FIG. 6A) is optionally associated with fast-forwarding and skipping an advertisement). In some embodiments, a second predefined region of the plurality of predefined regions on the touch-sensitive surface of the device is associated with a second set of functionalities, the second set of functionalities including a second functionality (734) (e.g., the left region of the touch-sensitive surface (e.g., region 608 in FIG. 6A) is associated with a first set of functionalities, and the right region of the touch-sensitive surface is associated with a second set of functionalities). In some embodiments, determining the functionality information for display in response to receiving the indication of the first input comprises (736) determining (738) a current context of the user interface (e.g., determining what kind of content is displayed in the user interface). In some embodiments, determining the functionality information for display in response to receiving the indication of the first input comprises (736) selecting (740) the first functionality from the first set of functionalities based on the current context of the user interface. In some embodiments, in accordance with a determination that the current context is a first context (e.g., an advertisement displayed in the user interface, a collection of music displayed in the user interface, an application displayed in the user interface, a collection of photos displayed in the user interface, etc.), the first functionality corresponds to a first operation (742) (e.g., skipping the advertisement, navigating to a page of the collection of music, switching to another application, navigating to a page of the collection of photos, etc.). In some embodiments, in accordance with a determination that the current context is a second context, different from the first context (e.g., a movie displayed in the user interface, a television channel displayed in the user interface, a content information page displayed in the user interface, etc.), the first functionality corresponds to a second operation, different from the first operation (744) (e.g., fast-forwarding the movie, changing the channel, viewing more content information, etc.). For example, selection of region 612 in FIG. 6A optionally performs a first operation when the current context is a first context, and performs a second operation when the current context is a second context.

In some embodiments, determining the functionality information for display in response to receiving the indication of the first input comprises (736) selecting (746) the second functionality from the second set of functionalities based on the current context of the user interface. In some embodiments, in accordance with the determination that the current context is the first context (e.g., an advertisement displayed in the user interface), the first functionality corresponds to the first operation (e.g., skipping the advertisement), and the second functionality corresponds to a third operation (e.g., restarting the advertisement) different from the first operation and the second operation (748) (e.g., the left region of the touch-sensitive surface restarts the advertisement and the right region of the touch-sensitive surface skips the advertisement). In some embodiments, in accordance with the determination that the current context is the second context (e.g., a movie displayed in the user interface), the first functionality corresponds to the second operation (e.g., fast-forwarding the movie), and the second functionality corresponds to a fourth operation (e.g., rewinding the movie) different from the first operation, the second operation, and the third operation (750) (e.g., the left region of the touch-sensitive surface rewinds the movie and the right region of the touch-sensitive surface fast-forwards the movie). Thus, the operations performed by the regions on the touch-sensitive surface are optionally based on the current context of the user interface.

In some embodiments, in accordance with a determination that the contact does not meet the functionality display criteria (e.g., because the contact has not been detected for longer than the first time period), the device forgoes (752) determination of the functionality information including the information about the first functionality of the plurality of associated functionalities (e.g., icons, such as icons 624 and 626 in FIG. 6E, indicating the functionalities of the different regions of the touch-sensitive surface are optionally not displayed if the contact ends before the first time period has been reached).

In some embodiments, in accordance with a determination that the functionality display criteria has not been met because the contact has moved more than the first movement threshold during the first time period, the device forgoes (754) determination of the functionality information including the information about the first functionality of the plurality of associated functionalities.

In some embodiments, the device receives (756) an indication of a second input detected on a first predefined region of the touch-sensitive surface that is associated with the first functionality, as illustrated by contacts 601 and 603 in FIGS. 6C and 6D. In some embodiments, detecting the second input comprises detecting the second input concurrently with the contact on the touch-sensitive surface of the device (758) (e.g., no liftoff of the contact need be detected before detection of a click in the respective predefined region of the touch-sensitive surface). In some embodiments, detecting the second input comprises detecting a second contact (e.g., one or more of a tap, a click and a resting touch) on the first predefined region of the touch-sensitive surface of the device (760). In some embodiments, detecting the second input comprises detecting an increase in an intensity of the contact above a first predetermined intensity threshold (762) (e.g., mechanical click or force detection).

In some embodiments, in response to receiving the indication of the second input, the device performs (764) the first functionality associated with the first predefined region. For example, in response to receiving the indication of contact 601 in region 612 in FIG. 6C, the device optionally fast forwards content in the user interface.

In some embodiments, the device receives (766) an indication of a third input detected on the first predefined region of the touch-sensitive surface that is associated with the first functionality. In some embodiments, detecting the third input comprises detecting a second increase in the intensity of the contact above a second predetermined intensity threshold (e.g., multi-level click), the second predetermined intensity threshold being greater than the first predetermined intensity threshold (768). In some embodiments, in response to receiving the indication of the third input, the device forgoes (770) performance of the first functionality associated with the first predefined region on the touch-sensitive surface, and performs a second functionality associated with the first predefined region of the touch-sensitive surface, the second functionality being different than the first functionality (e.g., a double-level click performs a different functionality than single-level click). For example, while a single-level click in region 612 in FIG. 6C optionally performs a fast forward operation, a double-level click in region 612 optionally performs a different operation (e.g., 30s forward skip).

In some embodiments, prior to performing the second functionality, the device replaces (772) the functionality information in the user interface with second functionality information, the second functionality information including second information about the second functionality associated with the first predefined region of the touch-sensitive surface. For example, the device optionally replaces functionality information 620 in FIG. 6C with functionality information about the different functionality performed in response to the double-level click.

In some embodiments, detecting the second input further comprises detecting the contact on the touch-sensitive surface of the device for longer than a second time period after detecting the increase in the intensity of the contact above the first predetermined intensity threshold (774) (e.g., detecting a click and hold for at least a threshold amount of time such as 0.1, 0.2, 0.5, or 1 seconds). In some embodiments, in response to receiving the indication of the second input, the device forgoes (776) performance of the first functionality associated with the first predefined region on the touch-sensitive surface, and performs a second functionality associated with the first predefined region of the touch-sensitive surface, the second functionality being different than the first functionality (e.g., a click and hold initiates a different functionality than only a click). For example, while a single-level click in region 612 in FIG. 6C optionally performs a fast forward operation, a click and hold in region 612 optionally performs a different operation (e.g., skipping to the next chapter in content).

In some embodiments, prior to performing the second functionality, the device replaces (778) the functionality information in the user interface with second functionality information, the second functionality information including second information about the second functionality associated with the first predefined region of the touch-sensitive surface. For example, the device optionally replaces functionality information 620 in FIG. 6C with functionality information about the different functionality performed in response to the click and hold.

It should be understood that the particular order in which the operations in FIGS. 7A-7G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300 and 1500) are also applicable in an analogous manner to method 700 described above with respect to FIGS. 7A-7G. For example, the user interfaces, display devices, touch-sensitive surfaces and contacts described above with reference to method 700 optionally have one or more of the characteristics of the user interfaces, display devices, touch-sensitive surfaces and contacts described herein with reference to other methods described herein (e.g., methods 900, 1100, 1300 and 1500). For brevity, these details are not repeated here.

The operations in the information processing methods described above are, optionally, implemented by running one or more functional modules in an information processing apparatus such as general purpose processors (e.g., as described above with respect to FIGS. 1A, 3 and 5) or application specific chips.

The operations described above with reference to FIGS. 7A-7G are, optionally, implemented by components depicted in FIGS. 1A-1B. For example, generation operation 702, receiving operation 703, and determination operations 712 and 714 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Content Navigation Bar

Providing a content navigation bar by which a user can easily and efficiently navigate content displayed in a user interface provided by a device can enhance the user's interaction with the content and the device. The embodiments described below provide ways that a device optionally presents such a content navigation bar in a user interface. Enhancing interactions with a device reduces the amount of time needed by a user to perform operations, and thus reduces the power usage of the device and increases battery life for battery-powered devices.

FIGS. 8A-8G illustrate exemplary ways in which a content navigation bar is presented in a user interface in accordance with some embodiments of the disclosure. The embodiments in these figures are used to illustrate the processes described below, including the processes described with reference to FIGS. 9A-9G.

Figure 8A:
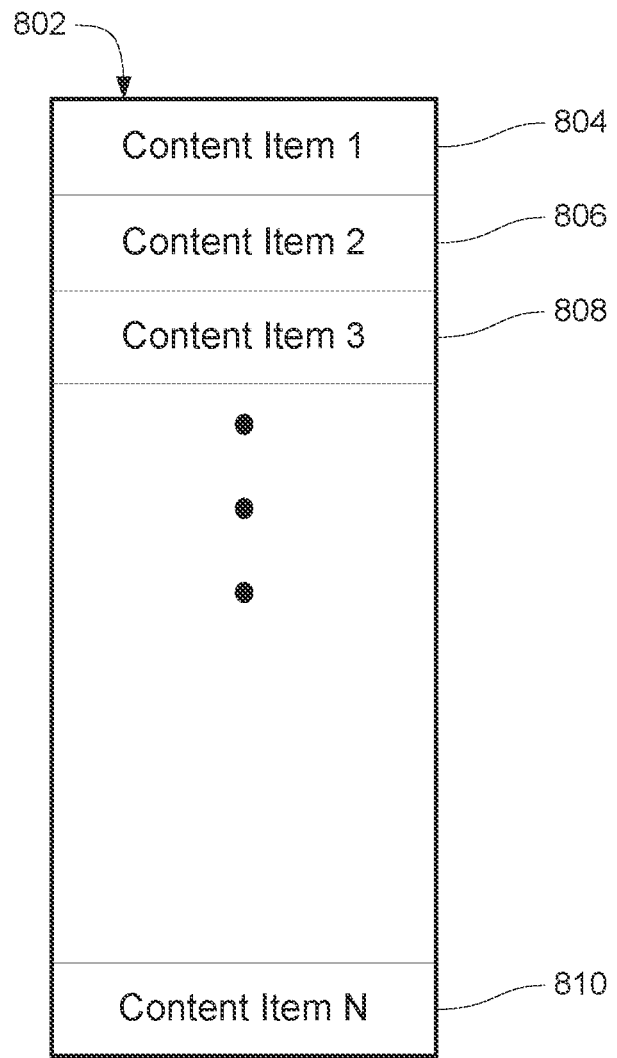
FIGS. 8A-8G illustrate exemplary ways in which a content navigation bar is presented in a user interface in accordance with some embodiments of the disclosure.

FIG. 8A illustrates an exemplary sequence of content items. The content items in sequence 802 are optionally any content items, such as movies, television shows, and/or applications. In some embodiments, sequence 802 includes entries representing content items 1 through N (e.g., entries 804, 806, 808, and 810). Sequence 802 optionally provides information about the ordering of the content items represented in it. For example, the fact that the entry for content item 2 806 comes before the entry for content item 3 808 optionally indicates that content item 2 is before content item 3 in the relevant sequence or ordering. Additionally or alternatively to the actual ordering of entries 804, 806, 808, and 810 in sequence 802, the entries themselves optionally contain information about the relative ordering of their corresponding content items in the relevant sequence or ordering.

The sequence or ordering of content items represented by sequence 802 optionally represents content item ordering in many contexts. For example, if the content items of interest are episodes of a television series, sequence 802 optionally provides the correct ordering of the episodes based on the content of the episodes (e.g., the first episode, the second episode, etc.). If the content items of interest are television broadcasts on a specific channel, for example, sequence 802 optionally provides the correct ordering of the television broadcasts based on the time that the broadcasts were aired (e.g., the 7:00 pm broadcast, followed by the 7:30 broadcast, followed by the 8:00 pm broadcast, etc.). Sequence 802 optionally provides an ordering of content items in any context in which ordering of content items is optionally of interest.

To facilitate such content type-based sequence determinations, an electronic device (e.g., device 500 in FIG. 5) optionally determines a content type (e.g., movie, television show, etc.) of a content item of interest (the "respective content item"). In some embodiments, in accordance with a determination that the content type of the respective content item is a first content type, the electronic device identifies a first sequence of content items that includes the respective content item, wherein a first content item immediately precedes the respective content item in the sequence of content items, and a second content item immediately follows the respective content item in the sequence of content items (e.g., if the content type of the respective content item is a television series, the respective content item is optionally an episode of the television series, the first content item is optionally an immediately previous episode in the television series, and the second content item is optionally the immediately next episode in the television series). In accordance with a determination that the content type of the respective content item is a second content type, the electronic device optionally identifies a second sequence of content items that includes the respective content item, the second sequence of content items being different than the first sequence of content items, wherein a third content item is adjacent to the respective content item in the second sequence of content items, the third content item being different than the first content item and the second content item (e.g., if the content type of the respective content item is a television broadcast, the respective content item is optionally a television program broadcast during a time slot, the first content item is optionally a television program broadcast during an immediately previous time slot, and the second content item is optionally a television program broadcast during an immediately next time slot).

Figure 8B:
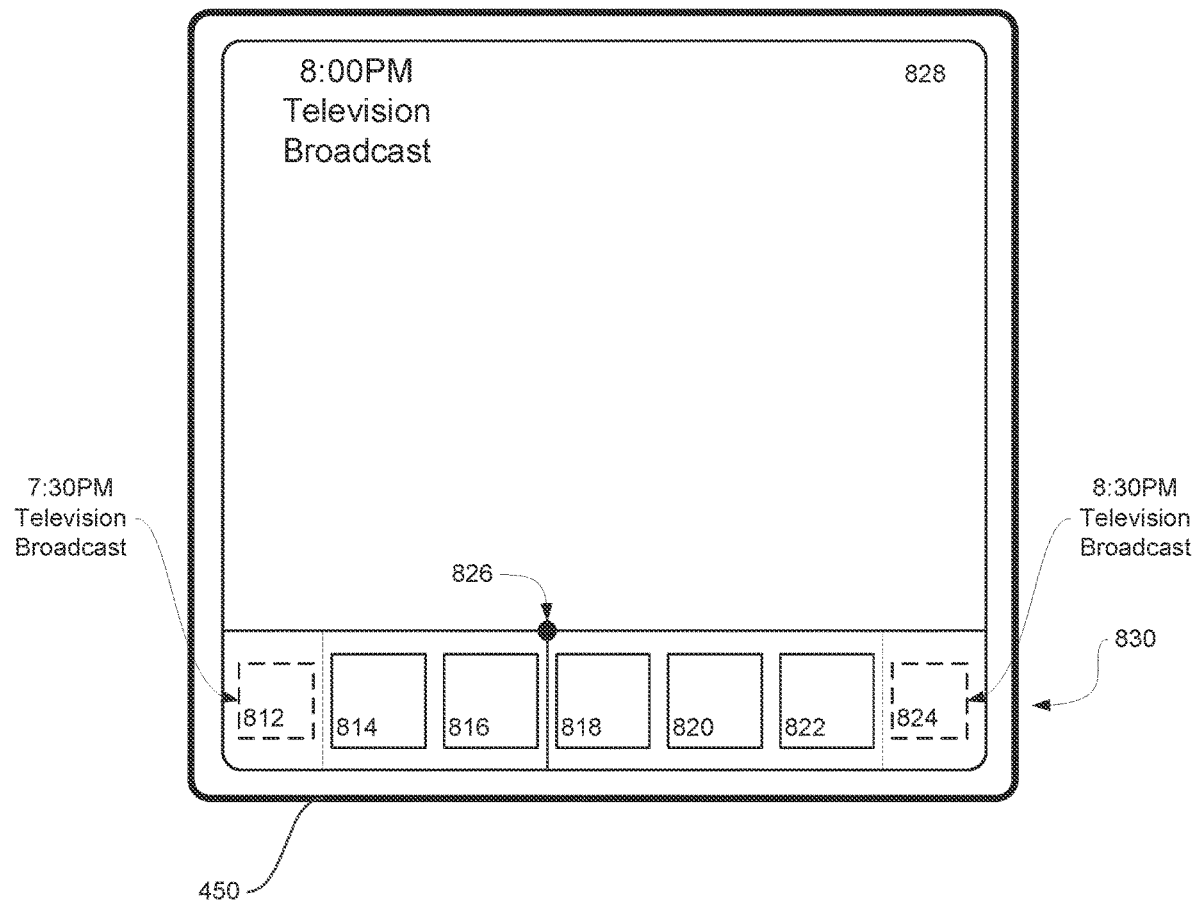

FIG. 8B illustrates an exemplary user interface including a navigation bar. Display 450 optionally displays a user interface that includes region 828 and navigation bar 830. Region 828 optionally displays a representation of a current position in a respective content item (e.g., a large version of content being played in the user interface). The respective content item is optionally a currently selected content item (e.g., a content item selected for presentation to the user on display 450) from a sequence of content items that includes a plurality of content items (e.g., movies, television shows, applications), such as sequence 802.

In some embodiments, navigation bar 830 includes a plurality of images 814, 816, 818, 820, and 822 that correspond to different positions in the respective content item, the representation of the current position in which is displayed in region 828. For example, navigation bar 830 optionally includes images from different points in time (e.g., every 5 seconds or minutes) in the first episode of a television series (the respective content item).

In some embodiments, the representation of the respective content item in region 828 of the user interface is larger than navigation bar 830 in the user interface (e.g., the video of the respective content item is larger than the images in the navigation bar). In some embodiments, the representation of the respective content item in region 828 comprises video from the respective content item, the video including the plurality of images 814, 816, 818, 820, and 822, in navigation bar 830. In some embodiments, the plurality of images 814, 816, 818, 820, and 822, in navigation bar 830 comprise a plurality of still images from the respective content item.

In some embodiments, navigation bar 830 also includes a representation of a first adjacent content item 824 in the plurality of content items that is adjacent to the respective content item in the sequence (e.g., sequence 802) of content items. For example, navigation bar 830 optionally includes a representation of the second episode (e.g., next episode) in a television series (the first adjacent content item 824) when the respective content item is an episode in the television series. It is understood that navigation bar 830 could additionally or alternatively include a representation of a previous episode in the television series, for example.

As shown in FIG. 8B, in some embodiments, navigation bar 830 includes representations of two adjacent content items 812 and 824 (e.g., a previous and a next content item). In some embodiments, navigation bar 830 optionally includes a representation of a second adjacent content item 812 (e.g., a previous content item) in the plurality of content items that is adjacent to the respective content item in the sequence of content items. As described above, the first adjacent content item optionally precedes the respective content item in the sequence of content items (e.g., the first adjacent content item is an episode previous to the current episode in a television series, or a television program broadcast during a time slot previous to the current television program), and the second adjacent content item optionally follows the respective content item in the sequence of content items (e.g., the second adjacent content item is an episode following the current episode in a television series, or a television program broadcast during a time slot following the current television program).

Figure 8C:
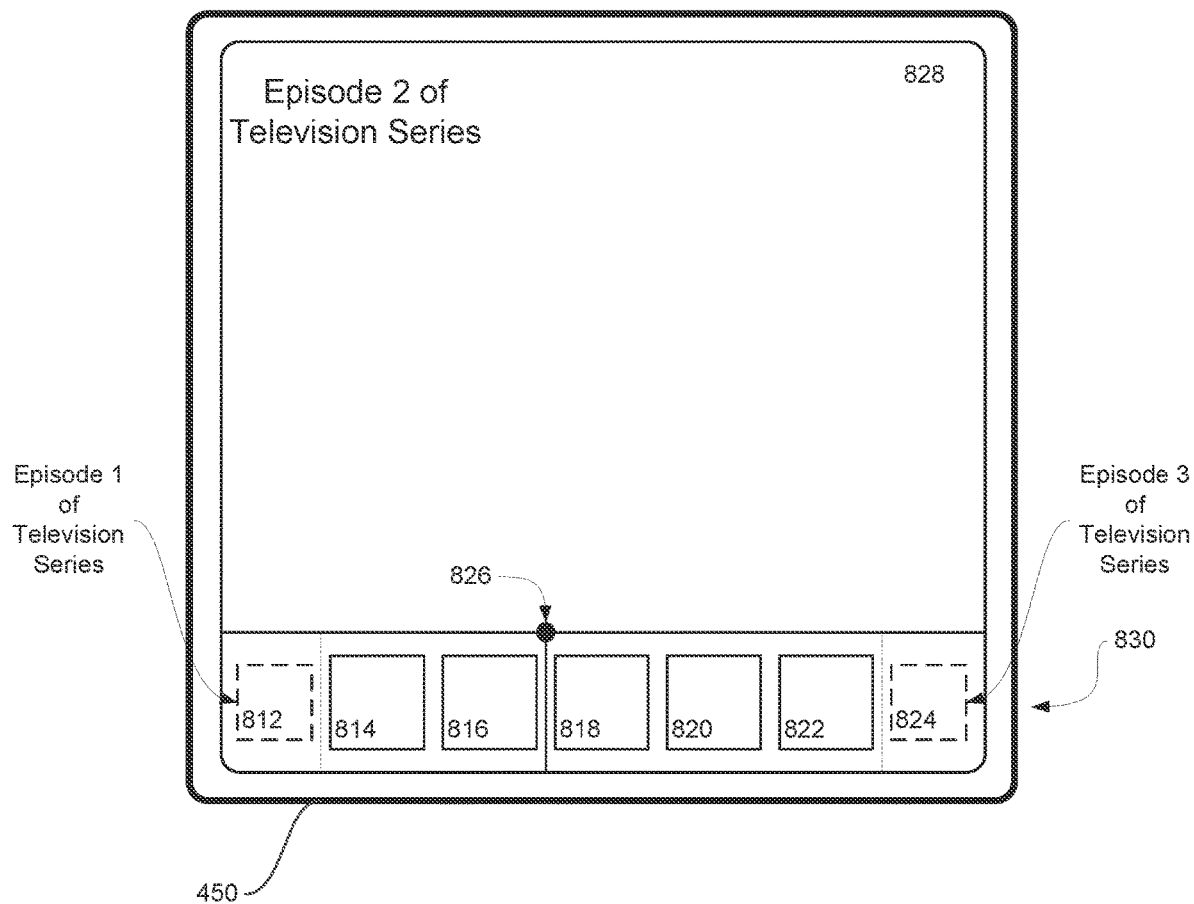

As discussed above with respect to FIG. 8A, in some embodiments, the first and second adjacent content items are based on a determined content type of the respective content item. For example, as shown in FIGS. 8B-8C, in some embodiments, when the content type of the respective content item is a television broadcast (e.g., 8:00 PM television broadcast in FIG. 8B), the previous adjacent content item is optionally a television broadcast during a previous time slot (e.g., 7:30 PM television broadcast in FIG. 8B), and the next adjacent content item is optionally a television broadcast during a next time slot (e.g., 8:30 PM television broadcast in FIG. 8B). In some embodiments, when the content type of the respective content item is an episode of a television series (e.g., episode 2 of a television series in FIG. 8C), the previous adjacent content item is optionally a previous episode of the television series (e.g., episode 1 of the television series in FIG. 8C), and the next adjacent content item is optionally a next episode of the television series (e.g., episode 3 of the television series in FIG. 8C).

In some embodiments, the representations of the first adjacent content item 824 and/or the second adjacent content item 812 in navigation bar 830 comprise images from positions in the first and/or second adjacent content item (e.g., one or more screenshots from points in time in the next and/or previous episodes in the television series).

In some embodiments, a user optionally provides input to change the time interval between positions in the respective content item to which images 814, 816, 818, 820, and 822, correspond. In other words, the user optionally provides input to change the time interval between images 814, 816, 818, 820, and 822, displayed in navigation bar 830, so that instead of the images corresponding to points in time separated by 5 minutes in the respective content item, for example, the images optionally correspond to points in time separated by 10 minutes in the respective content item, for example.

Thus, in some embodiments, a first image of the plurality of images (e.g., image 814) in navigation bar 830 corresponds to a first position in the respective content item, and a second image of the plurality of images (e.g., image 816) in the navigation bar corresponds to a second position in the respective content item, the first position in the respective content item and the second position in the respective content item being separated by a first interval (e.g., an amount of time, for example, 5 or 10 minutes). In some embodiments, while the user interface is displayed on display 450, the electronic device receives an indication of a first input that includes a contact (e.g., a finger contact or stylus contact) detected on a touch-sensitive surface of a device (e.g., a touch-sensitive surface of a remote control or a portable multifunction device with a touchscreen display), wherein detecting the contact comprises detecting a movement of the contact (e.g., a vertical swipe on the touch-sensitive surface). In accordance with the movement of the contact, the electronic device optionally selects a third position and a fourth position in the respective content item, and their corresponding third image and fourth image, respectively, the third position and fourth position being separated by a second interval that is different than the first interval (e.g., larger or smaller than the first interval), and replaces the first image (e.g., image 814) in navigation bar 830 with a third image corresponding to the third position in the respective content item, and the second image (e.g., image 816) in the navigation bar with a fourth image corresponding to the fourth position in the respective content item. In this way, the electronic device optionally changes the time interval between the images in navigation bar 830.

In some embodiments, changing the time interval between positions in the respective content item to which images 814, 816, 818, 820, and 822, correspond is based on the content type of the respective content item, similar to as described with reference to FIGS. 8D-8E below (e.g., the type of content that is being displayed in region 828 of the user interface). In some embodiments, the electronic device optionally determines a content type (e.g., movie, television show, etc.) of the respective content item. In accordance with a determination that the content type of the respective content item is a first content type (e.g., a sporting event), the electronic device optionally selects the second interval separating the third position and fourth position in the respective content item to be a time-based interval (e.g., separated by 5, 10, or 20 minutes). In accordance with a determination that the content type of the respective content item is a second content type (e.g., a movie), the electronic device optionally selects the second interval separating the third position and fourth position in the respective content item to be a content-based interval (e.g., separated by an amount of time based on the content of the respective content item, for example, scenes, chapters, and/or beginnings/ends of commercials).

In some embodiments, navigation bar 830 further includes current position indicator 826 overlaid on the plurality of images 814, 816, 818, 820, and 822, in the navigation bar (e.g., an indicator such as a line that moves over and between the images in the navigation bar). A relative location of current position indicator 826 with respect to each of the plurality of images in navigation bar 830 optionally corresponds to the current position in the respective content item (e.g., if the current position indicator is before an image in the navigation bar, the current position in the respective content item is before the position corresponding to the image). In some embodiments, the relative location of current position indicator 826 with respect to each of the plurality of images in navigation bar 830 additionally or alternatively corresponds to the representation of the current position in the respective content item displayed in region 828 of the user interface (e.g., the representation of the current position in the respective content item displayed in region 828 of the user interface shows content from the current position of the respective content item).

In some embodiments, the electronic device optionally scrolls (or "scrubs") through the respective content item in response to input detected on a touch-sensitive surface of a device (e.g., a touch-sensitive surface of a remote control or a portable multifunction device with a touchscreen display). In some embodiments, while the user interface is displayed on display 450, the electronic device receives an indication of a first input that includes a contact (e.g., a finger contact or stylus contact) detected on a touch-sensitive surface of a device (e.g., a touch-sensitive surface of a remote control or a portable multifunction device with a touchscreen display). Detecting the contact optionally comprises detecting a movement of the contact (e.g., the first input is optionally a gesture input, such as a horizontal swipe on the touch-sensitive surface). The electronic device optionally moves current position indicator 826 in navigation bar 830 in accordance with the movement of the contact (e.g., if the first input is a swipe to the right, the current position indicator is moved to the right in the navigation bar). Moving current position indicator 826 optionally comprises changing the relative location of the current position indicator with respect to each image of the plurality of images 814, 816, 818, 820, and 822, in navigation bar 830 in accordance with the movement of the contact (e.g., moving the current position indicator over and through the plurality of images in the navigation bar as the plurality of images remain stationary), and updating the current position in the respective content item and the representation of the current position in the respective content item (e.g., the representation displayed in region 828 of the user interface) in accordance with the relative location of the current position indicator with respect to each image of the plurality of images (e.g., scrubbing through the respective content item based on the location of the current position indicator, including updating the video and/or image(s) of the respective content item displayed in region 828 of the user interface).

Figure 8D:
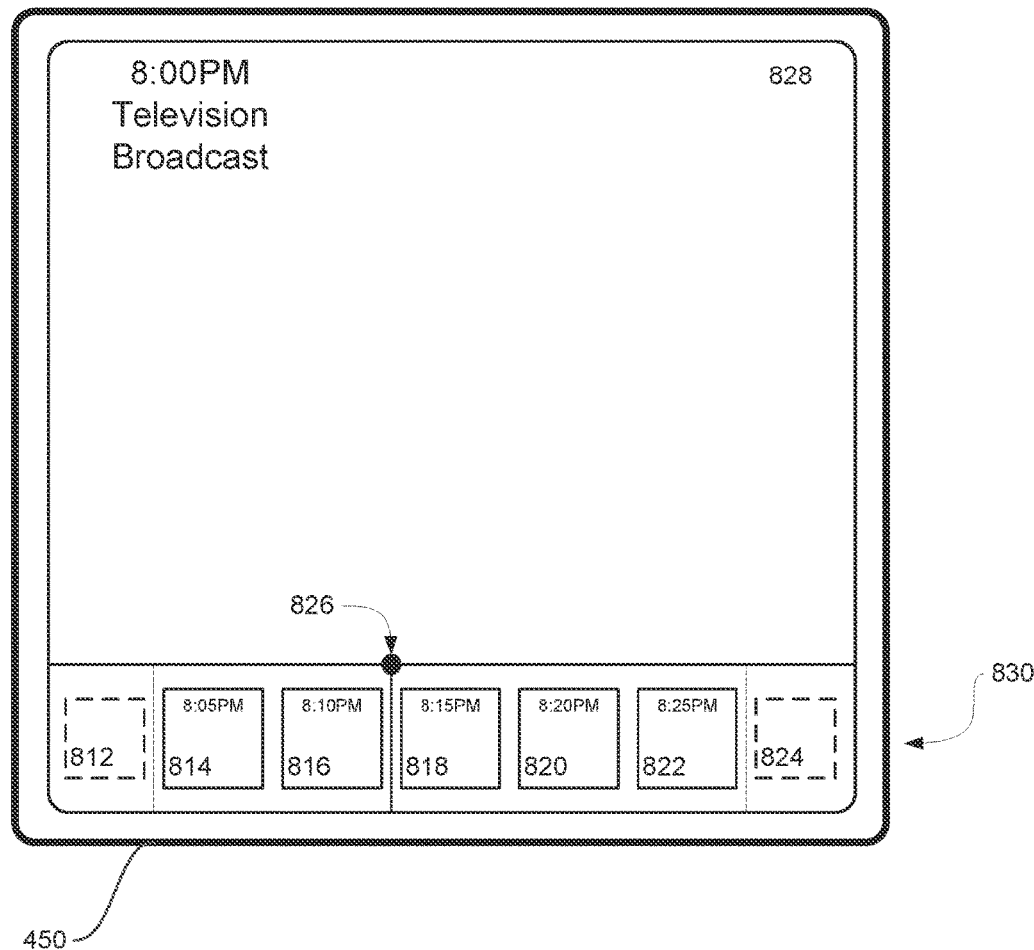
Figure 8E:
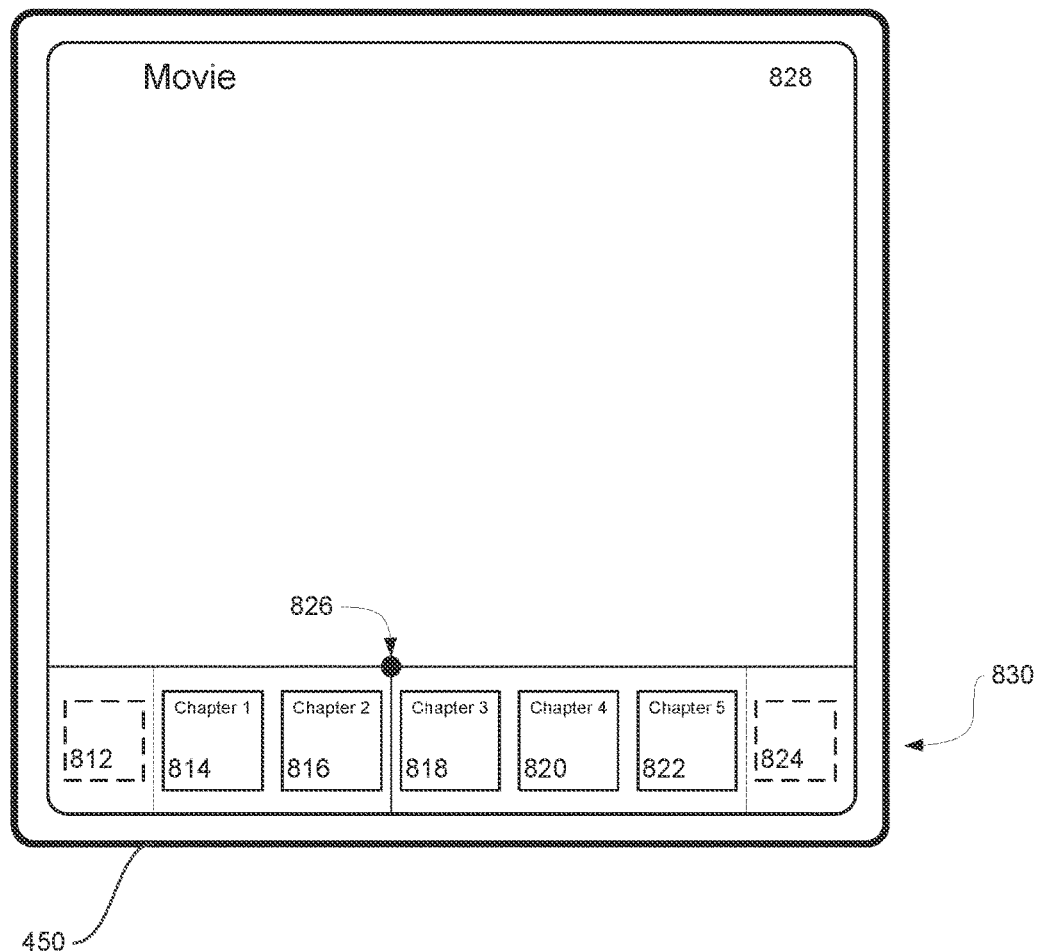

As shown in FIGS. 8D-8E, in some embodiments, the time interval between the positions in the respective content item to which the plurality of images 814, 816, 818, 820, and 822, in navigation bar 830 correspond is based on a content type (e.g., movie, television show, sporting event, etc.) of the respective content item. In some embodiments, the electronic device determines a content type (e.g., movie, television show, etc.) of the respective content item. In accordance with a determination that the content type of the respective content item is a first content type (e.g., a broadcast of a sporting event, such as the television broadcast in FIG. 8D), the electronic device optionally selects a first position and a second position in the respective content item, the first position and the second position being separated by a first interval (e.g., an amount of time). In some embodiments, the first interval is a time-based interval (e.g., the images 814, 816, 818, 820, and 822, in navigation bar 830 are images from the respective content item, the positions of which in the respective content item are separated by 5, 10, or 20 minute intervals, for example, as shown in FIG. 8D), a first image of the plurality of images (e.g., image 814) in the navigation bar corresponds to the first position in the respective content item, and a second image of the plurality of images (e.g., image 816) in the navigation bar corresponds to the second position in the respective content item.

In accordance with a determination that the content type of the respective content item is a second content type (e.g., a movie, such as the movie in FIG. 8E), the electronic device optionally selects a third position and a fourth position in the respective content item, the third position and the fourth position being separated by a second interval (e.g., an amount of time), different from the first interval discussed above. In some embodiments, the second interval is a content-based interval (e.g., the images 814, 816, 818, 820, and 822, in navigation bar 830 are images from the respective content item, the positions of which in the respective content item are separated by content-based intervals, such as scenes in a movie, chapters in a movie, and/or beginnings/ends of commercials, as shown in FIG. 8E), the first image of the plurality of images (e.g., image 814) in the navigation bar corresponds to the third position in the respective content item, and the second image of the plurality of images (e.g., image 816) in the navigation bar corresponds to the fourth position in the respective content item.

Figure 8F:
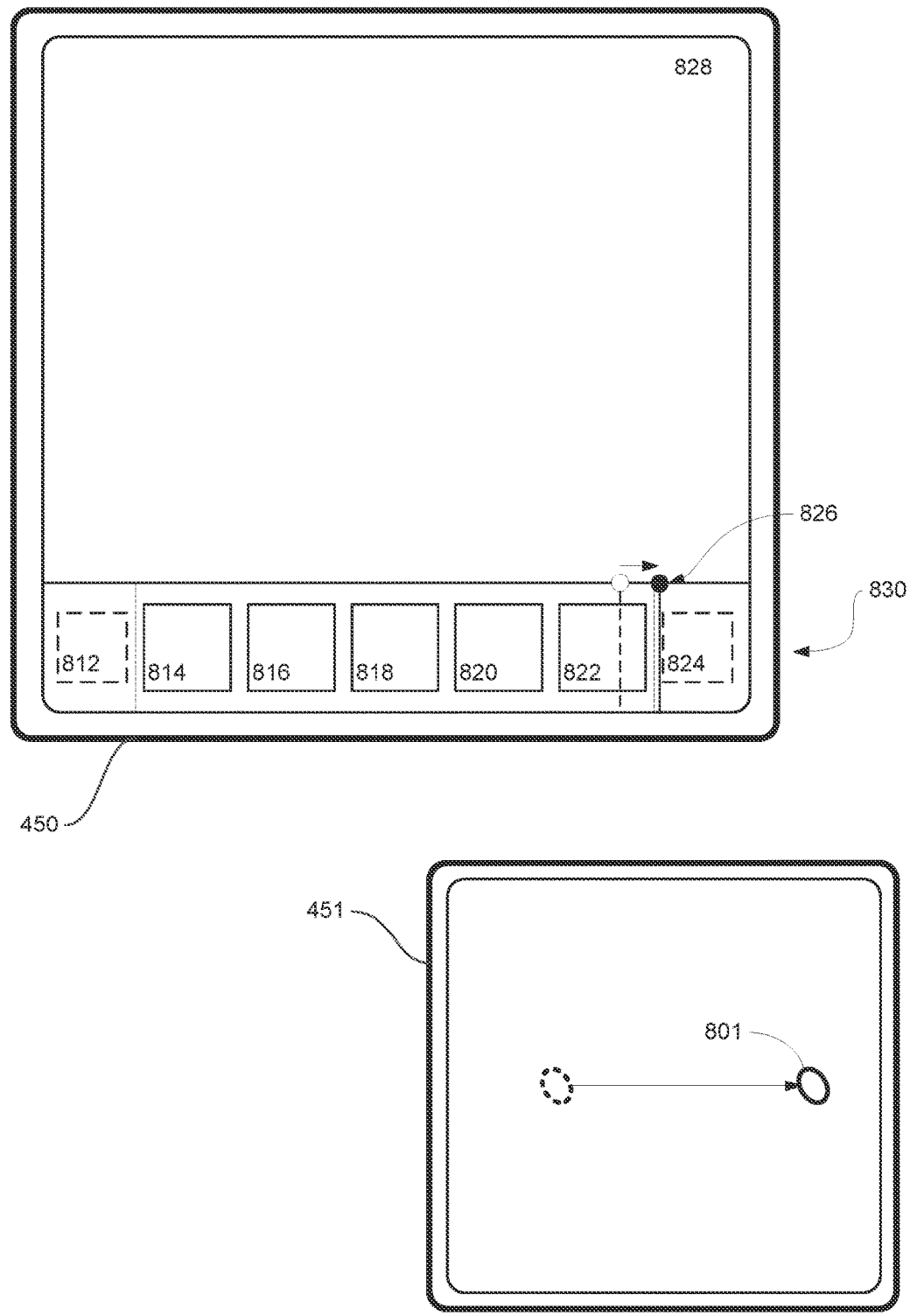

FIG. 8F illustrates an exemplary operation for scrolling into the adjacent content item in the navigation bar. As described above, the electronic device optionally scrolls through navigation bar 830, and the corresponding respective content item, in response to input detected on touch-sensitive surface 451. For example, the input optionally includes contact 801, and movement of the contact, as illustrated. In the illustrated example, the input is a horizontal swipe input, though the scope of the disclosure is not so limited.

Eventually, scrolling through navigation bar 830 optionally results in reaching the end of the respective content item, and thus current position indicator 826 optionally reaches the end of the portion of the navigation bar that includes images 814, 816, 818, 820, and 822, from the respective content item. If further scrolling input is detected on touch-sensitive surface 451, current position indicator 826 optionally crosses over into the portion of navigation bar 830 that includes the representation of the adjacent content item 824. In response, scrolling optionally continues through the content item corresponding to the representation of the adjacent content tem 824, as described below. Thus, the navigation bar of this disclosure allows a user to scroll through a current content item, and also scroll into one or more content items that are adjacent to the current content item (e.g., previous/next television episodes).

To facilitate the above scrolling, in some embodiments, a threshold separates the plurality of images 814, 816, 818, 820, and 822, in navigation bar 830 from the representation of the first adjacent content item 824 in the navigation bar (e.g., a line or other visual indication of a separation between the plurality of images and the representation of the first adjacent content item). The electronic device optionally determines that current position indicator 826 has crossed over the threshold from the plurality of images 814, 816, 818, 820, and 822, in navigation bar 830 to the representation of the first adjacent content item 824 in the navigation bar (e.g., the current position indicator has moved all the way through the plurality of images, and into the portion of the navigation bar including the representation of the first adjacent content item).

Figure 8G:
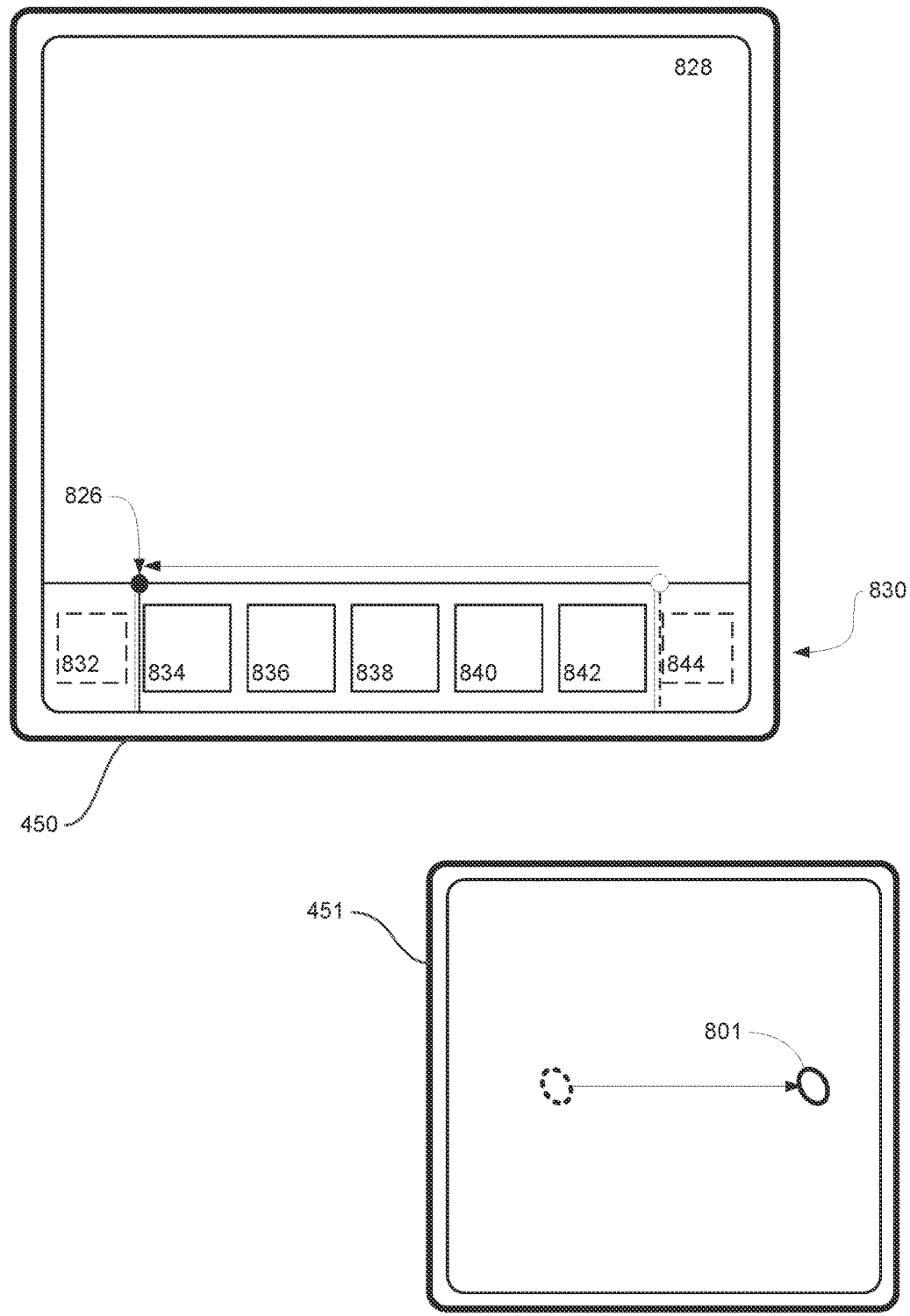
Figure 9A:
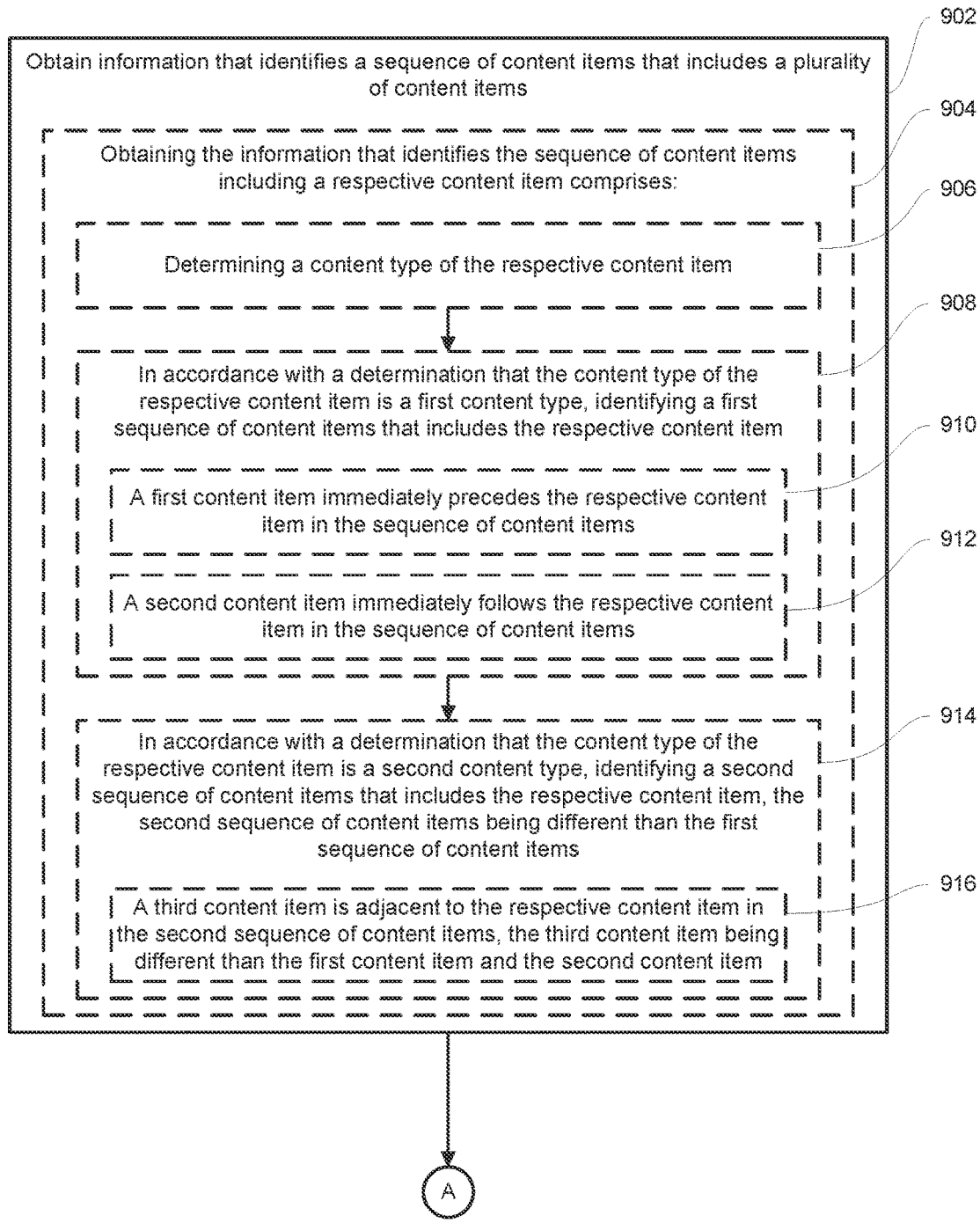
FIGS. 9A-9G are flow diagrams illustrating a method of presenting a content navigation bar in accordance with some embodiments.
Figure 9B:
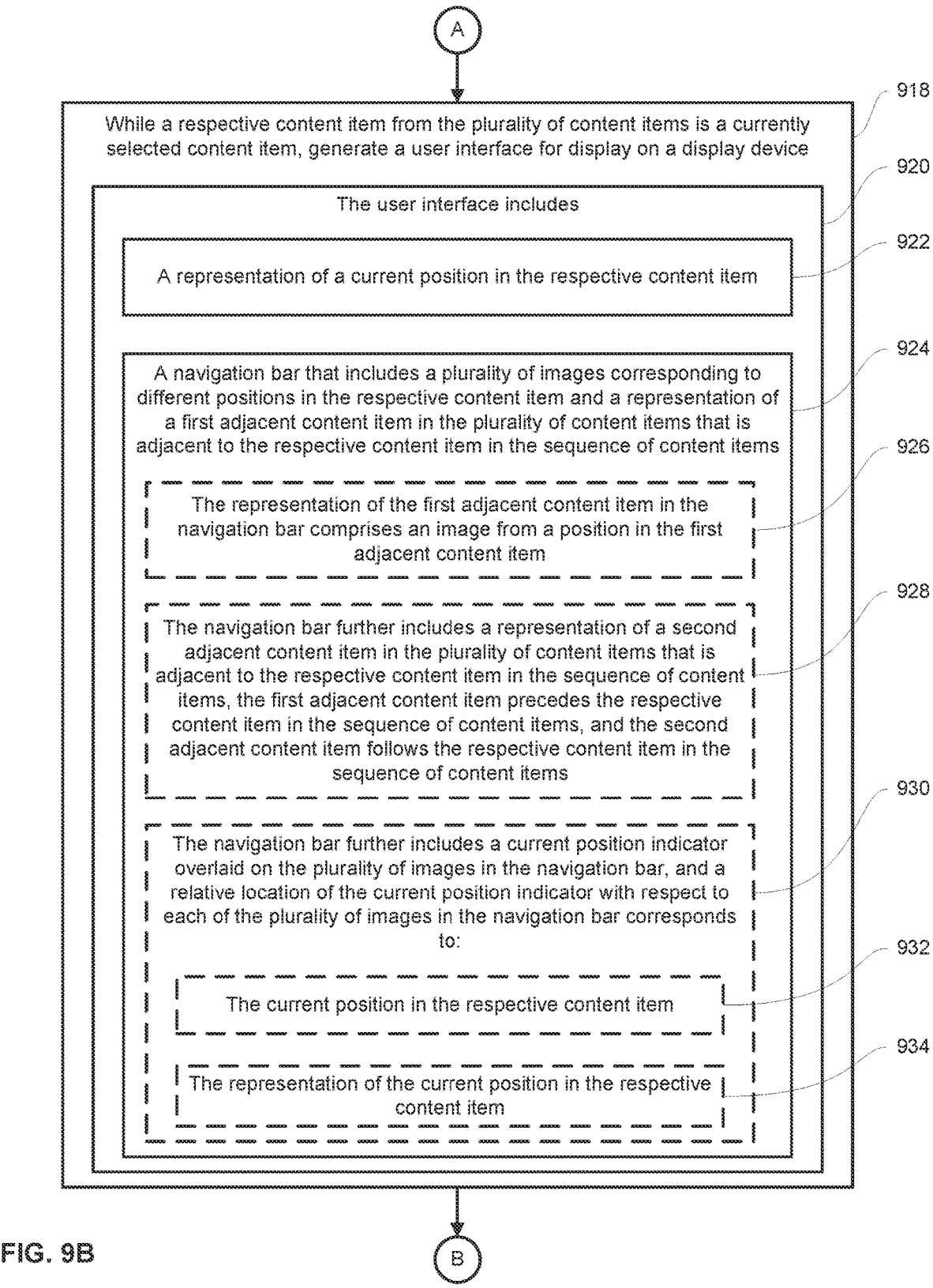
Figure 9C:
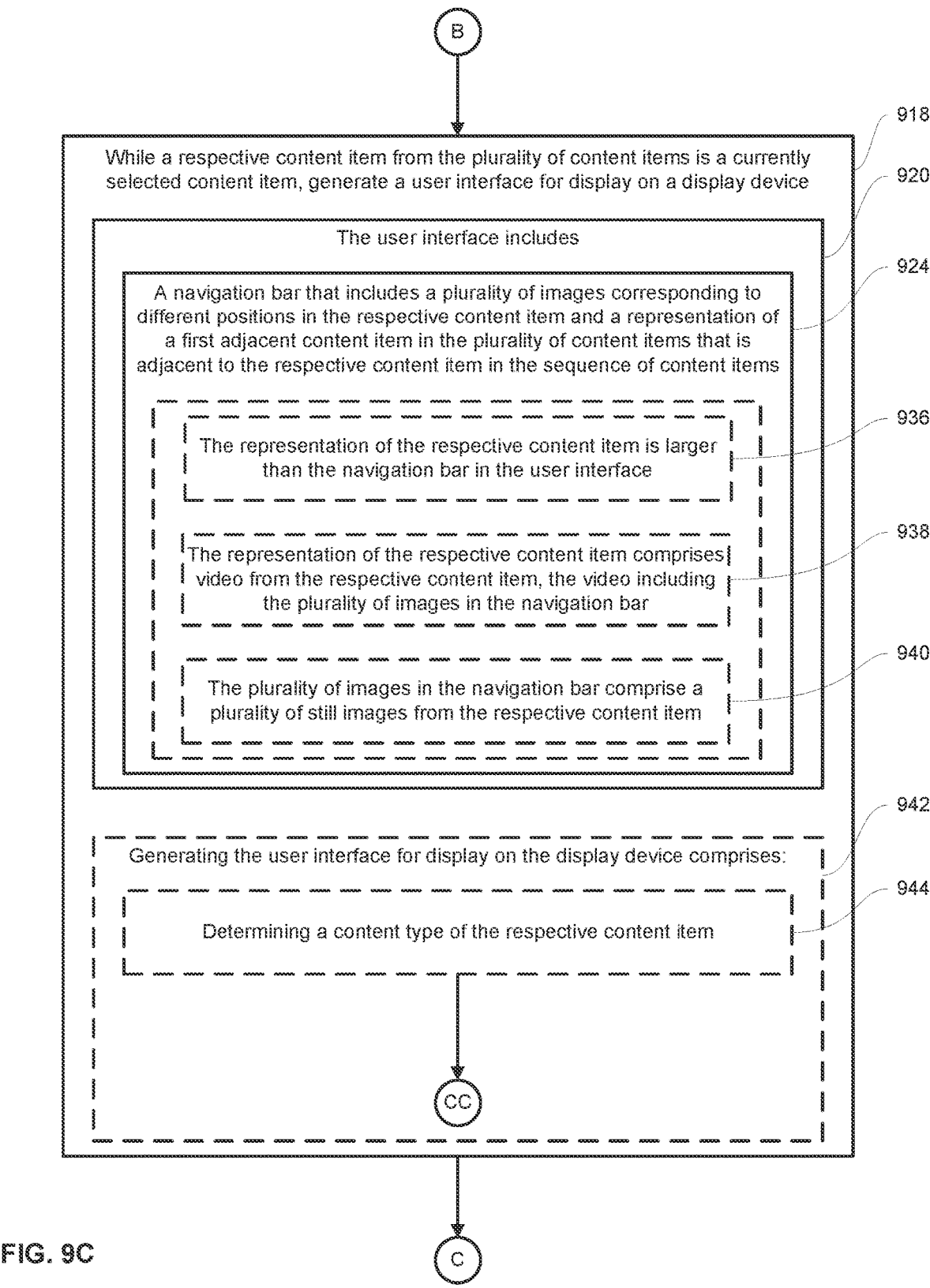
Figure 9D:
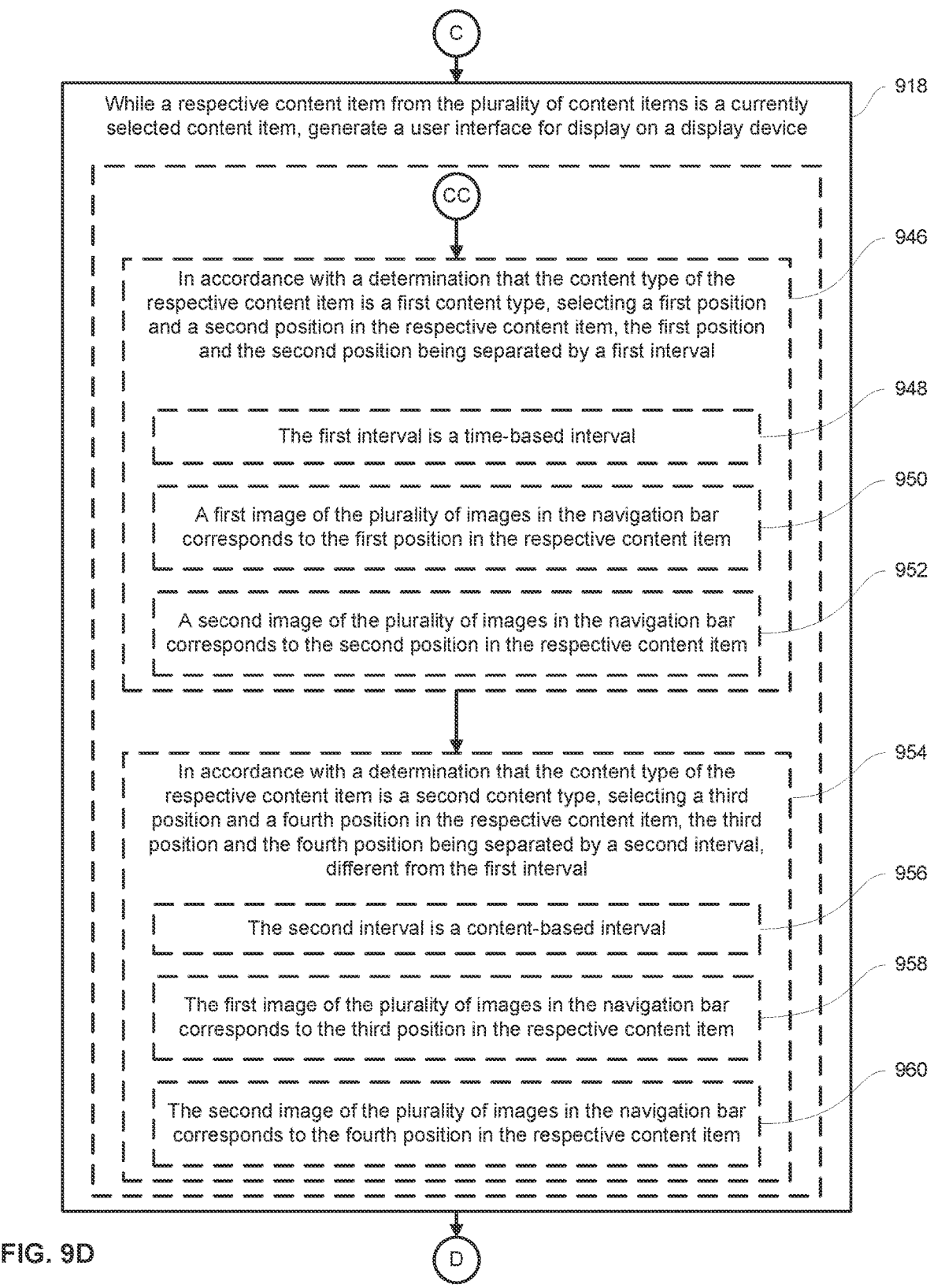
Figure 9E:
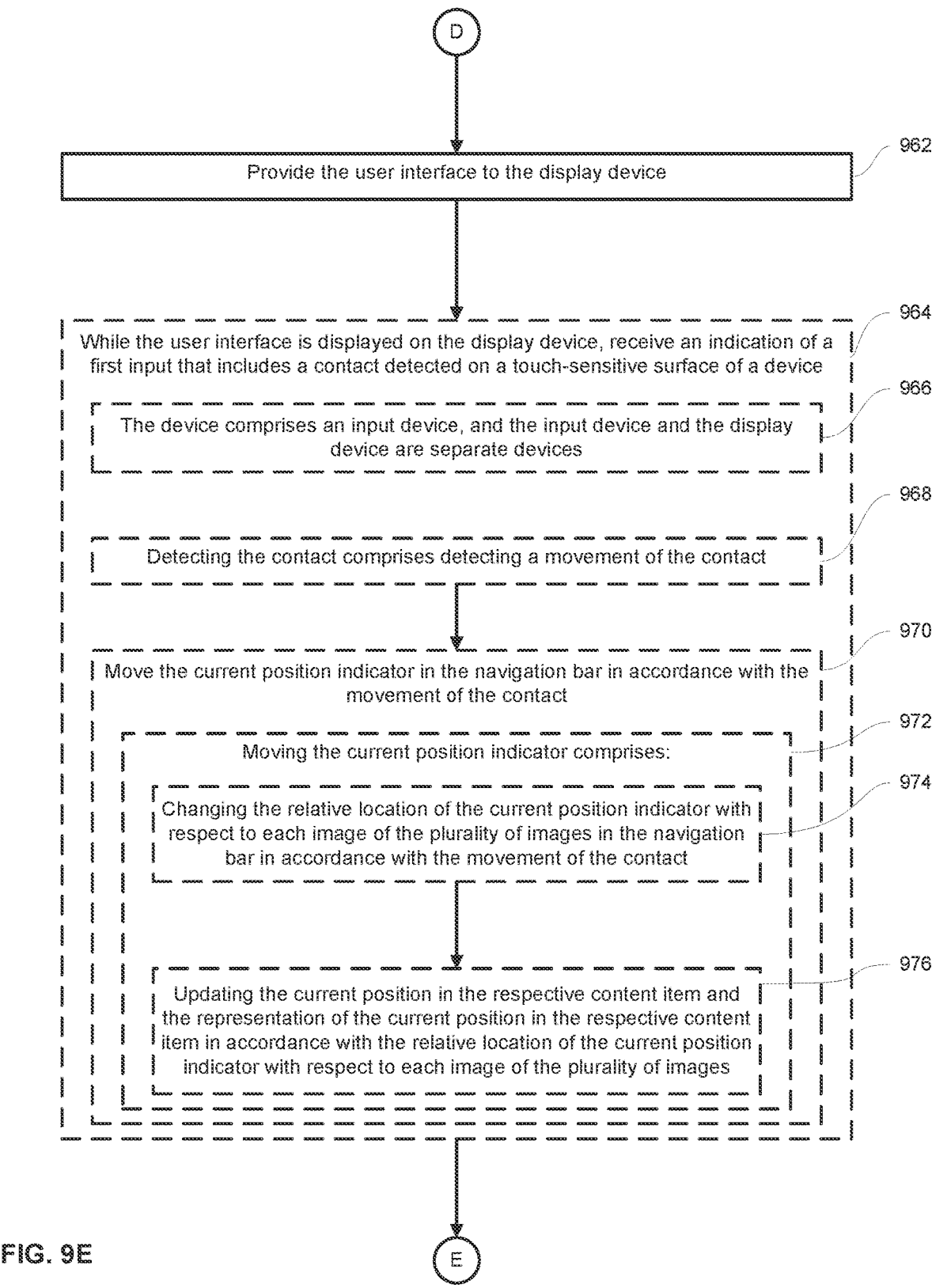
Figure 9F:
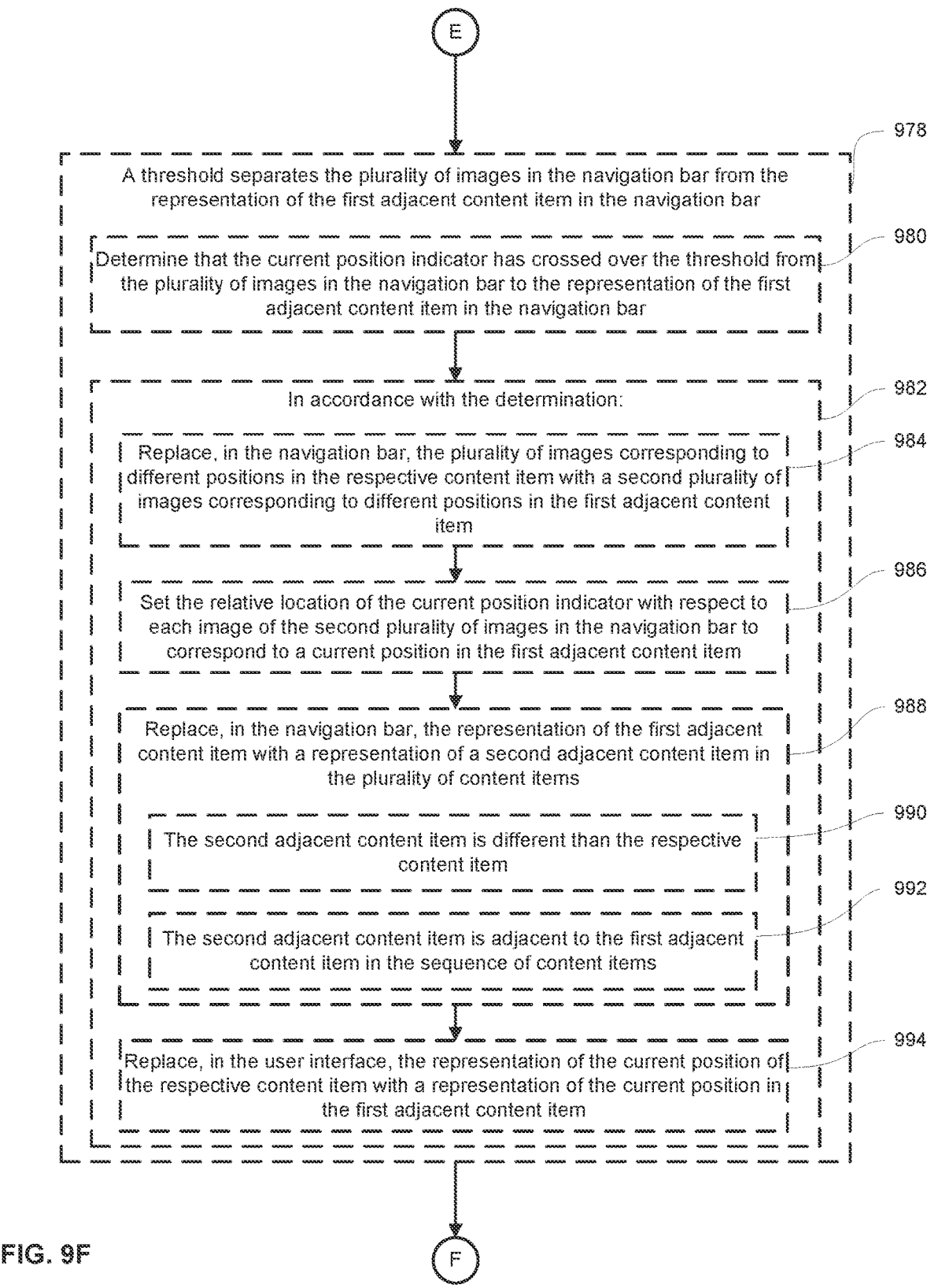
Figure 9G:
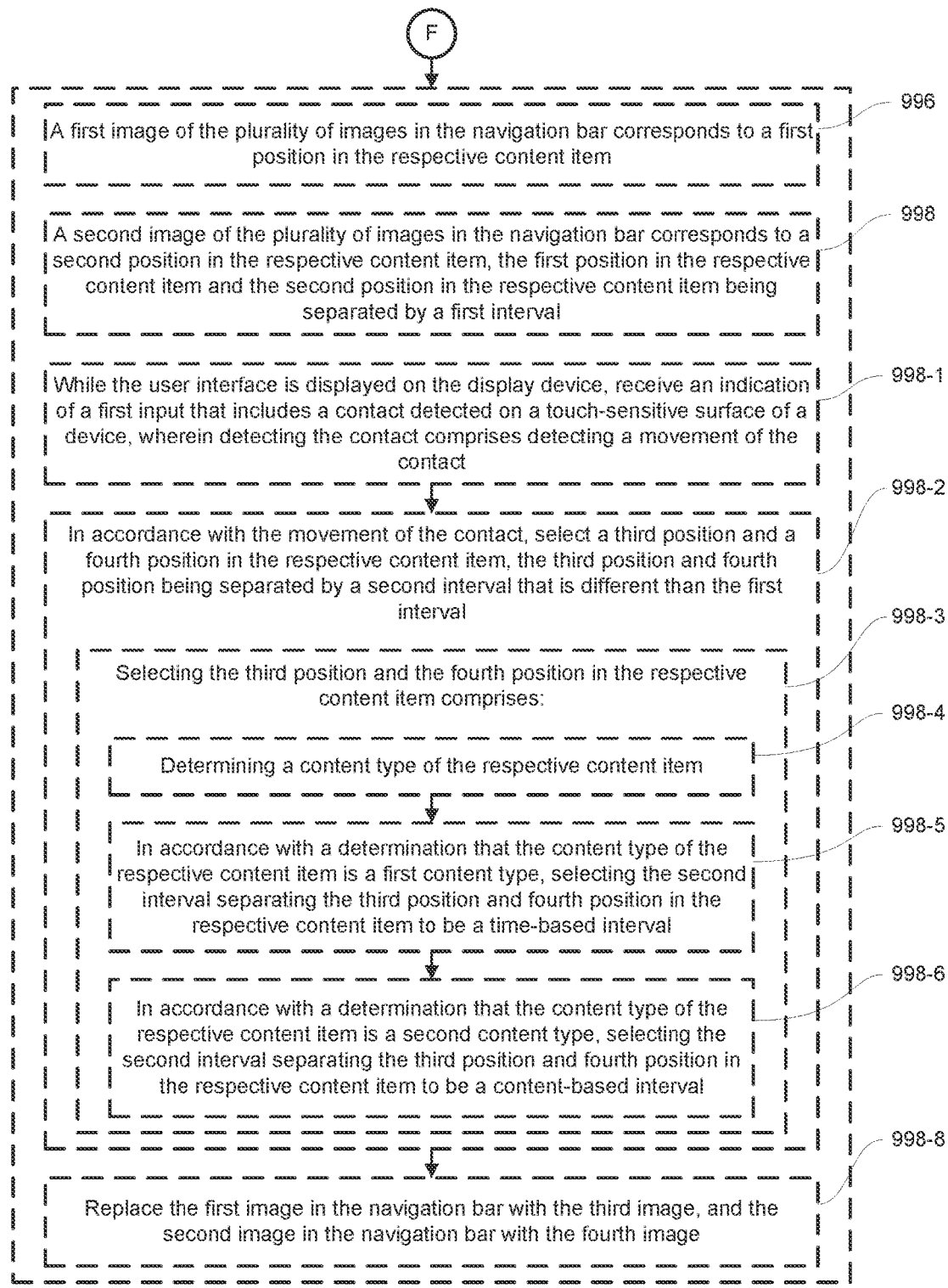

FIG. 8G illustrates an exemplary operation that results from scrolling into the adjacent content item in the navigation bar. When current position indicator 826 has crossed over into the representation of adjacent content item 824, as described above, navigation bar 830 is optionally reconstituted to reflect that the adjacent content item has now become the current content item.

To accomplish this reconstitution, in some embodiments, in accordance with the determination that current position indicator 826 has crossed over the threshold from the plurality of images 814, 816, 818, 820, and 822, in navigation bar 830 to the representation of the first adjacent content item 824 in the navigation bar, the electronic device replaces, in the navigation bar, the plurality of images corresponding to different positions in the respective content item (images 814, 816, 818, 820, and 822 in FIG. 8F) with a second plurality of images (image 834, 836, 838, 840, and 842 in FIG. 8G) corresponding to different positions in the first adjacent content item (e.g., the first adjacent content item now becomes the "currently selected" content item, images from which populate the navigation bar). The electronic device optionally sets the relative location of current position indicator 826 with respect to each image of the second plurality of images 834, 836, 838, 840, and 842, in navigation bar 830 to correspond to a current position in the first adjacent content item (e.g., the electronic device repositions the current position indicator to the beginning, as shown in FIG. 8G, or end of the first adjacent content item, depending on whether the current position indicator has been scrolled into the previous content item or the next content item).

In some embodiments, the electronic device replaces, in navigation bar 830, the representation of the first adjacent content item 824 (in FIG. 8F) with a representation of a second adjacent content item 844 (in FIG. 8G) in the plurality of content items—because what used to be the first adjacent content item has become the current content item, the electronic device optionally needs to determine a content item that is adjacent to the first adjacent content item, different from the respective content item. In other words, the electronic device optionally determines a next content item (e.g., the second adjacent content item) with respect to the first adjacent content item 824 in FIG. 8F.

In some embodiments, the second adjacent content item (e.g., the content item that is adjacent to the first adjacent content item) is different than the respective content item, and the second adjacent content item is adjacent to the first adjacent content item in the sequence of content items.

The electronic device optionally replaces, in the user interface, the representation of the current position of the respective content item, which was displayed in region 828 of the user interface, with a representation of the current position in the first adjacent content item in region 828 of the user interface (e.g., the electronic device optionally updates the user interface to display an image/video from the current position in the first adjacent content item instead of an image/video from the original, respective content item). In this way, the electronic device facilitates scrolling from one content item to an adjacent content item. Though the discussion above has focused on scrolling into a next content item, the operations disclosed above similarly apply to scrolling into a previous content item, the details of which are omitted here for brevity.

FIGS. 9A-9G are flow diagrams illustrating a method 900 of presenting a content navigation bar in accordance with some embodiments. The method 900 is optionally performed at an electronic device such as device 500 as described above with reference to FIG. 5, including a set top box or other user interface generating device that is in communication with a remote control and a display device. Some operations in method 900 are, optionally, combined and/or the order of some operations is, optionally, changed.

As described below, the method 900 provides ways in which a device optionally presents a content navigation bar in a user interface. The method reduces the cognitive burden on a user when interacting with a user interface on the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 500 in FIG. 5) with one or more processors and memory obtains (902) information that identifies a sequence of content items that includes a plurality of content items (e.g., movies, television shows, applications, etc.). For example, the electronic device optionally obtains information that identifies sequence 802 of N content items in FIG. 8A. In some embodiments, obtaining the information that identifies the sequence of content items including a respective content item comprises (904) determining (906) a content type (e.g., movie, television show, etc.) of the respective content item. In some embodiments, obtaining the information that identifies the sequence of content items including a respective content item comprises (904), in accordance with a determination that the content type of the respective content item is a first content type, identifying (908) a first sequence of content items that includes the respective content item. (e.g., the respective content item is optionally content item 2 806 in FIG. 8A) In some embodiments, a first content item immediately precedes the respective content item in the sequence of content items (910) (e.g., the first content item is optionally content item 1 804 in FIG. 8A). In some embodiments, a second content item immediately follows the respective content item in the sequence of content items (912) (e.g., the second content item is optionally content item 3 808 in FIG. 8A). For example, if the content type of the respective content item is a television series, the respective content item is optionally an episode of the television series, the first content item is optionally an immediately previous episode in the television series, and the second content item is optionally an immediately next episode in the television series.

In some embodiments, obtaining the information that identifies the sequence of content items including a respective content item comprises (904), in accordance with a determination that the content type of the respective content item is a second content type, identifying (914) a second sequence of content items that includes the respective content item, the second sequence of content items being different than the first sequence of content items. In some embodiments, a third content item is adjacent to the respective content item in the second sequence of content items, the third content item being different than the first content item and the second content item (916). For example, if the content type of the respective content item is a television broadcast, the respective content item is optionally a television program broadcast during a time slot, the first content item is optionally a television program broadcast during an immediately previous time slot, and the second content item is optionally a television program broadcast during an immediately next time slot.

In some embodiments, while a respective content item from the plurality of content items is a currently selected content item (e.g., a content item selected for presentation to the user on a display device), the device generates (918) a user interface for display on a display device. In some embodiments, the user interface includes (920) a representation of a current position in the respective content item (922) (e.g., a large version of the playing content). This representation of the current position in the respective content item is optionally provided in, for example, region 828 of the user interface in FIG. 8B.

In some embodiments, the user interface includes (920) a navigation bar (e.g., navigation bar 830 in FIG. 8B) that includes a plurality of images (e.g., images 814, 816, 818, 812, and 822 in FIG. 8B) corresponding to different positions in the respective content item and a representation of a first adjacent content item (e.g., representation 812 or 824 in FIG. 8B) in the plurality of content items that is adjacent to the respective content item in the sequence of content items (924) (e.g., the navigation bar includes images from the second episode in a television series (the respective content item) and a representation of the first episode in the television series (the first adjacent content item)). In some embodiments, the representation of the first adjacent content item in the navigation bar comprises an image from a position in the first adjacent content item (926) (e.g., representation 824 in FIG. 8B comprises a screenshot from the previous episode in a television series). In some embodiments, the navigation bar further includes a representation of a second adjacent content item (e.g., the next content item) in the plurality of content items that is adjacent to the respective content item in the sequence of content items (e.g., the navigation bar includes representations of a previous and a next content item, such as representations 812 and 824 in FIG. 8B), the first adjacent content item precedes the respective content item in the sequence of content items (e.g., the first adjacent content item is an episode previous to the current episode in a television series, or a television program broadcast during a time slot previous to the current television program), and the second adjacent content item follows the respective content item in the sequence of content items (928) (e.g., the second adjacent content item is an episode following the current episode in a television series, or a television program broadcast during a time slot following the current television program).

In some embodiments, the navigation bar further includes a current position indicator overlaid on the plurality of images (e.g., current position indicator 826) in the navigation bar (e.g., a line that moves over and between the images), and a relative location of the current position indicator with respect to each of the plurality of images in the navigation bar corresponds to (930) the current position in the respective content item (932) (e.g., if the current position indicator is before an image in the navigation bar, the current position in the respective content item is before the position corresponding to the image), and the representation of the current position in the respective content item (934) (e.g., the representation of the current position in the respective content item shows content from the current position).

In some embodiments, the representation of the respective content item is larger than the navigation bar in the user interface (936) (e.g., the video of the respective content item is relatively large (shown in region 828 in FIG. 8B), while the images in the navigation bar (images 814, 816, 818, 820, and 822 in FIG. 8B) are relatively small). In some embodiments, the representation of the respective content item comprises video from the respective content item, the video including the plurality of images in the navigation bar (938). In some embodiments, the plurality of images in the navigation bar comprise a plurality of still images from the respective content item (940).

In some embodiments, generating the user interface for display on the display device comprises (942) determining (944) a content type (e.g., movie, television show, etc.) of the respective content item.

In some embodiments, generating the user interface for display on the display device comprises (942), in accordance with a determination that the content type of the respective content item is a first content type, selecting (946) a first position and a second position in the respective content item, the first position and the second position being separated by a first interval (e.g., an amount of time). In some embodiments, the first interval is a time-based interval (948) (e.g., the images in the navigation bar (e.g., images 814, 816, 818, 820, and 822 in FIG. 8B) are images from the respective content item, the positions of which in the respective content item are separated by 5, 10, or 20 minute intervals, for example). In some embodiments, a first image of the plurality of images in the navigation bar corresponds to the first position in the respective content item (950) (e.g., image 814 in FIG. 8B optionally corresponds to the first position in the respective content item). In some embodiments, a second image of the plurality of images in the navigation bar corresponds to the second position in the respective content item (952) (e.g., image 816 in FIG. 8B optionally corresponds to the first position in the respective content item).

In some embodiments, generating the user interface for display on the display device comprises (942), in accordance with a determination that the content type of the respective content item is a second content type, selecting (954) a third position and a fourth position in the respective content item, the third position and the fourth position being separated by a second interval, different from the first interval. In some embodiments, the second interval is a content-based interval (956) (e.g., the images in the navigation bar (e.g., images 814, 816, 818, 820, and 822 in FIG. 8B) are images from the respective content item, the positions of which in the respective content item are separated by content-based intervals, such as scenes, chapters, and/or beginnings/ends of commercials). In some embodiments, the first image of the plurality of images in the navigation bar corresponds to the third position in the respective content item (958). In some embodiments, the second image of the plurality of images in the navigation bar corresponds to the fourth position in the respective content item (960). In some embodiments, after generating the user interface for display on the display device, the device provides (962) the user interface to the display device.

In some embodiments, while the user interface is displayed on the display device, the device receives (964) an indication of a first input that includes a contact (e.g., a finger contact or stylus contact) detected on a touch-sensitive surface of a device (e.g., a touch-sensitive surface of a remote control or a portable multifunction device with a touchscreen display). In some embodiments, the device comprises an input device, and the input device and the display device are separate devices (966). In some embodiments, detecting the contact comprises detecting a movement of the contact (968) (e.g., the first input is a gesture input, such as a horizontal swipe on the touch-sensitive surface, such as the movement of contact 801 as illustrated in FIG. 8F). In some embodiments, the device moves (970) the current position indicator in the navigation bar in accordance with the movement of the contact (e.g., if the first input is a swipe to the right, the current position indicator is moved to the right in the navigation bar, as is illustrated in FIG. 8F).

In some embodiments, moving the current position indicator comprises (972) changing (974) the relative location of the current position indicator with respect to each image of the plurality of images in the navigation bar in accordance with the movement of the contact (e.g., moving the current position indicator over and through the plurality of images in the navigation bar as the plurality of images remain stationary). In some embodiments, moving the current position indicator comprises (972) updating (976) the current position in the respective content item and the representation of the current position in the respective content item in accordance with the relative location of the current position indicator with respect to each image of the plurality of images (e.g., scrubbing through the respective content item based on the location of the current position indicator, including updating the video and/or image of the respective content item displayed in the user interface in region 828 in FIG. 8F, for example).

In some embodiments, a threshold separates the plurality of images in the navigation bar from the representation of the first adjacent content item in the navigation bar (978) (e.g., a line or other visual indication of a separation between the plurality of images and the representation of the first adjacent content item, as is illustrated in FIG. 8F). In some embodiments, the device determines (980) that the current position indicator has crossed over the threshold from the plurality of images in the navigation bar to the representation of the first adjacent content item in the navigation bar (e.g., the current position indicator has moved all the way through the plurality of images, and onto the representation of the first adjacent content item, as is illustrated in FIG. 8F).

In some embodiments, in accordance with the determination (982) that the current position indicator has crossed over the threshold, the device replaces (984), in the navigation bar, the plurality of images corresponding to different positions in the respective content item with a second plurality of images corresponding to different positions in the first adjacent content item (e.g., the first adjacent content item now becomes the "currently selected" content item, images from which populate the navigation bar). For example, after current position indicator 826 in FIG. 8F has crossed over the threshold to representation 824, images 814, 816, 818, 820, and 822 are optionally replaced by images from different positions in the content item associated with representation 824, as is illustrated in FIG. 8G. Now, representation 832 is optionally associated with the respective content item, and images 834, 836, 838, 840, and 842 are optionally associated with the first adjacent content item. In some embodiments, the device sets (986) the relative location of the current position indicator with respect to each image of the second plurality of images in the navigation bar to correspond to a current position in the first adjacent content item (e.g., the device repositions the current position indicator to the beginning or end, as is appropriate, of the first adjacent content item, as illustrated in FIG. 8G).

In some embodiments, the device replaces (988), in the navigation bar, the representation of the first adjacent content item with a representation of a second adjacent content item in the plurality of content items (e.g., now, the device determines a content item that is adjacent to the first adjacent content item, different from the respective content item, and places a representation of the second adjacent content item in the navigation bar as representation 844 in FIG. 8G, for example). In some embodiments, the second adjacent content item is different than the respective content item (990). In some embodiments, the second adjacent content item is adjacent to the first adjacent content item in the sequence of content items (992).

In some embodiments, the device replaces (994), in the user interface, the representation of the current position of the respective content item with a representation of the current position in the first adjacent content item (e.g., the device updates the user interface to display, in region 828 in FIG. 8G, for example, an image from the current position in the first adjacent content item instead of an image from the respective content item).

In some embodiments, a first image of the plurality of images in the navigation bar corresponds to a first position in the respective content item (996). In some embodiments, a second image of the plurality of images in the navigation bar corresponds to a second position in the respective content item, the first position in the respective content item and the second position in the respective content item being separated by a first interval (998) (e.g., an amount of time, for example, 5 or 10 minutes).

In some embodiments, while the user interface is displayed on the display device, the device receives (998-1) an indication of a first input that includes a contact detected on a touch-sensitive surface of a device, wherein detecting the contact comprises detecting a movement of the contact (e.g., a vertical swipe on the touch-sensitive surface).

In some embodiments, in accordance with the movement of the contact, the device selects (998-2) a third position and a fourth position in the respective content item, the third position and fourth position being separated by a second interval that is different than the first interval (e.g., larger or smaller than the first interval). In some embodiments, selecting the third position and the fourth position in the respective content item comprises (998-3) determining (998-4) a content type (e.g., movie, television show, etc.) of the respective content item. In some embodiments, selecting the third position and the fourth position in the respective content item comprises (998-3) in accordance with a determination that the content type of the respective content item is a first content type, selecting (998-5) the second interval separating the third position and fourth position in the respective content item to be a time-based interval (e.g., separated by 5, 10, or 20 minutes). In some embodiments, selecting the third position and the fourth position in the respective content item comprises (998-3), in accordance with a determination that the content type of the respective content item is a second content type, selecting (998-6) the second interval separating the third position and fourth position in the respective content item to be a content-based interval (e.g., separated by an amount of time based on the content of the respective content item, for example, scenes, chapters, and/or beginnings/ends of commercials).

In some embodiments, the device replaces (998-8) the first image in the navigation bar with the third image, and the second image in the navigation bar with the fourth image.

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300 and 1500) are also applicable in an analogous manner to method 900 described above with respect to FIGS. 9A-9G. For example, the user interface, display device and content items described above with reference to method 900 optionally have one or more of the characteristics of the user interfaces, display devices and content items described herein with reference to other methods described herein (e.g., methods 700, 1100, 1300 and 1500). For brevity, these details are not repeated here.

The operations in the information processing methods described above are, optionally, implemented by running one or more functional modules in an information processing apparatus such as general purpose processors (e.g., as described above with respect to FIGS. 1A, 3 and 5) or application specific chips.

The operations described above with reference to FIGS. 9A-9G are, optionally, implemented by components depicted in FIGS. 1A-1B. For example, obtaining operation 902, generation operation 918, and providing operation 962 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Predefined Movement in a User Interface

When interacting with a user interface presented by an electronic device, a user can sometimes mean to move a cursor, for example, by a certain amount in the user interface, but can accidentally move the cursor less or more than that due to imprecision in the user's input on a touch-sensitive surface, for example. Thus, it can be beneficial for the electronic device to provide for mechanisms for moving a cursor in a user interface by a predefined amount (e.g., by a single element in the user interface) in response to certain inputs detected on an input device (e.g., a touch-sensitive surface) to enhance the user's experience with the device. The embodiments described below provide ways to allow for such cursor movement. Enhancing interactions with a device reduces the amount of time needed by a user to perform operations, and thus reduces the power usage of the device and increases battery life for battery-powered devices.

FIGS. 10A-10D illustrate exemplary ways in which an electronic device moves a cursor in a user interface by a predefined amount in accordance with some embodiments of the disclosure. The embodiments in these figures are used to illustrate the processes described below, including the processes described with reference to FIGS. 11A-11D.

Figure 10A:
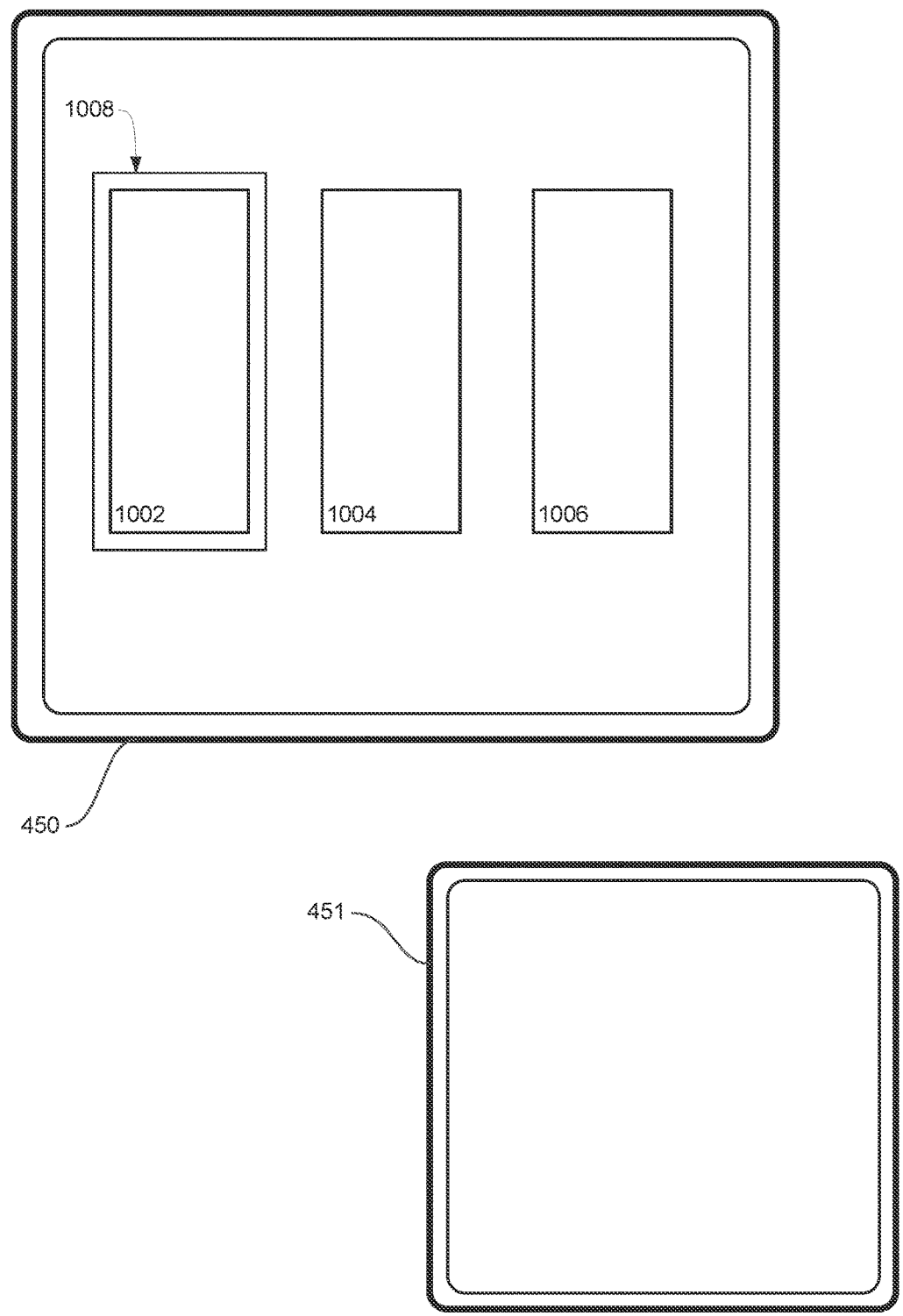
FIGS. 10A-10D illustrate exemplary ways in which an electronic device moves a cursor in a user interface by a predefined amount in accordance with some embodiments of the disclosure.

FIG. 10A illustrates an exemplary user interface. Display 450 optionally displays a user interface that includes various user interface elements 1002, 1004, and 1006. The user interface also optionally includes selection-indicator 1008, which provides an indication of a currently selected user interface element (e.g., element 1002) of the plurality of user interface elements (e.g., elements 1002, 1004, and 1006). Selection-indicator 1008, though illustrated as a visually distinct object in the user interface, is optionally anything that provides an indication of a currently selected user interface element, such as a glow around the currently selected user interface element, a highlight around the currently selected user interface element, or an outline around the currently selected user interface element.

As discussed above, in some circumstances, a user wishes to move selection-indicator 1008 from element 1002 to another element (e.g., element 1004). To do so, the user optionally provides input on touch-sensitive surface 451, as will be described below.

Figure 10B:
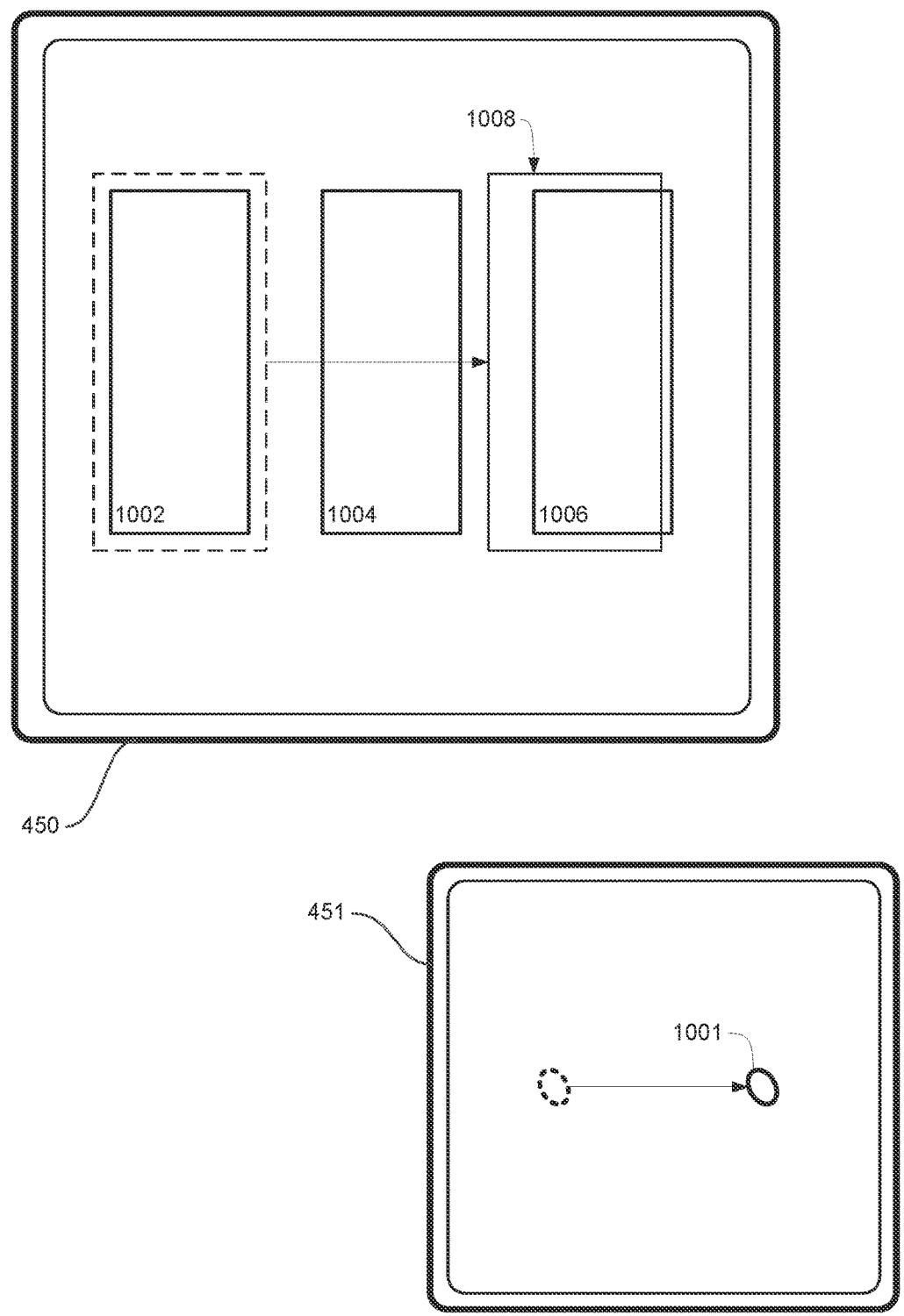

FIG. 10B illustrates exemplary movement of selection-indicator 1008 in response to input detected on touch-sensitive surface 451. Movement of selection-indicator 1008 is optionally performed in response to an input that includes contact 1001 being detected on touch-sensitive surface 451. As shown in FIG. 10B, in some embodiments, the input detected on touch-sensitive surface 451 is a horizontal swipe. The input optionally corresponds to a respective value for a movement metric—a metric expressing how much selection-indicator 1008 in the user interface should move based on how much contact 1001 detected on touch-sensitive surface 451 moves. In some embodiments, the movement metric is optionally a metric based on a relationship of contact 1001 movement to selection-indicator 1008 movement. As shown in FIG. 10B, in some embodiments, the movement of contact 1001 detected on touch-sensitive surface 451 corresponds to a movement metric for moving selection-indicator 1008 by the amount illustrated (e.g., to a position in user interface between elements 1004 and 1006).

However, in some cases, the input detected on touch-sensitive surface 451 was optionally intended to move selection-indicator 1008 by an amount other than the amount specified by the movement metric (such as by a single user interface element— from element 1002 to element 1004, for example). To address such cases, electronic device optionally provides for the ability to move selection-indicator 1008 by a predefined amount (e.g., by a single user interface element) in response to detecting specified inputs and/or gestures.

Figure 10C:
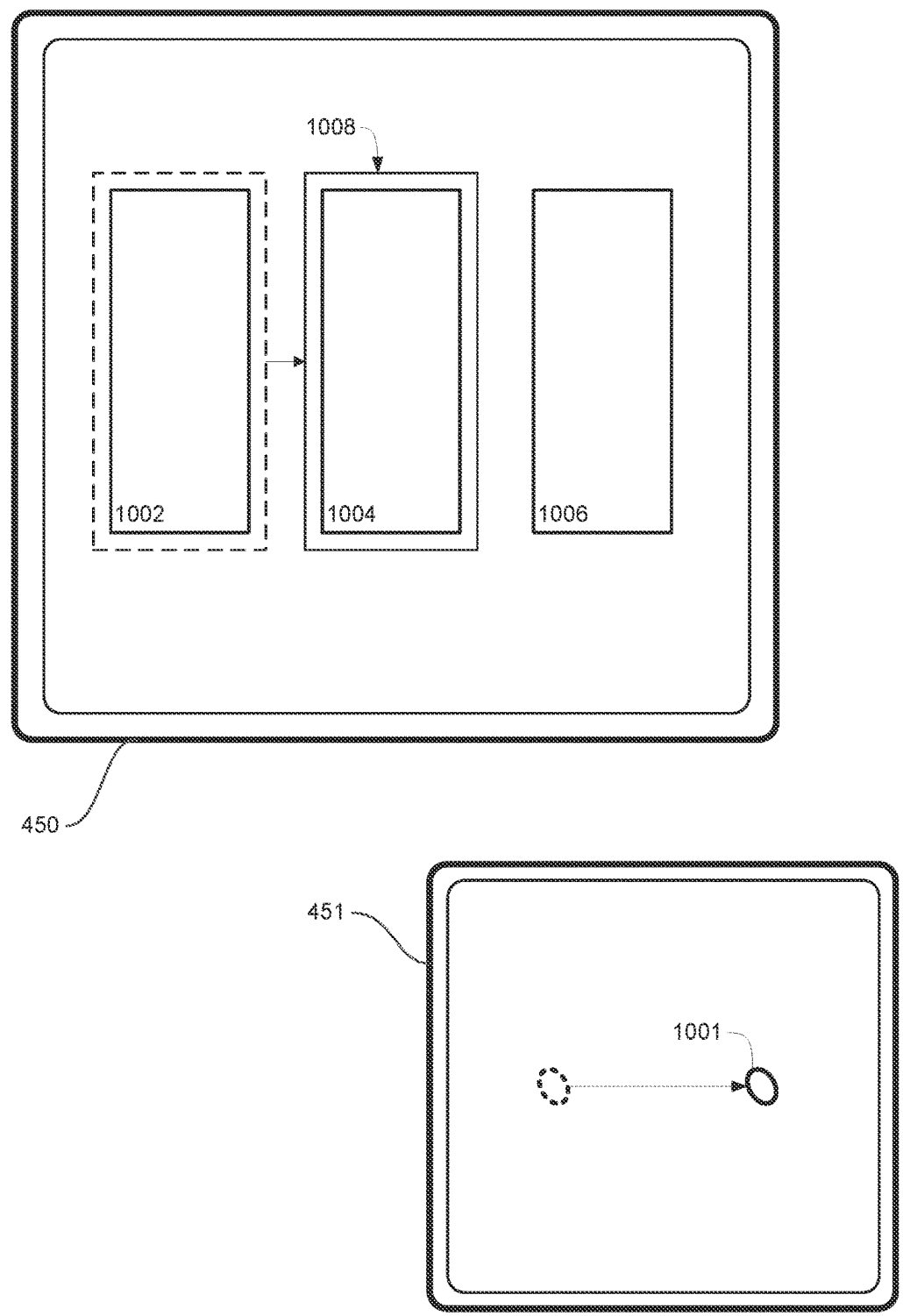

FIG. 10C illustrates an exemplary scheme for moving selection-indicator 1008 by a predefined amount in response to detecting an input on touch-sensitive surface 451. The input detected on touch-sensitive surface 451 is optionally the same input as described in FIG. 10B; however in this case, selection-indicator 1008 optionally moves by a predefined amount (e.g., from element 1002 to element 1004) in response to the detection of the input. In some embodiments, as illustrated, moving selection-indicator 1008 by the predefined amount in the user interface comprises moving the selection-indicator to indicate selection of an adjacent user interface element (e.g., element 1004) in the plurality of user interface elements (e.g., elements 1002, 1004, and 1006).

To facilitate such predefined movement of selection-indicator 1008, in response to receiving the indication of the first input (e.g., the input detected on touch-sensitive surface 451), the electronic device optionally determines whether the first input meets unitary-movement criteria (e.g., criteria that, when met, cause the selection-indicator in the user interface to move by a predefined amount, such as by a single user interface element). In accordance with a determination that the first input meets the unitary-movement criteria, the electronic device optionally moves selection-indicator 1008 by a predefined amount in the user interface (e.g., a predefined amount not based on the respective value for the selection-indicator movement metric. In some embodiments, the respective value for the movement metric is optionally less than a value that would cause the selection-indicator in the user interface to be moved by the predefined amount, or greater than a value that would cause the selection-indicator in the user interface to be moved by the predefined amount). In accordance with a determination that the first input does not meet the unitary-movement criteria, the electronic device optionally moves selection-indicator 1008 in accordance with the respective value of the movement metric associated with the first input (e.g., the electronic device moves the selection-indicator in the user interface by an amount defined by the magnitude of the movement of the contact on the touch-sensitive surface, as described with reference to FIG. 10B. In some embodiments, this is optionally greater than the predefined amount that the selection-indicator would move if the first input met the unitary movement criteria, or less than the predefined amount that the selection-indicator would move if the first input met the unitary movement criteria).

In some embodiments, movement of selection-indicator 1008 by a predefined amount occurs when the input detected on touch-sensitive surface 451 is a "quick swipe"-type input. In other words, in some embodiments, the unitary-movement criteria include a criterion that is met when liftoff of contact 1001 is detected within a first time period (e.g., 0.2, 0.4, or 1 seconds) of touchdown of the contact, and movement of the contact is greater than a first movement threshold (e.g., 0.1, 0.2 or 0.5 cm) but less than a second movement threshold (e.g., 1 or 2 cm). In some embodiments, the first movement threshold and the second movement threshold are defined in terms of contact movement needed on touch-sensitive surface 451 to move selection-indicator 1008 by a single UI element in the user interface (e.g., if 1 cm of movement of the contact on the touch-sensitive surface is needed to move the selection-indicator from a first UI element to a second UI element that is adjacent to the first UI element, the first movement threshold is optionally a first percentage of 1 cm (e.g., 10% of 1 cm), and the second movement threshold is optionally a second percentage of 1 cm (e.g., 100% of 1 cm)).

In some embodiments, moving selection-indicator 1008 by the predefined amount, and moving the selection-indicator in accordance with the respective value of the movement metric, both comprise moving the selection-indicator in accordance with a direction of a movement of contact 1001 on touch-sensitive surface 451 (e.g., contact movement to the right on the touch-sensitive surface optionally moves the selection-indicator to the right, whether by the predefined amount or by the respective value of the movement metric— the same optionally holds for any direction of contact movement on the touch-sensitive surface).

In some embodiments, the plurality of user interface elements 1002, 1004, and 1006, include a plurality of navigation columns (e.g., plurality of navigation columns adjacent to each other, each column including a plurality of vertically-arranged selectable items, such as content items to watch, applications to launch, etc.), and moving selection-indicator 1008 by the predefined amount comprises moving the selection-indicator from a first navigation column to a second navigation column, adjacent to the first navigation column.

In some embodiments, the plurality of user interface elements 1002, 1004, and 1006, include a plurality of images, and moving selection-indicator 1008 by the predefined amount comprises moving the selection-indicator from a first image to a second image, adjacent to the first image.

In some embodiments, the plurality of user interface elements 1002, 1004, and 1006, include a plurality of content items in a grid arrangement (e.g., movies, television shows, applications, games, etc., arranged in a grid, and selectable to access the respective content items), and moving selection-indicator 1008 by the predefined amount comprises moving the selection-indicator from a first content item to a second content item, adjacent to the first content item.

Figure 10D:
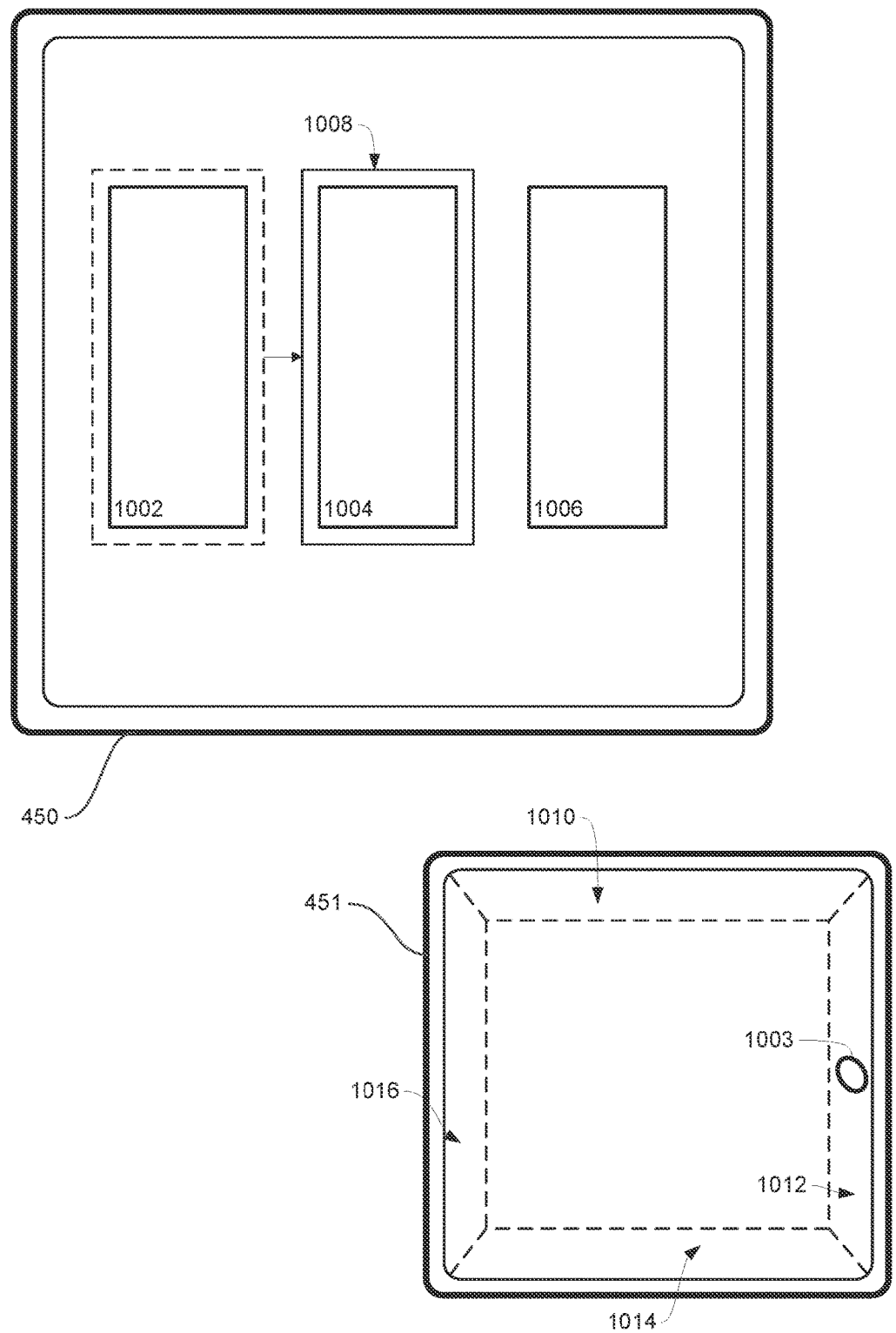
Figure 11A:
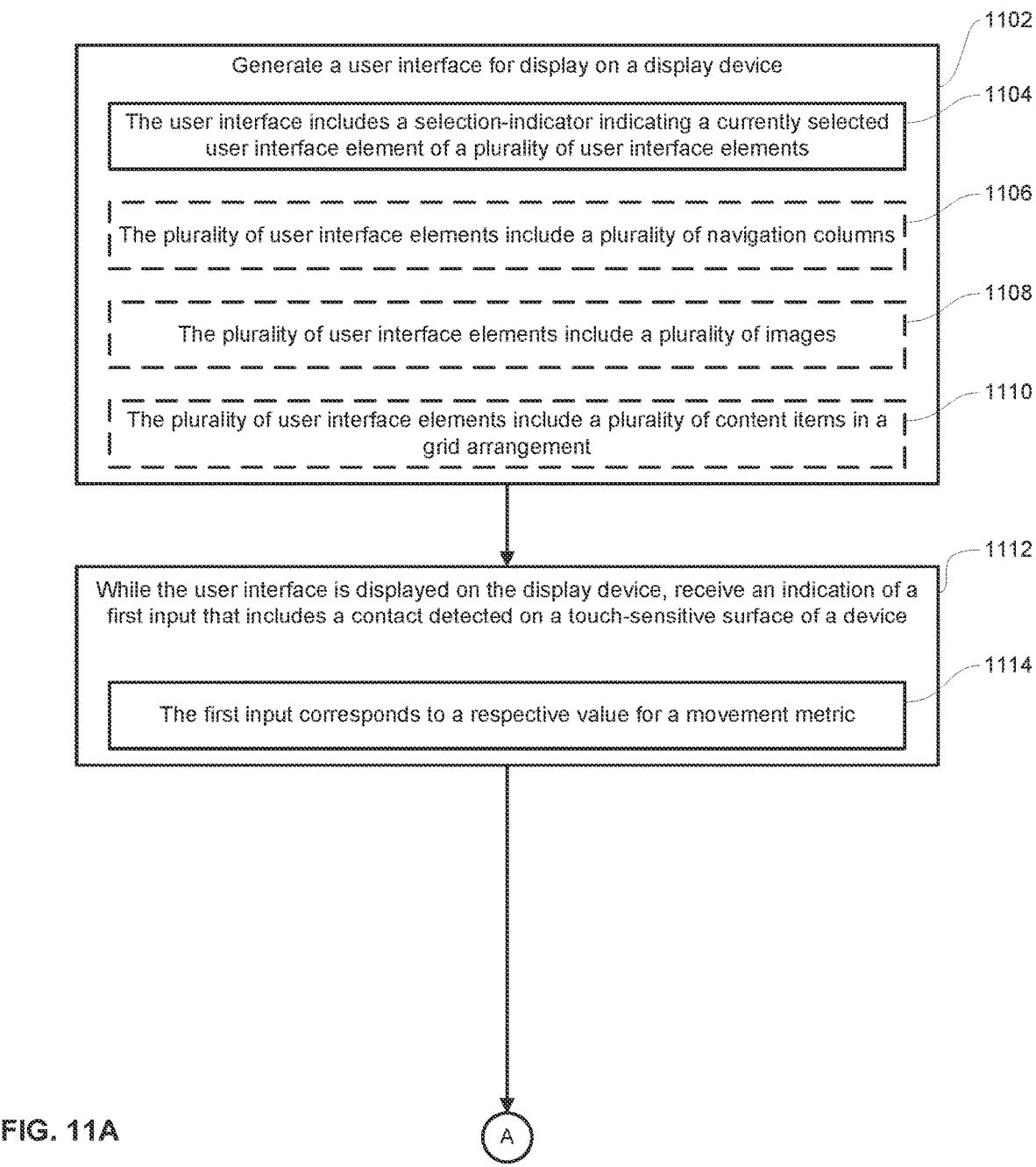
FIGS. 11A-11D are flow diagrams illustrating a method of moving a cursor in a user interface by a predefined amount in accordance with some embodiments.
Figure 11B:
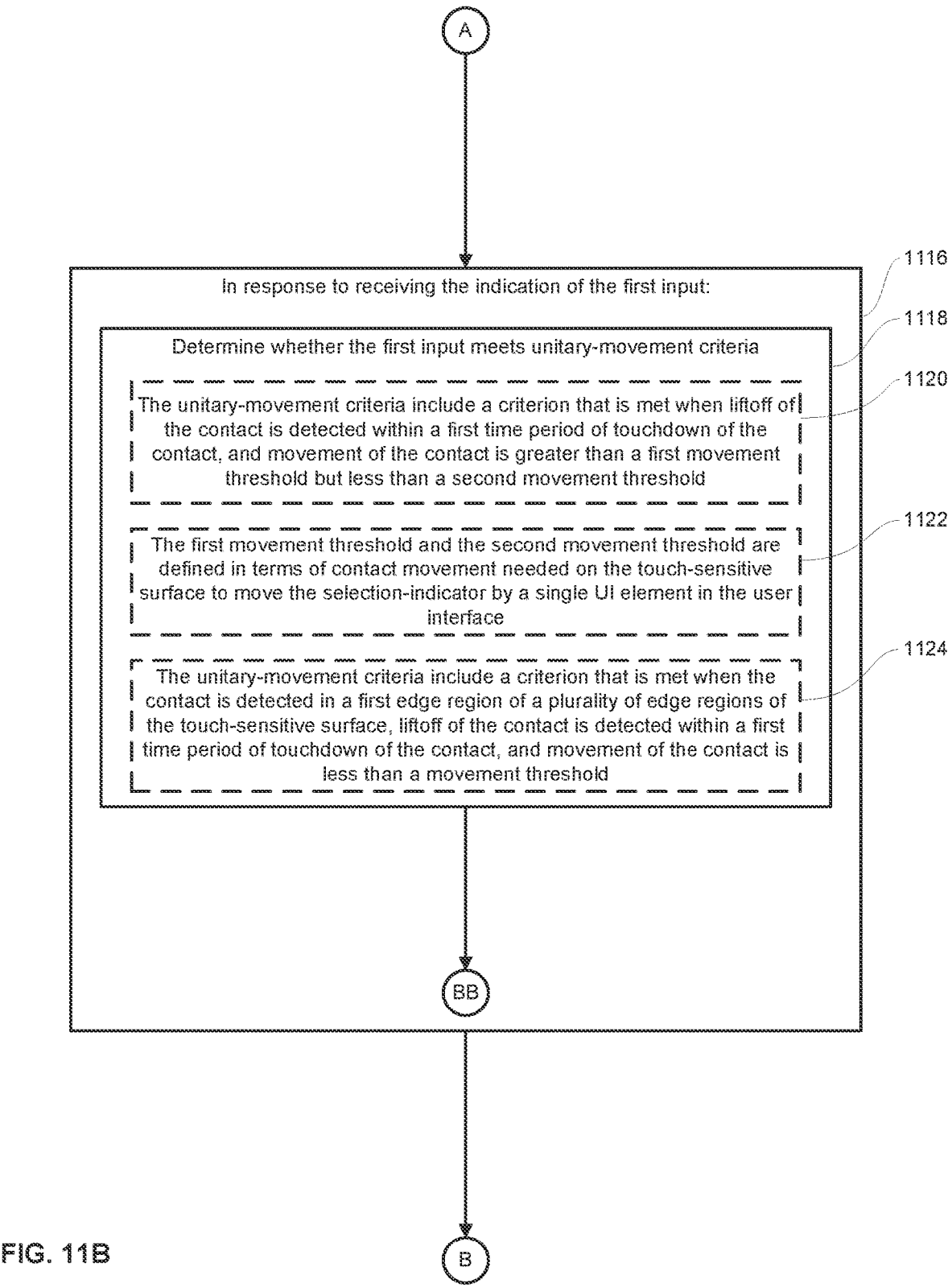
Figure 11C:
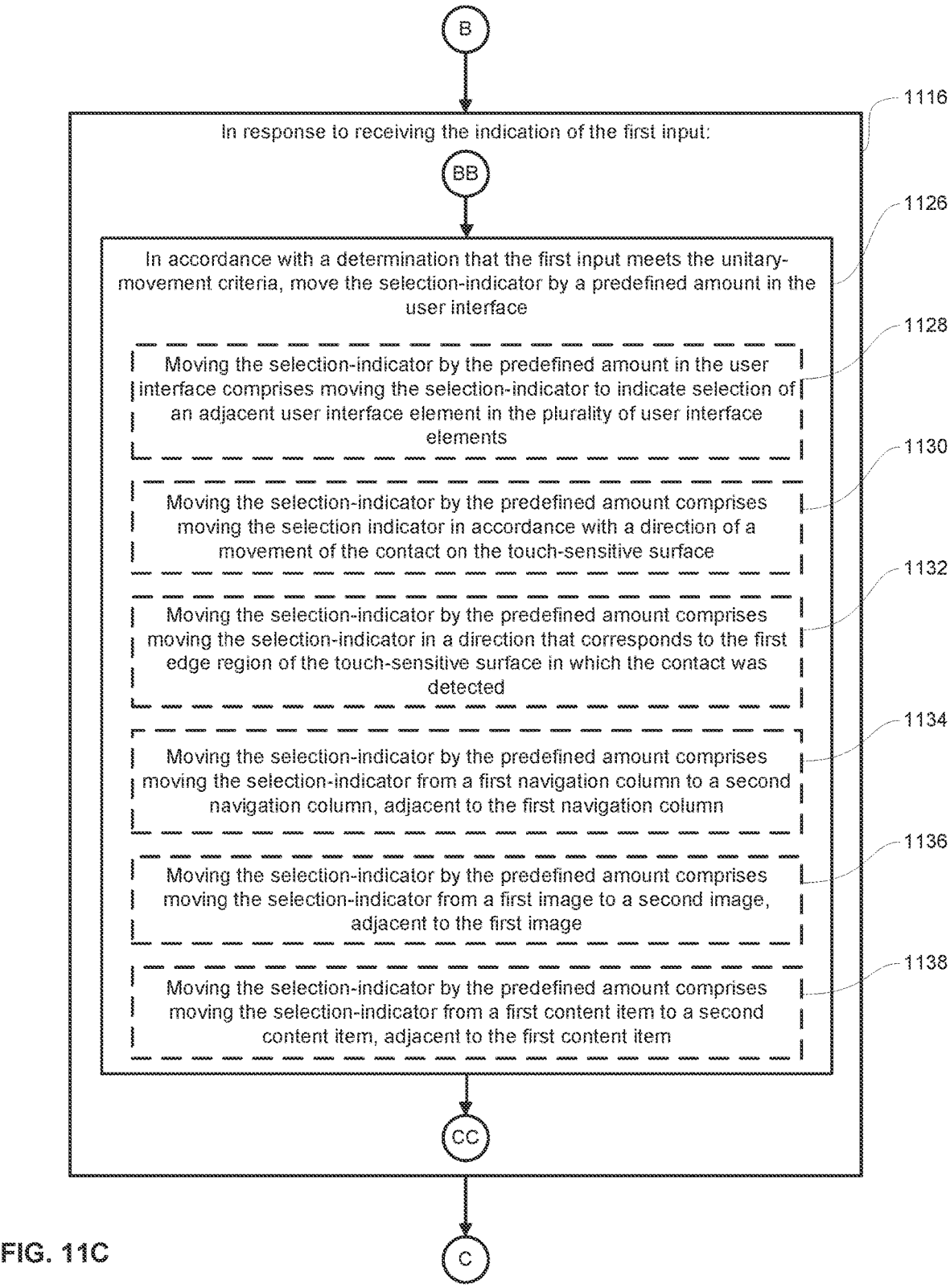
Figure 11D:
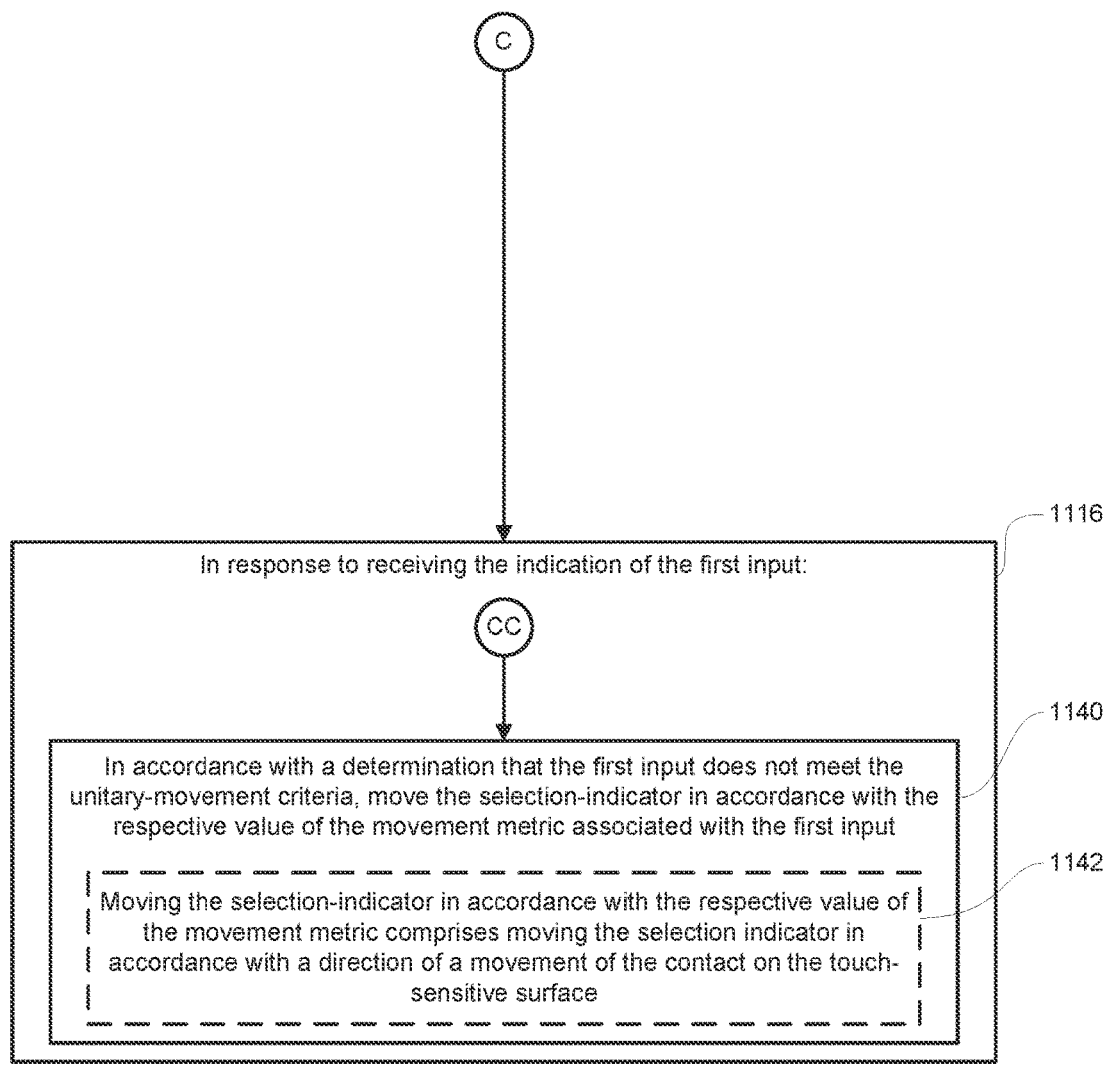

FIG. 10D illustrates another exemplary scheme for moving selection-indicator 1008 by a predefined amount in response to detecting an input on touch-sensitive surface 451. As shown in FIG. 10D, in some embodiments, selection-indicator 1008 is moved by a predefined amount (e.g., by a single user interface element) in response to detecting a tap input 1003 in one of edge regions 1010, 1012, 1014, 1016, of touch-sensitive surface 451. For example, a tap detected in edge region 1012 optionally moves selection-indicator 1008 to the right by one user interface element. Taps detected in edge regions 1010, 1014, and 1016, optionally result in movement of selection-indicator 1008 up, down, and to the left, respectively, by one user interface element.

In some embodiments, the unitary-movement criteria optionally include a criterion that is met when contact 1003 is detected in a first edge region (e.g., region 1012) of a plurality of edge regions (e.g., regions 1010, 1012, 1014, and 1016) of touch-sensitive surface 451 (e.g., a top, bottom, right, and/or left outer 5%, 10% or 20% of the touch-sensitive surface), liftoff of the contact is detected within a first time period (e.g., 0.1, 0.3 or 0.5 seconds) of touchdown of the contact (e.g., a tap), and movement of the contact is less than a movement threshold (e.g., less than 0.1, 0.3 or 0.5 cm). In some embodiments, moving selection-indicator 1008 by the predefined amount comprises moving the selection-indicator in a direction that corresponds to the first edge region (e.g., region 1012) of touch-sensitive surface 451 in which contact 1003 was detected (e.g., tapping in the right edge region of the touch-sensitive surface optionally moves the selection-indicator in the UI to the right by the predefined amount).

FIGS. 11A-11D are flow diagrams illustrating a method 1100 of moving a cursor in a user interface by a predefined amount in accordance with some embodiments. The method 1100 is optionally performed at an electronic device such as device 500 as described above with reference to FIG. 5, including a set top box or other user interface generating device that is in communication with a remote control and a display device. Some operations in method 1100 are, optionally, combined and/or the order of some operations is, optionally, changed.

As described below, the method 1100 provides ways in which a device optionally moves a cursor in a user interface by a predefined amount in response to specified inputs. The method reduces the cognitive burden on a user when interacting with a user interface on the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 500 in FIG. 5) with one or more processors generates (1102) a user interface for display on a display device (e.g., a television or other display device). In some embodiments, the user interface includes a selection-indicator (e.g., a glow, highlight or outline around a currently selected user interface element, such as indicator 1008 in FIG. 10A) indicating a currently selected user interface element of a plurality of user interface elements (1104) (e.g., user interface elements 1002, 1004, and 1006 in FIG. 10A). In some embodiments, the plurality of user interface elements include a plurality of navigation columns (1106) (e.g., plurality of navigation columns adjacent to each other, each column including a plurality of vertically-arranged selectable items, such as content items to watch, applications to launch, etc.). In some embodiments, the plurality of user interface elements include a plurality of images (1108). In some embodiments, the plurality of user interface elements include a plurality of content items in a grid arrangement (1110) (e.g., movies, television shows, games, etc., arranged in a grid, and selectable to access the respective content items).

In some embodiments, while the user interface is displayed on the display device, the device receives (1112) an indication of a first input that includes a contact (e.g., contact 1001 in FIG. 10B) detected on a touch-sensitive surface of a device (e.g., a touch-sensitive surface of a remote control or a portable multifunction device with a touchscreen display, such as touch-sensitive surface 451). In some embodiments, the first input corresponds to a respective value for a movement metric (1114) (e.g., a metric expressing how much the selection-indicator in the user interface should move based on how much the contact on the touch-sensitive surface moves. In other words, a metric based on a relationship of contact movement to selection-indicator movement). For example, the movement of contact 1001 on touch-sensitive surface 451 in FIG. 10B optionally corresponds to a value for a movement metric for moving selection-indicator 1008 in the user interface.

In some embodiments, in response to receiving the indication of the first input (1116) (e.g., the input defined by movement of contact 1001 in FIG. 10B), the device determines (1118) whether the first input meets unitary-movement criteria (e.g., criteria that, when met, cause the selection-indicator in the user interface (e.g., indicator 1008 in FIG. 10B) to move by a predefined amount, such as by a single user interface element). In some embodiments, the unitary-movement criteria include a criterion that is met when liftoff of the contact (e.g., contact 1001 in FIG. 10B) is detected within a first time period (e.g., 0.2, 0.4, or 1 seconds) of touchdown of the contact, and movement of the contact is greater than a first movement threshold (e.g., 0.1, 0.2 or 0.5 cm) but less than a second movement threshold (1120) (e.g., 1 or 2 cm). In some embodiments, the first movement threshold and the second movement threshold are defined in terms of contact movement needed on the touch-sensitive surface to move the selection-indicator by a single UI element in the user interface (1122) (e.g., if 1 cm of movement of the contact on the touch-sensitive surface is needed to move the selection-indicator from a first UI object (e.g., user interface element 1002) to a second UI object (e.g., user interface element 1004) that is adjacent to the first UI object, the first movement threshold is optionally a first percentage of 1 cm (e.g., 10% of 1 cm), and the second movement threshold is optionally a second percentage of 1 cm (e.g., 100% of 1 cm)).

In some embodiments, the unitary-movement criteria include a criterion that is met when the contact (e.g., contact 1003 in FIG. 10D) is detected in a first edge region (e.g., region 1012 in FIG. 10D) of a plurality of edge regions of the touch-sensitive surface (e.g., a top, bottom, right, and/or left outer 5%, 10% or 20% of the touch-sensitive surface, as illustrated in FIG. 10D), liftoff of the contact is detected within a first time period (e.g., 0.1, 0.3 or 0.5 seconds) of touchdown of the contact (e.g., a tap), and movement of the contact is less than a movement threshold (1124) (e.g., less than 0.1, 0.3 or 0.5 cm).

In some embodiments, in accordance with a determination that the first input meets the unitary-movement criteria, the device moves (1126) the selection-indicator by a predefined amount in the user interface (e.g., a predefined amount not based on the respective value for the selection-indicator movement metric. In some embodiments, the respective value for the movement metric can be less than a value that would cause the selection-indicator in the user interface to be moved by one unit, or greater than a value that would cause the selection-indicator in the user interface to be moved by one unit). In some embodiments, moving the selection-indicator by the predefined amount in the user interface comprises moving the selection-indicator to indicate selection of an adjacent user interface element in the plurality of user interface elements (1128) (e.g., as illustrated in FIGS. 10C and 10D). In some embodiments, moving the selection-indicator by the predefined amount comprises moving the selection-indicator in accordance with a direction of a movement of the contact on the touch-sensitive surface (1130) (e.g., contact movement to the right on the touch-sensitive surface will move the selection-indicator to the right, as illustrated in FIG. 10C). In some embodiments, moving the selection-indicator by the predefined amount comprises moving the selection-indicator in a direction that corresponds to the first edge region of the touch-sensitive surface in which the contact was detected (1132) (e.g., tapping in the right edge region of the touch-sensitive surface will move the selection-indicator in the UI to the right by the predefined amount, as illustrated in FIG. 10D).

In some embodiments, moving the selection-indicator by the predefined amount comprises moving the selection-indicator from a first navigation column to a second navigation column, adjacent to the first navigation column (1134). In some embodiments, moving the selection-indicator by the predefined amount comprises moving the selection-indicator from a first image to a second image, adjacent to the first image (1136). In some embodiments, moving the selection-indicator by the predefined amount comprises moving the selection-indicator from a first content item to a second content item, adjacent to the first content item (1138).

In some embodiments, in accordance with a determination that the first input does not meet the unitary-movement criteria, the device moves (1140) the selection-indicator in accordance with the respective value of the movement metric associated with the first input (e.g., moving the selection-indicator in the user interface by an amount defined by the magnitude of movement of the contact on the touch-sensitive surface. In some embodiments, this is optionally beyond the predefined amount that the selection-indicator would move if the first input met the unitary movement criteria). Such movement of the selection-indicator in accordance with the respective value of the movement metric associated with the first input is illustrated in FIG. 10B. In some embodiments, moving the selection-indicator in accordance with the respective value of the movement metric comprises moving the selection-indicator in accordance with a direction of a movement of the contact on the touch-sensitive surface (1142) (e.g., contact movement to the right on the touch-sensitive surface will move the selection-indicator to the right, as illustrated in FIG. 10B).

It should be understood that the particular order in which the operations in FIGS. 11A-11D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300 and 1500) are also applicable in an analogous manner to method 1100 described above with respect to FIGS. 11A-11D. For example, the user interface, display device and touch-sensitive surface described above with reference to method 1100 optionally have one or more of the characteristics of the user interfaces, display devices and touch-sensitive surfaces described herein with reference to other methods described herein (e.g., methods 700, 900, 1300 and 1500). For brevity, these details are not repeated here.

The operations in the information processing methods described above are, optionally, implemented by running one or more functional modules in an information processing apparatus such as general purpose processors (e.g., as described above with respect to FIGS. 1A, 3 and 5) or application specific chips.

The operations described above with reference to FIGS. 11A-11D are, optionally, implemented by components depicted in FIGS. 1A-1B. For example, generation operation 1102, receiving operation 1112, determination operation 1118, and moving operations 1126 and 1140 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Grip Recognition

A device with a touch-sensitive surface (e.g., a remote control with a touch-sensitive surface) may be used to interact with an electronic device. Some people using the device (e.g., the remote) to interact with the electronic device may hold the device differently than other people using the device. This difference in grip may result in users providing input to the touch-sensitive surface that, while meant to be the same input, looks slightly different based on the grip of the device (e.g., whether the user is holding the device in the user's right hand or the user's left hand, and whether the user is providing the input to the touch-sensitive surface using the user's right hand or the user's left hand). Thus, it can be beneficial to interpret inputs to the touch-sensitive surface based on the grip of the user to improve the accuracy of gesture detection (e.g., by more accurately determining user intent for a gesture based on a grip of the user while detecting the gesture). The embodiments described below provide ways to allow for such input interpretation by an electronic device. Enhancing interactions with a device in this way reduces the amount of time needed by a user to perform operations, and thus reduces the power usage of the device and increases battery life for battery-powered devices.

FIGS. 12A-12E illustrate exemplary ways in which inputs on a touch-sensitive surface are interpreted based on the grip of a user in accordance with some embodiments of the disclosure. The embodiments in these figures are used to illustrate the processes described below, including the processes described with reference to FIGS. 13A-13C.

Figure 12A:
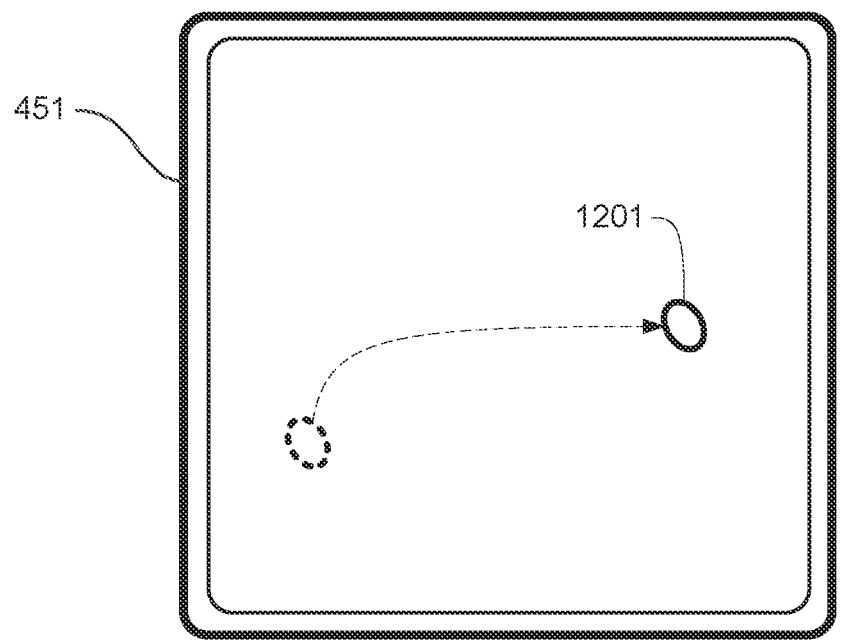
FIGS. 12A-12E illustrate exemplary ways in which inputs on a touch-sensitive surface are interpreted based on the grip of a user in accordance with some embodiments of the disclosure.

FIG. 12A illustrates an exemplary input detected on touch-sensitive surface 451 of a device. Touch-sensitive surface 451 is optionally included in a device (e.g., a touch-sensitive surface of a remote control or a portable multifunction device with a touchscreen display, such as remote 510 in FIG. 5). The device is optionally used to interact with an electronic device, such as device 500 in FIG. 5. Additionally, the device is optionally a device that is held in one hand, and a user is optionally able to provide input to touch-sensitive surface 451 using a finger on the same hand in which the user is holding the device. For example, the device is optionally a remote control having touch-sensitive surface 451. The remote control is optionally held in either the user's right hand or left hand, and input to touch-sensitive surface 451 on the remote control is optionally provided by the thumb, for example, of the hand in which the user is holding the remote control.

The input detected on touch-sensitive surface 451 optionally includes movement of contact 1201 (e.g., a finger contact or stylus contact), as illustrated. In some embodiments, contact 1201 optionally corresponds to a thumb contact, as described above.

As stated above, it can be beneficial to interpret the movement of contact 1201 based on a determined grip of the user holding a device that includes touch-sensitive surface 451, because the grip of the user optionally affects the shape of the movement of the contact. For example, a left-to-right horizontal swipe might look like the movement of contact 1201, as illustrated in FIG. 12A, when inputted by a user's right thumb when the user is holding the device that includes touch-sensitive surface 451 in the user's right hand. In such a circumstance, the electronic device (e.g., device 500 in FIG. 5) with which the device with touch-sensitive surface 451 (e.g., remote 510 in FIG. 5) interacts optionally uses knowledge of the user's grip to interpret the movement of contact 1201 to be a left-to-right horizontal swipe, despite the fact that the beginning of the movement of the contact has upward trajectory. In contrast, if the electronic device has knowledge that the user is holding the device that includes touch-sensitive surface 451 in the user's left hand, the electronic device optionally interprets the movement of contact 1201 to be more than just a left-to-right horizontal swipe, because a left-to-right horizontal swipe inputted by, for example, the user's left thumb while holding the device in the user's left hand optionally does not look like the movement of contact 1201, as illustrated in FIG. 12A.

To facilitate such grip-specific interpretations of inputs, in some embodiments, the electronic device determines a grip of a user using the device (e.g., determines whether the device that includes touch-sensitive surface 451 is being held in a user's right hand or the user's left hand). The electronic device optionally interprets the movement of the contact on the touch-sensitive surface (e.g., contact 1201 on touch-sensitive surface 451) based at least in part on the grip of the user. For example, the electronic device optionally interprets the movement of the contact as a first gesture (e.g., a horizontal swipe) if the grip is determined to be right-handed, and interprets the movement of the contact as a second gesture (e.g., a vertical swipe plus a horizontal swipe) if the grip is determined to be left-handed.

In some embodiments, determining the grip of the user using the device comprises determining the grip of the user using the device based at least in part on an orientation of the device. In some embodiments, determining the grip of the user using the device comprises determining the grip of the user using the device based on an average orientation of the device over a most recent predetermined time period (e.g., 30, 90, or 180 seconds). In some embodiments, the orientation of the device is determined based on an accelerometer or other orientation sensor in the device.

Figure 12B:
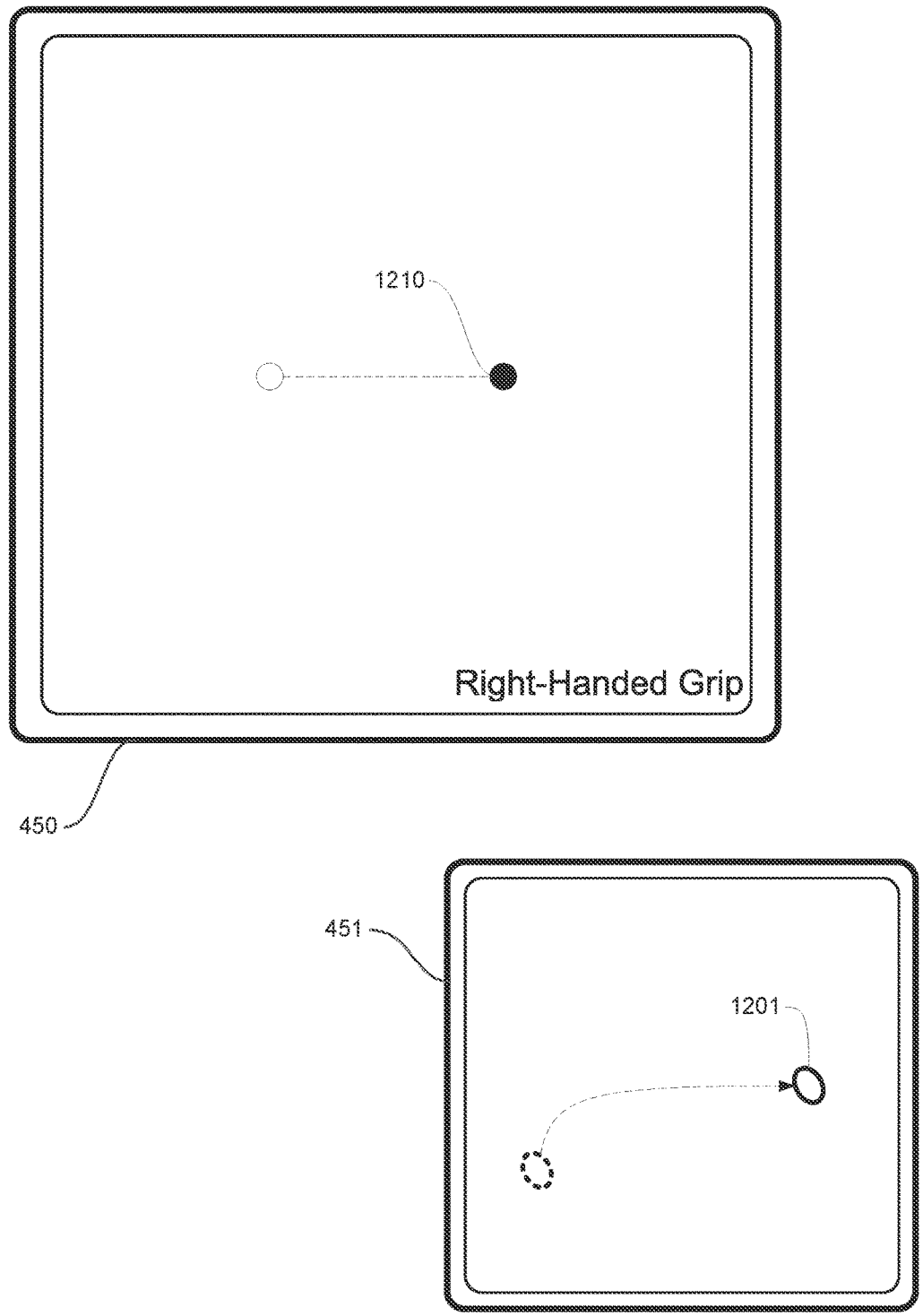
Figure 12C:
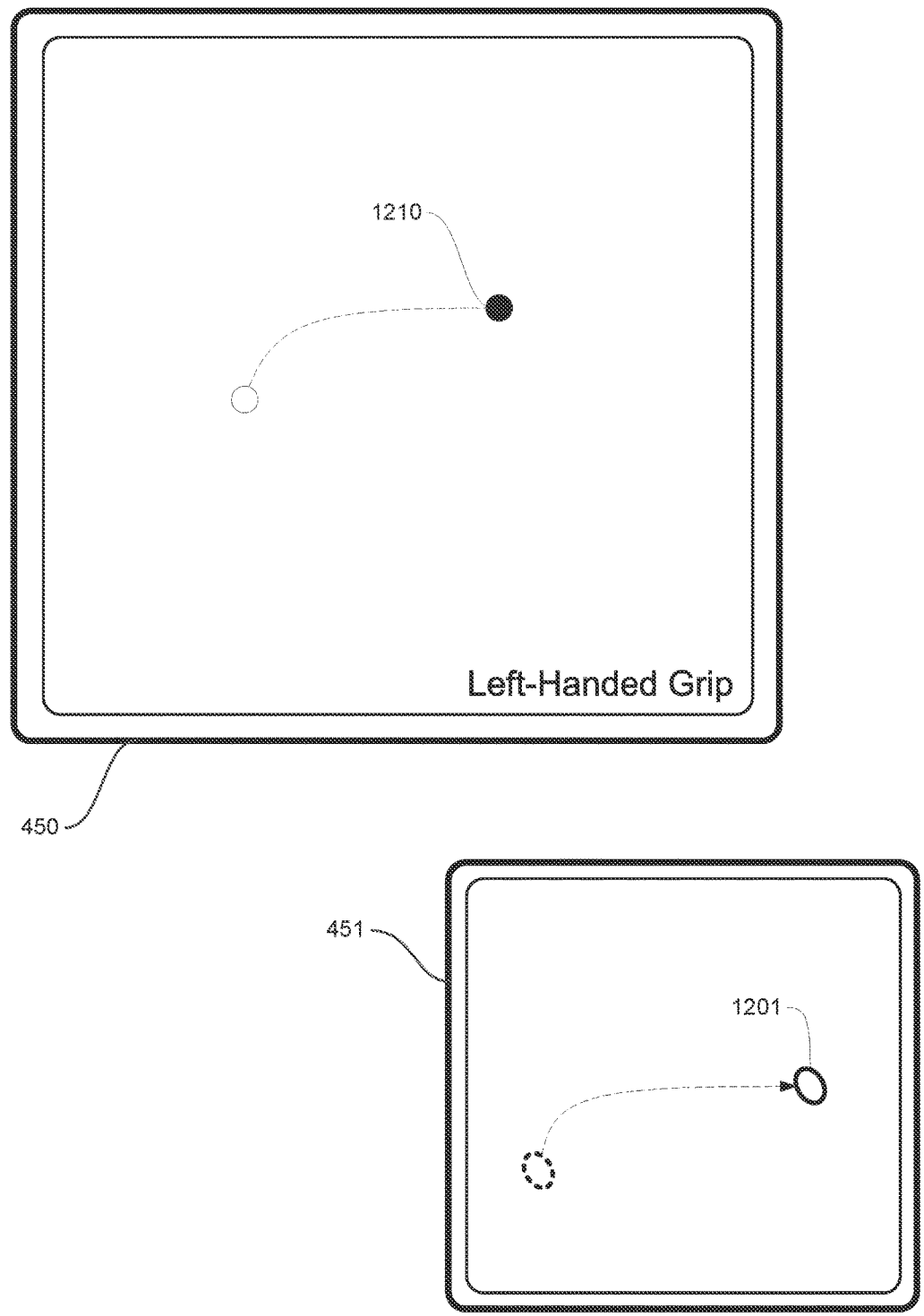

Because the electronic device optionally interprets movement of a contact differently based on a determined grip of a user, actions resulting from the movement of the contact are optionally also different based on the grip of the user, as illustrated in FIGS. 12B-12C. Thus, in some embodiments, interpreting the movement of the contact on the touch-sensitive surface (e.g., the movement of contact 1201 on touch-sensitive surface 451) based at least in part on the grip of the user comprises, in accordance with a determination that the grip is a first grip (e.g., right-handed grip, as shown in FIG. 12B), performing a first action in response to the first input, and, in accordance with a determination that the grip is a second grip (e.g., left-handed grip, as shown in FIG. 12C), different from the first grip, performing a second action in response to the first input, different from the first action. With respect to the input shown in FIG. 12A, in some embodiments, the first action is optionally a purely horizontal movement of a cursor in a user interface (e.g., a purely horizontal movement of cursor 1210 in FIG. 12B in response to the upward and rightward movement of contact 1201); the second action is optionally a vertical movement of the cursor in the user interface, followed by a horizontal movement of the cursor in the user interface (which mirrors the movement of contact 1201 on touch-sensitive surface 451, such as the upward and rightward movement of cursor 1210 in FIG. 12C in response to the upward and rightward movement of contact 1201). Thus, as illustrated in FIGS. 12B-12C, the same movement of contact 1201 on touch-sensitive surface 451 optionally produces different actions depending on the determined grip of the user.

In some embodiments, the electronic device provides feedback information for display on a display device (e.g., a television or other display device), the feedback information including information about the determined grip of the user using the device, and the interpretation of the movement of contact 1201 on touch-sensitive surface 451 (e.g., the electronic device displays feedback after interpreting the movement of the contact to inform the user of the grip/gesture detected, possibly allowing the user to correct the grip determination or the contact movement interpretation).

In some embodiments, the electronic device optionally ignores different portions of the movement of contact 1201 depending on the determined grip of the user, as will be described in more detail below.

Figure 12D:
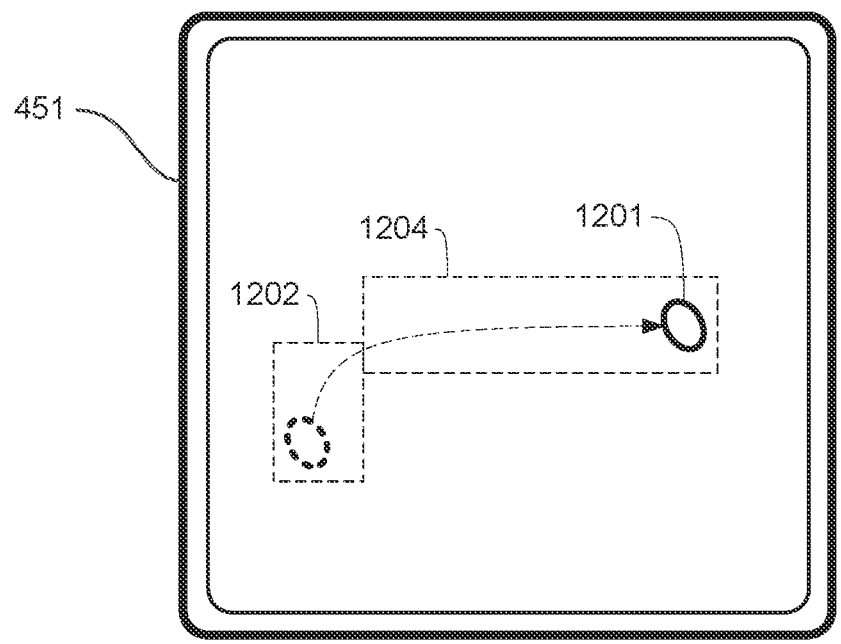

FIG. 12D illustrates an exemplary scenario in which the electronic device ignores a first portion of the movement of contact 1201. In some embodiments, interpreting the movement of contact 1201 on touch-sensitive surface 451 based at least in part on the grip of the user comprises, in accordance with a determination that the grip is a first grip (e.g., right-handed grip), ignoring a first portion 1202 of the movement of the contact. In some embodiments, the electronic device optionally ignores portion 1202 of the movement of contact 1201, and relies only on portion 1204 of the movement of the contact in interpreting the movement of the contact.

In some embodiments, the first grip comprises a right-handed grip, and ignoring the first portion of the movement of contact 1201 comprises, in accordance with a determination that the movement of the contact is from right to left on the touch-sensitive surface, ignoring an end of the movement of the contact. In some embodiments, ignoring the first portion of the movement of contact comprises, in accordance with a determination that the movement of the contact is from left to right on the touch-sensitive surface (as illustrated in FIG. 12D), ignoring a beginning (e.g., portion 1202) of the movement of the contact. For example, if the grip is right-handed, the joint of the finger (e.g., thumb) providing the contact will optionally be to the right of the touch-sensitive surface on the device. The one or more portions of the first input detected at a location on the touch-sensitive surface far from the joint (e.g., portion 1202 in FIG. 12D) are optionally distorted due to reaching the limit of the finger's extension—those portions are optionally ignored.

Figure 12E:
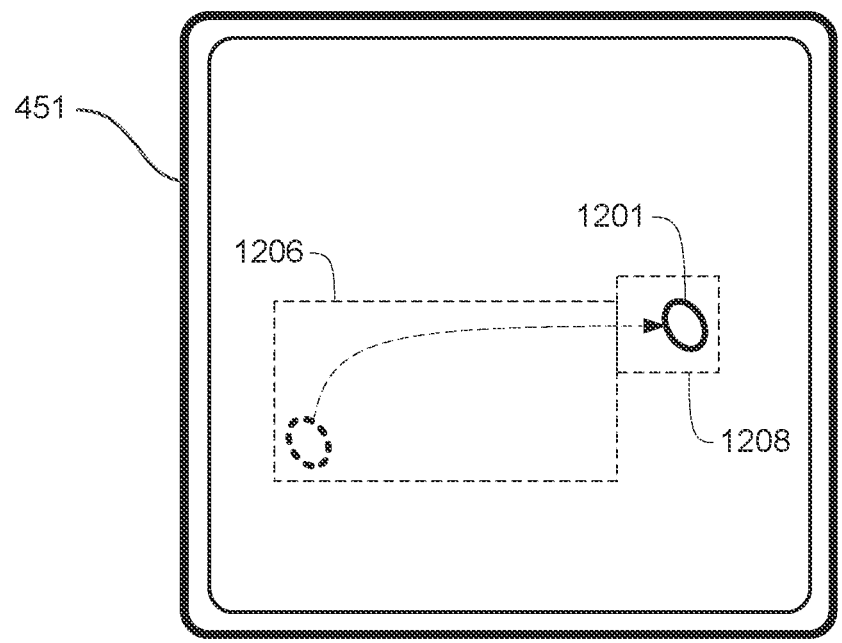

FIG. 12E illustrates an exemplary scenario in which the electronic device ignores a second portion of the movement of contact 1201. In some embodiments, interpreting the movement of contact 1201 on touch-sensitive surface 451 based at least in part on the grip of the user comprises, in accordance with a determination that the grip is a second grip (e.g., left-handed grip), different from the first grip, ignoring a second portion 1208 of the movement of contact 1201, different from the first portion 1202 of the movement of the contact. In some embodiments, the electronic device optionally ignores portion 1208 of the movement of contact 1201, and relies only on portion 1206 of the movement of the contact in interpreting the movement of the contact.

In some embodiments, the second grip comprises a left-handed grip, and ignoring the second portion of the movement of contact 1201 comprises, in accordance with a determination that the movement of the contact is from right to left on the touch-sensitive surface, ignoring a beginning of the movement of the contact. In some embodiments, ignoring the second portion of the movement of the contact comprises, in accordance with a determination that the movement of the contact is from left to right on the touch-sensitive surface (as illustrated in FIG. 12E), ignoring an end (e.g., portion 1208) of the movement of the contact. For example, if the grip is left-handed, the joint of the finger (e.g., thumb) providing the contact will optionally be to the left of the touch-sensitive surface on the device. The one or more portions of the first input detected at a location on the touch-sensitive surface far from the joint (e.g., portion 1208 in FIG. 12E) are optionally distorted due to reaching the limit of the finger's extension—those portions are optionally ignored.

Figure 13A:
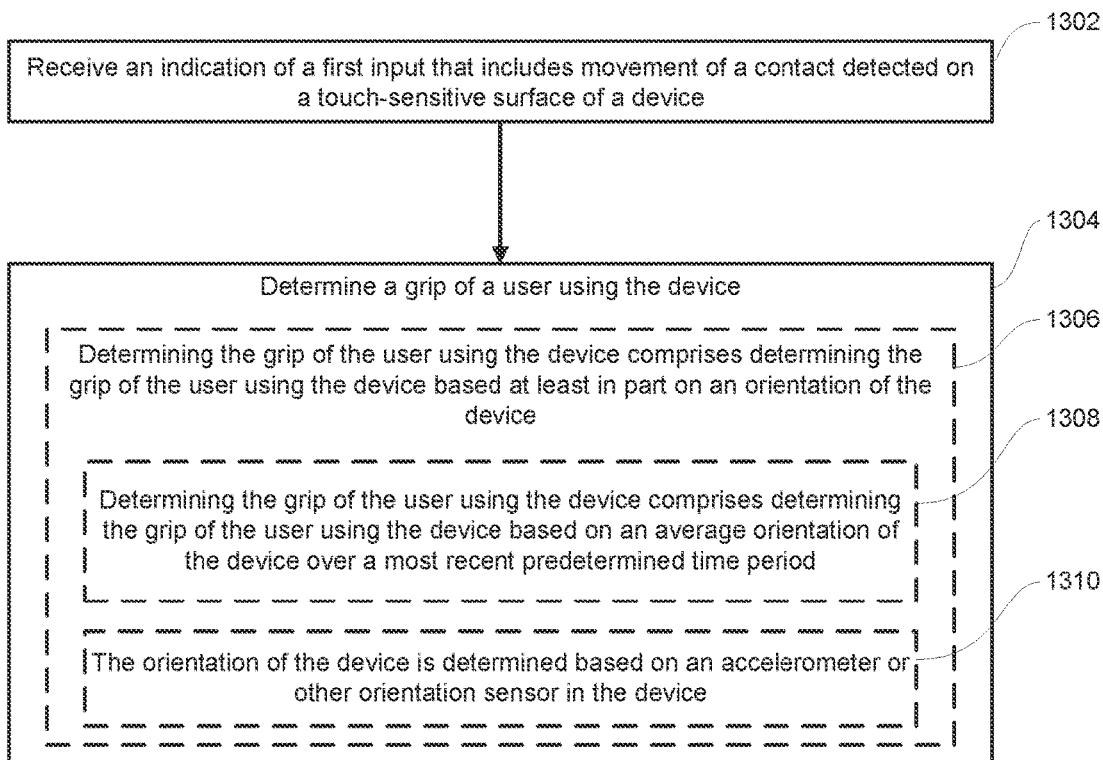
FIGS. 13A-13C are flow diagrams illustrating a method of interpreting an input detected on a touch-sensitive surface based on the grip of a user in accordance with some embodiments.
Figure 13B:
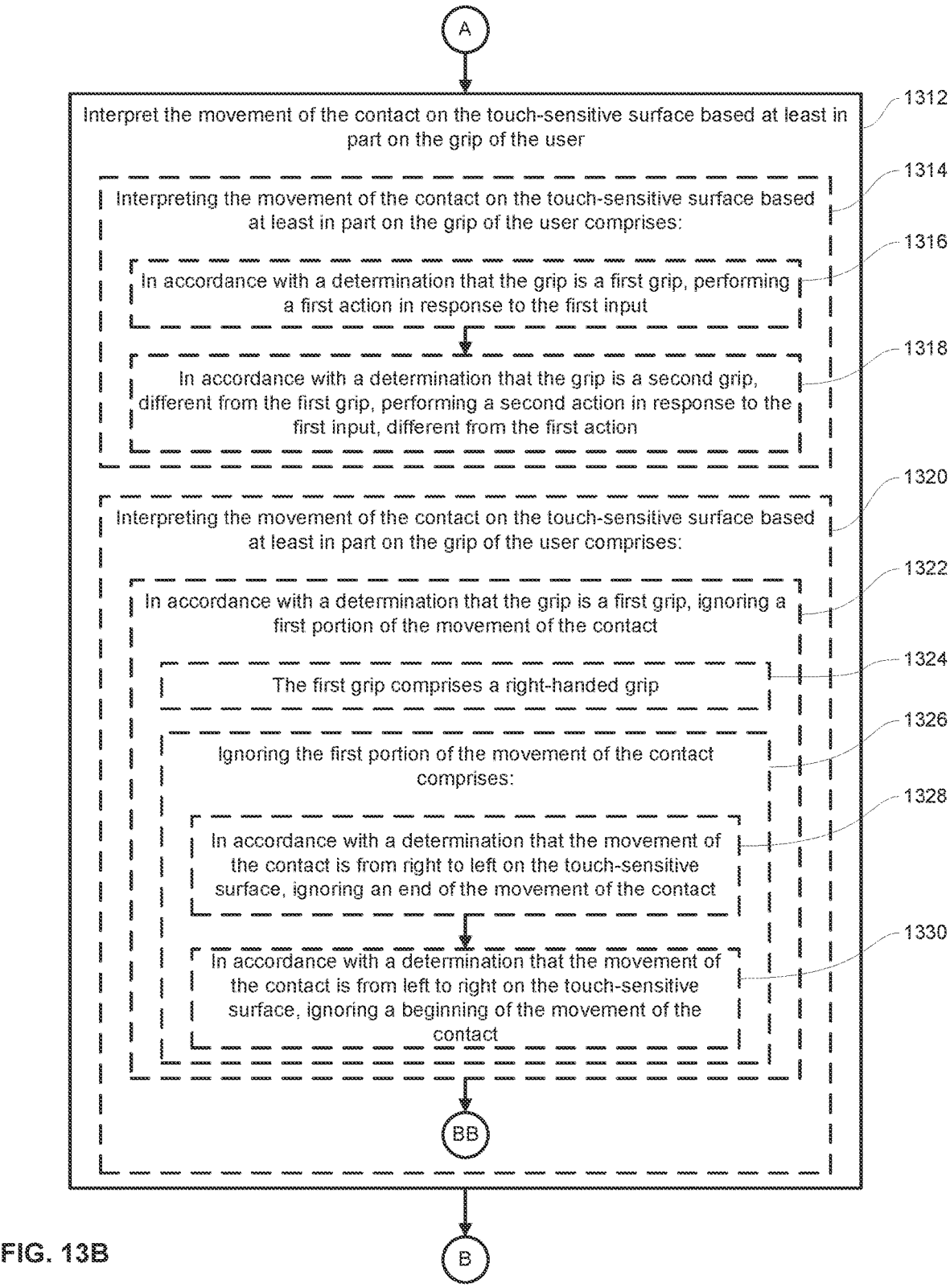
Figure 13C:
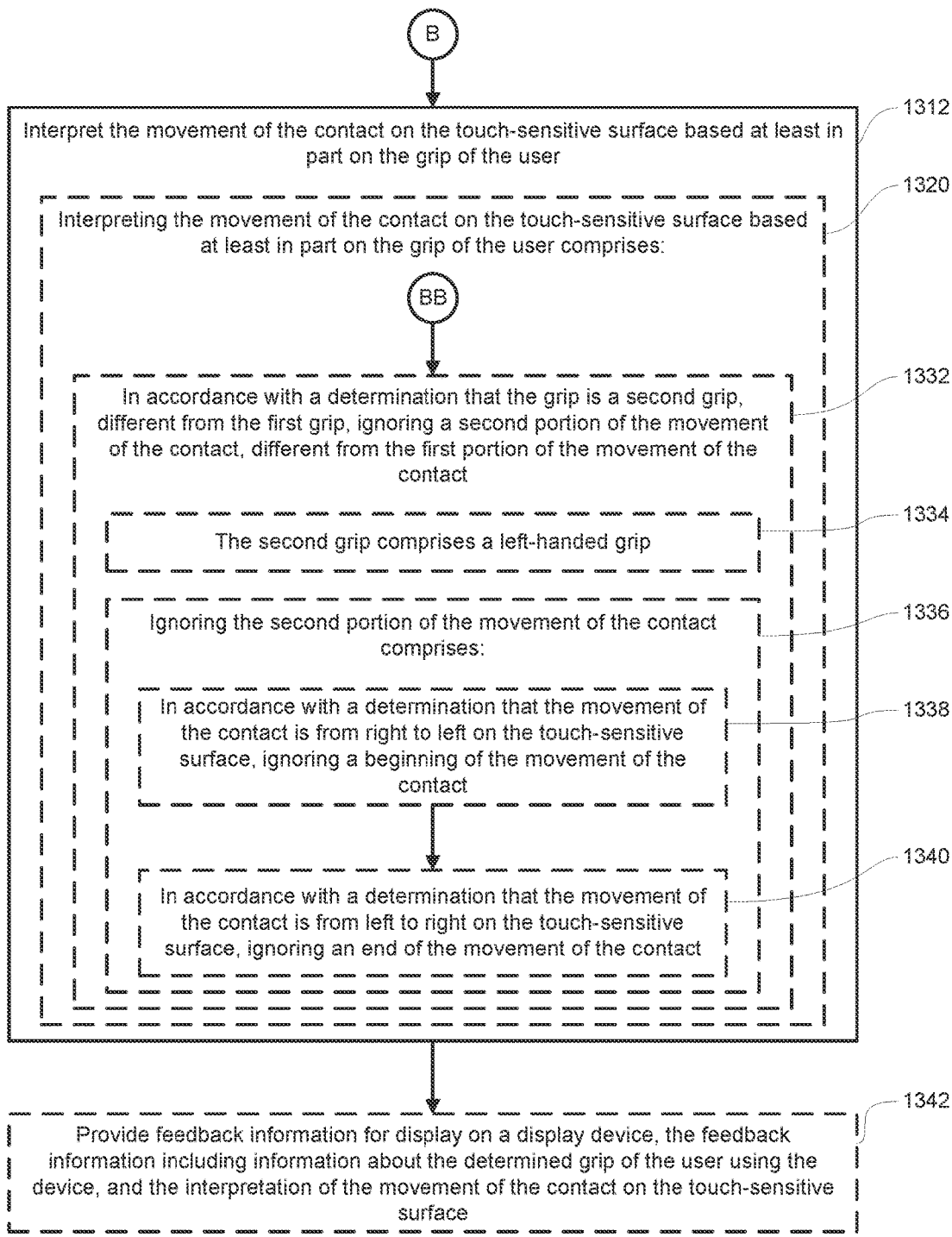

FIGS. 13A-13C are flow diagrams illustrating a method 1300 of interpreting an input detected on a touch-sensitive surface based on the grip of a user in accordance with some embodiments. The method 1300 is optionally performed at an electronic device such as device 500 as described above with reference to FIG. 5, including a set top box or other user interface generating device that is in communication with a remote control and a display device. Some operations in method 1300 are, optionally, combined and/or the order of some operations is, optionally, changed.

As described below, the method 1300 provides ways in which inputs on a touch-sensitive surface are optionally interpreted based on the grip of a user. The method reduces the cognitive burden on a user when interacting with a user interface on the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 500 in FIG. 5) with one or more processors receives (1302) an indication of a first input that includes movement of a contact (e.g., a finger contact or stylus contact, such as contact 1201 in FIG. 12A. In some embodiments, the contact optionally corresponds to a thumb contact) detected on a touch-sensitive surface of a device (e.g., a touch-sensitive surface of a remote control or a portable multifunction device with a touchscreen display, such as touch-sensitive surface 451 in FIG. 12A).

In some embodiments, the device determines (1304) a grip of a user using the device (e.g., the device determines whether the device is being held in the user's right hand or the user's left hand). In some embodiments, determining the grip of the user using the device comprises determining the grip of the user using the device based at least in part on an orientation of the device (1306). In some embodiments, determining the grip of the user using the device comprises determining the grip of the user using the device based on an average orientation of the device over a most recent predetermined time period (1308) (e.g., 30, 90, or 180 seconds).

In some embodiments, the orientation of the device is determined based on an accelerometer or other orientation sensor in the device (1310).

In some embodiments, the device interprets (1312) the movement of the contact (e.g., contact 1201 in FIG. 12A) on the touch-sensitive surface based at least in part on the grip of the user (e.g., the device interprets the movement of the contact as a first gesture (e.g., horizontal swipe) if the grip is determined to be right-handed, and interprets the movement of the contact as a second gesture (e.g., vertical swipe+horizontal swipe) if the grip is determined to be left-handed). In some embodiments, interpreting the movement of the contact on the touch-sensitive surface based at least in part on the grip of the user comprises (1314), in accordance with a determination that the grip is a first grip (e.g., a right-handed grip), performing (1316) a first action in response to the first input. In some embodiments, interpreting the movement of the contact on the touch-sensitive surface based at least in part on the grip of the user comprises (1314), in accordance with a determination that the grip is a second grip (e.g., a left-handed grip), different from the first grip, performing (1318) a second action in response to the first input, different from the first action. For example, the movement of contact 1201 illustrated in FIG. 12A optionally results in performance of a first action if the user's grip is determined to be right-handed, and a second action if the user's grip is determined to be left-handed.

In some embodiments, interpreting the movement of the contact on the touch-sensitive surface based at least in part on the grip of the user comprises (1320), in accordance with a determination that the grip is a first grip (e.g., a right-handed grip), ignoring (1322) a first portion (e.g., portion 1202 in FIG. 12D) of the movement of the contact. In some embodiments, the first grip comprises a right-handed grip (1324). In some embodiments, ignoring the first portion of the movement of the contact comprises (1326), in accordance with a determination that the movement of the contact is from right to left on the touch-sensitive surface, ignoring (1328) an end of the movement of the contact. In some embodiments, ignoring the first portion of the movement of the contact comprises (1326), in accordance with a determination that the movement of the contact is from left to right on the touch-sensitive surface, ignoring (1330) a beginning (e.g., portion 1202 in FIG. 12D) of the movement of the contact (e.g., if the grip is right-handed, the joint of the finger (e.g., thumb) providing the contact is optionally to the right of the touch-sensitive surface on the device. The portions of the first input detected at a location on the touch-sensitive surface far from the joint (e.g., portion 1202 in FIG. 12D) are optionally distorted due to reaching the limit of the finger's extension. Those portions are optionally ignored). The remaining portions of the first input (e.g., portion 1204 in FIG. 12D) are optionally not ignored.

In some embodiments, interpreting the movement of the contact on the touch-sensitive surface based at least in part on the grip of the user comprises (1320), in accordance with a determination that the grip is a second grip (e.g., a left-handed grip), different from the first grip, ignoring (1332) a second portion (e.g., portion 1208 in FIG. 12E) of the movement of the contact, different from the first portion of the movement of the contact. In some embodiments, the second grip comprises a left-handed grip (1334). In some embodiments, ignoring the second portion of the movement of the contact comprises (1336), in accordance with a determination that the movement of the contact is from right to left on the touch-sensitive surface, ignoring (1338) a beginning of the movement of the contact. In some embodiments, ignoring the second portion of the movement of the contact comprises (1336), in accordance with a determination that the movement of the contact is from left to right on the touch-sensitive surface, ignoring (1340) an end (e.g., portion 1208 in FIG. 12E) of the movement of the contact. For example, if the grip is left-handed, the joint of the finger (e.g., thumb) providing the contact is optionally to the left of the touch-sensitive surface on the device. The portions of the first input detected at a location on the touch-sensitive surface far from the joint are optionally distorted due to reaching the limit of the finger's extension. Those portions are optionally ignored. The remaining portions of the first input (e.g., portion 1206 in FIG. 12E) are optionally not ignored.

In some embodiments, the device provides (1342) feedback information for display on a display device (e.g., a television or other display device), the feedback information including information about the determined grip of the user using the device, and the interpretation of the movement of the contact on the touch-sensitive surface (e.g., the electronic device displays feedback after interpreting the movement of the contact to inform the user of the grip/gesture detected, possibly allowing the user to correct the grip determination or the contact movement interpretation).

It should be understood that the particular order in which the operations in FIGS. 13A-13C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1500) are also applicable in an analogous manner to method 1300 described above with respect to FIGS. 13A-13C. For example, the touch-sensitive surface described above with reference to method 1300 optionally has one or more of the characteristics of the touch-sensitive surfaces described herein with reference to other methods described herein (e.g., methods 700, 900, 1100 and 1500). For brevity, these details are not repeated here.

The operations in the information processing methods described above are, optionally, implemented by running one or more functional modules in an information processing apparatus such as general purpose processors (e.g., as described above with respect to FIGS. 1A, 3 and 5) or application specific chips.

The operations described above with reference to FIGS. 13A-13C are, optionally, implemented by components depicted in FIGS. 1A-1B. For example, receiving operation 1302, determination operation 1304, and interpretation operation 1312 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Character Recognition

There are many instances in which a user may wish to provide text input to an electronic device (e.g., to provide a username or a password). Providing such text input using handwritten input is often simpler for a user than having to use an onscreen keyboard. Thus, it can be beneficial for an electronic device to provide a robust handwritten input user interface such that user interaction with the electronic device is enhanced. The embodiments described below provide ways for providing such a handwritten input user interface. Enhancing interactions with a device in this way reduces the amount of time needed by a user to perform operations, and thus reduces the power usage of the device and increases battery life for battery-powered devices.

Figure 14A:
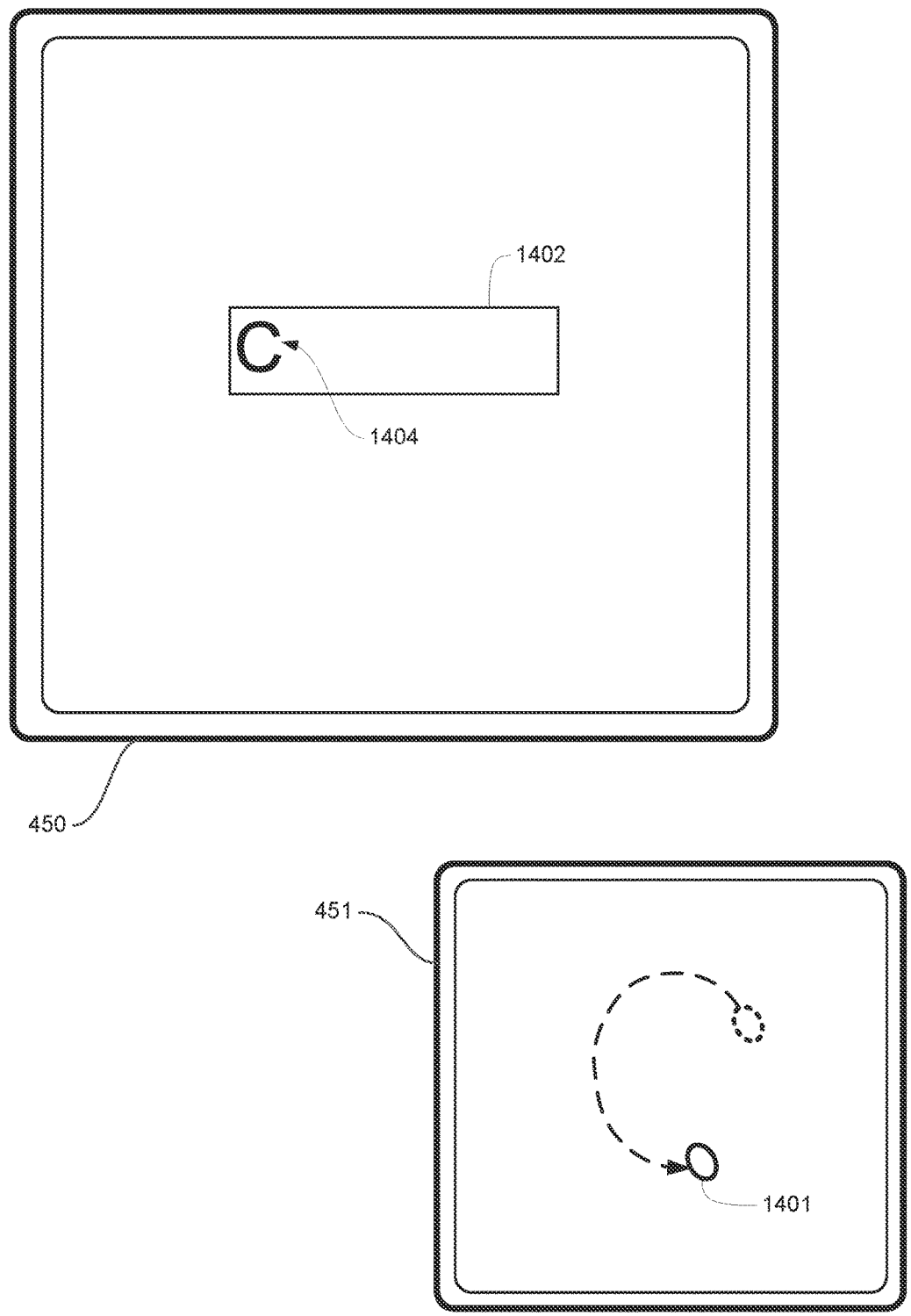
FIGS. 14A-14C illustrate exemplary ways in which an electronic device presents a handwritten input user interface according to some embodiments of the disclosure.
Figure 14B:
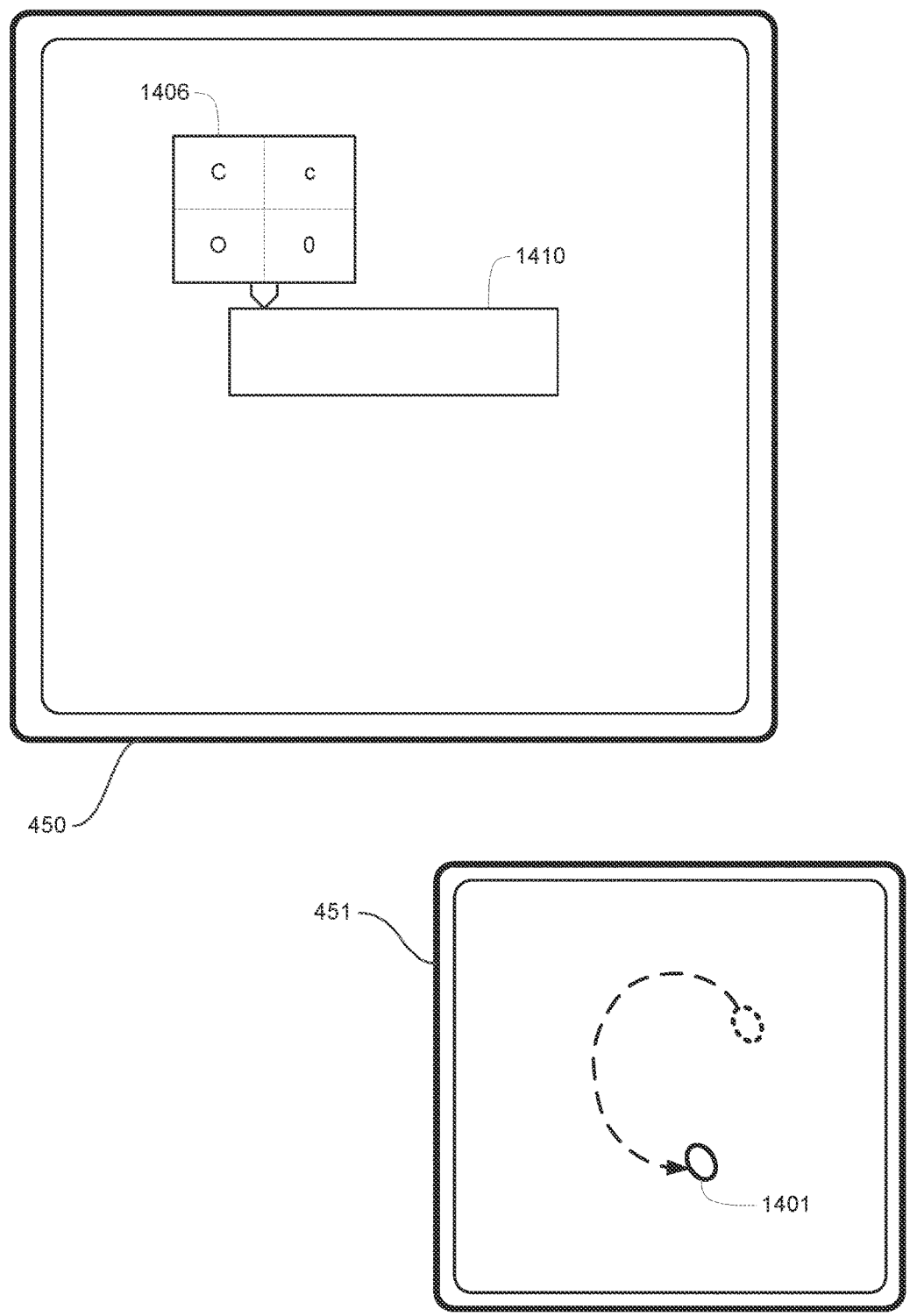
Figure 14C:
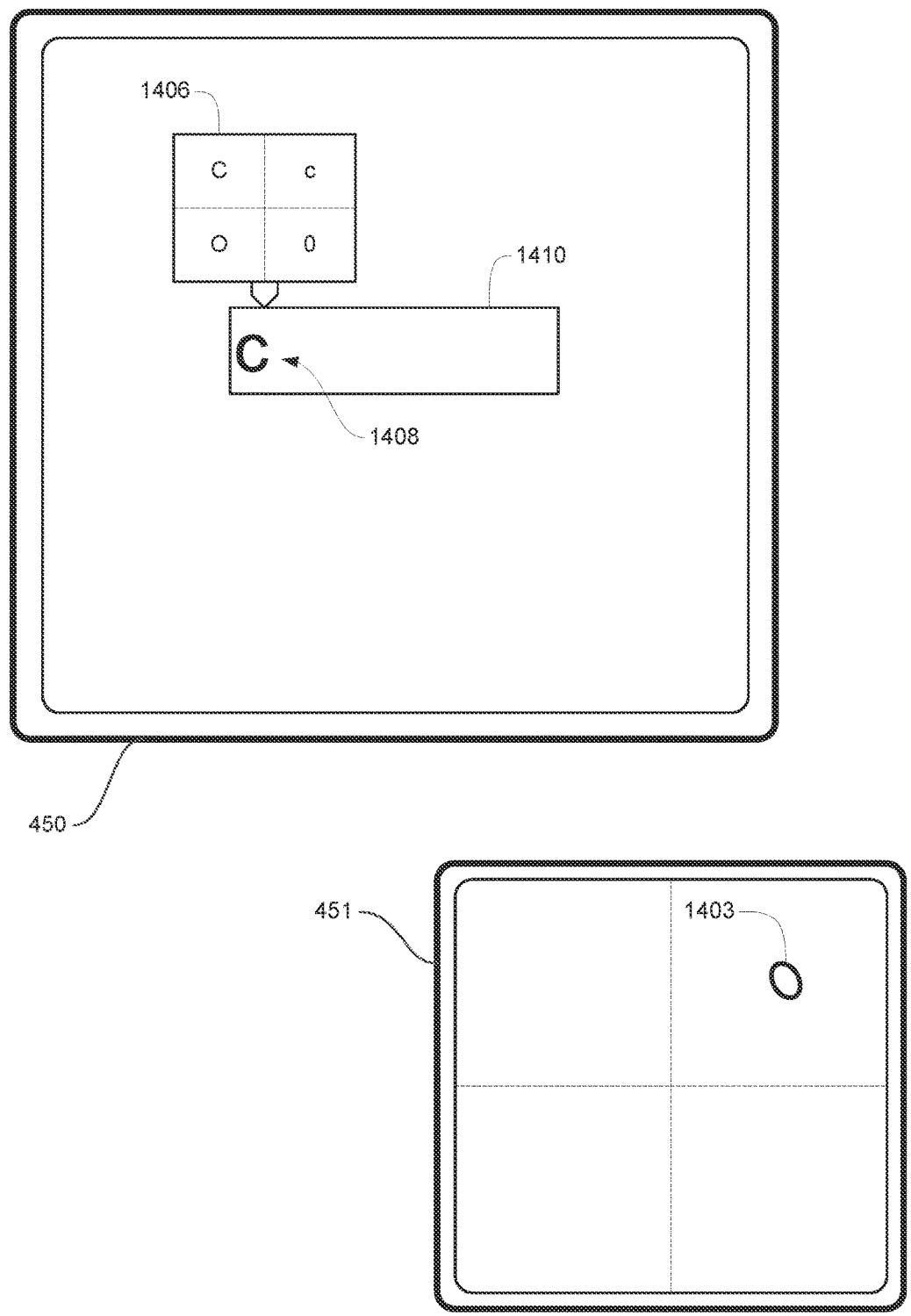
Figure 15A:
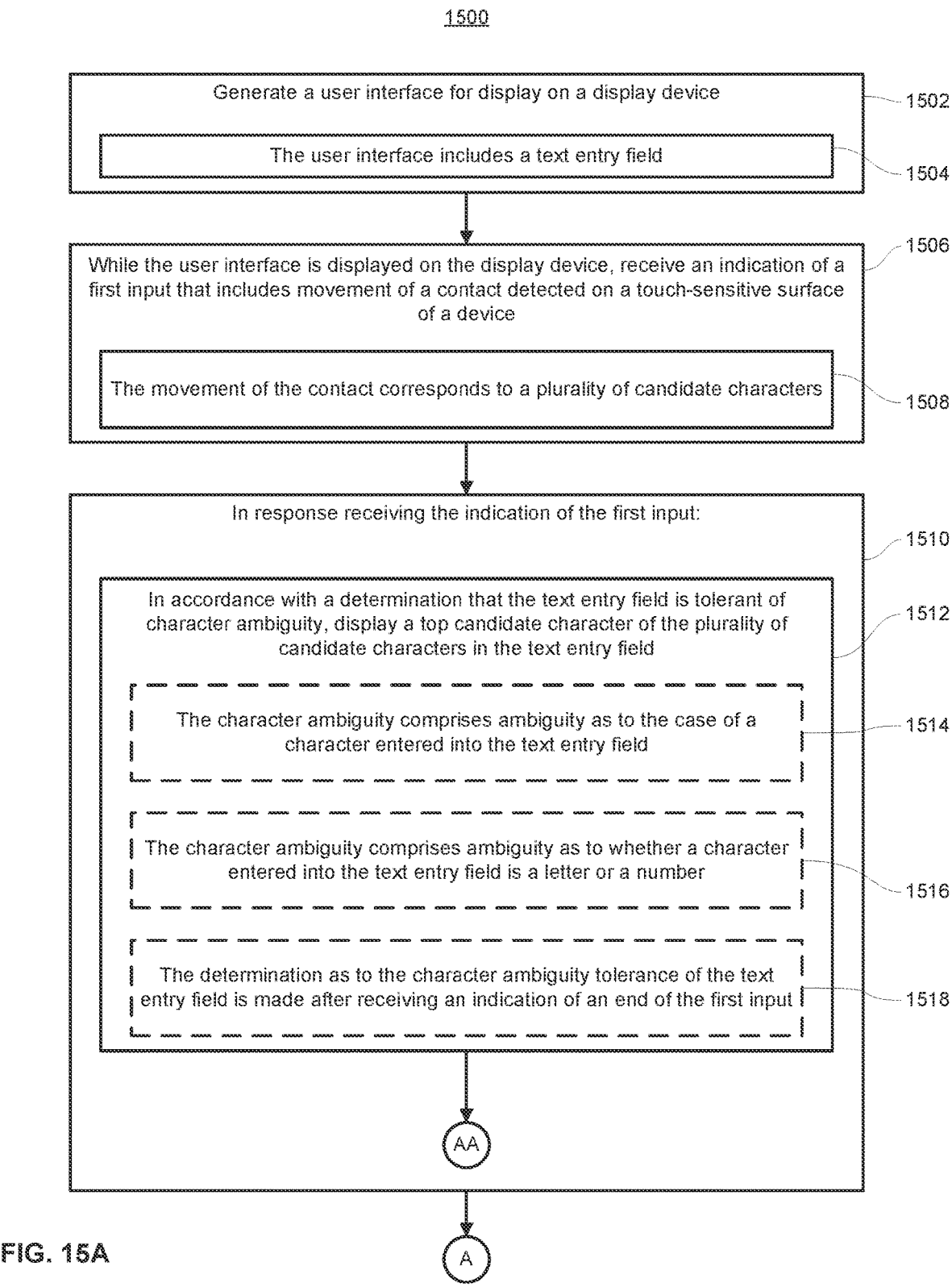
FIGS. 15A-15D are flow diagrams illustrating a method of detecting handwritten input in accordance with some embodiments.
Figure 15B:
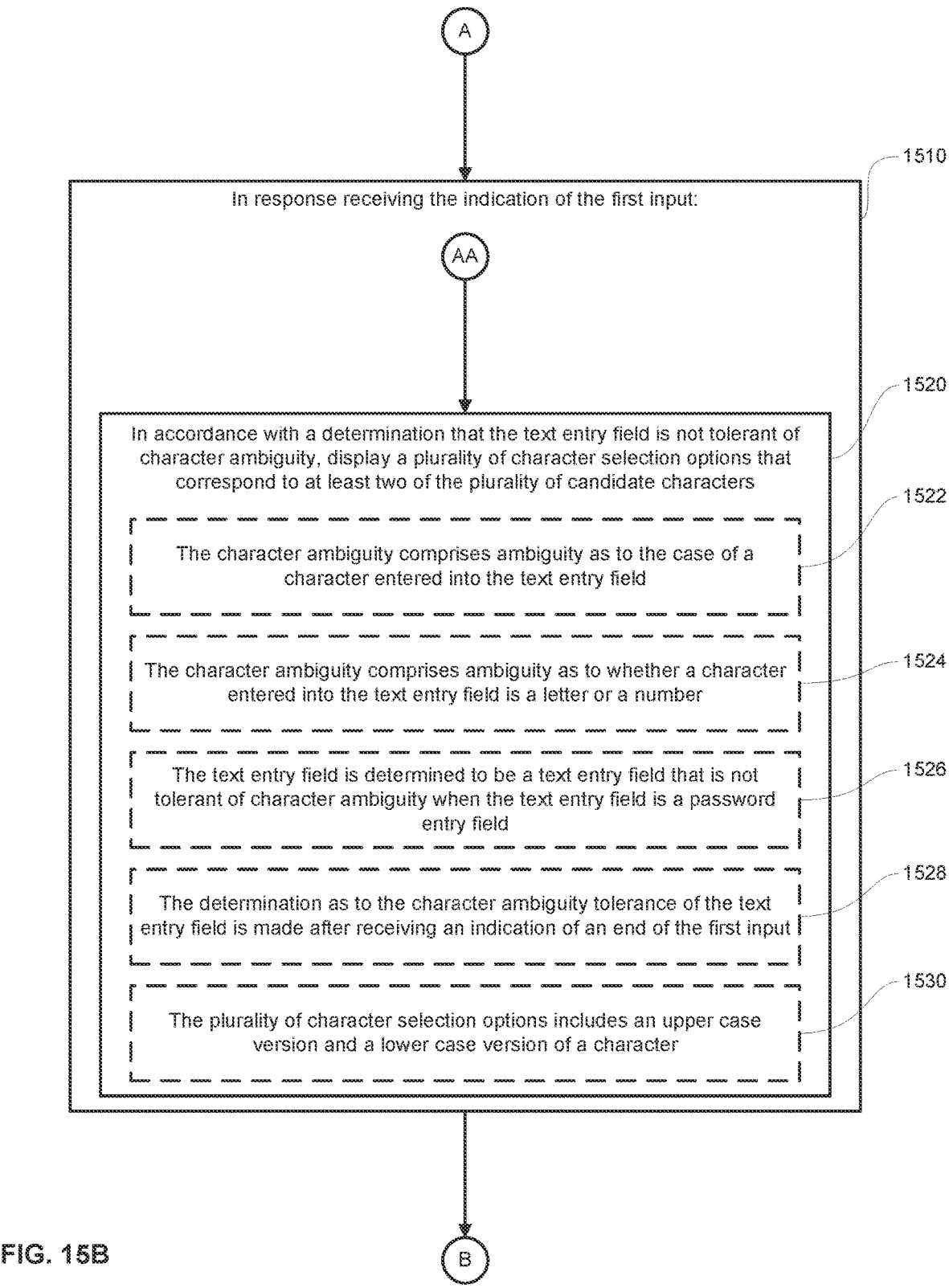
Figure 15C:
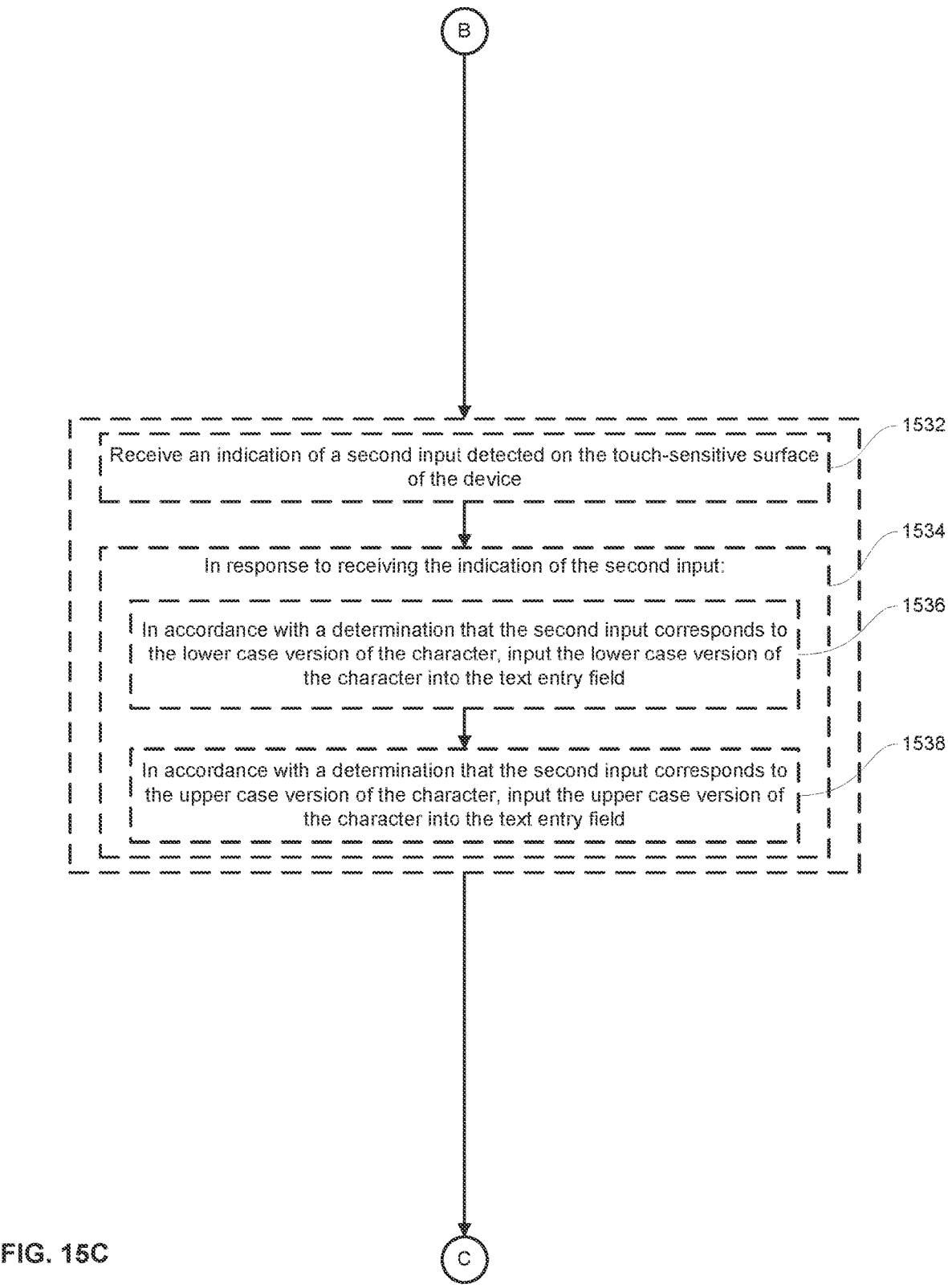
Figure 15D:
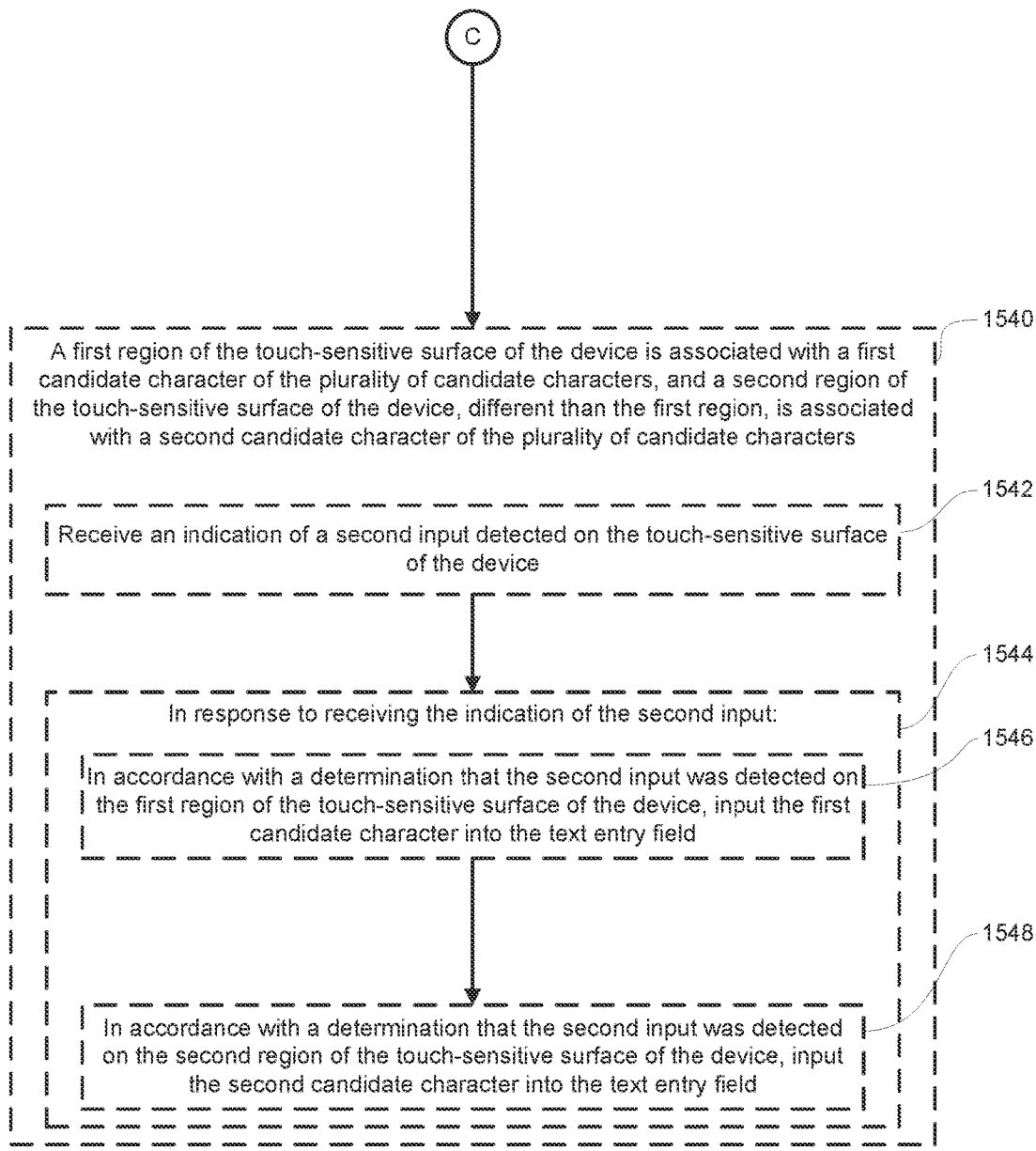

FIGS. 14A-14C illustrate exemplary ways in which an electronic device presents a handwritten input user interface according to some embodiments of the disclosure. The embodiments in these figures are used to illustrate the processes described below, including the processes described with reference to FIGS. 15A-15D.

FIG. 14A illustrates an exemplary handwritten input user interface displayed on display 450. The user interface optionally includes text entry field 1402. Text entry field 1402 is optionally any area of the user interface into which text is to be inputted, such as a search field, a web address field, and/or a username/password field. Text (e.g., letters, numbers, words, symbols, etc.) is optionally inputted into text entry field 1402 by providing handwritten input on touch-sensitive surface 451.

In some embodiments, the handwritten input provided on touch-sensitive surface 451 optionally corresponds to more than one character (e.g., letter, number, symbol, etc.). For example, the movement of contact 1401 on touch-sensitive surface 451 optionally corresponds to a lower case "c" and an upper case "C", as both the lower case "c" and the upper case "C" are optionally associated with the same or similar contact movement on the touch-sensitive surface. The movement of contact 1401 optionally also corresponds to an "0" and a "0", because the movement optionally corresponds to respective portions of the "0" and the "0" characters. In such circumstances, the electronic device optionally needs to determine which of the plurality of characters to which the movement of contact 1401 corresponds to input into text entry field 1402. In some embodiments, this determination optionally depends on whether text entry field 1402 is tolerant of character ambiguity.

In some embodiments, text entry field 1402 is optionally tolerant of character ambiguity. In other words, text entry field 1402 is optionally a text entry field in which some ambiguity about the characters entered into the text entry field is acceptable. For example, if text entry field 1402 is a web address field (e.g., a Uniform Resource Locator (URL) field), the cases, for example, of characters entered into the text entry field are optionally unimportant. In such circumstances, entering "www.xyz.com" in text entry field 1402 is optionally equally as acceptable as entering "www.xYz.com" in the text entry field, because the cases of characters in a URL address are optionally ignored when resolving the URL address. The above discussion optionally similarly applies to other kinds of character ambiguity in addition to character case ambiguity, such as ambiguity as to whether a character is a letter or a number (e.g., O vs 0).

In circumstances in which text entry field 1402 is tolerant of character ambiguity, in response to receiving an input that optionally corresponds to a plurality of candidate characters (e.g., the movement of contact 1401 that optionally corresponds to a lower case "c" and an upper case "C"), the electronic device optionally displays a top candidate character (e.g., the candidate character that the electronic device determines is the best match for the handwritten input) in the text entry field. As shown in FIG. 14A, in some embodiments, the electronic device is displaying an upper case "C" 1404 in text entry field 1402 in response to the input received on touch-sensitive surface 451. In some embodiments, the determination as to whether text entry field 1402 is tolerant of character ambiguity is made after receiving an indication of the end of the input received on touch-sensitive surface 451.

However, in some circumstances, a text entry field in a user interface is optionally not tolerant of character ambiguity.

FIG. 14B illustrates an exemplary handwritten input user interface displayed on display 450 when a text entry field in the user interface is not tolerant of character ambiguity. The user interface optionally includes text entry field 1410. Text entry field 1410 is optionally any area of the user interface into which text is to be inputted, such as a search field, a web address field, and/or a username/password field, as discussed above. Text (e.g., letters, numbers, words, symbols, etc.) is optionally inputted into text entry field 1410 by providing handwritten input using touch-sensitive surface 451, as discussed above.

In some embodiments, text entry field 1410 is optionally not tolerant of character ambiguity. In other words, text entry field 1410 is optionally a text entry field in which ambiguity about the characters entered into the text entry field is not acceptable. For example, if text entry field 1410 is a password entry field, the cases, for example, of characters entered into the text entry field are optionally important. In such circumstances, entering "xyz" in text entry field 1410 is optionally not equally as acceptable as entering "xYz" in the text entry field, because the cases of characters in a password are optionally not ignored when determining whether a password is a correct password. The above discussion optionally similarly applies to other kinds of character ambiguity in addition to character case ambiguity, such as ambiguity as to whether a character is a letter or a number (e.g., O vs 0).

In circumstances in which text entry field 1410 is not tolerant of character ambiguity, in response to receiving an input that optionally corresponds to a plurality of candidate characters (e.g., the movement of contact 1401 that optionally corresponds to a lower case "c" and an upper case "C"), the electronic device optionally displays at least two character selection options 1406 that correspond to at least two of the plurality of candidate characters. These character selection options 1406 optionally allow a user to indicate which of the character selection options should be inputted in text entry field 1410. As shown in FIG. 14B, in some embodiments, the electronic device is displaying character selection options 1406 that include an upper case "C", a lower case "c", an "0", and a "0" in response to the input received on touch-sensitive surface 451. In some embodiments, the determination as to whether text entry field 1410 is tolerant of character ambiguity is made after receiving an indication of the end of the input received on touch-sensitive surface 451. In some embodiments, one of character selection options 1406 is optionally selected to input the selected character option into text entry field 1410.

FIG. 14C illustrates an exemplary handwritten input user interface displayed on display 450 when a character selection option is selected in response to a selection input. As discussed above, one of character selection options 1406 is optionally selected to input that selected character option into text entry field 1410. Selection of one of character selection options 1406 is optionally accomplished in any appropriate manner. As shown in FIG. 14C, in some embodiments, selection of a character selection option is in response to detecting an input in a region of touch-sensitive surface 451 that corresponds to the character selection option.

Specifically, character selection options 1406 are optionally displayed in a layout similar to a layout of touch-sensitive surface 451. As shown in FIG. 14C, in some embodiments, character selection options 1406 are displayed in a 2×2 grid, and touch-sensitive surface 451 has a 2×2 grid of regions. Detection of an input (e.g., a tap or a click) in one of the regions of touch-sensitive surface 451 optionally results in selection of the character selection option that is in the grid region corresponding to the region on touch-sensitive surface in which the input was detected. For example, detection of an input in the upper-left region of touch-sensitive surface 451 optionally results in selection of character selection option "C", detection of an input in the lower-left region of touch-sensitive surface 451 optionally results in selection of character selection option "0", detection of an input in the lower-right region of touch-sensitive surface 451 optionally results in selection of character selection option "0", and detection of an input in the upper-right region of touch-sensitive surface 451 optionally results in selection of character selection option "c". As shown in FIG. 14C, in some embodiments, contact 1403 has been detected in the upper-right region of touch-sensitive surface 451, and as a result, lower case "c" 1408 has been selected and inputted into text entry field 1410. As such, the electronic device allows a user to specify which character the user wishes to input to the device when ambiguity as to the handwritten character exists.

In some embodiments, ambiguity as to the character being inputted on touch-sensitive surface 451 is optionally resolved by the device in response to further handwritten input being detected by using the further handwritten input to further narrow the possible characters to a single most-probable character. For example, a first portion of the handwritten input optionally corresponds to the upper case and lower case versions of a character (e.g., the downward stroke of a lower case "1" and an upper case "L"). However, as a second portion of the handwritten input is detected (e.g., the horizontal stroke of an upper case "L"), the first and second portions of the handwritten input together optionally define the case of the character. In such circumstances, character selection options (e.g., character selection options 1406) are optionally displayed in response to detecting the first portion of the handwritten input, and are optionally no longer displayed in response to detecting the second portion of the handwritten input, which optionally resolves the ambiguity of the character being inputted, as described above. In some embodiments, character ambiguity is resolved because the first and second portions of the handwritten input together define a different character that does not have ambiguous case (e.g., the first portion of the handwritten input optionally corresponds to a lower case "1" and an upper case "L", as above, and the second portion of the handwritten input optionally defines the character to be a "D" rather than an "1" or an "L". In some embodiments, the first and second portions of the handwritten input together define a number instead of a letter, and thus the character ambiguity is resolved—for example, the first portion of the handwritten input optionally corresponds to a lower case "1" and an upper case "L", as above, and the second portion of the handwritten input optionally defines the character to be a "4").

FIGS. 15A-15D are flow diagrams illustrating a method 1500 of detecting handwritten input in accordance with some embodiments. The method 1500 is optionally performed at an electronic device such as device 500 as described above with reference to FIG. 5, including a set top box or other user interface generating device that is in communication with a remote control and a display device. Some operations in method 1500 are, optionally, combined and/or the order of some operations is, optionally, changed.

As described below, the method 1500 provides ways in which a device optionally responds to receiving an indication of an input that corresponds to a plurality of candidate characters. The method reduces the cognitive burden on a user when interacting with a user interface on the device, and reduces the need for the user to physically interact with the device, thereby creating a more efficient human-machine interface. For battery-operated electronic devices, increasing the efficiency of the user's interaction with the user interface conserves power and increases the time between battery charges.

In some embodiments, an electronic device (e.g., a set top box or other user interface generating device that is in communication with a remote control and a display device, such as device 500 in FIG. 5) with one or more processors generates (1502) a user interface for display on a display device (e.g., a television or other display device, such as display 450 in FIG. 14A). In some embodiments, the user interface includes a text entry field (1504) (e.g., search field, web address field, username/password fields, etc., such as text entry fields 1402 and 1410 in FIGS. 14A-14C).

In some embodiments, while the user interface is displayed on the display device, the device receives (1506) an indication of a first input that includes movement of a contact (e.g., a finger contact or stylus contact, such as contact 1401 in FIGS. 14A-14B) detected on a touch-sensitive surface of a device (e.g., a touch-sensitive surface of a remote control or a portable multifunction device with a touchscreen display, such as touch-sensitive surface 451 in FIGS. 14A-14B). In some embodiments, the movement of the contact corresponds to a plurality of candidate characters (1508) (e.g., a letter, a number, a word, a symbol, etc., such as described with reference to FIGS. 14A-14B).

In some embodiments, in response receiving the indication of the first input (1510), in accordance with a determination that the text entry field is tolerant of character ambiguity (e.g., a search field; that is, a text entry field for which upper vs. lower case character input does not matter, for example, such as text entry field 1402 in FIG. 14A), the device displays (1512) a top candidate character of the plurality of candidate characters in the text entry field (e.g., the device optionally automatically selects the top candidate if case does not matter, such as character 1404 in FIG. 14A). In some embodiments, the character ambiguity comprises ambiguity as to the case of a character entered into the text entry field (1514) (e.g., s vs S). In some embodiments, the character ambiguity comprises ambiguity as to whether a character entered into the text entry field is a letter or a number (1516) (e.g., O vs 0). In some embodiments, the determination as to the character ambiguity tolerance of the text entry field is made after receiving an indication of an end of the first input (1518).

In some embodiments, in response receiving the indication of the first input (1510), in accordance with a determination that the text entry field is not tolerant of character ambiguity (e.g., a username or password field, such as text entry field 1410 in FIG. 14B), the device displays (1520) a plurality of character selection options (e.g., character selection options 1406 in FIG. 14B) that correspond to at least two of the plurality of candidate characters (e.g., the device displays a lower case and upper case version of a character. In some embodiments, a desired character is optionally selected to input the selected character into the text entry field). In some embodiments, the character ambiguity comprises ambiguity as to the case of a character entered into the text entry field (1522). In some embodiments, the character ambiguity comprises ambiguity as to whether a character entered into the text entry field is a letter or a number (1524). In some embodiments, the text entry field is determined to be a text entry field that is not tolerant of character ambiguity when the text entry field is a password entry field (1526). In some embodiments, the determination as to the character ambiguity tolerance of the text entry field is made after receiving an indication of an end of the first input (1528). In some embodiments, the plurality of character selection options includes an upper case version and a lower case version of a character (1530) (as illustrated in FIG. 14B).

In some embodiments, the device receives (1532) an indication of a second input (e.g., contact 1403 in FIG. 14C) detected on the touch-sensitive surface of the device (e.g., a touch-sensitive surface of a remote control or a portable multifunction device with a touchscreen display). In some embodiments, in response to receiving the indication of the second input (1534), in accordance with a determination that the second input corresponds to the lower case version of the character (e.g., a tap in a specific region of the touch-sensitive surface of the device associated with the lower case version of the character, or a particular gesture associated with the lower case version of the character. For example, in FIG. 14C, contact 1403 detected in the upper-right region of touch-sensitive surface 451), the device inputs (1536) the lower case version of the character into the text entry field (e.g., lower case "c" 1408 into text entry field 1410 in FIG. 14C). In some embodiments, in response to receiving the indication of the second input (1534), in accordance with a determination that the second input corresponds to the upper case version of the character (e.g., a tap in a specific region of the touch-sensitive surface of the device associated with the upper case version of the character, or a particular gesture associated with the upper case version of the character. For example, in FIG. 14C, a contact detected in the upper-left region of touch-sensitive surface 451), the device inputs (1538) the upper case version of the character into the text entry field.

In some embodiments, a first region of the touch-sensitive surface of the device (e.g., a touch-sensitive surface of a remote control or a portable multifunction device with a touchscreen display) is associated with a first candidate character of the plurality of candidate characters (e.g., the upper-right region of touch-sensitive surface 451 being associated with the lower case "c" in character selection options 1406 in FIG. 14C), and a second region of the touch-sensitive surface of the device, different than the first region, is associated with a second candidate character of the plurality of candidate characters (1540) (e.g., the upper-left region of touch-sensitive surface 451 being associated with the upper case "C" in character selection options 1406 in FIG. 14C). In some embodiments, the relative location of the first region on the touch-sensitive surface to the second region on the touch-sensitive surface is the same as the relative location of the first candidate character to the second candidate character in the user interface. That is, the plurality of character selection options is displayed in a layout similar to a layout of the touch-sensitive surface of the device. In some embodiments, the device receives (1542) an indication of a second input (e.g., tap or tap-and-click) detected on the touch-sensitive surface of the device. In some embodiments, in response to receiving the indication of the second input (1544), in accordance with a determination that the second input was detected on the first region of the touch-sensitive surface of the device, the device inputs (1546) the first candidate character into the text entry field. In some embodiments, in response to receiving the indication of the second input (1544), in accordance with a determination that the second input was detected on the second region of the touch-sensitive surface of the device, the device inputs (1548) the second candidate character into the text entry field. For example, the plurality of character selection options are optionally displayed as a 2×2 grid in the user interface (as illustrated in FIG. 14C), with a first character in the top-left, a second character in the top-right, a third character in the bottom-right, and a fourth character in the bottom-left. Selection of a respective one of the characters is optionally accomplished by tapping in the region on the touch-sensitive surface (top-left, top-right, bottom-right, bottom-left) corresponding to the region in the grid in which the respective character is displayed, as illustrated in FIG. 14C.

It should be understood that the particular order in which the operations in FIGS. 15A-15D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100 and 1300) are also applicable in an analogous manner to method 1500 described above with respect to FIGS. 15A-15D. For example, the user interface, display device and touch-sensitive surface described above with reference to method 1500 optionally have one or more of the characteristics of the user interfaces, display devices and touch-sensitive surfaces described herein with reference to other methods described herein (e.g., methods 700, 900, 1100 and 1300). For brevity, these details are not repeated here.

The operations in the information processing methods described above are, optionally, implemented by running one or more functional modules in an information processing apparatus such as general purpose processors (e.g., as described above with respect to FIGS. 1A, 3 and 5) or application specific chips.

The operations described above with reference to FIGS. 15A-15D are, optionally, implemented by components depicted in FIGS. 1A-1B. For example, generation operation 1502, receiving operation 1506, and displaying operations 1512 and 1520 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 16:
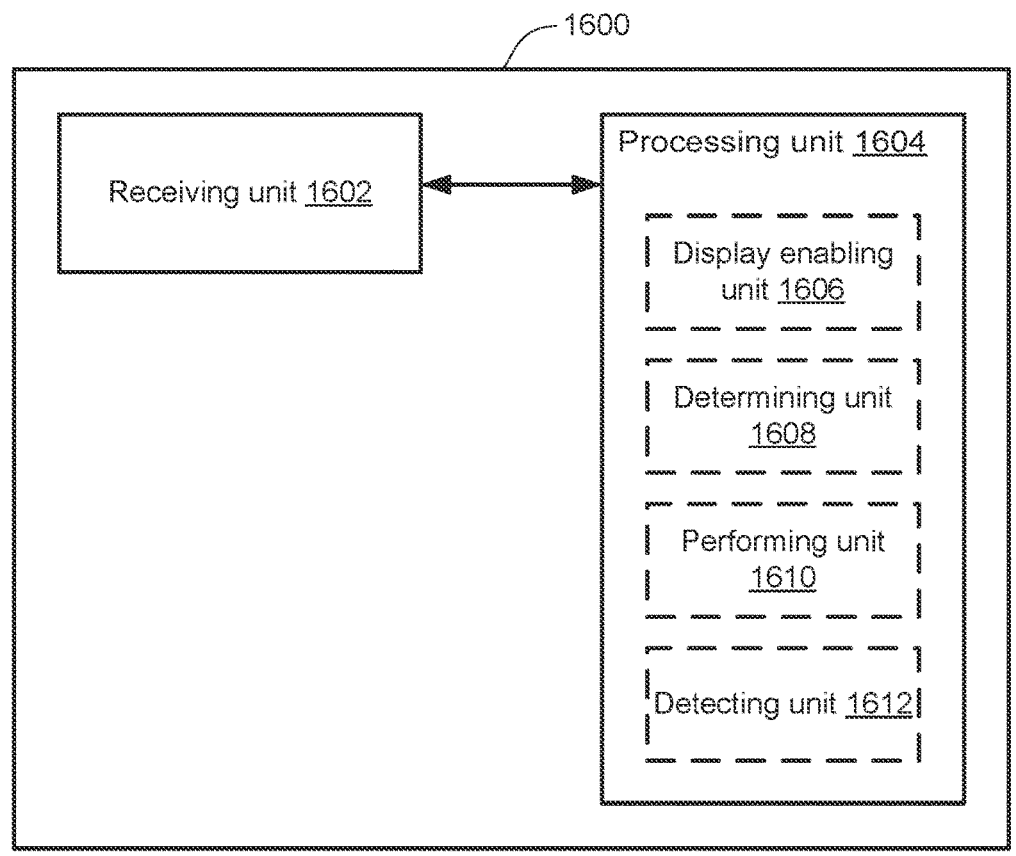
FIGS. 16-20 are functional block diagrams of electronic devices in accordance with some embodiments.

In accordance with some embodiments, FIG. 16 shows a functional block diagram of an electronic device 1600 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 16 are, optionally, combined or separated into sub-blocks to implement the principles of the various described embodiments. Therefore, the description herein optionally supports any possible combination or separation or further definition of the functional blocks described herein.

As shown in FIG. 16, an electronic device 1600 optionally includes a receiving unit 1602 configured to receive inputs, and a processing unit 1604 coupled to the receiving unit 1602. In some embodiments, the processing unit 1604 includes a display enabling unit 1606, a determining unit 1608, a performing unit 1610 and a detecting unit 1612.

In some embodiments, the receiving unit 1602 is configured to receive an indication of a first input that includes a contact detected on a touch-sensitive surface of a device, wherein the touch-sensitive surface includes a plurality of predefined regions and each predefined region of the plurality of predefined regions is selectable to perform an associated functionality. In some embodiments, the processing unit 1604 is configured to generate a user interface for display on a display device (e.g., with display enabling unit 1606), in response to receiving the indication of the first input: determine whether the contact has been detected for longer than a first time period (e.g., with the determining unit 1608); and in accordance with a determination that the contact meets functionality display criteria that include a criterion that is met when the contact has been detected for longer than the first time period, determine functionality information for display in the user interface, the functionality information including information about a first functionality of the plurality of associated functionalities (e.g., with the determining unit 1608).

In some embodiments, the processing unit 1604 is further configured to, in accordance with a determination that the contact does not meet the functionality display criteria, forgo determination of the functionality information including the information about the first functionality of the plurality of associated functionalities (e.g., with the determining unit 1608).

In some embodiments, the functionality information comprises an overlay displayed over a moving image or a still image in the user interface. In some embodiments, the functionality display criteria include a criterion that is met when the contact has moved less than a first movement threshold during the first time period.

In some embodiments, the processing unit is further configured to, in accordance with a determination that the functionality display criteria has not been met because the contact has moved more than the first movement threshold during the first time period, forgo determination of the functionality information including the information about the first functionality of the plurality of associated functionalities (e.g., with determining unit 1608).

In some embodiments, the information about the first functionality comprises a visual cue for performing the first functionality. In some embodiments, the information about the first functionality is displayed at a first location in the user interface, the first location corresponding to a first predefined region on the touch-sensitive surface associated with the first functionality. In some embodiments, the functionality information further includes second information about a second functionality of the plurality of associated functionalities, the second information is displayed at a second location in the user interface, the second location corresponding to a second predefined region on the touch-sensitive surface associated with the second functionality, and a relative positioning of the first location in the user interface with respect to the second location in the user interface corresponds to a relative positioning of the first predefined region on the touch-sensitive surface with respect to the second predefined region on the touch-sensitive surface.

In some embodiments, the receiving unit 1602 is further configured to receive an indication of a second input detected on a first predefined region of the touch-sensitive surface that is associated with the first functionality, and the processing unit 1604 is further configured to, in response to receiving the indication of the second input, perform the first functionality associated with the first predefined region (e.g., with performing unit 1610).

In some embodiments, detecting the second input comprises detecting the second input concurrently with the contact on the touch-sensitive surface of the device. In some embodiments, detecting the second input comprises detecting a second contact on the first predefined region of the touch-sensitive surface of the device. In some embodiments, detecting the second input comprises detecting an increase in an intensity of the contact above a first predetermined intensity threshold.

In some embodiments, the receiving unit 1602 is further configured to receive an indication of a third input detected on the first predefined region of the touch-sensitive surface that is associated with the first functionality, wherein detecting the third input comprises detecting a second increase in the intensity of the contact above a second predetermined intensity threshold, the second predetermined intensity threshold being greater than the first predetermined intensity threshold, and the processing unit 1604 is further configured to, in response to receiving the indication of the third input, forgo performance of the first functionality associated with the first predefined region on the touch-sensitive surface (e.g., with performing unit 1610), and perform a second functionality associated with the first predefined region of the touch-sensitive surface (e.g., with performing unit 1610), the second functionality being different than the first functionality.

In some embodiments, the processing unit 1604 is further configured to, prior to performing the second functionality, replace the functionality information in the user interface with second functionality information (e.g., with the display enabling unit 1606), the second functionality information including second information about the second functionality associated with the first predefined region of the touch-sensitive surface.

In some embodiments, detecting the second input further comprises detecting the contact on the touch-sensitive surface of the device for longer than a second time period after detecting the increase in the intensity of the contact above the first predetermined intensity threshold, and the processing unit 1604 is further configured to, in response to receiving the indication of the second input, forgo performance of the first functionality associated with the first predefined region on the touch-sensitive surface (e.g., with the performing unit 1610), and perform a second functionality associated with the first predefined region of the touch-sensitive surface (e.g., with the performing unit 1610), the second functionality being different than the first functionality.

In some embodiments, the processing unit is further configured to, prior to performing the second functionality, replace the functionality information in the user interface with second functionality information (e.g., with the display enabling unit 1606), the second functionality information including second information about the second functionality associated with the first predefined region of the touch-sensitive surface. In some embodiments, the device comprises an input device, and the input device and the display device are separate devices.

In some embodiments, a first predefined region of the plurality of predefined regions on the touch-sensitive surface of the device is associated with a first set of functionalities, the first set of functionalities including the first functionality, and determining the functionality information for display in response to receiving the indication of the first input comprises: determining a current context of the user interface; and selecting the first functionality from the first set of functionalities based on the current context of the user interface. In some embodiments, selecting the first functionality from the first set of functionalities based on the current context of the user interface includes: in accordance with a determination that the current context is a first context, the first functionality corresponds to a first operation; and in accordance with a determination that the current context is a second context, different from the first context, the first functionality corresponds to a second operation, different from the first operation.

In some embodiments, a second predefined region of the plurality of predefined regions on the touch-sensitive surface of the device is associated with a second set of functionalities, the second set of functionalities including a second functionality; and determining the functionality information for display in response to receiving the indication of the first input further comprises: selecting the second functionality from the second set of functionalities based on the current context of the user interface, wherein: in accordance with the determination that the current context is the first context, the first functionality corresponds to the first operation, and the second functionality corresponds to a third operation different from the first operation and the second operation; and in accordance with the determination that the current context is the second context, the first functionality corresponds to the second operation, and the second functionality corresponds to a fourth operation different from the first operation, the second operation, and the third operation.

In some embodiments, the plurality of associated functionalities includes navigation functionalities for navigating in the user interface. In some embodiments, the plurality of associated functionalities includes navigation functionalities for navigating content in the user interface. In some embodiments, the plurality of associated functionalities includes navigation functionalities for navigating one or more content bars in the user interface. In some embodiments, the plurality of associated functionalities includes information functionalities for presenting information about content in the user interface.

Figure 17:
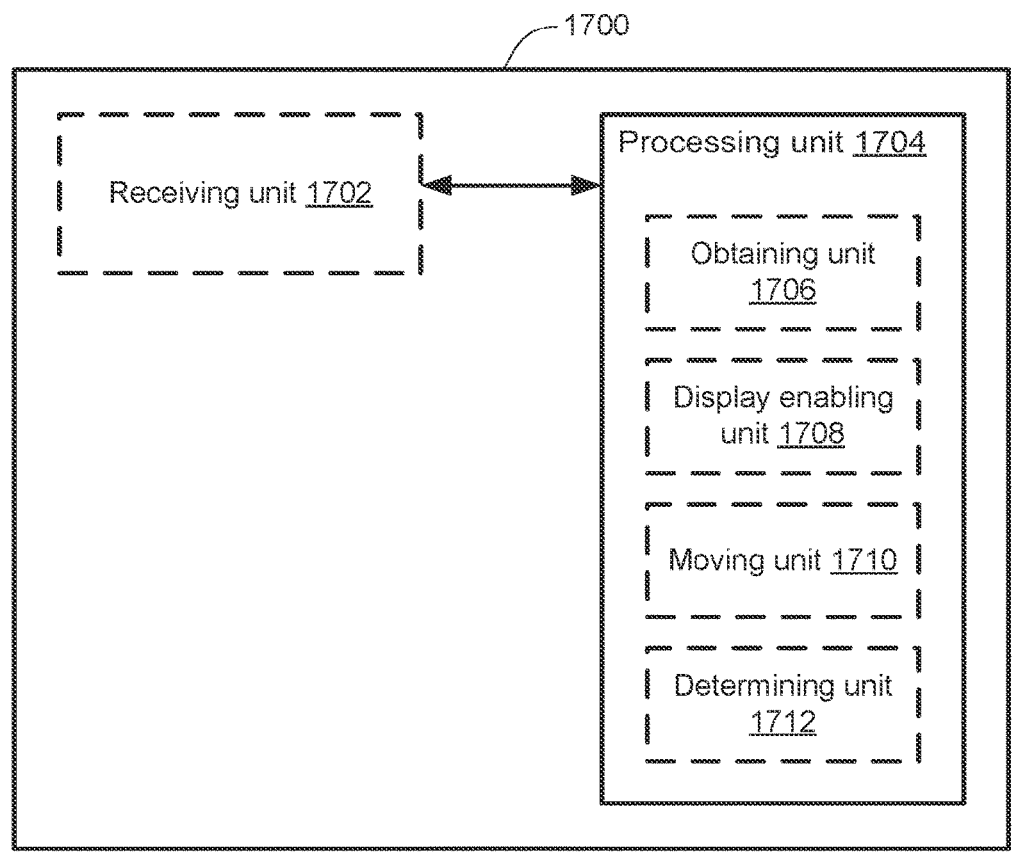

In accordance with some embodiments, FIG. 17 shows a functional block diagram of an electronic device 1700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 17 are, optionally, combined or separated into sub-blocks to implement the principles of the various described embodiments. Therefore, the description herein optionally supports any possible combination or separation or further definition of the functional blocks described herein.

As shown in FIG. 17, an electronic device 1700 optionally includes a receiving unit 1702 configured to receive inputs, and a processing unit 1704 coupled to the receiving unit 1702. In some embodiments, the processing unit 1704 includes an obtaining unit 1706, a display enabling unit 1708, a moving unit 1710 and a determining unit 1712.

In some embodiments, the processing unit 1704 is configured to: obtain information that identifies a sequence of content items that includes a plurality of content items (e.g., with the obtaining unit 1706); while a respective content item from the plurality of content items is a currently selected content item, generate a user interface for display on a display device (e.g., with the display enabling unit 1708), wherein the user interface includes: a representation of a current position in the respective content item; and a navigation bar that includes a plurality of images corresponding to different positions in the respective content item and a representation of a first adjacent content item in the plurality of content items that is adjacent to the respective content item in the sequence of content items; and provide the user interface to the display device (e.g., with the display enabling unit 1708).

In some embodiments, the representation of the first adjacent content item in the navigation bar comprises an image from a position in the first adjacent content item. In some embodiments, the navigation bar further includes a representation of a second adjacent content item in the plurality of content items that is adjacent to the respective content item in the sequence of content items, the first adjacent content item precedes the respective content item in the sequence of content items, and the second adjacent content item follows the respective content item in the sequence of content items.

In some embodiments, the navigation bar further includes a current position indicator overlaid on the plurality of images in the navigation bar, and a relative location of the current position indicator with respect to each of the plurality of images in the navigation bar corresponds to: the current position in the respective content item, and the representation of the current position in the respective content item. In some embodiments, the receiving unit 1702 is configured to, while the user interface is displayed on the display device, receive an indication of a first input that includes a contact detected on a touch-sensitive surface of a device, wherein detecting the contact comprises detecting a movement of the contact, and the processing unit 1704 is further configured to: move the current position indicator in the navigation bar in accordance with the movement of the contact (e.g., with the moving unit 1710), wherein moving the current position indicator comprises: changing the relative location of the current position indicator with respect to each image of the plurality of images in the navigation bar in accordance with the movement of the contact; and updating the current position in the respective content item and the representation of the current position in the respective content item in accordance with the relative location of the current position indicator with respect to each image of the plurality of images.

In some embodiments, a threshold separates the plurality of images in the navigation bar from the representation of the first adjacent content item in the navigation bar, and the processing unit 1704 is further configured to: determine that the current position indicator has crossed over the threshold from the plurality of images in the navigation bar to the representation of the first adjacent content item in the navigation bar (e.g., with the determining unit 1712); and in accordance with the determination: replace, in the navigation bar, the plurality of images corresponding to different positions in the respective content item with a second plurality of images corresponding to different positions in the first adjacent content item (e.g., with the display enabling unit 1708); set the relative location of the current position indicator with respect to each image of the second plurality of images in the navigation bar to correspond to a current position in the first adjacent content item (e.g., with the display enabling unit 1708); replace, in the navigation bar, the representation of the first adjacent content item with a representation of a second adjacent content item in the plurality of content items (e.g., with the display enabling unit 1708), wherein: the second adjacent content item is different than the respective content item, and the second adjacent content item is adjacent to the first adjacent content item in the sequence of content items; and replace, in the user interface, the representation of the current position of the respective content item with a representation of the current position in the first adjacent content item (e.g., with the display enabling unit 1708).

In some embodiments, the device comprises an input device, and the input device and the display device are separate devices. In some embodiments, the representation of the respective content item is larger than the navigation bar in the user interface, the representation of the respective content item comprises video from the respective content item, the video including the plurality of images in the navigation bar, and the plurality of images in the navigation bar comprise a plurality of still images from the respective content item.

In some embodiments, generating the user interface for display on the display device comprises: determining a content type of the respective content item; in accordance with a determination that the content type of the respective content item is a first content type, selecting a first position and a second position in the respective content item, the first position and the second position being separated by a first interval, wherein: the first interval is a time-based interval, a first image of the plurality of images in the navigation bar corresponds to the first position in the respective content item, and a second image of the plurality of images in the navigation bar corresponds to the second position in the respective content item; and in accordance with a determination that the content type of the respective content item is a second content type, selecting a third position and a fourth position in the respective content item, the third position and the fourth position being separated by a second interval, different from the first interval, wherein: the second interval is a content-based interval, the first image of the plurality of images in the navigation bar corresponds to the third position in the respective content item, and the second image of the plurality of images in the navigation bar corresponds to the fourth position in the respective content item.

In some embodiments, obtaining the information that identifies the sequence of content items including the respective content item comprises: determining a content type of the respective content item; in accordance with a determination that the content type of the respective content item is a first content type, identifying a first sequence of content items that includes the respective content item, wherein a first content item immediately precedes the respective content item in the sequence of content items, and a second content item immediately follows the respective content item in the sequence of content items; and in accordance with a determination that the content type of the respective content item is a second content type, identifying a second sequence of content items that includes the respective content item, the second sequence of content items being different than the first sequence of content items, wherein a third content item is adjacent to the respective content item in the second sequence of content items, the third content item being different than the first content item and the second content item.

In some embodiments, a first image of the plurality of images in the navigation bar corresponds to a first position in the respective content item, a second image of the plurality of images in the navigation bar corresponds to a second position in the respective content item, the first position in the respective content item and the second position in the respective content item being separated by a first interval, the receiving unit 1702 is further configured to, while the user interface is displayed on the display device, receive an indication of a first input that includes a contact detected on a touch-sensitive surface of a device, wherein detecting the contact comprises detecting a movement of the contact, and the processing unit 1704 is further configured to: in accordance with the movement of the contact, select a third position and a fourth position in the respective content item (e.g., with the determining unit 1712), the third position and fourth position being separated by a second interval that is different than the first interval; and replace the first image in the navigation bar with a third image corresponding to the third position in the respective content item, and the second image in the navigation bar with a fourth image corresponding to the fourth position in the respective content item (e.g., with the display enabling unit 1706).

In some embodiments, selecting the third position and the fourth position in the respective content item comprises: determining a content type of the respective content item; in accordance with a determination that the content type of the respective content item is a first content type, selecting the second interval separating the third position and fourth position in the respective content item to be a time-based interval; and in accordance with a determination that the content type of the respective content item is a second content type, selecting the second interval separating the third position and fourth position in the respective content item to be a content-based interval.

Figure 18:
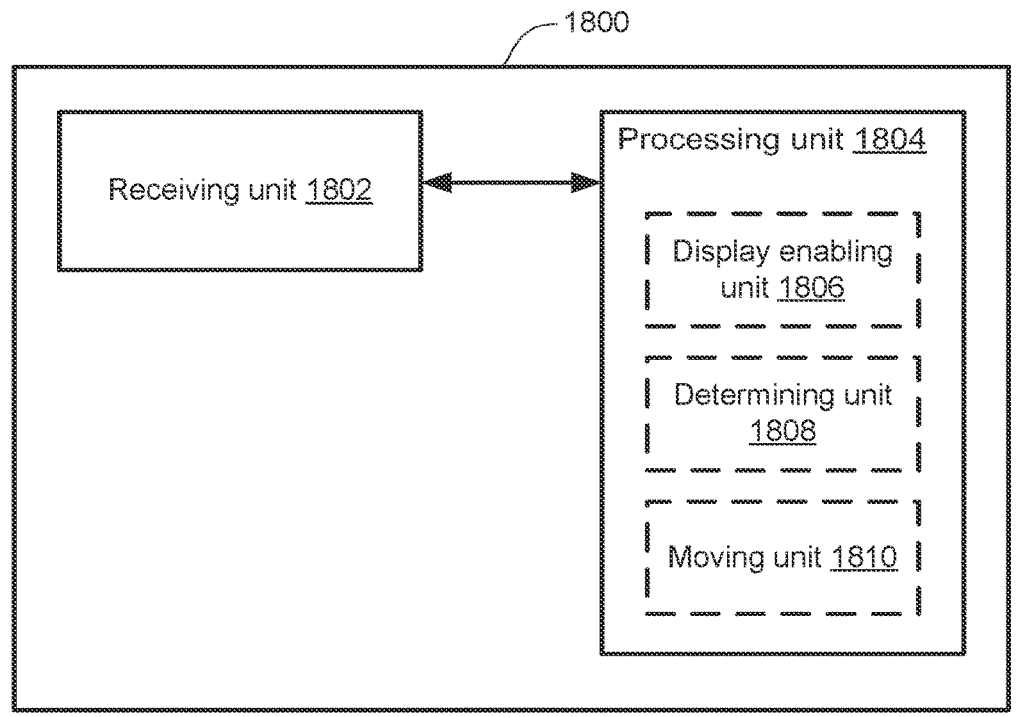

In accordance with some embodiments, FIG. 18 shows a functional block diagram of an electronic device 1800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 18 are, optionally, combined or separated into sub-blocks to implement the principles of the various described embodiments. Therefore, the description herein optionally supports any possible combination or separation or further definition of the functional blocks described herein.

As shown in FIG. 18, an electronic device 1800 optionally includes a receiving unit 1802 configured to receive inputs, and a processing unit 1804 coupled to the receiving unit 1802. In some embodiments, the processing unit 1804 includes a display enabling unit 1806, a determining unit 1808, and a moving unit 1810.

In some embodiments, the receiving unit 1802 is configured to receive an indication of a first input that includes a contact detected on a touch-sensitive surface of a device, wherein the first input corresponds to a respective value for a movement metric, and the processing unit 1804 is configured to: generate a user interface for display on a display device (e.g., with the display enabling unit 1806), wherein the user interface includes a selection-indicator indicating a currently selected user interface element of a plurality of user interface elements; in response to receiving the indication of the first input: determine whether the first input meets unitary-movement criteria (e.g., with the determining unit 1808); in accordance with a determination that the first input meets the unitary-movement criteria, move the selection-indicator by a predefined amount in the user interface (e.g., with the moving unit 1810); and in accordance with a determination that the first input does not meet the unitary-movement criteria, move the selection-indicator in accordance with the respective value of the movement metric associated with the first input (e.g., with the moving unit 1810).

In some embodiments, moving the selection-indicator by the predefined amount in the user interface comprises moving the selection-indicator to indicate selection of an adjacent user interface element in the plurality of user interface elements. In some embodiments, the unitary-movement criteria include a criterion that is met when: liftoff of the contact is detected within a first time period of touchdown of the contact, and movement of the contact is greater than a first movement threshold but less than a second movement threshold. In some embodiments, the first movement threshold and the second movement threshold are defined in terms of contact movement needed on the touch-sensitive surface to move the selection-indicator by a single UI element in the user interface.

In some embodiments, moving the selection-indicator by the predefined amount, and moving the selection-indicator in accordance with the respective value of the movement metric, both comprise moving the selection indicator in accordance with a direction of a movement of the contact on the touch-sensitive surface. In some embodiments, the unitary-movement criteria include a criterion that is met when: the contact is detected in a first edge region of a plurality of edge regions of the touch-sensitive surface, liftoff of the contact is detected within a first time period of touchdown of the contact, and movement of the contact is less than a movement threshold, and moving the selection-indicator by the predefined amount comprises moving the selection-indicator in a direction that corresponds to the first edge region of the touch-sensitive surface in which the contact was detected.

In some embodiments, the plurality of user interface elements include a plurality of navigation columns, and moving the selection-indicator by the predefined amount comprises moving the selection-indicator from a first navigation column to a second navigation column, adjacent to the first navigation column. In some embodiments, the plurality of user interface elements include a plurality of images, and moving the selection-indicator by the predefined amount comprises moving the selection-indicator from a first image to a second image, adjacent to the first image. In some embodiments, the plurality of user interface elements include a plurality of content items in a grid arrangement, and moving the selection-indicator by the predefined amount comprises moving the selection-indicator from a first content item to a second content item, adjacent to the first content item.

Figure 19:
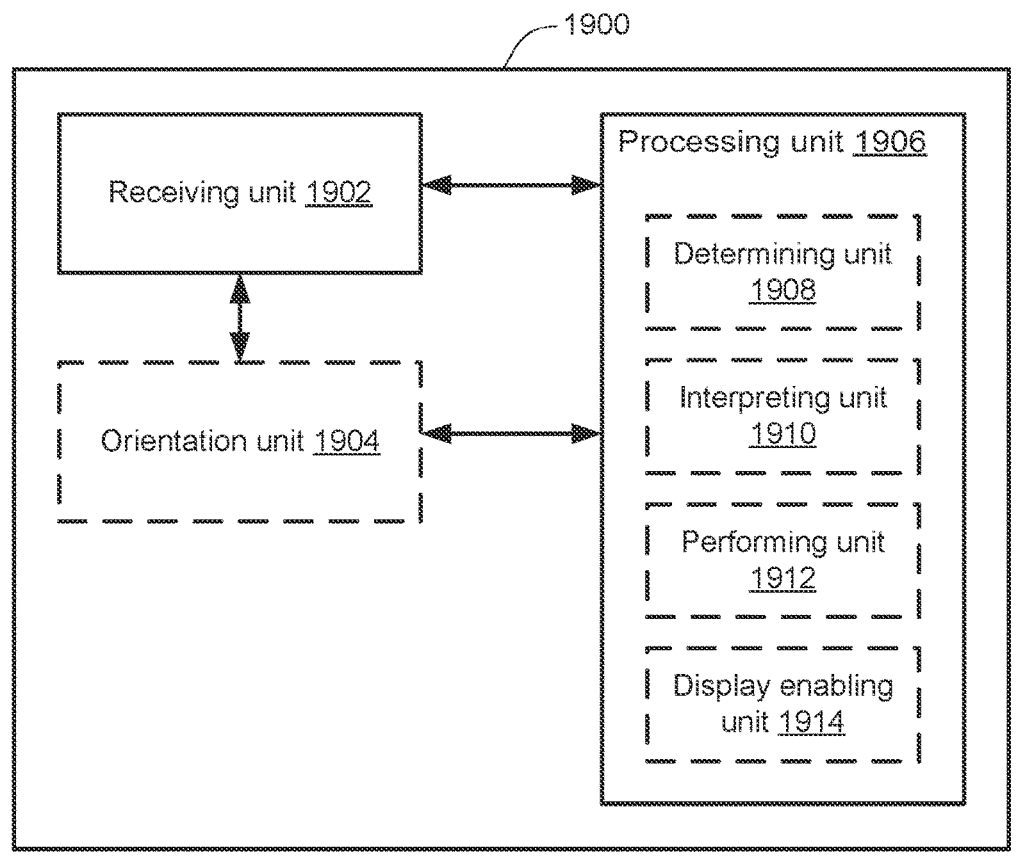

In accordance with some embodiments, FIG. 19 shows a functional block diagram of an electronic device 1900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 19 are, optionally, combined or separated into sub-blocks to implement the principles of the various described embodiments. Therefore, the description herein optionally supports any possible combination or separation or further definition of the functional blocks described herein.

As shown in FIG. 19, an electronic device 1900 optionally includes a receiving unit 1902 configured to receive inputs, an orientation unit 1904 coupled to the receiving unit and configured to detect an orientation of the device, and a processing unit 1906 coupled to the receiving unit 1902 and the orientation unit 1904. In some embodiments, the processing unit 1906 includes a determining unit 1908, an interpreting unit 1910, a performing unit 1912, and a display enabling unit 1914.

In some embodiments, the receiving unit 1902 is configured to receive an indication of a first input that includes movement of a contact detected on a touch-sensitive surface of a device; and the processing unit 1906 is configured to: determine a grip of a user using the device (e.g., with the determining unit 1908); and interpret the movement of the contact on the touch-sensitive surface based at least in part on the grip of the user (e.g., with the interpreting unit 1910). In some embodiments, determining the grip of the user using the device comprises determining the grip of the user using the device based at least in part on an orientation of the device. In some embodiments, determining the grip of the user using the device comprises determining the grip of the user using the device based on an average orientation of the device over a most recent predetermined time period. In some embodiments, the orientation of the device is determined based on an accelerometer or other orientation unit 1904 in the device.

In some embodiments, interpreting the movement of the contact on the touch-sensitive surface based at least in part on the grip of the user comprises: in accordance with a determination that the grip is a first grip, performing a first action in response to the first input (e.g., with the performing unit 1912); and in accordance with a determination that the grip is a second grip, different from the first grip, performing a second action in response to the first input (e.g., with the performing unit 1912), different from the first action. In some embodiments, interpreting the movement of the contact on the touch-sensitive surface based at least in part on the grip of the user comprises: in accordance with a determination that the grip is a first grip, ignoring a first portion of the movement of the contact; and in accordance with a determination that the grip is a second grip, different from the first grip, ignoring a second portion of the movement of the contact, different from the first portion of the movement of the contact.

In some embodiments, the first grip comprises a right-handed grip, and ignoring the first portion of the movement of the contact comprises: in accordance with a determination that the movement of the contact is from right to left on the touch-sensitive surface, ignoring an end of the movement of the contact; and in accordance with a determination that the movement of the contact is from left to right on the touch-sensitive surface, ignoring a beginning of the movement of the contact. In some embodiments, the second grip comprises a left-handed grip, and ignoring the second portion of the movement of the contact comprises: in accordance with a determination that the movement of the contact is from right to left on the touch-sensitive surface, ignoring a beginning of the movement of the contact; and in accordance with a determination that the movement of the contact is from left to right on the touch-sensitive surface, ignoring an end of the movement of the contact.

In some embodiments, the processing unit 1906 is further configured to provide feedback information for display on a display device (e.g., with the display enabling unit 1914), the feedback information including information about the determined grip of the user using the device, and the interpretation of the movement of the contact on the touch-sensitive surface.

Figure 20:
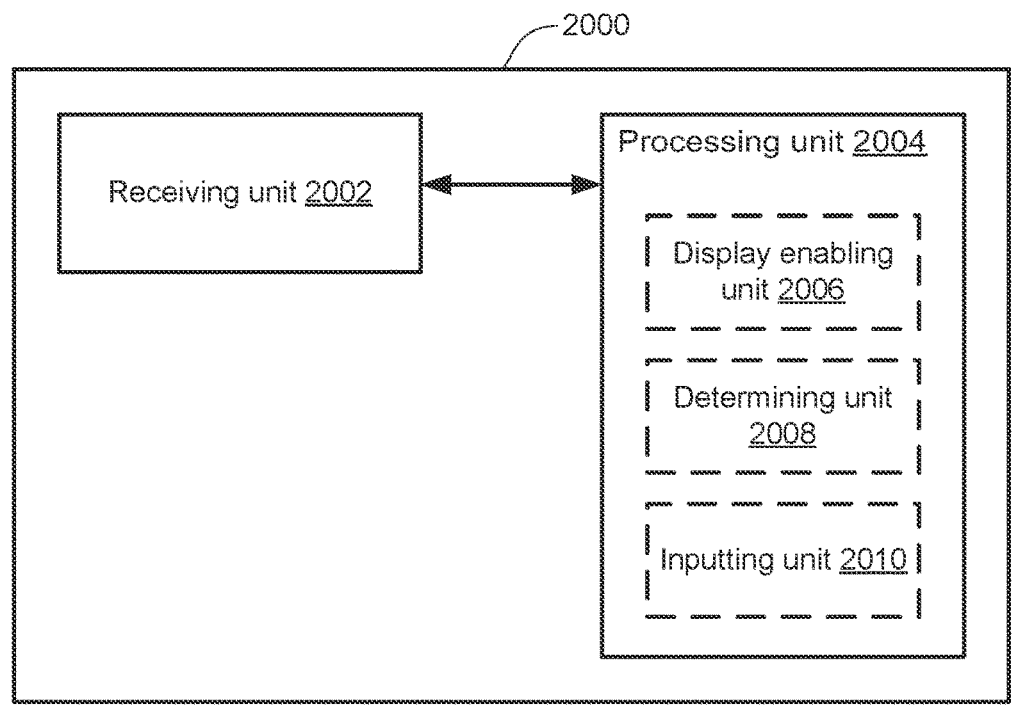

In accordance with some embodiments, FIG. 20 shows a functional block diagram of a first device 2000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 20 are, optionally, combined or separated into sub-blocks to implement the principles of the various described embodiments. Therefore, the description herein optionally supports any possible combination or separation or further definition of the functional blocks described herein.

As shown in FIG. 20, an electronic device 2000 optionally includes a receiving unit 2002 configured to receive inputs, and a processing unit 2004 coupled to the receiving unit 2002. In some embodiments, the processing unit 2004 includes a display enabling unit 2006, a determining unit 2008, and an inputting unit 2010.

In some embodiments, the receiving unit 2002 is configured to receive an indication of a first input that includes movement of a contact detected on a touch-sensitive surface of a device, wherein the movement of the contact corresponds to a plurality of candidate characters; and the processing unit 2004 is configured to: generate a user interface for display on a display device (e.g., with the display enabling unit 2006), wherein the user interface includes a text entry field; in response receiving the indication of the first input: in accordance with a determination that the text entry field is tolerant of character ambiguity (e.g., with the determining unit 2008), display a top candidate character of the plurality of candidate characters in the text entry field (e.g., with the display enabling unit 2006); and in accordance with a determination that the text entry field is not tolerant of character ambiguity (e.g., with the determining unit 2008), display a plurality of character selection options that correspond to at least two of the plurality of candidate characters (e.g., with the display enabling unit 2006). In some embodiments, the character ambiguity comprises ambiguity as to the case of a character entered into the text entry field. In some embodiments, the character ambiguity comprises ambiguity as to whether a character entered into the text entry field is a letter or a number. In some embodiments, the text entry field is determined to be a text entry field that is not tolerant of character ambiguity when the text entry field is a password entry field. In some embodiments, the determination as to the character ambiguity tolerance of the text entry field is made after receiving an indication of an end of the first input.

In some embodiments, the plurality of character selection options includes an upper case version and a lower case version of a character, the receiving unit is further configured to receive an indication of a second input detected on the touch-sensitive surface of the device, and the processing unit 2004 is further configured to: in response to receiving the indication of the second input: in accordance with a determination that the second input corresponds to the lower case version of the character (e.g., with the determining unit 2008), input the lower case version of the character into the text entry field (e.g., with the inputting unit 2010); and in accordance with a determination that the second input corresponds to the upper case version of the character (e.g., with the determining unit 2008), input the upper case version of the character into the text entry field (e.g., with the inputting unit 2010). In some embodiments, a first region of the touch-sensitive surface of the device is associated with a first candidate character of the plurality of candidate characters, a second region of the touch-sensitive surface of the device, different than the first region, is associated with a second candidate character of the plurality of candidate characters, the receiving unit 2002 is further configured to receive an indication of a second input detected on the touch-sensitive surface of the device, and the processing unit 2004 is further configured to: in response to receiving the indication of the second input: in accordance with a determination that the second input was detected on the first region of the touch-sensitive surface of the device (e.g., with the determining unit 2008), input the first candidate character into the text entry field (e.g., with the inputting unit 2010); and in accordance with a determination that the second input was detected on the second region of the touch-sensitive surface of the device (e.g., with the determining unit 2008), input the second candidate character into the text entry field (e.g., with the inputting unit 2010).

The operations described above with reference to FIGS. 7A-7G, 9A-9G, 11A-11D, 13A-13C and 15A-15D are, optionally, implemented by components depicted in FIGS. 1A-1B, FIG. 16, FIG. 17, FIG. 18, FIG. 19, or FIG. 20. For example, determining operations 712, 906, 1118, and 1304 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, FIGS. 1A-1B, FIG. 16, FIG. 17, FIG. 18, FIG. 19, or FIG. 20.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device with one or more processors and memory:
obtaining information that identifies a sequence of content items that includes a plurality of content items;
while a respective content item from the plurality of content items is a currently selected and playing content item, generating a user interface for display on a display device, wherein the user interface includes:
a representation of a current position in the respective content item; and
a navigation bar that includes a plurality of images corresponding to different positions in the respective content item and a representation of a first adjacent content item, different from the respective content item, in the plurality of content items that is adjacent to the respective content item in the sequence of content items, wherein the representation of the first adjacent content item corresponds to a position other than a position in the respective content item, and wherein the first adjacent content item is not a currently playing content item; and
providing the user interface to the display device.

2. The method of claim 1, wherein the representation of the first adjacent content item in the navigation bar comprises an image from a position in the first adjacent content item.

3. The method of claim 1, wherein:
the navigation bar further includes a representation of a second adjacent content item in the plurality of content items that is adjacent to the respective content item in the sequence of content items,
the first adjacent content item precedes the respective content item in the sequence of content items, and
the second adjacent content item follows the respective content item in the sequence of content items.

4. The method of claim 1, wherein:
the navigation bar further includes a current position indicator overlaid on the plurality of images in the navigation bar, and
a relative location of the current position indicator with respect to each of the plurality of images in the navigation bar corresponds to:
the current position in the respective content item, and
the representation of the current position in the respective content item.

5. The method of claim 4, further comprising:
while the user interface is displayed on the display device, receiving an indication of a first input that includes a contact detected on a touch-sensitive surface of a device, wherein detecting the contact comprises detecting a movement of the contact; and
moving the current position indicator in the navigation bar in accordance with the movement of the contact, wherein moving the current position indicator comprises:
changing the relative location of the current position indicator with respect to each image of the plurality of images in the navigation bar in accordance with the movement of the contact; and
updating the current position in the respective content item and the representation of the current position in the respective content item in accordance with the relative location of the current position indicator with respect to each image of the plurality of images.

6. The method of claim 5, wherein a threshold separates the plurality of images in the navigation bar from the representation of the first adjacent content item in the navigation bar, the method further comprising:
determining that the current position indicator has crossed over the threshold from the plurality of images in the navigation bar to the representation of the first adjacent content item in the navigation bar; and
in accordance with the determination:
replacing, in the navigation bar, the plurality of images corresponding to different positions in the respective content item with a second plurality of images corresponding to different positions in the first adjacent content item;
setting the relative location of the current position indicator with respect to each image of the second plurality of images in the navigation bar to correspond to a current position in the first adjacent content item;
replacing, in the navigation bar, the representation of the first adjacent content item with a representation of a second adjacent content item in the plurality of content items, wherein:
the second adjacent content item is different than the respective content item, and
the second adjacent content item is adjacent to the first adjacent content item in the sequence of content items; and
replacing, in the user interface, the representation of the current position of the respective content item with a representation of the current position in the first adjacent content item.

7. The method of claim 5, wherein the device comprises an input device, and the input device and the display device are separate devices.

8. The method of claim 1, wherein:
the representation of the respective content item is larger than the navigation bar in the user interface,
the representation of the respective content item comprises video from the respective content item, the video including the plurality of images in the navigation bar, and
the plurality of images in the navigation bar comprise a plurality of still images from the respective content item.

9. The method of claim 1, wherein generating the user interface for display on the display device comprises:
  determining a content type of the respective content item;
  in accordance with a determination that the content type of the respective content item is a first content type, selecting a first position and a second position in the respective content item, the first position and the second position being separated by a first interval, wherein:
    the first interval is a time-based interval,
    a first image of the plurality of images in the navigation bar corresponds to the first position in the respective content item, and
    a second image of the plurality of images in the navigation bar corresponds to the second position in the respective content item; and
  in accordance with a determination that the content type of the respective content item is a second content type, selecting a third position and a fourth position in the respective content item, the third position and the fourth position being separated by a second interval, different from the first interval, wherein:
    the second interval is a content-based interval,
    the first image of the plurality of images in the navigation bar corresponds to the third position in the respective content item, and
    the second image of the plurality of images in the navigation bar corresponds to the fourth position in the respective content item.

10. The method of claim 1, wherein obtaining the information that identifies the sequence of content items including the respective content item comprises:
  determining a content type of the respective content item;
  in accordance with a determination that the content type of the respective content item is a first content type, identifying a first sequence of content items that includes the respective content item, wherein a first content item immediately precedes the respective content item in the sequence of content items, and a second content item immediately follows the respective content item in the sequence of content items; and
  in accordance with a determination that the content type of the respective content item is a second content type, identifying a second sequence of content items that includes the respective content item, the second sequence of content items being different than the first sequence of content items, wherein a third content item is adjacent to the respective content item in the second sequence of content items, the third content item being different than the first content item and the second content item.

11. The method of claim 1, wherein:
  a first image of the plurality of images in the navigation bar corresponds to a first position in the respective content item, and
  a second image of the plurality of images in the navigation bar corresponds to a second position in the respective content item, the first position in the respective content item and the second position in the respective content item being separated by a first interval, the method further comprising:
  while the user interface is displayed on the display device, receiving an indication of a first input that includes a contact detected on a touch-sensitive surface of a device, wherein detecting the contact comprises detecting a movement of the contact;
  in accordance with the movement of the contact, selecting a third position and a fourth position in the respective content item, the third position and fourth position being separated by a second interval that is different than the first interval; and
  replacing the first image in the navigation bar with a third image corresponding to the third position in the respective content item, and the second image in the navigation bar with a fourth image corresponding to the fourth position in the respective content item.

12. The method of claim 11, wherein selecting the third position and the fourth position in the respective content item comprises:
  determining a content type of the respective content item;
  in accordance with a determination that the content type of the respective content item is a first content type, selecting the second interval separating the third position and fourth position in the respective content item to be a time-based interval; and
  in accordance with a determination that the content type of the respective content item is a second content type, selecting the second interval separating the third position and fourth position in the respective content item to be a content-based interval.

13. An electronic device, comprising:
  one or more processors;
  memory; and
  one or more programs, wherein the one or more programs are stored in the memory and configured to be executed by the one or more processors, the one or more programs including instructions for:
    obtaining information that identifies a sequence of content items that includes a plurality of content items;
    while a respective content item from the plurality of content items is a currently selected and playing content item, generating a user interface for display on a display device, wherein the user interface includes:
      a representation of a current position in the respective content item; and
      a navigation bar that includes a plurality of images corresponding to different positions in the respective content item and a representation of a first adjacent content item, different from the respective content item, item in the plurality of content items that is adjacent to the respective content item in the sequence of content items, wherein the representation of the first adjacent content item corresponds to a position other than a position in the respective content item, and wherein the first adjacent content item is not a currently playing content item; and
    providing the user interface to the display device.

14. A non-transitory computer readable storage medium storing one or more programs, the one or more programs comprising instructions, which when executed by an electronic device with one or more processors and memory, cause the device to:
  obtain information that identifies a sequence of content items that includes a plurality of content items;
  while a respective content item from the plurality of content items is a currently selected and playing content item, generate a user interface for display on a display device, wherein the user interface includes:
    a representation of a current position in the respective content item; and a navigation bar that includes a plurality of images corresponding to different positions in the respective content item and a representation of a first adjacent content item, different from the respective content item, in the plurality of content items that is adjacent to the respective content item in the sequence of content items, wherein the representation of the first adjacent content item corresponds to a position other than a position in the respective content item, and wherein the first adjacent content item is not a currently playing content item; and provide the user interface to the display device.

15. The method of claim 1, wherein the representation of the first adjacent content item corresponds to a position in the first adjacent content item.

16. The method of claim 1, wherein the content items of the plurality of content items are television broadcasts, the respective content item is a first television broadcast in a first time slot, and the first adjacent content item is a second television broadcast, different from the first television broadcast, in a second time slot.

17. The method of claim 1, wherein the content items of the plurality of content items are episodes of a television series, the respective content item is a first episode of the television series, and the first adjacent content item is a second episode of the television series, different from the first episode of the television series.

18. The electronic device of claim 13, wherein the representation of the first adjacent content item in the navigation bar comprises an image from a position in the first adjacent content item.

19. The electronic device of claim 13, wherein:
the navigation bar further includes a representation of a second adjacent content item in the plurality of content items that is adjacent to the respective content item in the sequence of content items,
the first adjacent content item precedes the respective content item in the sequence of content items, and
the second adjacent content item follows the respective content item in the sequence of content items.

20. The electronic device of claim 13, wherein:
the navigation bar further includes a current position indicator overlaid on the plurality of images in the navigation bar, and
a relative location of the current position indicator with respect to each of the plurality of images in the navigation bar corresponds to:
the current position in the respective content item, and
the representation of the current position in the respective content item.

21. The electronic device of claim 20, the one or more programs further including instructions for:
while the user interface is displayed on the display device, receiving an indication of a first input that includes a contact detected on a touch-sensitive surface of a device, wherein detecting the contact comprises detecting a movement of the contact; and
moving the current position indicator in the navigation bar in accordance with the movement of the contact, wherein moving the current position indicator comprises:
changing the relative location of the current position indicator with respect to each image of the plurality of images in the navigation bar in accordance with the movement of the contact; and
updating the current position in the respective content item and the representation of the current position in the respective content item in accordance with the relative location of the current position indicator with respect to each image of the plurality of images.

22. The electronic device of claim 21, wherein a threshold separates the plurality of images in the navigation bar from the representation of the first adjacent content item in the navigation bar, the one or more programs further including instructions for:
determining that the current position indicator has crossed over the threshold from the plurality of images in the navigation bar to the representation of the first adjacent content item in the navigation bar; and
in accordance with the determination:
replacing, in the navigation bar, the plurality of images corresponding to different positions in the respective content item with a second plurality of images corresponding to different positions in the first adjacent content item;
setting the relative location of the current position indicator with respect to each image of the second plurality of images in the navigation bar to correspond to a current position in the first adjacent content item;
replacing, in the navigation bar, the representation of the first adjacent content item with a representation of a second adjacent content item in the plurality of content items, wherein:
the second adjacent content item is different than the respective content item, and
the second adjacent content item is adjacent to the first adjacent content item in the sequence of content items; and
replacing, in the user interface, the representation of the current position of the respective content item with a representation of the current position in the first adjacent content item.

23. The electronic device of claim 21, wherein the electronic device comprises an input device, and the input device and the display device are separate devices.

24. The electronic device of claim 13, wherein:
the representation of the respective content item is larger than the navigation bar in the user interface,
the representation of the respective content item comprises video from the respective content item, the video including the plurality of images in the navigation bar, and
the plurality of images in the navigation bar comprise a plurality of still images from the respective content item.

25. The electronic device of claim 13, wherein generating the user interface for display on the display device comprises:
determining a content type of the respective content item;
in accordance with a determination that the content type of the respective content item is a first content type, selecting a first position and a second position in the respective content item, the first position and the second position being separated by a first interval, wherein:
the first interval is a time-based interval,
a first image of the plurality of images in the navigation bar corresponds to the first position in the respective content item, and
a second image of the plurality of images in the navigation bar corresponds to the second position in the respective content item; and
in accordance with a determination that the content type of the respective content item is a second content type, selecting a third position and a fourth position in the respective content item, the third position and the fourth position being separated by a second interval, different from the first interval, wherein:
- the second interval is a content-based interval,
- the first image of the plurality of images in the navigation bar corresponds to the third position in the respective content item, and
- the second image of the plurality of images in the navigation bar corresponds to the fourth position in the respective content item.

26. The electronic device of claim 13, wherein obtaining the information that identifies the sequence of content items including the respective content item comprises:
- determining a content type of the respective content item;
- in accordance with a determination that the content type of the respective content item is a first content type, identifying a first sequence of content items that includes the respective content item, wherein a first content item immediately precedes the respective content item in the sequence of content items, and a second content item immediately follows the respective content item in the sequence of content items; and
- in accordance with a determination that the content type of the respective content item is a second content type, identifying a second sequence of content items that includes the respective content item, the second sequence of content items being different than the first sequence of content items, wherein a third content item is adjacent to the respective content item in the second sequence of content items, the third content item being different than the first content item and the second content item.

27. The electronic device of claim 13, wherein:
- a first image of the plurality of images in the navigation bar corresponds to a first position in the respective content item, and
- a second image of the plurality of images in the navigation bar corresponds to a second position in the respective content item, the first position in the respective content item and the second position in the respective content item being separated by a first interval, the one or more programs further including instructions for:
- while the user interface is displayed on the display device, receiving an indication of a first input that includes a contact detected on a touch-sensitive surface of a device, wherein detecting the contact comprises detecting a movement of the contact;
- in accordance with the movement of the contact, selecting a third position and a fourth position in the respective content item, the third position and fourth position being separated by a second interval that is different than the first interval; and
- replacing the first image in the navigation bar with a third image corresponding to the third position in the respective content item, and the second image in the navigation bar with a fourth image corresponding to the fourth position in the respective content item.

28. The electronic device of claim 27, wherein selecting the third position and the fourth position in the respective content item comprises:
- determining a content type of the respective content item;
- in accordance with a determination that the content type of the respective content item is a first content type, selecting the second interval separating the third position and fourth position in the respective content item to be a time-based interval; and
- in accordance with a determination that the content type of the respective content item is a second content type, selecting the second interval separating the third position and fourth position in the respective content item to be a content-based interval.

29. The electronic device of claim 13, wherein the representation of the first adjacent content item corresponds to a position in the first adjacent content item.

30. The electronic device of claim 13, wherein the content items of the plurality of content items are television broadcasts, the respective content item is a first television broadcast in a first time slot, and the first adjacent content item is a second television broadcast, different from the first television broadcast, in a second time slot.

31. The electronic device of claim 13, wherein the content items of the plurality of content items are episodes of a television series, the respective content item is a first episode of the television series, and the first adjacent content item is a second episode of the television series, different from the first episode of the television series.

32. The non-transitory computer readable storage medium of claim 14, wherein the representation of the first adjacent content item in the navigation bar comprises an image from a position in the first adjacent content item.

33. The non-transitory computer readable storage medium of claim 14, wherein:
- the navigation bar further includes a representation of a second adjacent content item in the plurality of content items that is adjacent to the respective content item in the sequence of content items,
- the first adjacent content item precedes the respective content item in the sequence of content items, and
- the second adjacent content item follows the respective content item in the sequence of content items.

34. The non-transitory computer readable storage medium of claim 14, wherein:
- the navigation bar further includes a current position indicator overlaid on the plurality of images in the navigation bar, and a relative location of the current position indicator with respect to each of the plurality of images in the navigation bar corresponds to:
  - the current position in the respective content item, and
  - the representation of the current position in the respective content item.

35. The non-transitory computer readable storage medium of claim 34, wherein the instructions further cause the device to:
- while the user interface is displayed on the display device, receive an indication of a first input that includes a contact detected on a touch-sensitive surface of a device, wherein detecting the contact comprises detecting a movement of the contact; and
- move the current position indicator in the navigation bar in accordance with the movement of the contact, wherein moving the current position indicator comprises:
  - changing the relative location of the current position indicator with respect to each image of the plurality of images in the navigation bar in accordance with the movement of the contact; and
  - updating the current position in the respective content item and the representation of the current position in the respective content item in accordance with the relative location of the current position indicator with respect to each image of the plurality of images.

36. The non-transitory computer readable storage medium of claim 35, wherein a threshold separates the plurality of images in the navigation bar from the representation of the first adjacent content item in the navigation bar, and the instructions further cause the device to:

determine that the current position indicator has crossed over the threshold from the plurality of images in the navigation bar to the representation of the first adjacent content item in the navigation bar; and in accordance with the determination:

replace, in the navigation bar, the plurality of images corresponding to different positions in the respective content item with a second plurality of images corresponding to different positions in the first adjacent content item;

set the relative location of the current position indicator with respect to each image of the second plurality of images in the navigation bar to correspond to a current position in the first adjacent content item;

replace, in the navigation bar, the representation of the first adjacent content item with a representation of a second adjacent content item in the plurality of content items, wherein:

the second adjacent content item is different than the respective content item, and the second adjacent content item is adjacent to the first adjacent content item in the sequence of content items; and replace, in the user interface, the representation of the current position of the respective content item with a representation of the current position in the first adjacent content item.

37. The non-transitory computer readable storage medium of claim 35, wherein the device comprises an input device, and the input device and the display device are separate devices.

38. The non-transitory computer readable storage medium of claim 14, wherein:

the representation of the respective content item is larger than the navigation bar in the user interface, the representation of the respective content item comprises video from the respective content item, the video including the plurality of images in the navigation bar, and the plurality of images in the navigation bar comprise a plurality of still images from the respective content item.

39. The non-transitory computer readable storage medium of claim 14, wherein generating the user interface for display on the display device comprises:

determining a content type of the respective content item;

in accordance with a determination that the content type of the respective content item is a first content type, selecting a first position and a second position in the respective content item, the first position and the second position being separated by a first interval, wherein:

the first interval is a time-based interval, a first image of the plurality of images in the navigation bar corresponds to the first position in the respective content item, and a second image of the plurality of images in the navigation bar corresponds to the second position in the respective content item; and in accordance with a determination that the content type of the respective content item is a second content type, selecting a third position and a fourth position in the respective content item, the third position and the fourth position being separated by a second interval, different from the first interval, wherein:

the second interval is a content-based interval, the first image of the plurality of images in the navigation bar corresponds to the third position in the respective content item, and the second image of the plurality of images in the navigation bar corresponds to the fourth position in the respective content item.

40. The non-transitory computer readable storage medium of claim 14, wherein obtaining the information that identifies the sequence of content items including the respective content item comprises:

determining a content type of the respective content item;

in accordance with a determination that the content type of the respective content item is a first content type, identifying a first sequence of content items that includes the respective content item, wherein a first content item immediately precedes the respective content item in the sequence of content items, and a second content item immediately follows the respective content item in the sequence of content items; and in accordance with a determination that the content type of the respective content item is a second content type, identifying a second sequence of content items that includes the respective content item, the second sequence of content items being different than the first sequence of content items, wherein a third content item is adjacent to the respective content item in the second sequence of content items, the third content item being different than the first content item and the second content item.

41. The non-transitory computer readable storage medium of claim 14, wherein:

a first image of the plurality of images in the navigation bar corresponds to a first position in the respective content item, and a second image of the plurality of images in the navigation bar corresponds to a second position in the respective content item, the first position in the respective content item and the second position in the respective content item being separated by a first interval, and the instructions further cause the device to:

while the user interface is displayed on the display device, receive an indication of a first input that includes a contact detected on a touch-sensitive surface of a device, wherein detecting the contact comprises detecting a movement of the contact;

in accordance with the movement of the contact, select a third position and a fourth position in the respective content item, the third position and fourth position being separated by a second interval that is different than the first interval; and replace the first image in the navigation bar with a third image corresponding to the third position in the respective content item, and the second image in the navigation bar with a fourth image corresponding to the fourth position in the respective content item.

42. The non-transitory computer readable storage medium of claim 41, wherein selecting the third position and the fourth position in the respective content item comprises:

determining a content type of the respective content item;

in accordance with a determination that the content type of the respective content item is a first content type, selecting the second interval separating the third position and fourth position in the respective content item to be a time-based interval; and in accordance with a determination that the content type of the respective content item is a second content type, selecting the second interval separating the third position and fourth position in the respective content item to be a content-based interval.

43. The non-transitory computer readable storage medium of claim 14, wherein the representation of the first adjacent content item corresponds to a position in the first adjacent content item.

44. The non-transitory computer readable storage medium of claim 14, wherein the content items of the plurality of content items are television broadcasts, the respective content item is a first television broadcast in a first time slot, and the first adjacent content item is a second television broadcast, different from the first television broadcast, in a second time slot.

45. The non-transitory computer readable storage medium of claim 14, wherein the content items of the plurality of content items are episodes of a television series, the respective content item is a first episode of the television series, and the first adjacent content item is a second episode of the television series, different from the first episode of the television series.

\* \* \* \* \*